United States Patent [19]

Tai et al.

[11] Patent Number: 5,034,309
[45] Date of Patent: Jul. 23, 1991

[54] NAPHTHALOCYANINE DERIVATIVES AND THEIR USE IN OPTICAL RECORDING MEDIUM

[75] Inventors: Seiji Tai; Shigeru Hayashida; Nobuyuki Hayashi; Hideo Hagiwara; Mitsuo Katayose; Koichi Kamijima; Takayuki Akimoto; Susumu Era; Setsuo Kobayashi, all of Hitachi; Akio Mukoh, Mito, all of Japan

[73] Assignees: Hitachi Chemical Co., Ltd.; Hitachi, Ltd., both of Tokyo, Japan

[21] Appl. No.: 211,692

[22] Filed: Jun. 24, 1988

[30] Foreign Application Priority Data

| Jun. 26, 1987 | [JP] | Japan | 62-160498 |
| Sep. 18, 1987 | [JP] | Japan | 62-235710 |
| Mar. 23, 1988 | [JP] | Japan | 63-68464 |

[51] Int. Cl.[5] .................... G11B 7/24; C09B 47/00
[52] U.S. Cl. ..................... 430/495; 430/270; 430/945; 540/128
[58] Field of Search .............. 540/128, 140; 430/270, 430/495, 945

[56] References Cited

U.S. PATENT DOCUMENTS

| 3,094,535 | 6/1963 | Kenney et al. | |
| 3,094,536 | 6/1963 | Kenney et al. | |
| 4,622,179 | 11/1986 | Eda. | |
| 4,725,525 | 2/1988 | Kenney et al. | 430/270 |
| 4,798,781 | 1/1989 | Hirose et al. | 430/270 |

FOREIGN PATENT DOCUMENTS

| 456203 | 4/1949 | Canada. |
| 0191215 | 8/1986 | European Pat. Off. . |
| 0191970 | 8/1986 | European Pat. Off. . |

*Primary Examiner*—Charles L. Bowers, Jr.
*Assistant Examiner*—Mark R. Buscher
*Attorney, Agent, or Firm*—Antonelli, Terry, Stout & Kraus

[57] ABSTRACT

Novel naphthalocyanine derivatives are disclosed in the specification are useful for forming a recording layer in an optical recording medium. These derivatives are represented by the following formula (I):

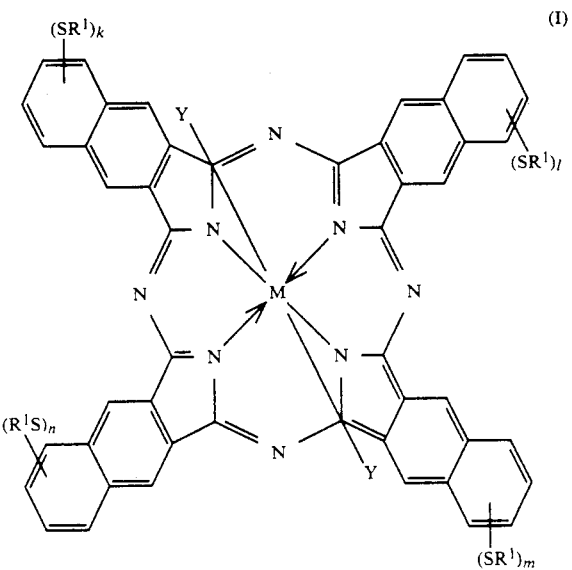

in which k, l, m and n, which may be the same or different, are zero or integers of 1 to 4, k+l+m+n being an integer of 1 or more; $R^1$'s in a number of (k+l+m+n), which may be the same or different, are alkyl groups, substituted alkyl groups, or aryl groups; M is Si, Ge or Sn; and two Y's, which may be the same or different, are aryloxyl groups, alkoxyl groups, trialkylsiloxyl groups, triarylsiloxyl groups, trialkoxysiloxyl groups, triaryloxysiloxyl groups, trityloxyl groups, or acyloxyl groups. These derivatives are especially useful in the preparation of an optical recording medium.

20 Claims, 60 Drawing Sheets

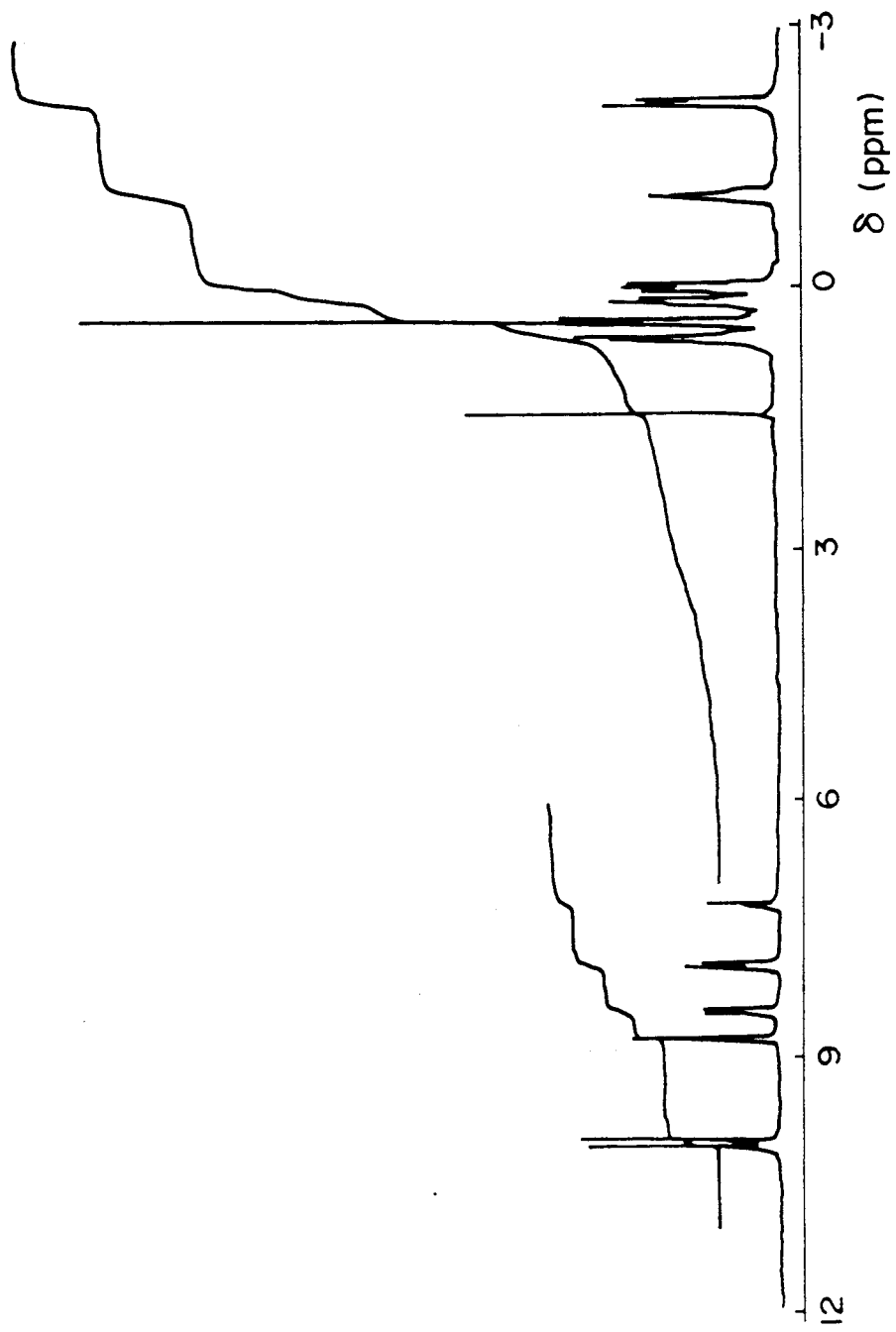
F I G. 15

NAPHTHALOCYANINE DERIVATIVES AND THEIR USE IN OPTICAL RECORDING MEDIUM

BACKGROUND OF THE INVENTION

This invention relates to a naphthalocyanine derivative, a process for producing the same, an optical recording medium using the same, and a process for producing the optical recording medium.

In recent years, it has been proposed to utilize diode laser beams for writing and reading in compact discs, video discs, liquid crystal display devices, optical reading machines etc. and as light source for electrophotograph. For writing or reading by use of diode laser beams, a substance capable of absorbing diode laser beams, i.e., near infrared rays is indispensable.

As organic dyes which absorb near infrared rays, cyanine dyes have heretofore been well known, and metal complexes of oximes and thiols and aminated quinone derivatives are also known as dyes which absorb near infrared rays [Yuki Gosei Kagaku Kyokai Shi, vol. 43, p. 334 (1985), Shikizai Kyokai Shi, vol. 53, p. 197 (1980), and Shikizai Kyokai Shi, vol. 58, p. 220 (1985)].

However, the cyanine dyes have a very low stability against light and hence their employment has many restrictions. The metal complexes of oximes and thiols are disadvantageous in that the metals are released from the complexes in a certain medium, resulting in loss of the ability to absorb near infrared rays. The aminated quinone derivatives are very poor in ability to absorb near infrared rays.

On the other hand, as materials capable of overcoming these problems, naphthalocyanine derivatives have recently been known, but conventional unsubstituted metal naphthalocyanines [Zhurnal Obshchei Khimii, vol. 39, p. 2554 (1969) and Mol. Cryst. Liq. Cryst. 112, 345 (1984)] are insoluble in organic solvents and hence are very difficult to purify. Recently, synthesis of naphthalocyanine derivatives soluble in organic solvents has been reported (Japanese Patent Appln Kokai (Laid-Open) Nos. 60-23451, 60-184565, 61-215662 and 61-215663), but these naphthalocyanine derivatives have the following disadvantages. Their absorption varies greatly depending on the kind of solvent, concentration, temperature, etc., and in a solution having a high concentration or in the form of a solid film, their ability to absorb diode laser beams is greatly lowered and moreover the reflectivity which is important when reflected light is used for reading out information recorded in an optical disc is very low in the diode laser region (780 to 830 nm).

Only two compounds have been reported in Japanese Patent Appln Kokai No. 61-235188 as naphthalocyanines having a high reflectivity, and the concept of synthesis of these compounds has been reported in Japanese Patent Appln. Kokai Nos. 61-177287 and 61-177288, but only a small number of Examples are described therein and in few Examples, the compounds can be synthesized in the manner described therein. For example, in the case of the reaction formula I described in the first line in the right, top column on page 8 of Japanese Patent Appln Kokai (Laid-Open) No. 61-177288, when a long-chain alkyl group or the like is contained in Xn, the solubility of a starting material:

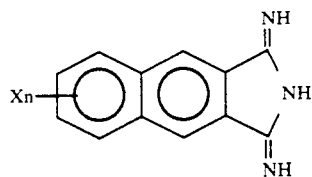

is too large, and in synthesizing this material, isolation of the material from a reaction solution becomes impossible and moreover a reaction mixture in a synthesis step of a starting material:

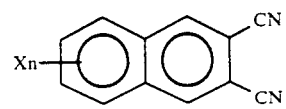

for the above-mentioned starting material is complicated, so that separation and purification of this compound from a reaction system becomes difficult. Therefore, it becomes impossible to use the starting materials for synthesizing a desired naphthalocyanine. The reaction formula II described in the third line in the right, top column on page 8 of Japanese Patent Appln Kokai (Laid-Open) No. 61-177288 shows a nucleophilic reaction of a naphthalocyanine ring which is similar to Friedel-Craft reaction, and it is not suitable for introduction of alkoxyl groups, alkylthio groups, and amino groups into a naphthalocyanine ring. Further, in the case of the reaction formula III described in the fifth line in the right, top column on page 8 of Japanese Patent Appln. Kokai (Laid-Open) No. 61-177288, purification of a starting material is impossible, and a product is obtained in the form of a very complicated mixture and is difficult to purify. Therefore, this reaction formula is not suitable for isolating a product of high purity, and moreover the reaction cannot be allowed to proceed in a desirable direction because the reaction itself is inhibited by the influence of a hydroxyl group bonded to Si of the starting material. Thus, there has been a problem that a synthetic method should be independently found for synthesizing naphthalocyanines particularly having a long-chain alkyl group in the naphthalocyanine ring which is actually soluble in organic solvents and has excellent characteristics as an optical recording medium.

SUMMARY OF THE INVENTION

This invention provides a naphthalocyanine derivative represented by the formula:

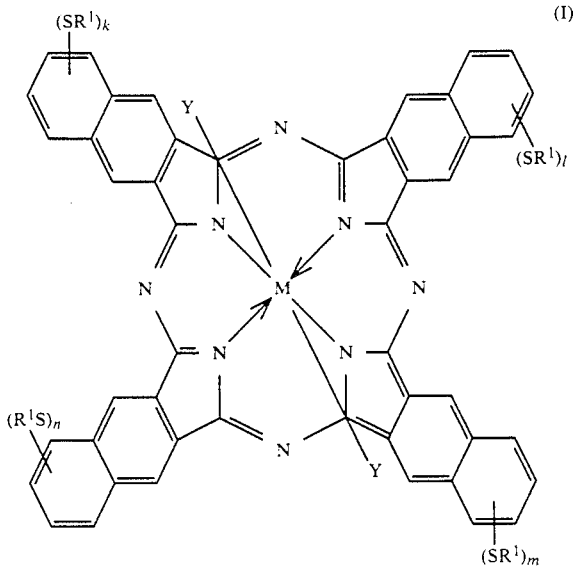

wherein k, l, m and n, which may be the same or different, are zero or integers of 1 to 4, k+l+m+n being an integer of 1 or more; $R^1$'s in a number of 4(k+l+m+n), which may be the same or different, are alkyl groups, substituted alkyl groups or aryl groups; M is Si, Ge, or Sn; and two Y's, which are the same or different are aryloxyl groups, alkoxyl groups, trialkylsiloxyl groups, triarylsiloxyl groups, trialkoxysiloxyl groups, triaryloxysiloxyl groups, trityloxyl groups, or acyloxyl groups.

This invention further provides a process for producing a naphthalocyanine derivative of the formula (I) which comprises reacting a naphthalocyanine derivative represented by the formula:

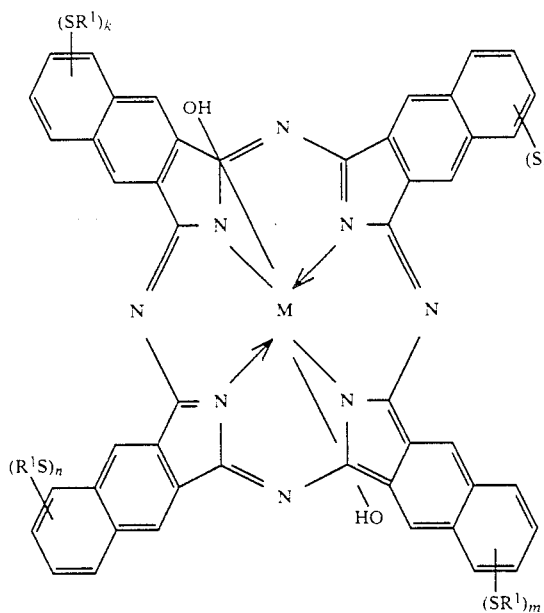

wherein k, l, m and n, which may be the same or different, are zero or integers of 1 to 4, k+l+m+n being an integer of 1 or more; M is Si, Ge or Sn, with a chlorosilane represented by the formula:

$$(R^2)_3SiCl \qquad (III).$$

a silanol represented by the formula:

$$(R^3)_3SiOH \qquad (IV)$$

(in the formulas (III) and (IV), each of $R^2$ and $R^3$ is an alkyl group, an aryl group, an alkoxyl group or an aryloxyl group), an alcohol represented by the formula:

$$R^4OH \qquad (V)$$

wherein $R^4$ is an alkyl group or an aryl group, or a compound represented by the formula:

$$R^5CO.X \qquad (VI)$$

wherein $R^5$ is an alkyl group, and X is a halogen atom, a hydroxyl group, or an acyloxyl group.

This invention further provides a process for producing a naphthalocyanine derivative of the formula (I) which comprises reacting a naphthalocyanine derivative represented by the formula:

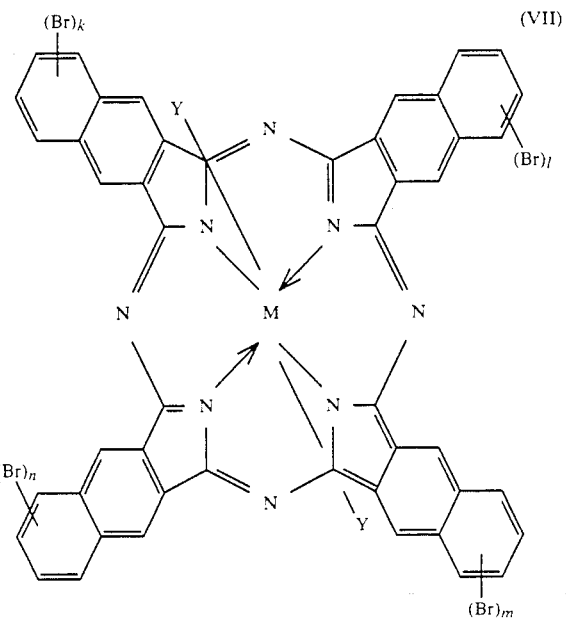

wherein k, l, m and n, which may be the same or different, are zero or integers of 1 to 4, k+l+m+n being an integer of 1 or more; M is Si, Ge or Sn; and two Y's, which may be the same or different, are aryloxyl groups, alkoxyl groups, trialkylsiloxyl groups, triarylsiloxyl groups, trialkoxysiloxyl groups, triaryloxysiloxyl groups, trityloxyl groups or acyloxyl groups, with a copper (I) thiolate represented by the formula:

$$CuSR^1 \qquad (VIII)$$

wherein $R^1$ is an alkyl group, a substituted alkyl group, or an aryl group.

This invention further provides an optical recording medium comprising a substrate and a recording layer composed mainly of a naphthalocyanine derivative of the formula (I) formed on the surface of the substrate.

This invention further provides a process for producing an optical recording medium which comprises forming a recording film or layer on a substrate by use of a solution prepared by dissolving a naphthalocyanine derivative of the formula (I) as a main component in an organic solvent.

BRIEF DESCRIPTION OF THE DRAWINGS

FIG. 15 is an NMR spectrum of bis(tri-n-hexylsiloxy)silicon-tetrabromonaphthalocyanine.

DESCRIPTION OF THE PREFERRED EMBODIMENTS

Figure 1:
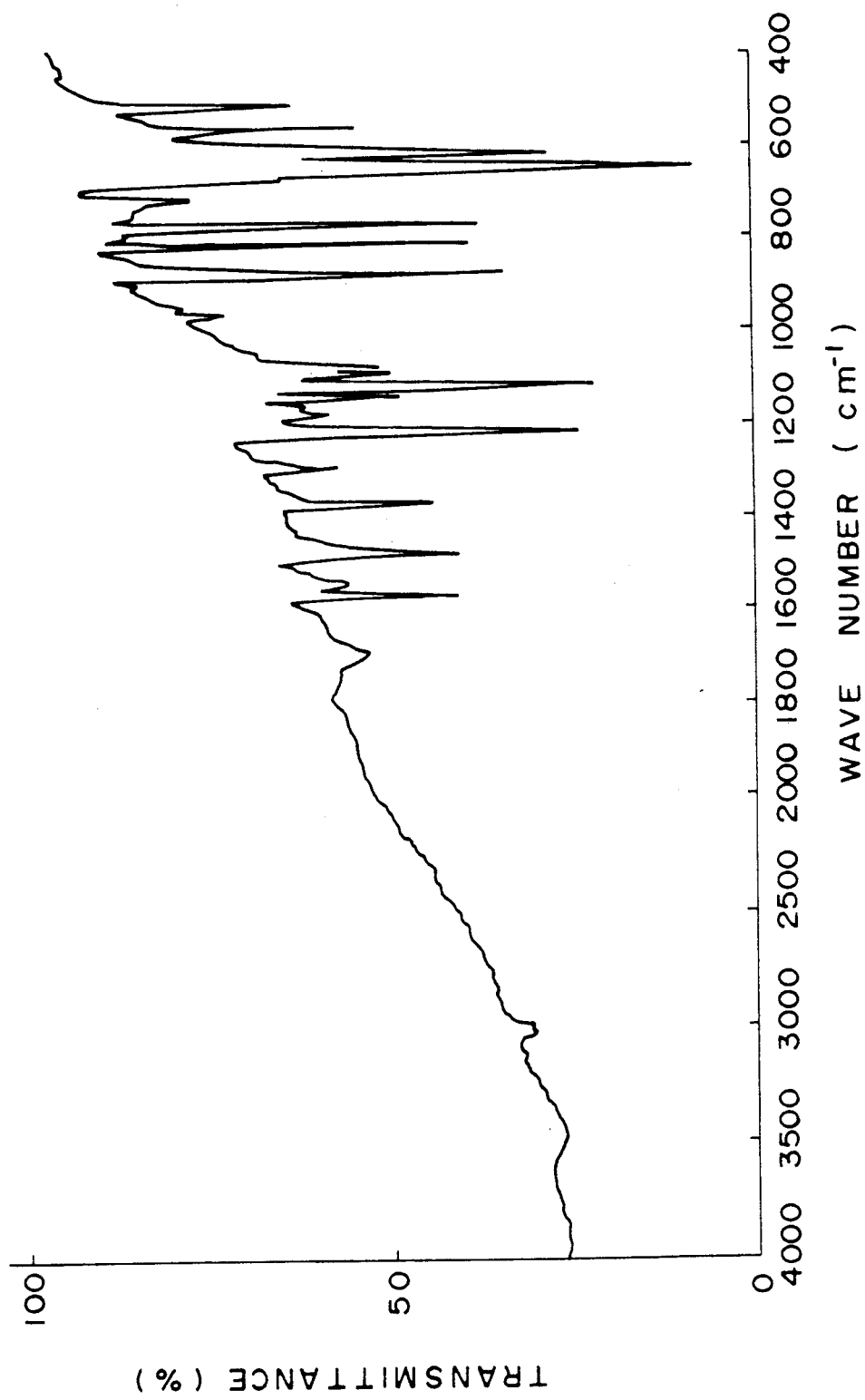
FIG. 1 is an IR spectrum of 3,4-bis(dibromomethyl)-bromobenzene.

This invention provides a naphthalocyanine derivative represented by the formula:

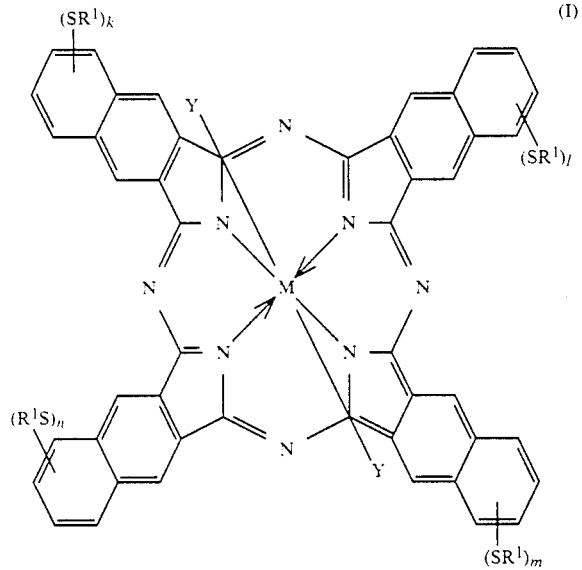

wherein k, l, m and n, which may be the same or different, are zero or integers of 1 to 4, $k+l+m+n$ being an integer of 1 or more; $R^1$'s in a number of $(k+l+m+n)$, which may be the same or different, are alkyl groups, substituted alkyl groups, or aryl groups; M is Si, Ge or Sn; and two Y's, which may be the same or different, are aryloxyl groups, alkoxyl groups, trialkylsiloxyl groups, triarylsiloxyl groups, trialkoxysiloxyl groups, triaryloxysiloxyl groups, trityloxyl groups, or acyloxyl groups.

The naphthalocyanine derivative of the formula (I) is soluble in aromatic solvent, halogenated solvents, ether solvents, ketone solvents and saturated hydrocarbon solvents, and can easily be purified to be improved in purity. Moreover, it does not change in absorption depending on the kind of solvent, concentration, etc. and is very excellent in ability to absorb diode laser beams.

The aromatic solvents include benzene, toluene, xylene, chlorobenzene, dichlorobenzene, trimethylbenzene, 1-chloronaphthalene, quinoline, etc. The halogenated solvents include methylene chloride, chloroform, carbon tetrachloride, trichloroethane, etc. The ether solvents include diethyl ether, dibutyl ether, tetrahydrofuran, ethylene glycol monomethyl ether, ethylene glycol dimethyl ether, diethylene glycol monomethyl ether, diethylene glycol dimethyl ether, etc. The ketone solvents include acetone, methyl ethyl ketone, methyl propyl ketone, cyclopentanone, cyclohexanone, acetone alcohol, etc. The saturated hydrocarbon solvents include hexane, heptane, octane, nonane, decane, undecane, dodecane, etc.

In the above formula (I), examples of the alkyl group for $R^1$ include methyl group, ethyl group, n-propyl group, sec-propyl group, n-butyl group, secbutyl group, t-butyl group, n-amyl group, t-amyl group, 2-amyl group, 3-amyl group, hexyl group, heptyl group, octyl group, decyl group, dodecyl group, tetradecyl group, hexadecyl group, octadecyl group, eicosyl group, docosyl group, etc.; examples of the substituted alkyl group for $R^1$ include alkyl group having an ester group, alkyl groups having an amide group, alkyl groups having a hydroxyl group, aralkyl groups, alkoxyalkyl groups, haloalkyl groups, etc.; and examples of the aryl group for $R^1$ include phenyl group, tolyl group, anisyl group, halophenyl group, furyl group, thenyl group, pyridyl group, etc.

In the formula (I), M includes Si, Ge and Sn, and for Y, the aryloxyl group includes phenoxyl group, tolyloxyl group, anisyloxyl group, etc.; the alkoxyl group includes amyloxyl group, hexyloxyl group, octyloxyl group, decyloxyl group, dodecyloxyl group, tetradecyloxyl group, hexadecyloxyl group, octadecyloxyl group, eicosyloxyl group, docosyloxyl group, etc.; the trialkylsiloxyl group includes trimethylsiloxyl group, triethylsiloxyl group, tripropylsiloxyl group, tributylsiloxyl group, etc.; the triarylsiloxyl group includes triphenylsiloxyl group, trianisylsiloxyl group, tritolylsiloxyl group, etc.; the trialkoxysiloxyl group includes trimethoxysiloxyl group, triethoxysiloxyl group, tripropoxysiloxyl group, tributoxysiloxyl group, etc.; the triaryloxysiloxyl group includes triphenoxysiloxyl group, trianisiloxysiloxyl group, tritolyloxysiloxyl group, etc.; and the acyloxy group includes acetoxyl group, propionyloxyl group, butyryloxyl group, valeryloxyl group, pivaloyloxyl group, hexanoyloxyl group, octanoyloxyl group, etc.

The length of the alkyl groups of these groups greatly affects not only the solubility of the naphthalocyanine derivative of the formula (I) in an organic solvent but also the melting point of this compound and absorption spectrum, transmission spectrum and reflection spectrum of an amorphous film formed by dissolving this compound in an organic solvent and spin-coating the resulting solution on a suitable substrate such as a glass plate.

In particular, the length of the alkyl group of the substituent Y bound to the central metal M greatly affects spectra of the spin-coated film. Therefore, the alkyl chain length of Y can be varied depending on the output wavelength of a laser used.

On the other hand, the alkyl chain length of $R^1$ serves to control the solubility in an organic solvent and the melting point of said compound in the case where the alkyl chain length of Y is varied.

For example, when Y is a trialkylsiloxyl group, the length of its alkyl group greatly affects spectrum of a spin-coated film: the shorter the alkyl chain length becomes, the more each of the absorption maximum, the minimum transmittance and the maximum reflectivity shifts to a longer wavelength range. Therefore, a compound which is particularly preferable for a diode laser used from the viewpoint of the maximum reflectivity can be obtained by varying the length of alkyl group of the trialkylsiloxyl group, and $R^1$ can be properly selected so as to make the solubility and melting point of the naphthalocyanine derivative the most suitable.

Naphthalocyanine derivative of the formula (I) in which M is Si or Ge are preferred.

Naphthalocyanine derivatives of the formula (I) in which k, l, m and n are all 1 are preferred.

Naphthalocyanine derivatives of the formula (I) in which two Y's are trialkylsiloxyl groups are preferred.

Naphthalocyanine derivatives of the formula (I) in which all $R^1$'s are alkyl groups having 1 to 22 carbon atoms are preferred.

Naphthalocyanine derivatives of the formula (I) in which all $R^1$'s are substituted alkyl groups are preferred.

Specific examples of the naphthalocyanine derivative of this invention are given below. In the formulas, Ph represents a phenyl group.

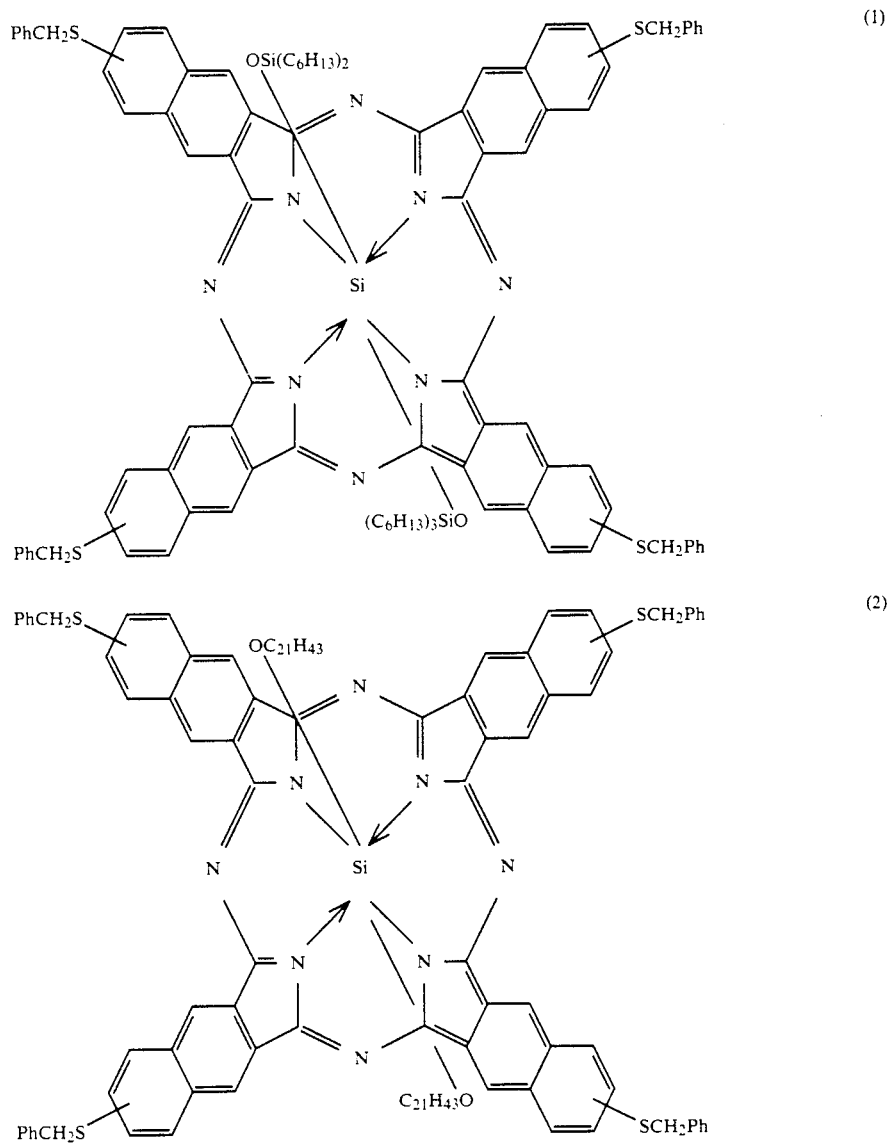

-continued
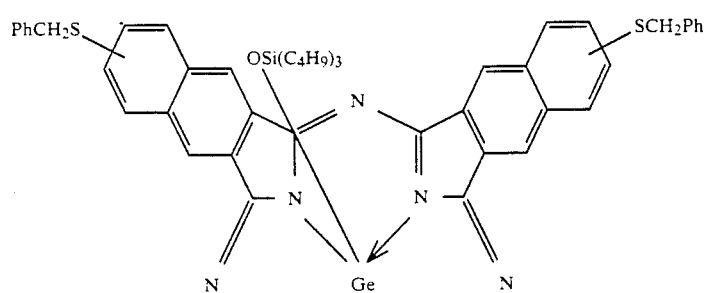
(3)
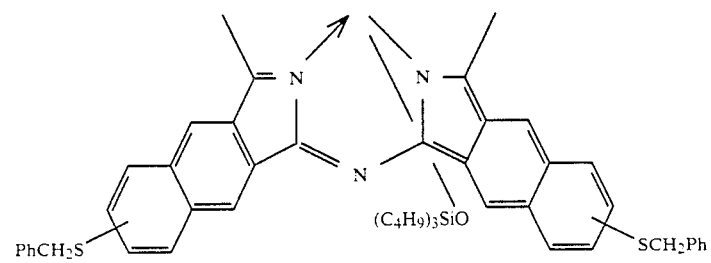
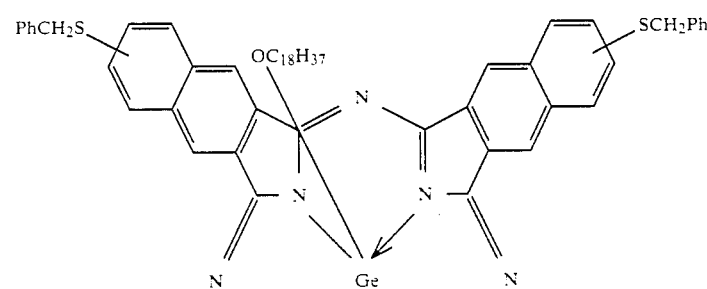
(4)
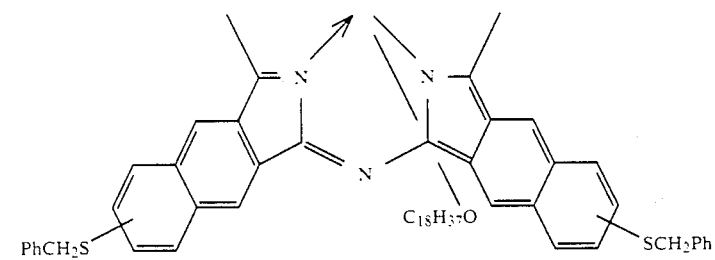
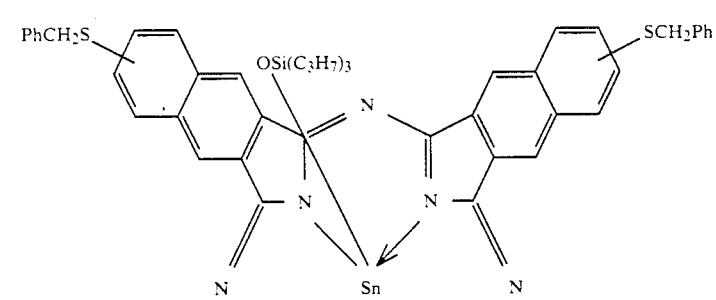
(5)
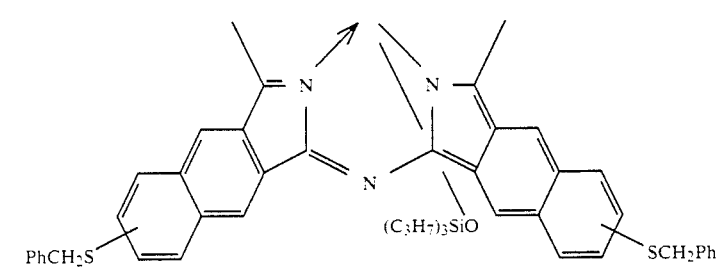

-continued
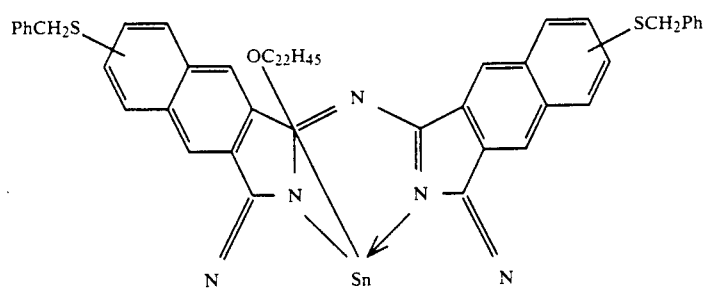
(6)
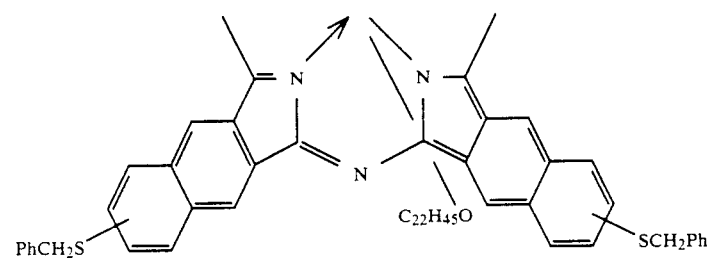
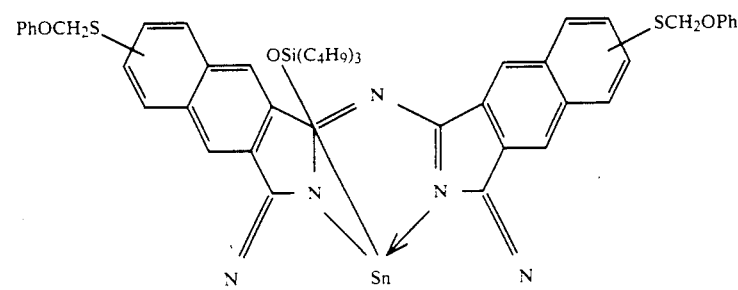
(7)
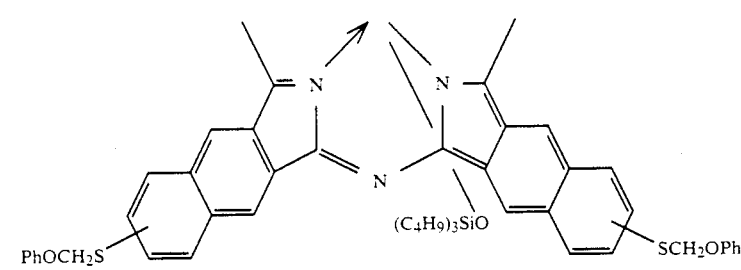
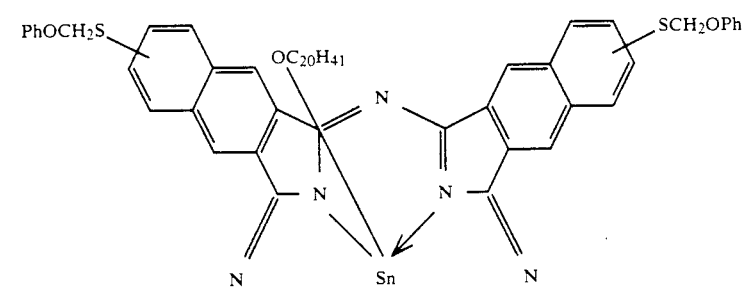
(8)
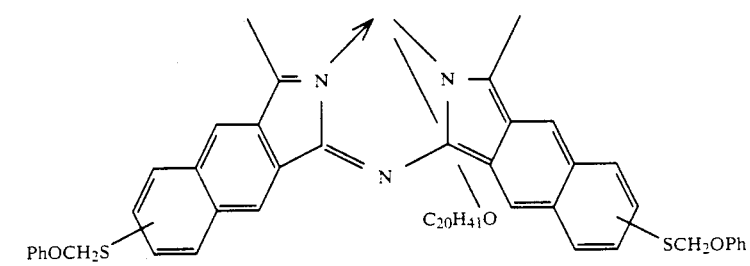

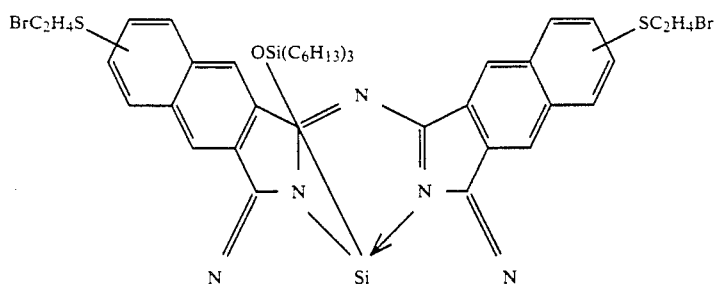
(9)
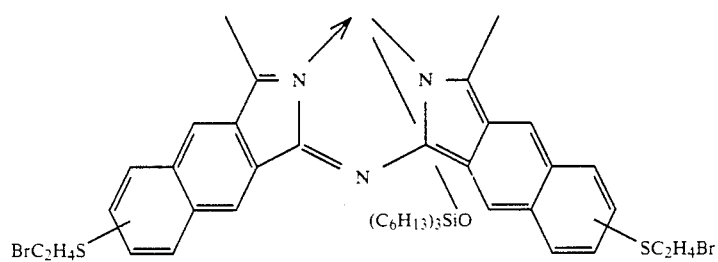
(10)
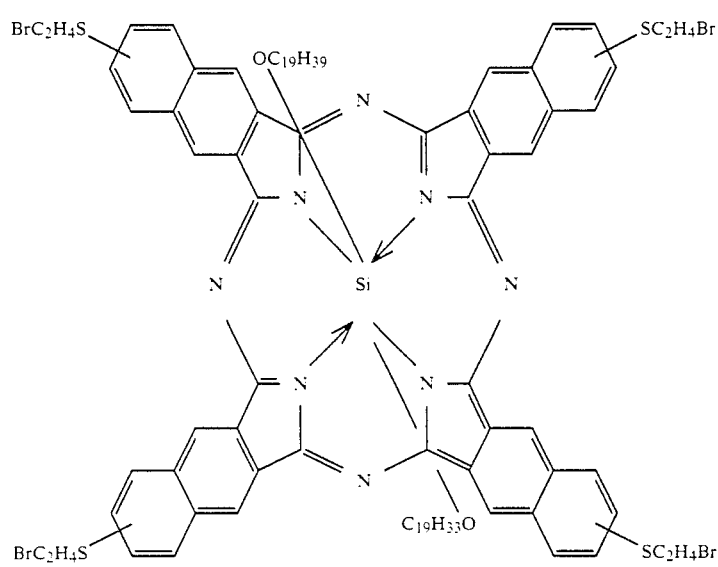
(11)

-continued
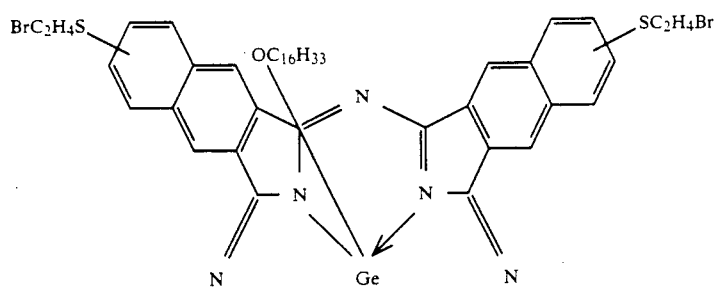
(12)
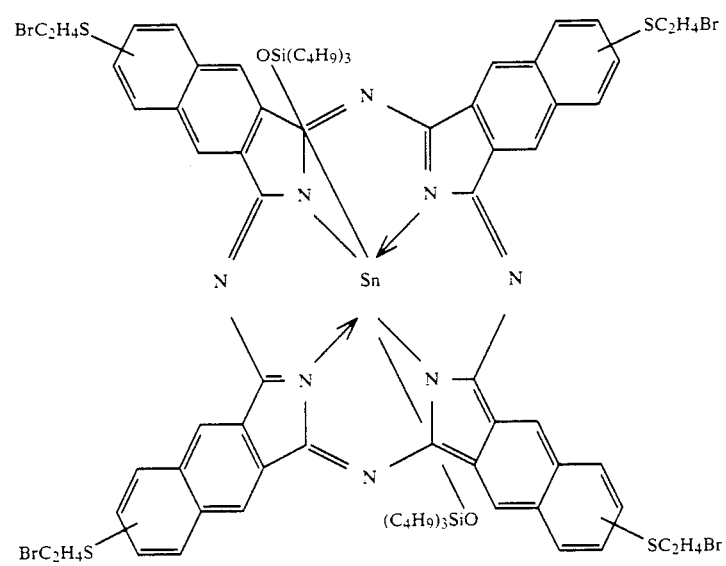
(13)
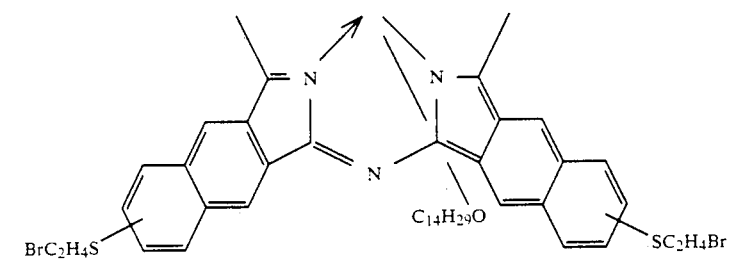
(14)

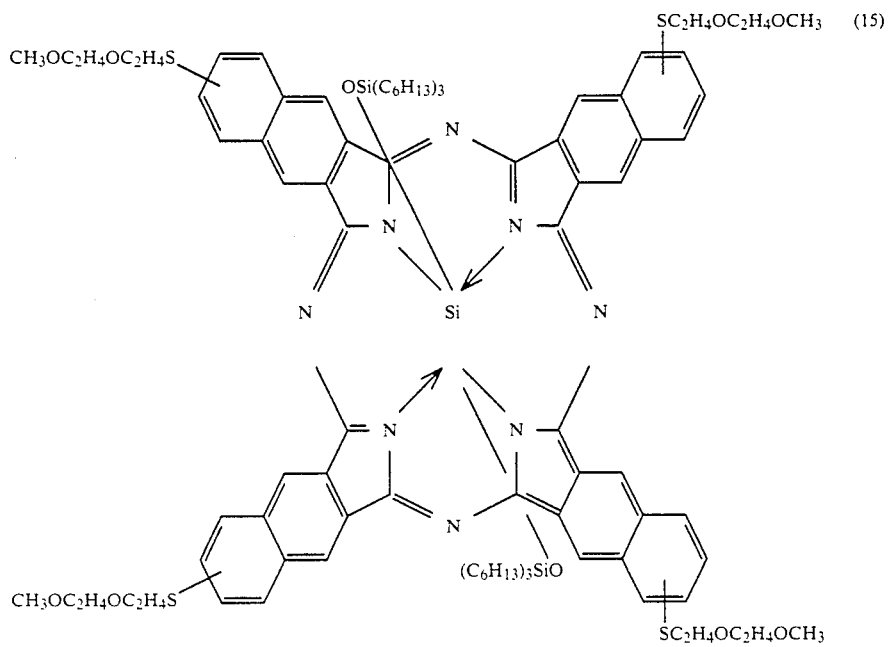
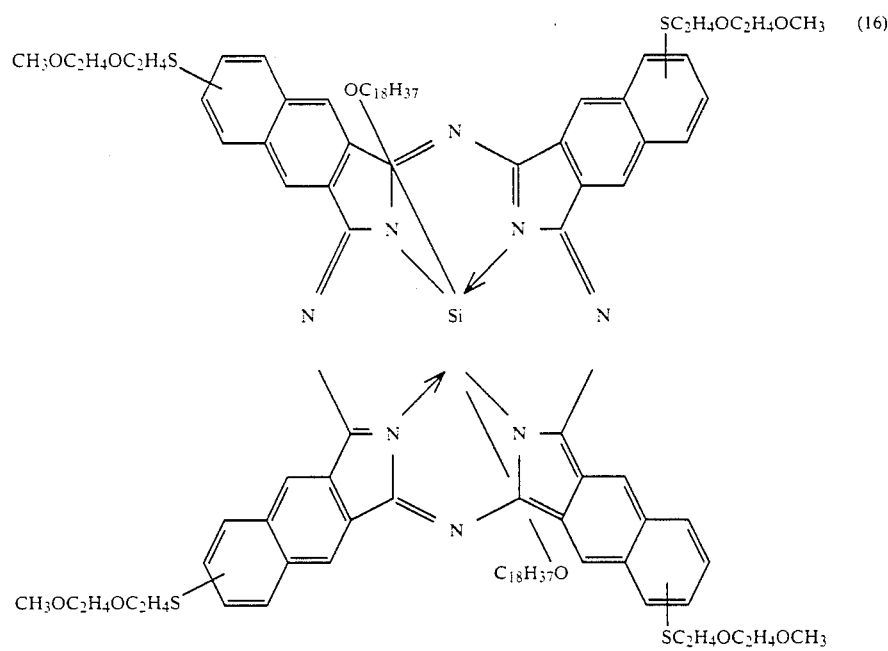
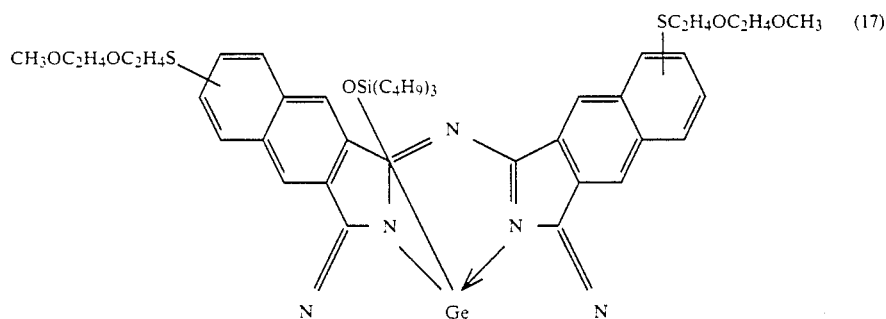

-continued
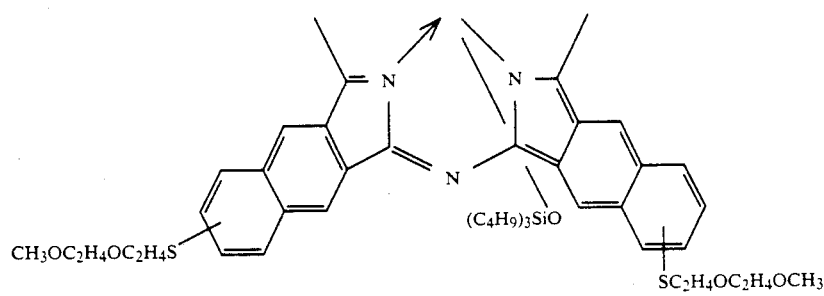
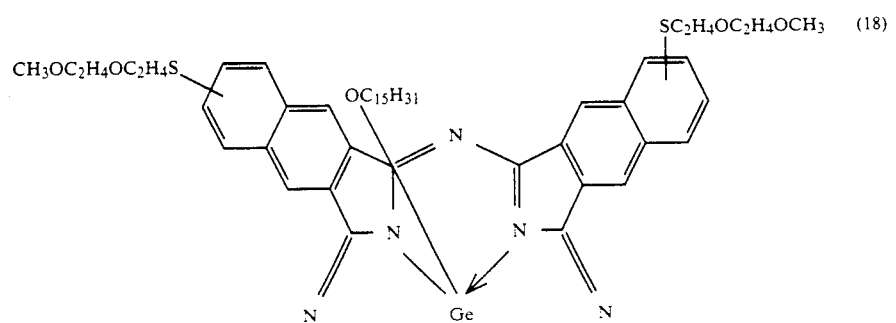 (18)
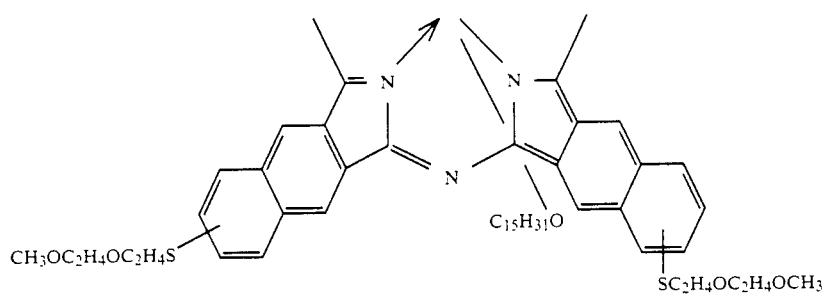
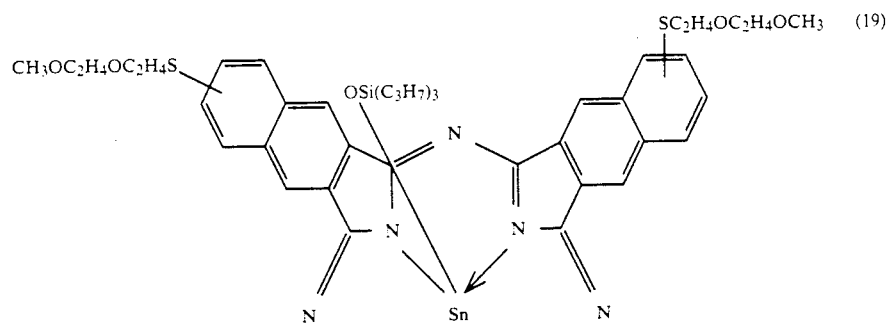 (19)
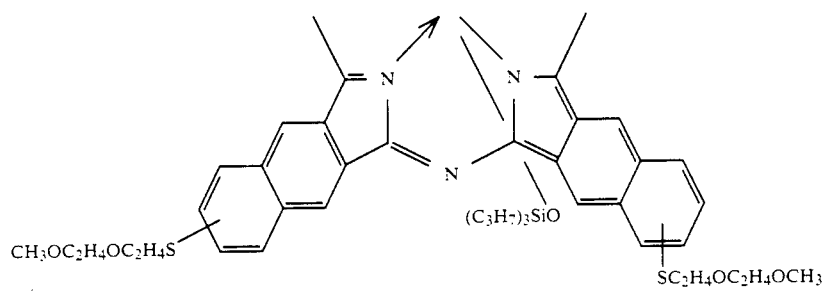

-continued
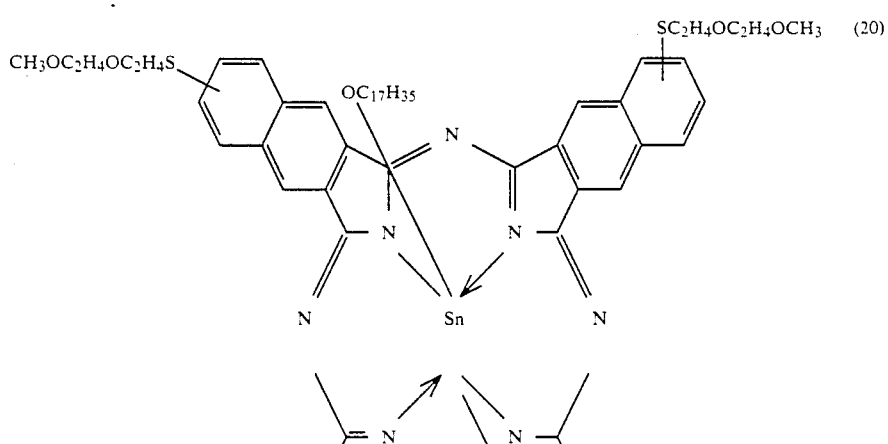
(20)
(21)
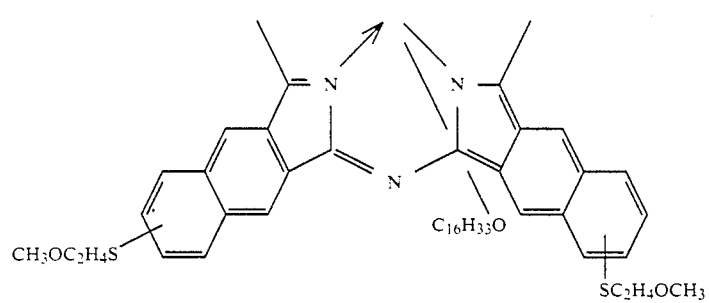
(22)

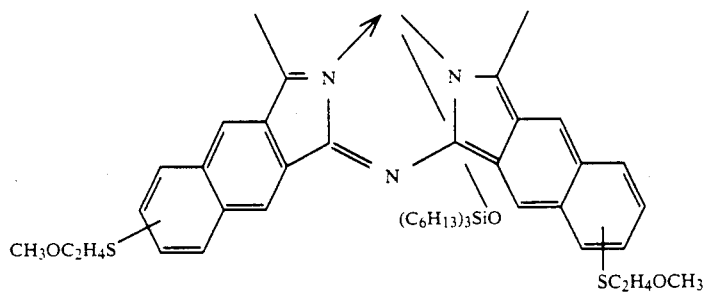
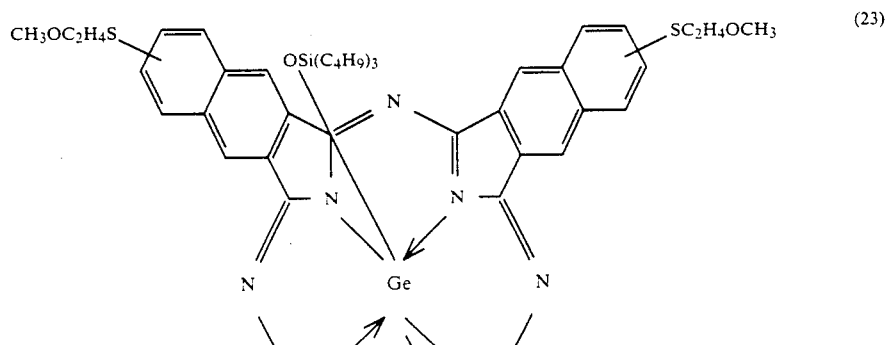
(23)
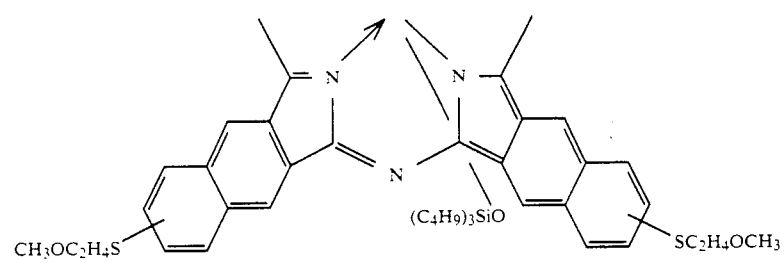
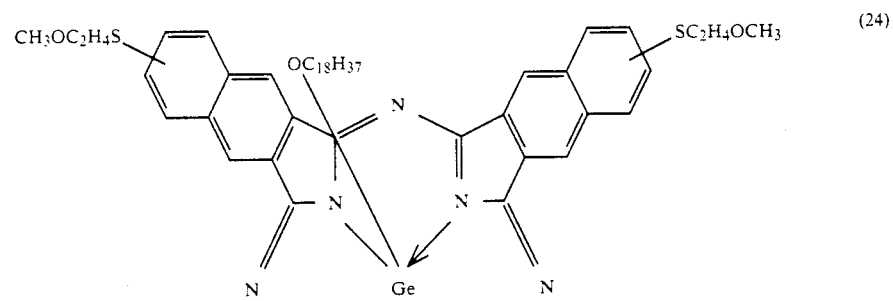
(24)
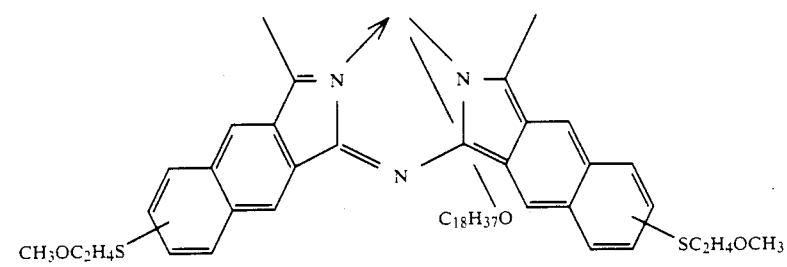
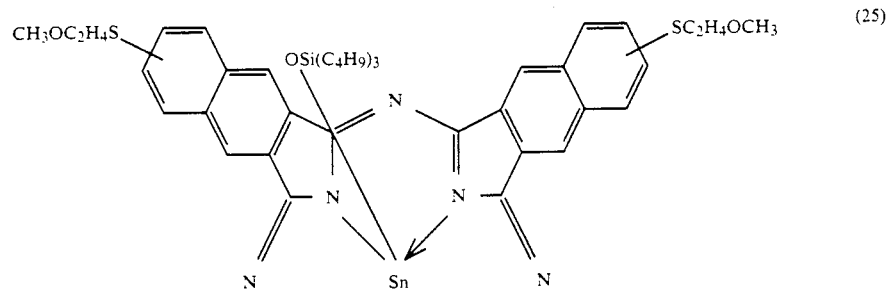
(25)

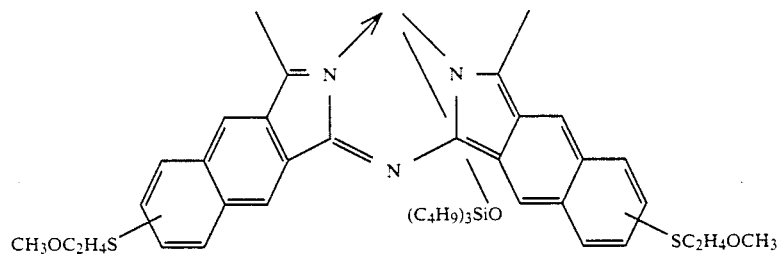
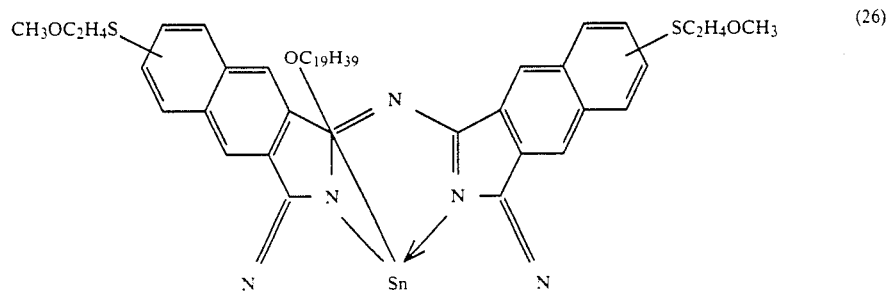
(26)
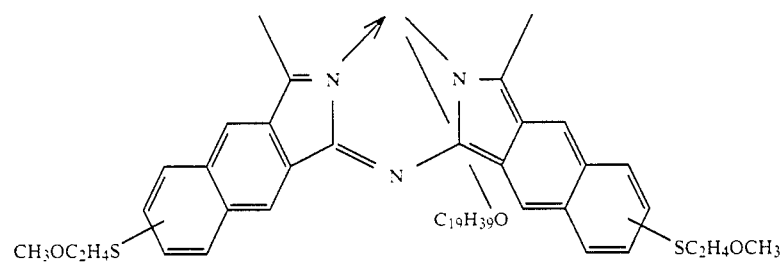
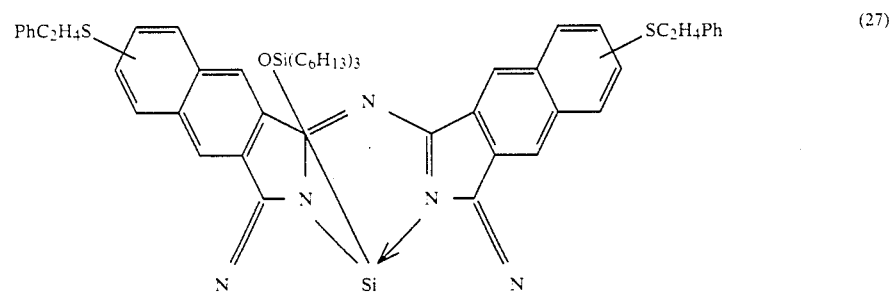
(27)
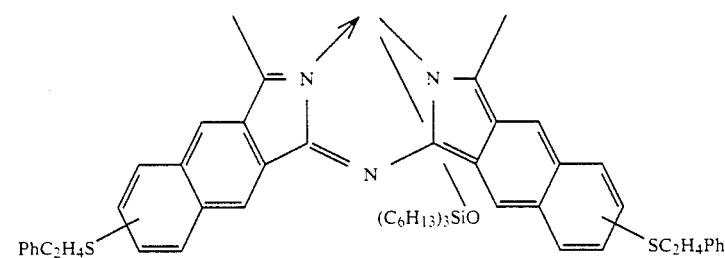
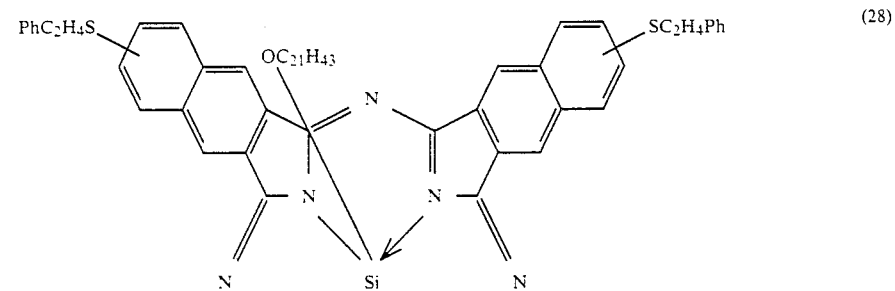
(28)

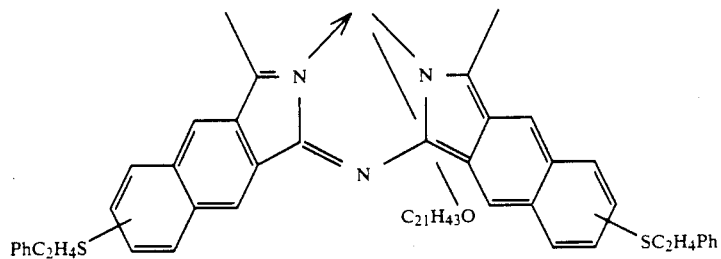
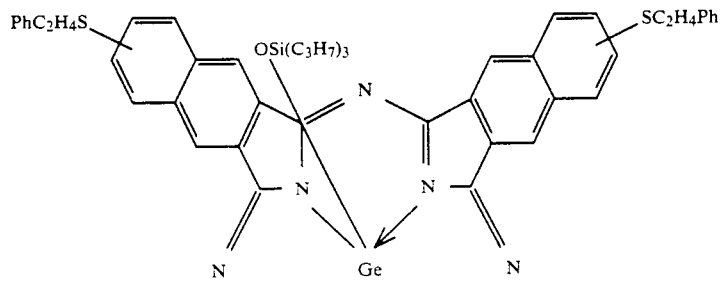
(29)
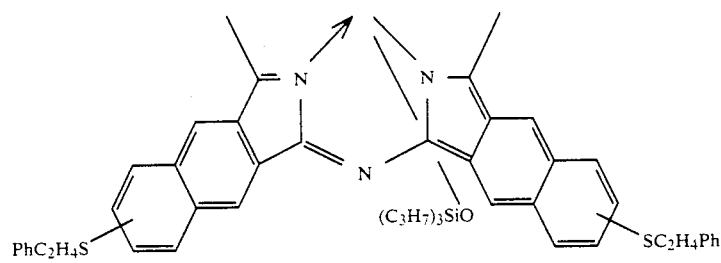
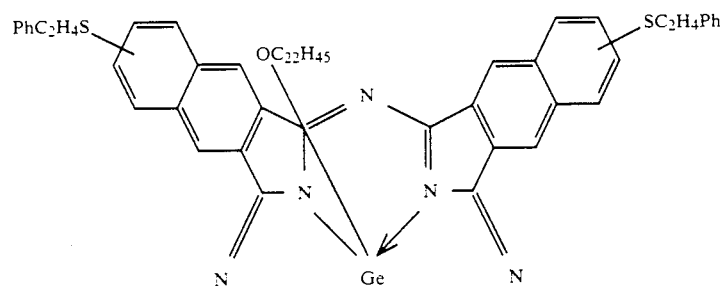
(30)
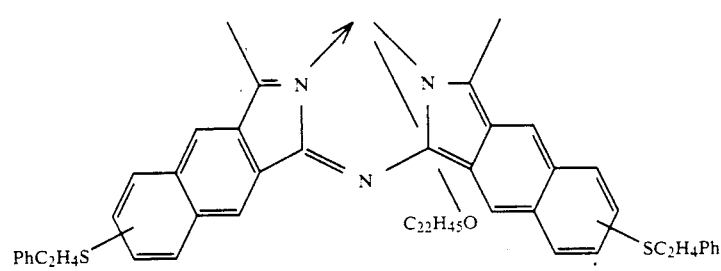
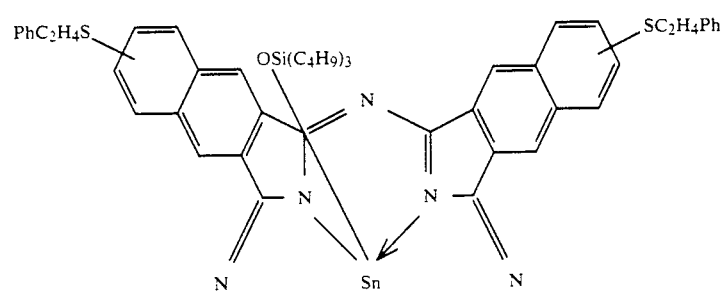
(31)

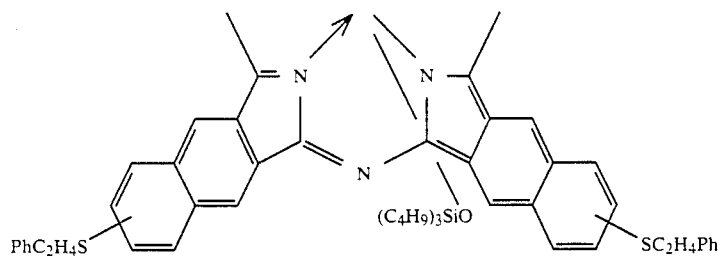
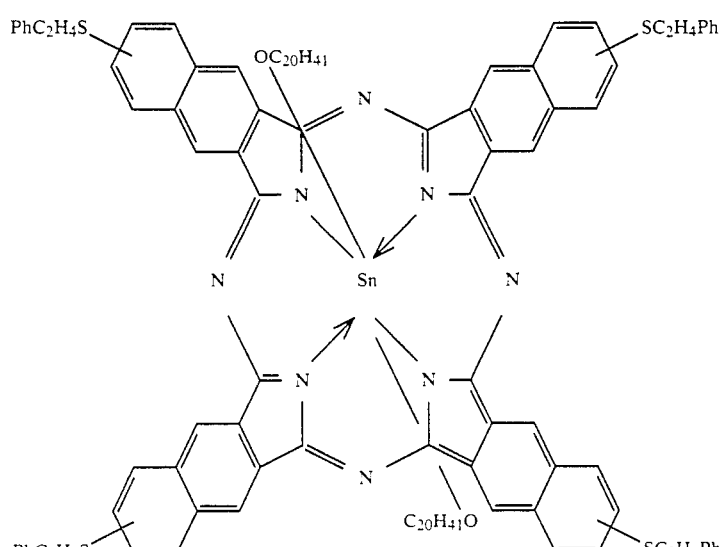
(32)
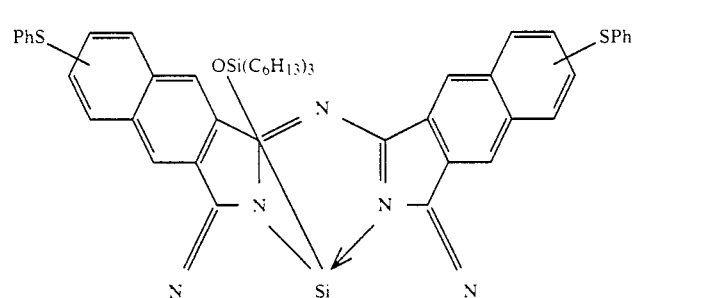
(33)
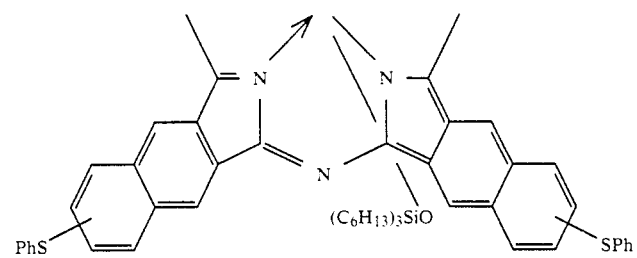
(34)

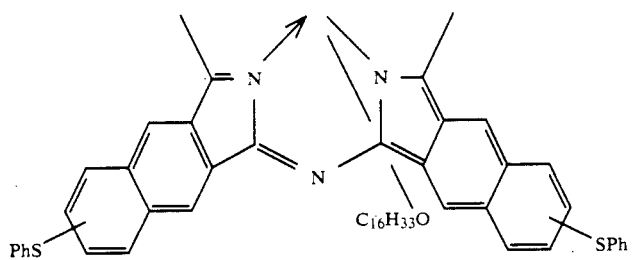
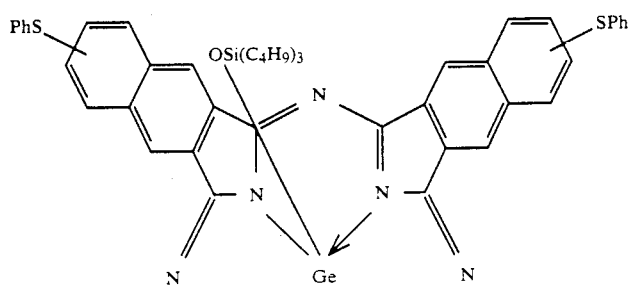
(35)
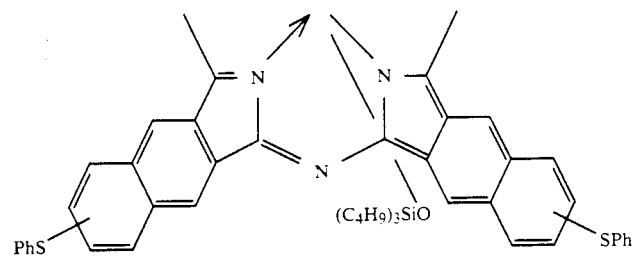
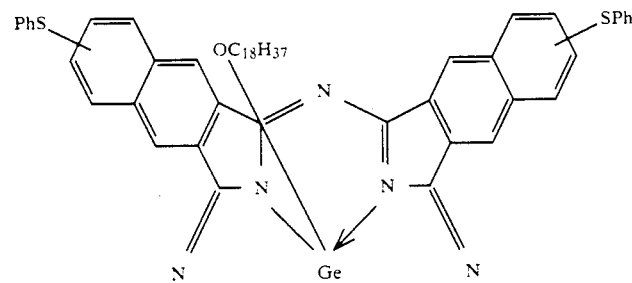
(36)
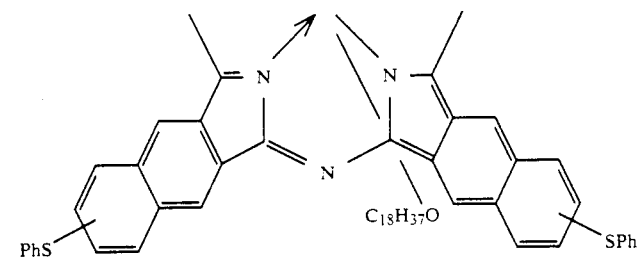
(37)

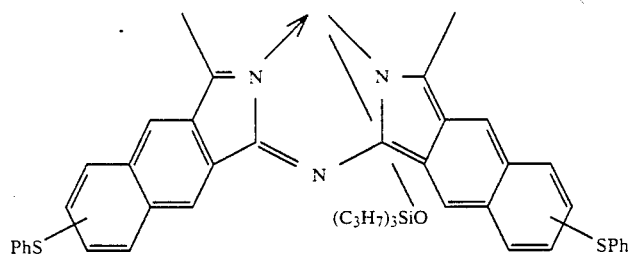
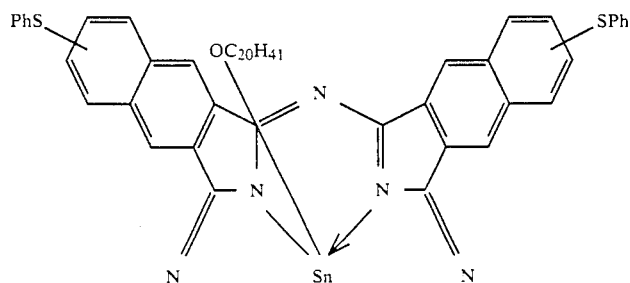
(38)
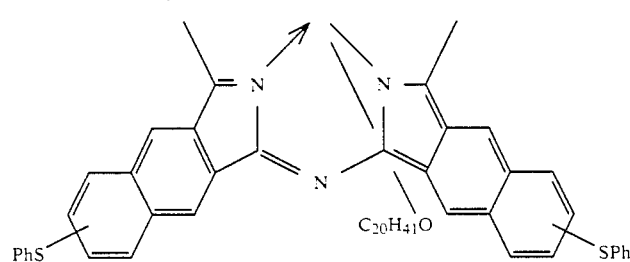
(39)
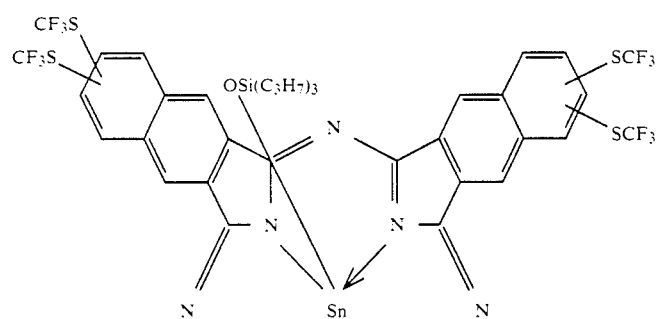
(40)
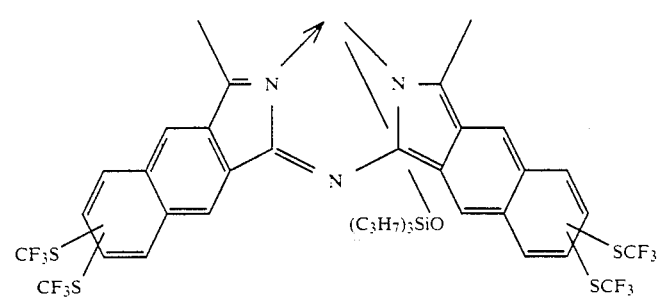

-continued
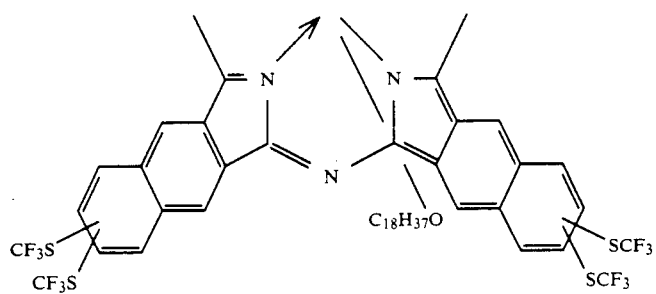
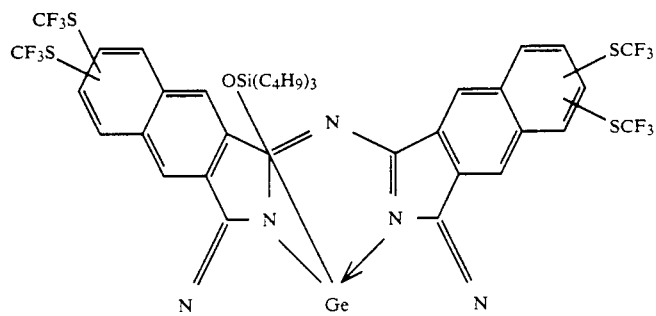
(41)
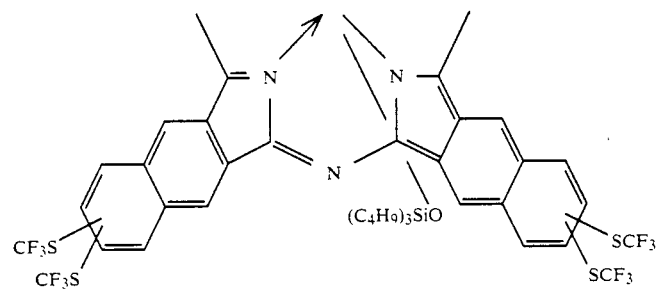
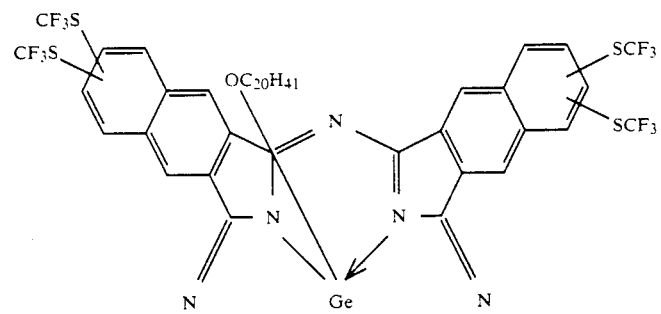
(42)
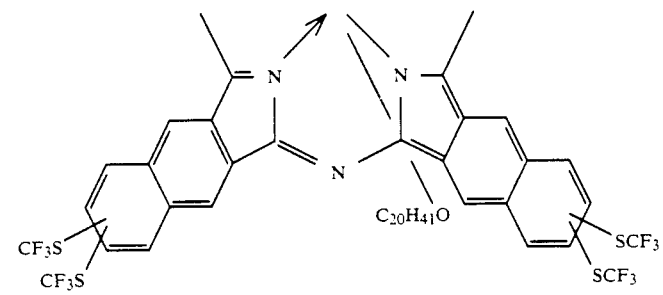

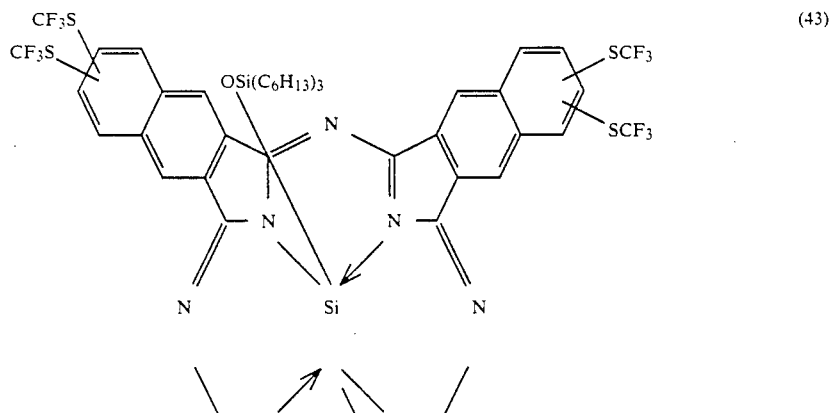
(43)
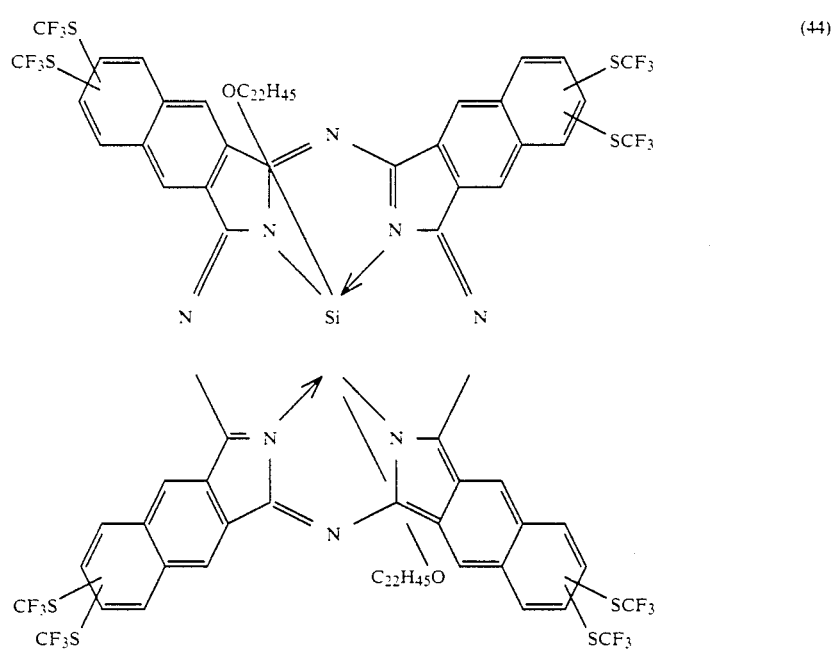
(44)
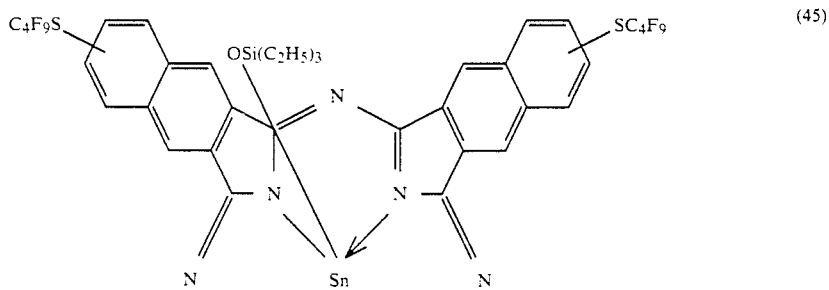
(45)

-continued
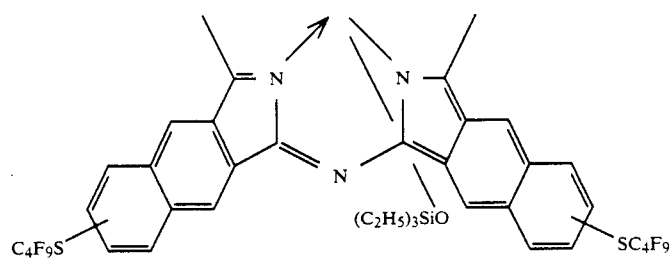
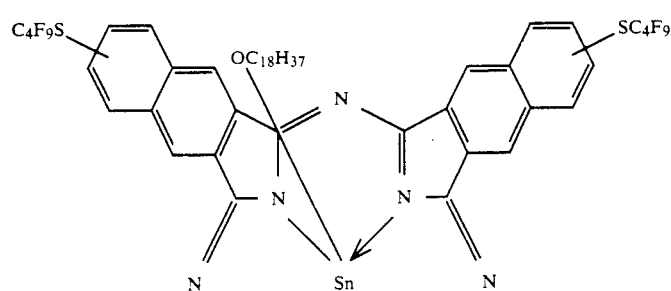
(46)
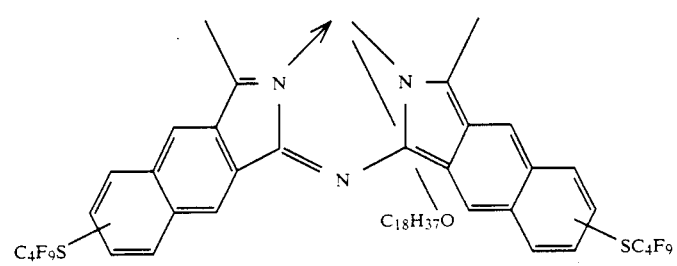
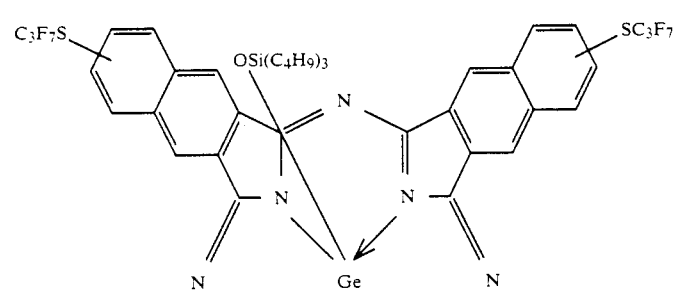
(47)
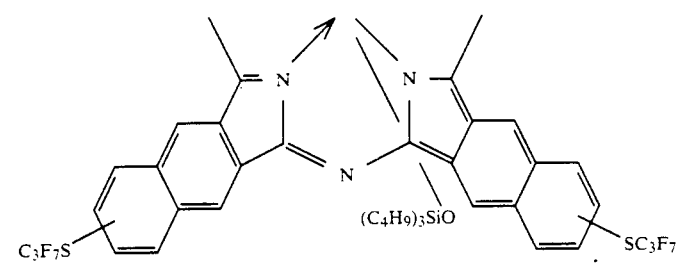
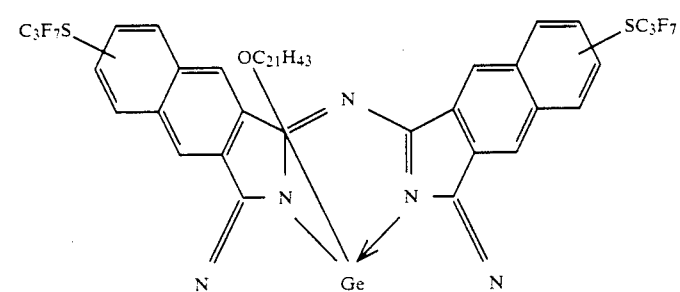
(48)

-continued
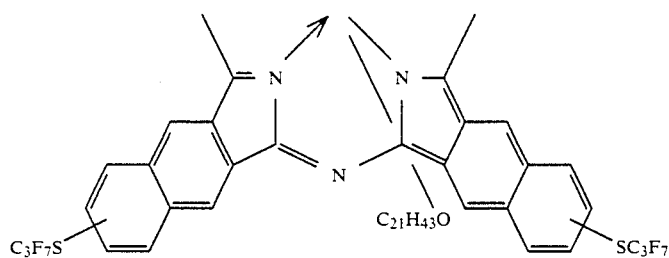
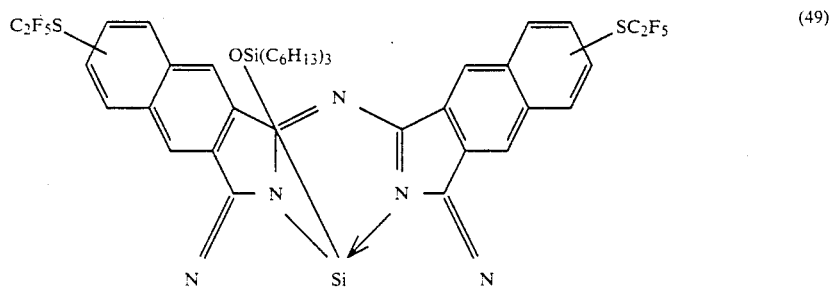
(49)
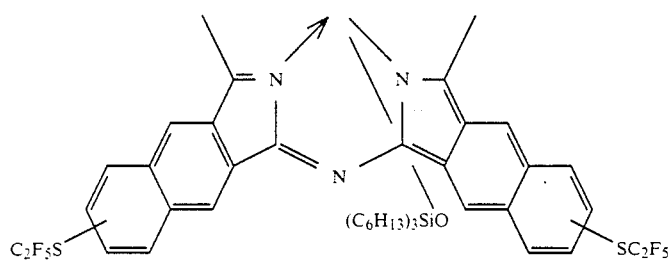
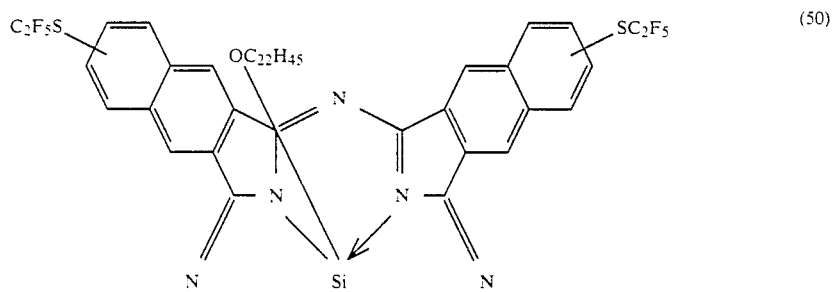
(50)
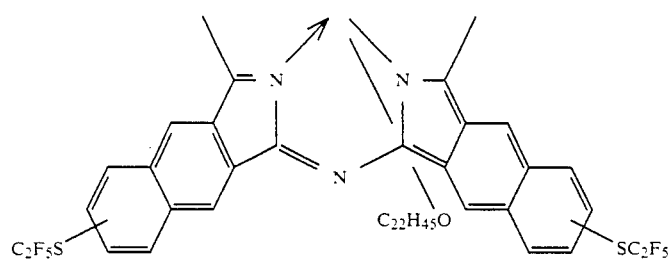
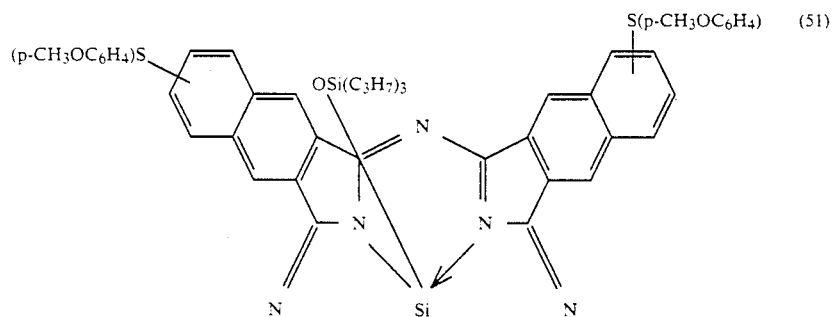
(51)

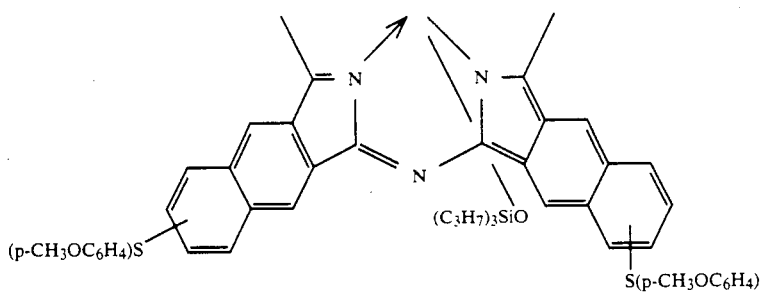
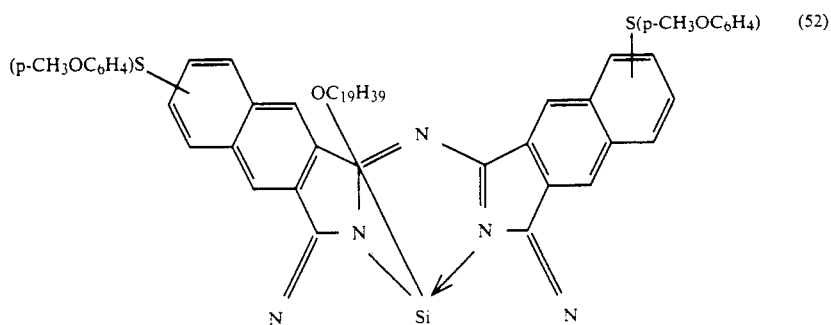
(52)
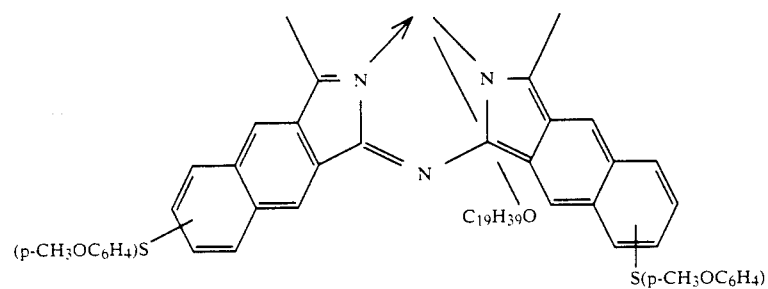
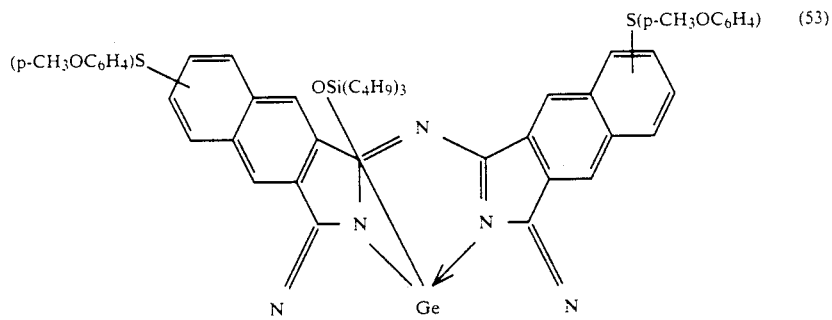
(53)
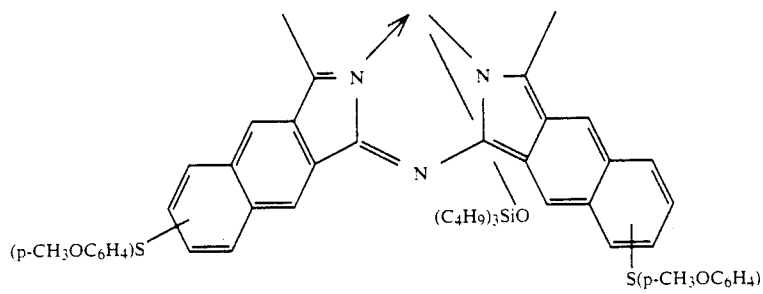

-continued
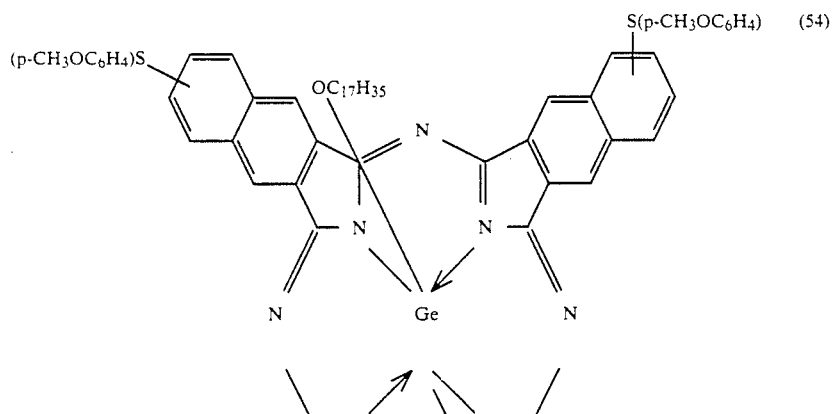
(54)
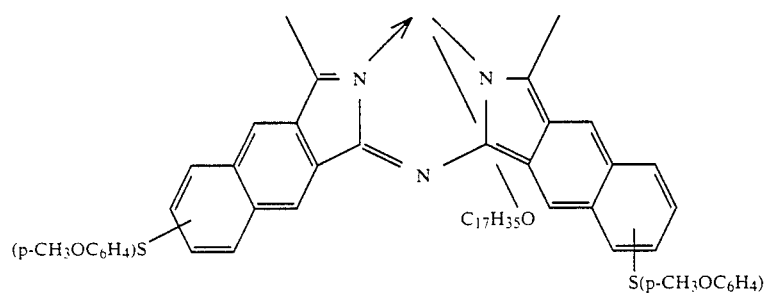
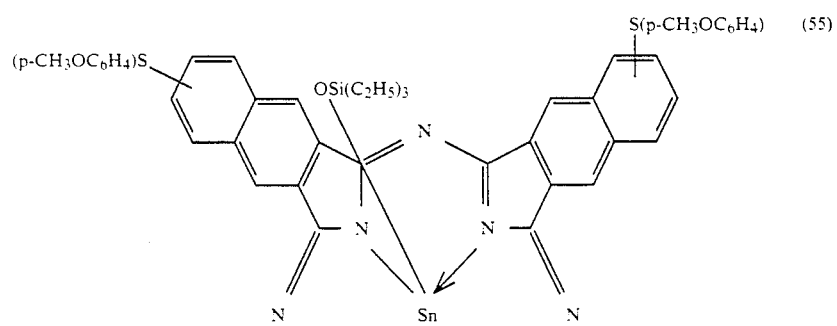
(55)
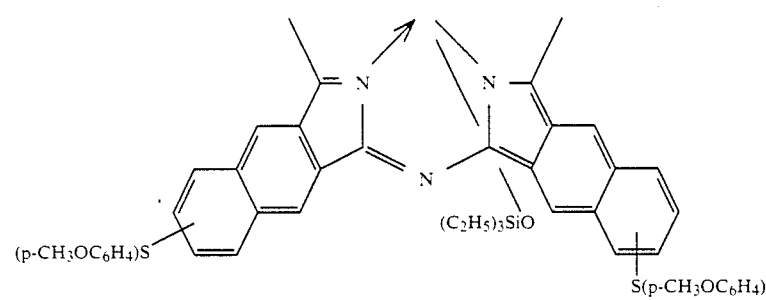
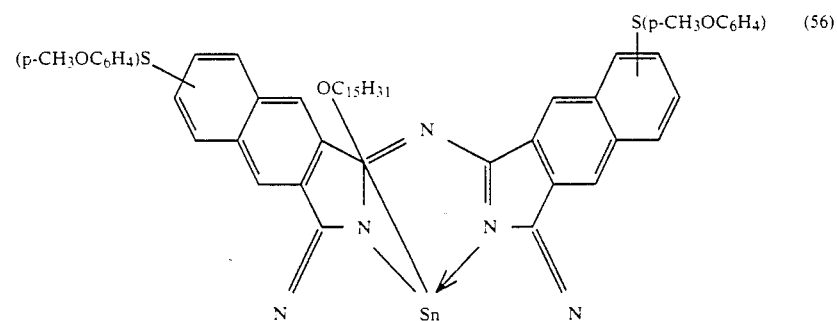
(56)

-continued
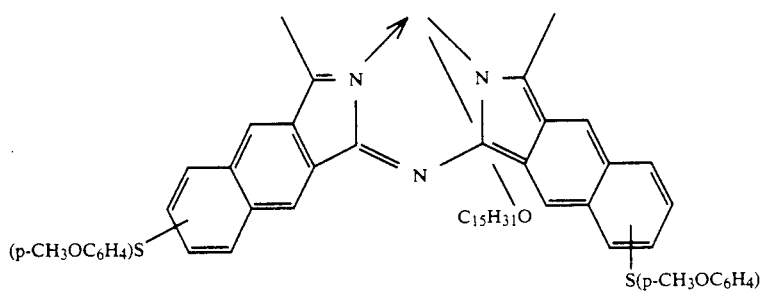
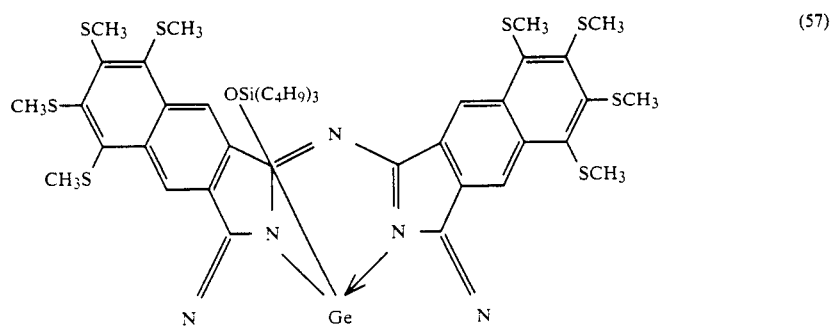
(57)
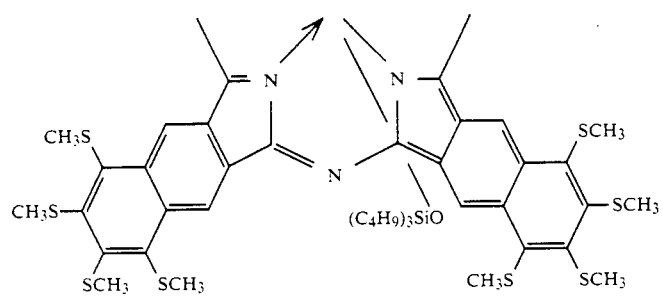
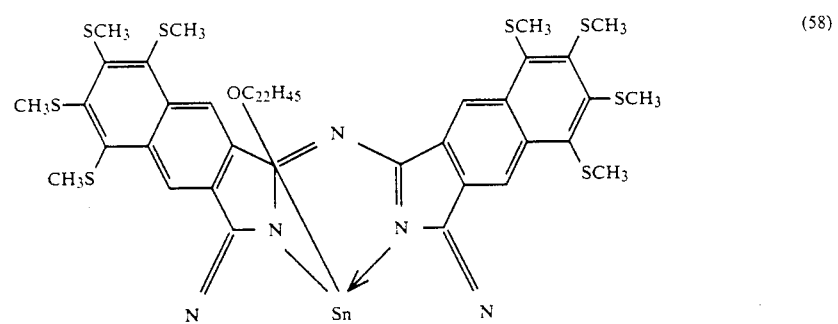
(58)
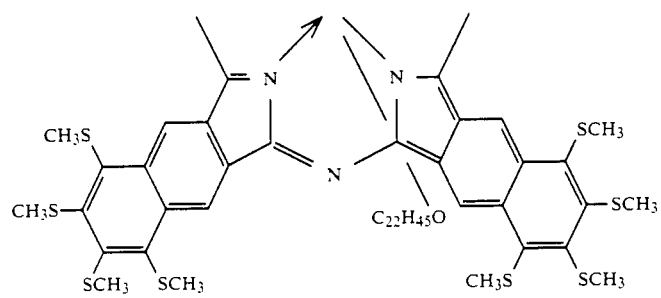

-continued
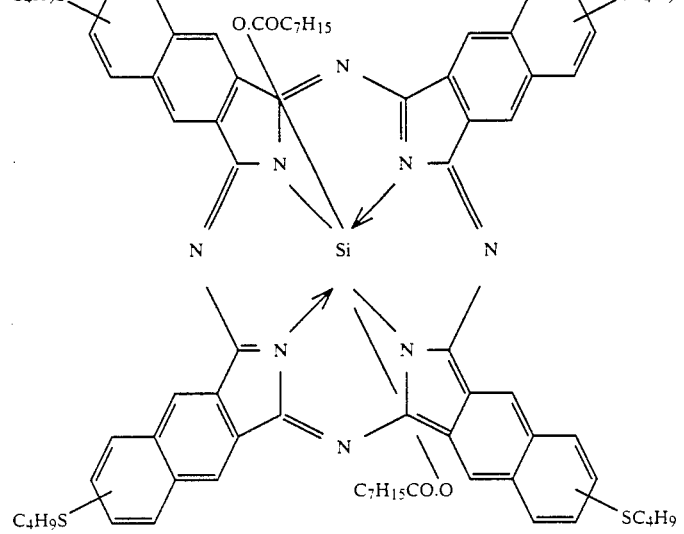
(59)
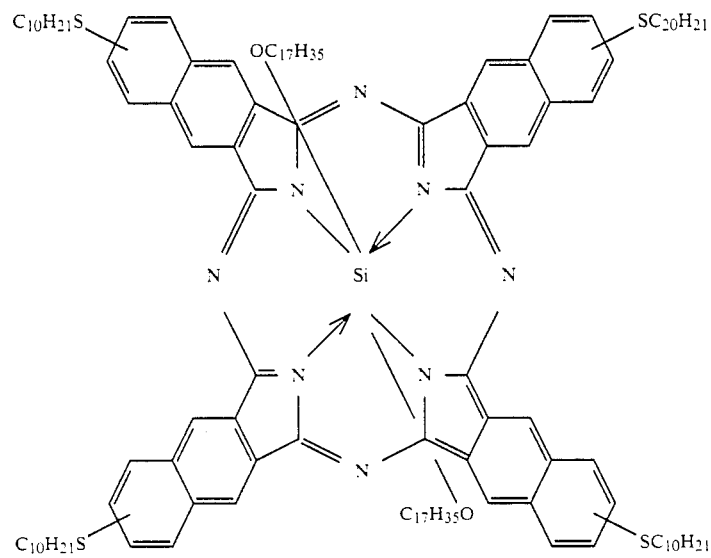
(60)
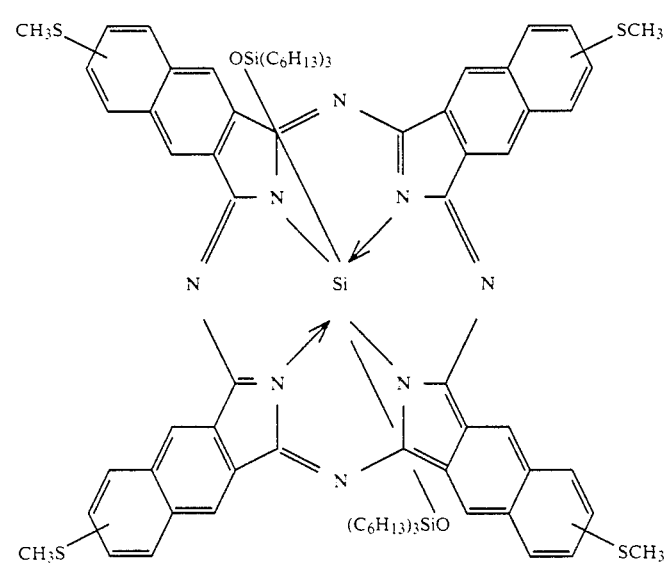
(61)

-continued
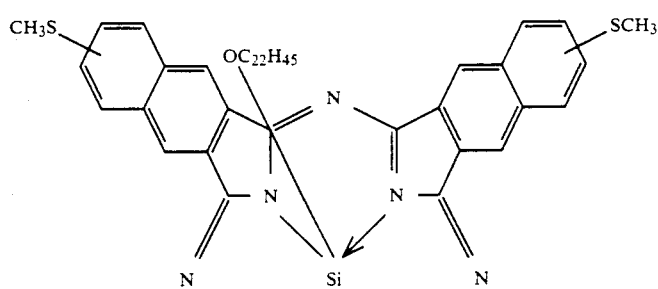
(62)
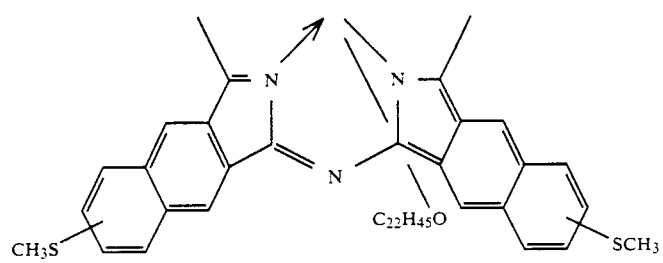
(63)
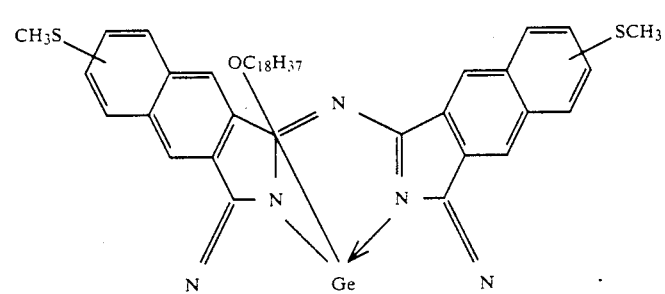
(64)
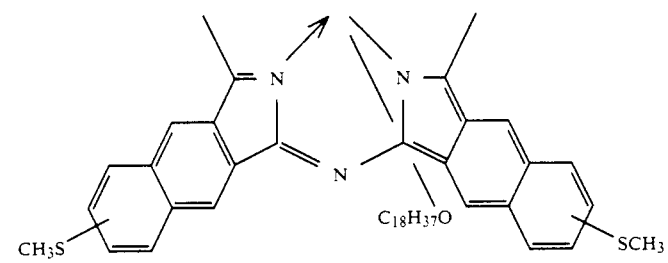

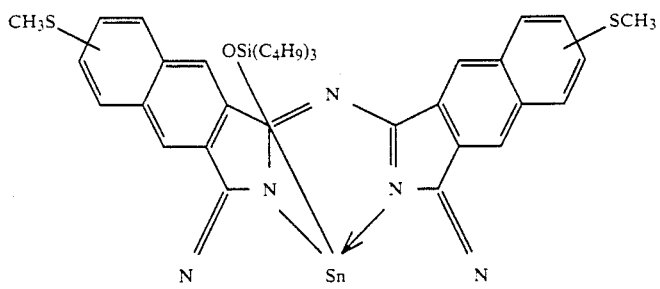
(65)
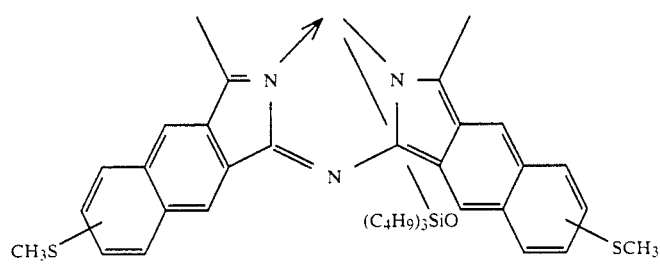
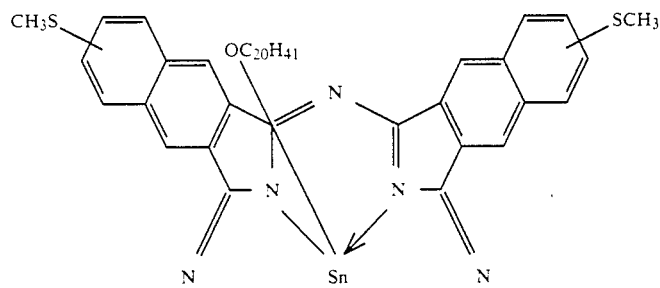
(66)
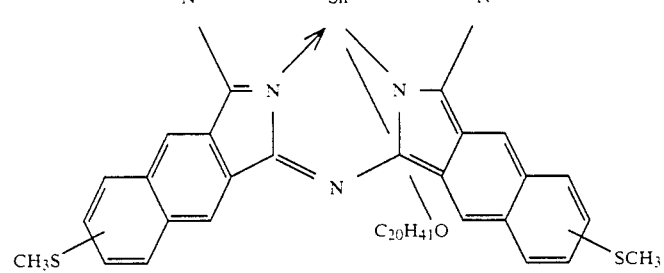
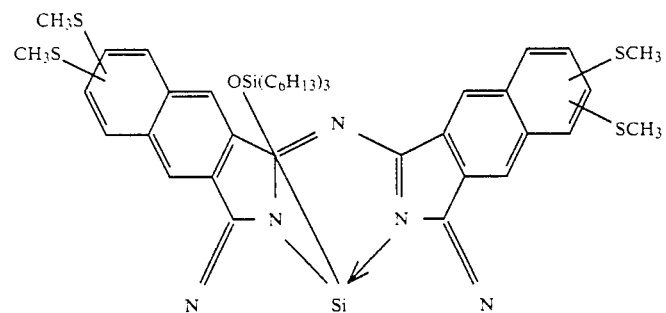
(67)
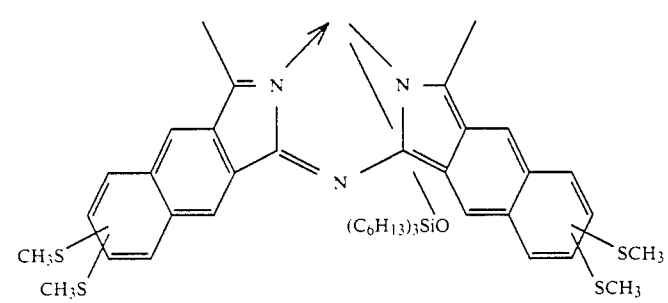

-continued
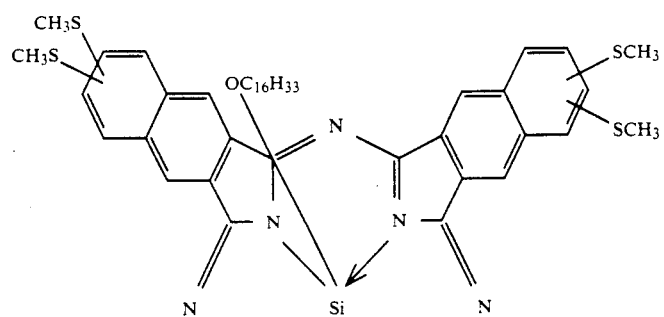
(68)
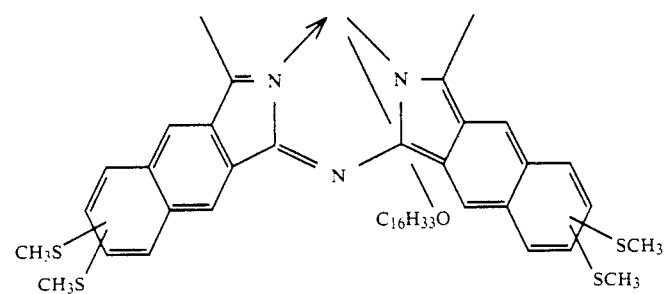
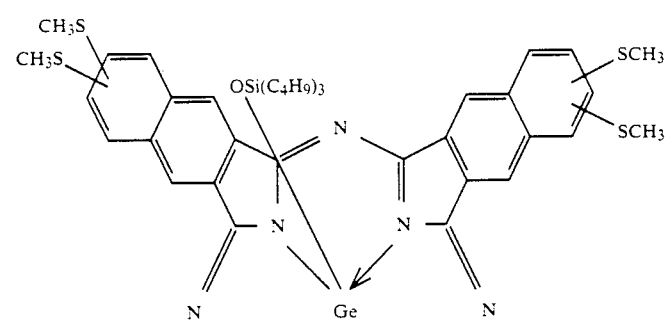
(69)
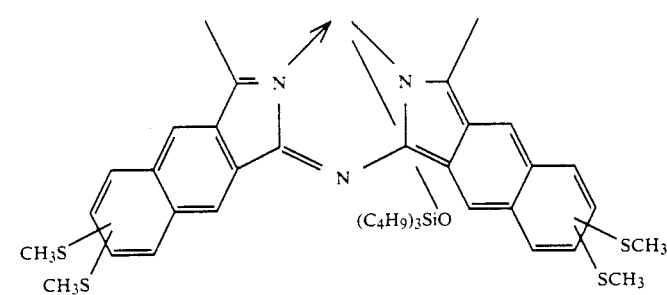
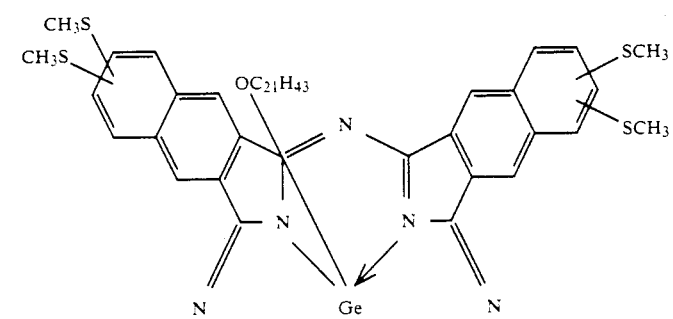
(70)

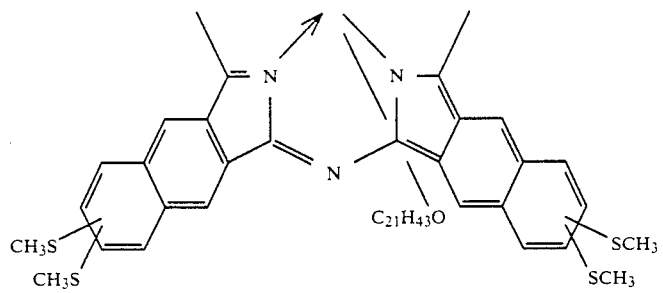
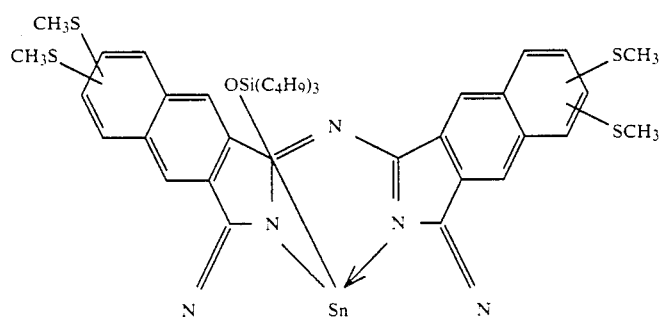
(71)
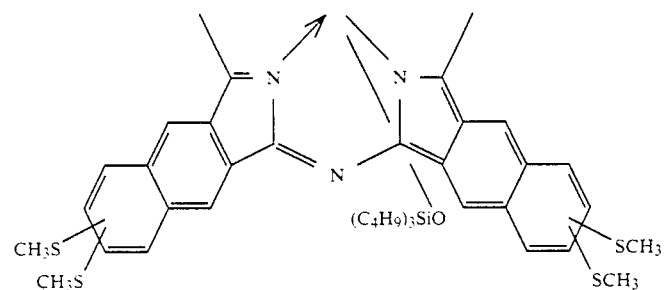
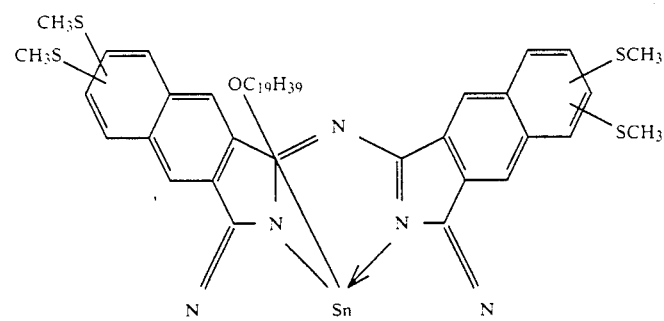
(72)
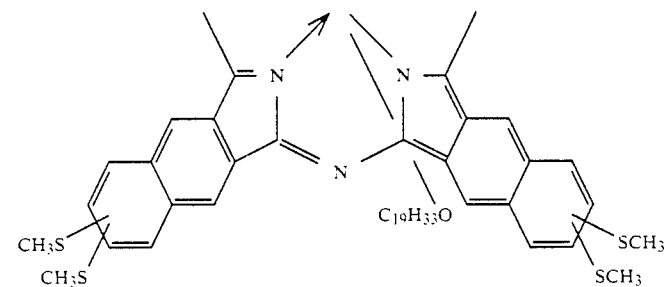

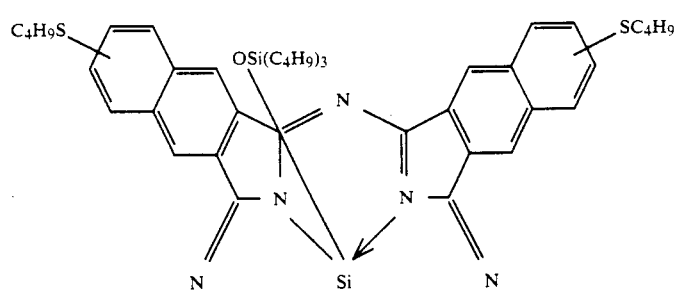
(73)
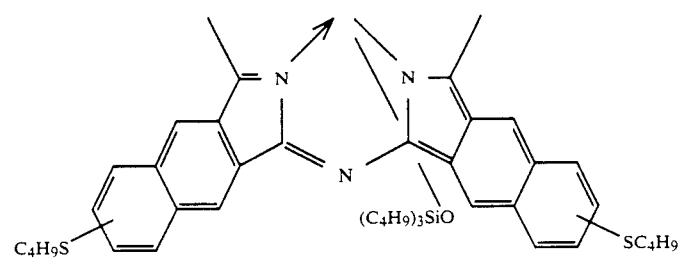
(74)
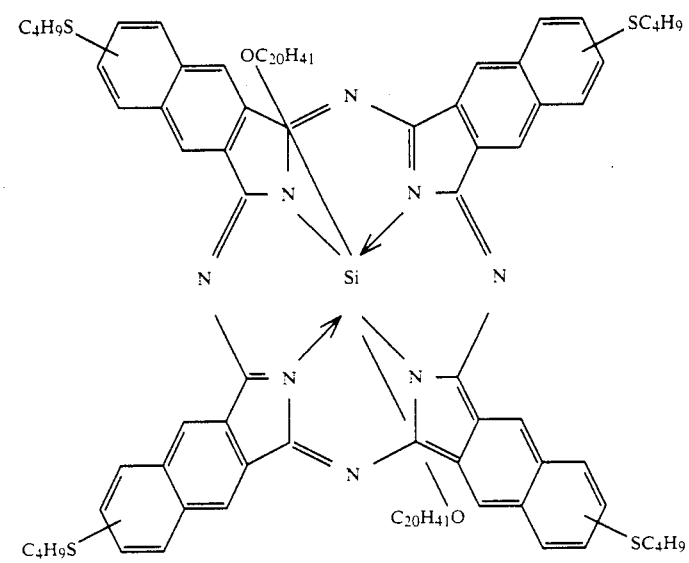
(75)
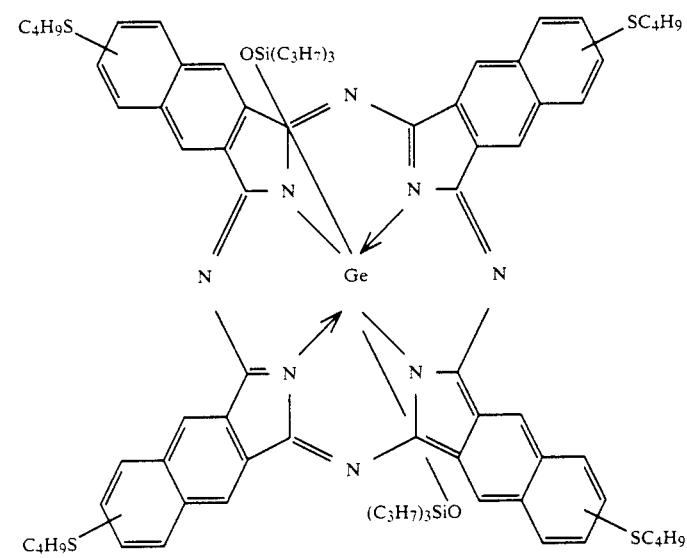

-continued
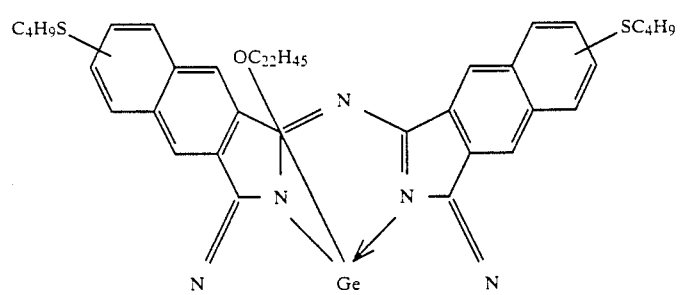
(76)
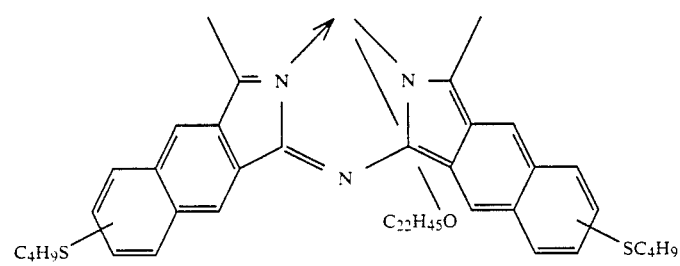
(77)
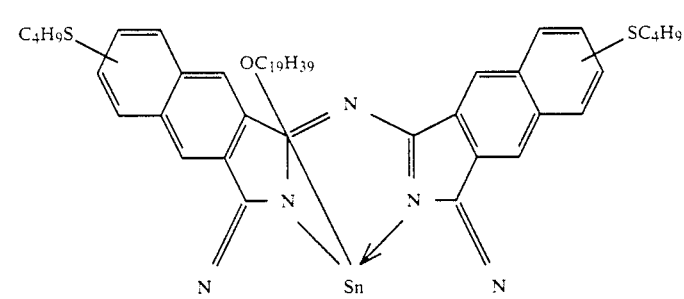
(78)
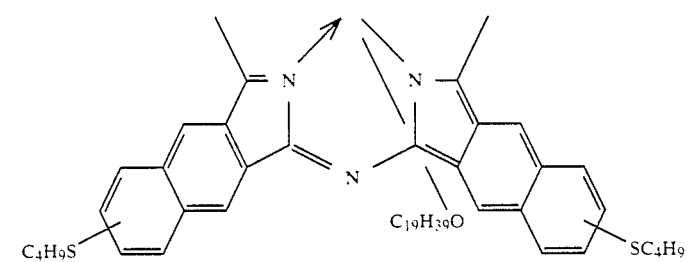

-continued
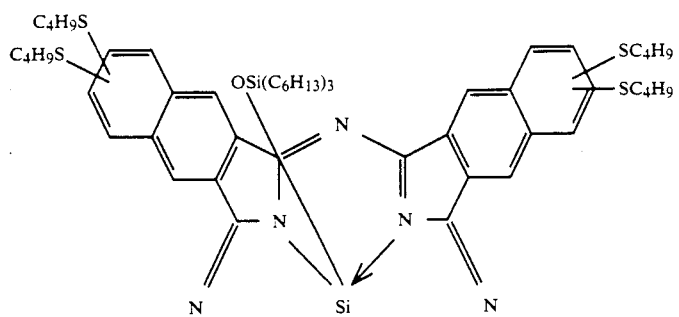 (79)
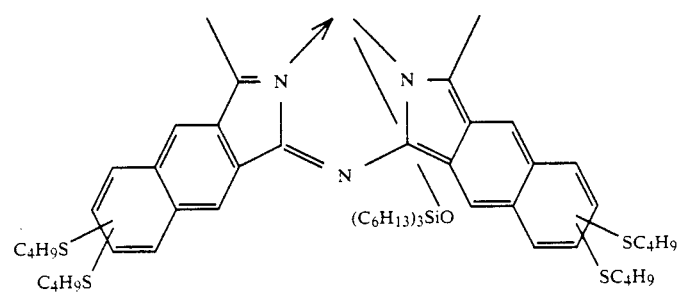
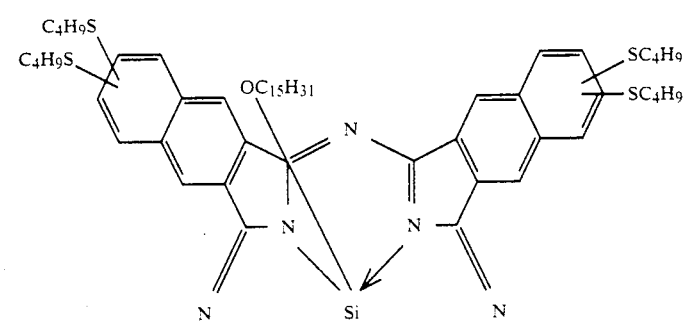 (80)
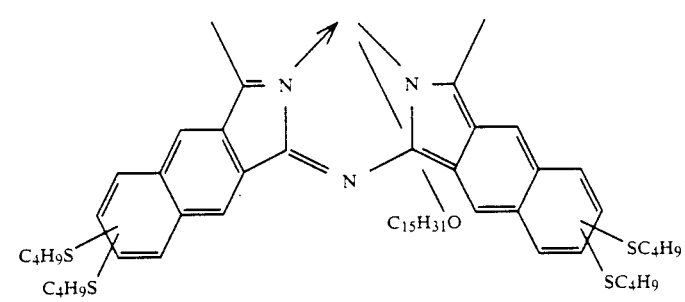
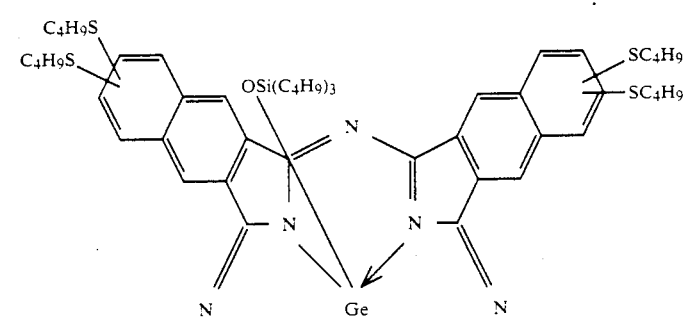 (81)

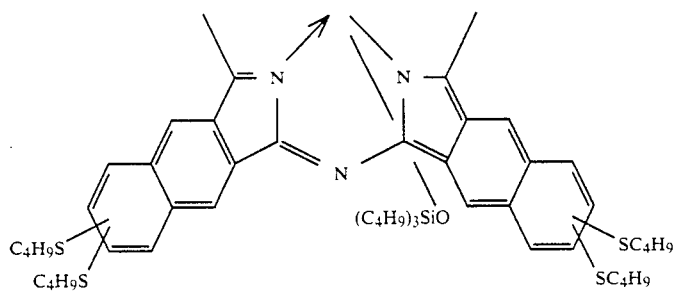
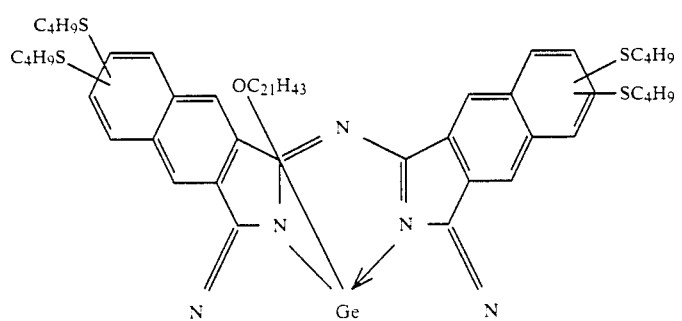
(82)
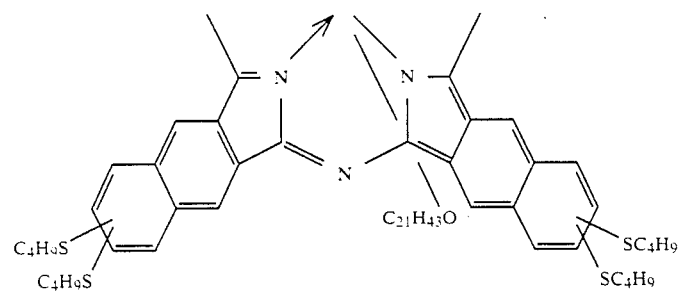
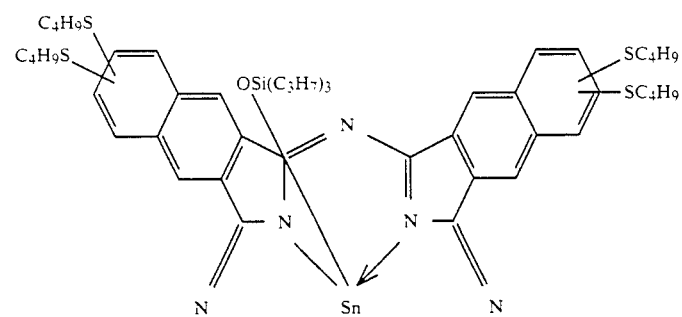
(83)
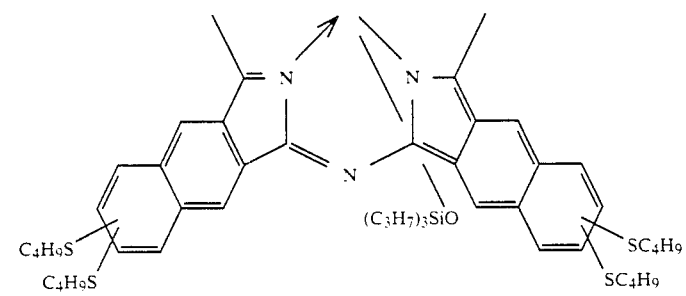

-continued
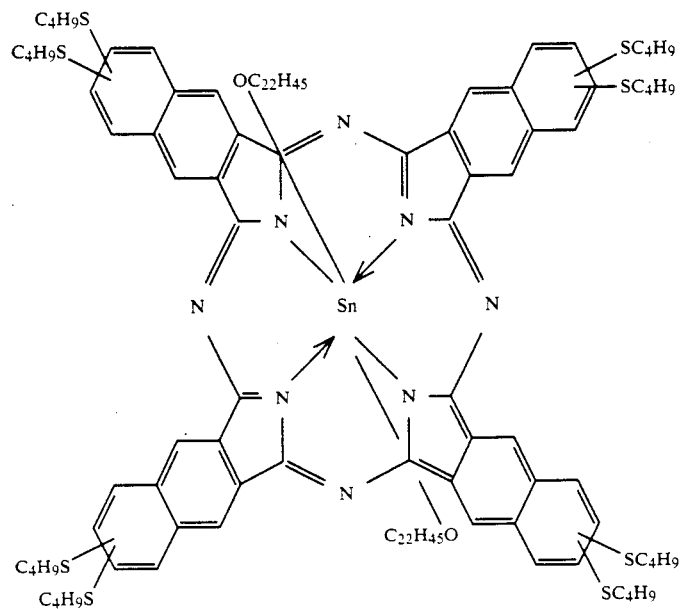
(84)
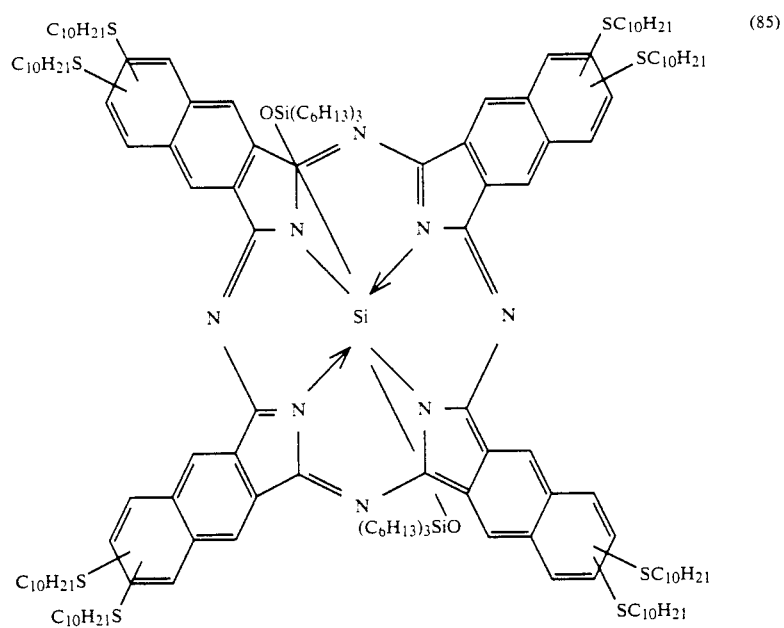
(85)
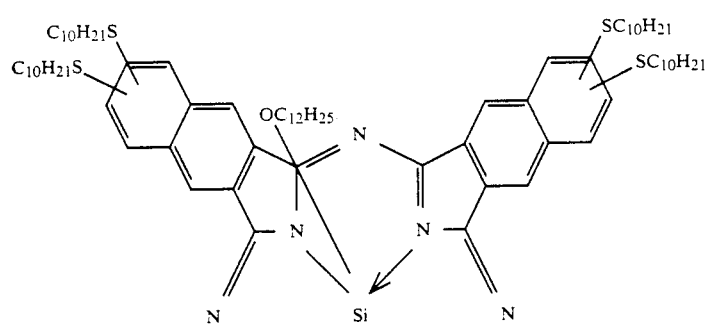
(86)

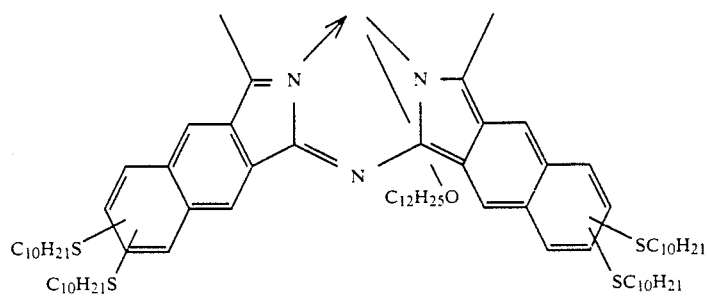
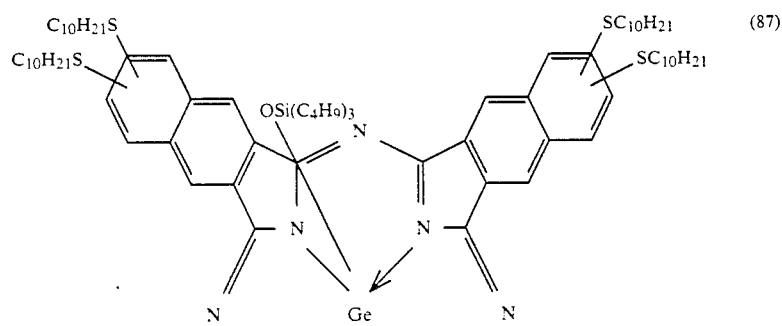
(87)
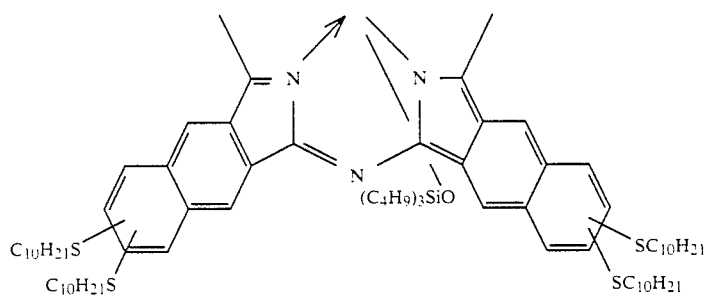
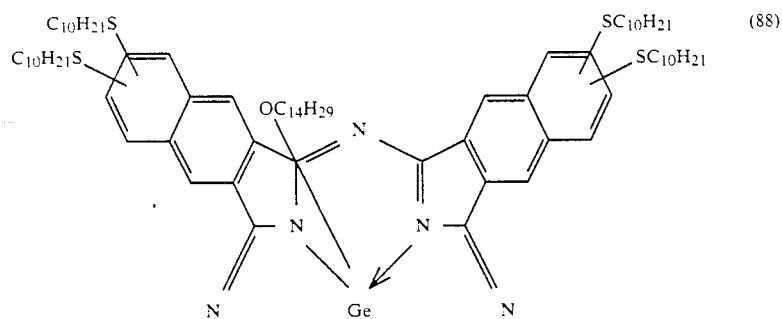
(88)
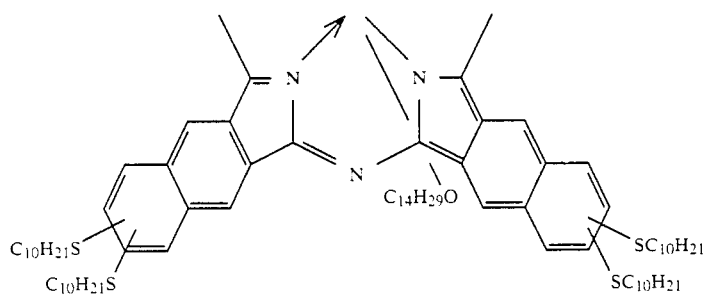

-continued
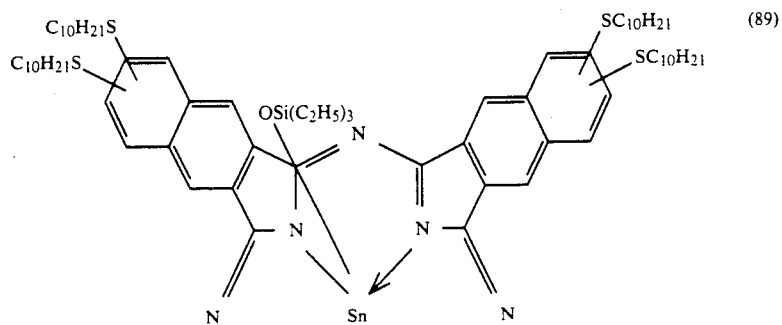
(89)
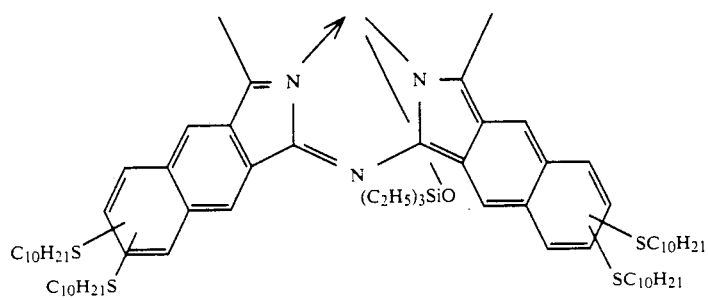
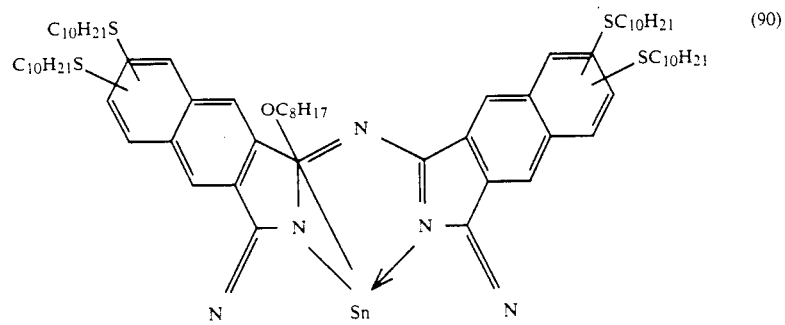
(90)
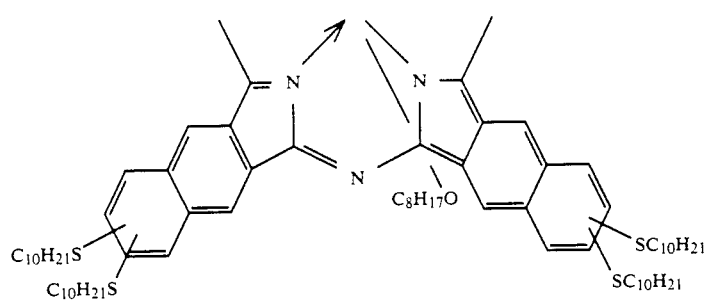
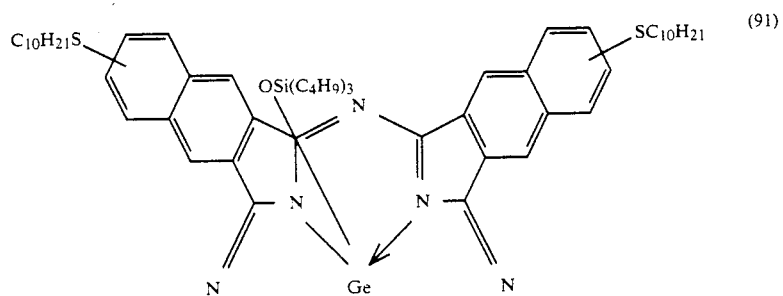
(91)

-continued
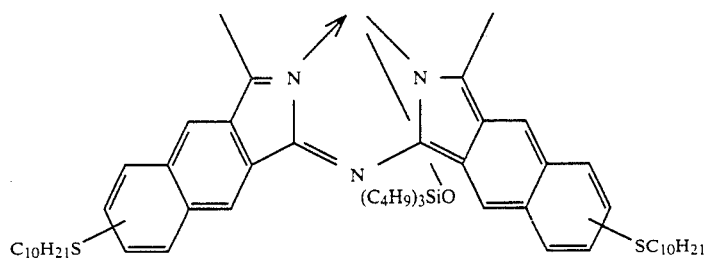
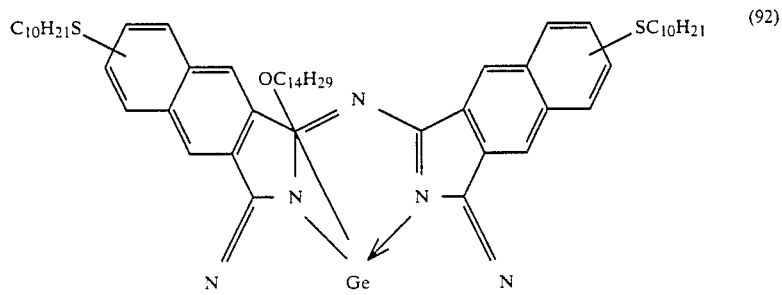
(92)
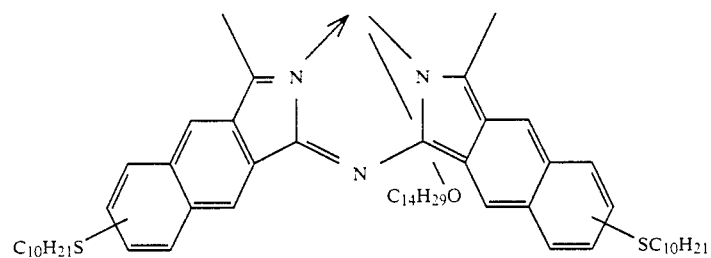
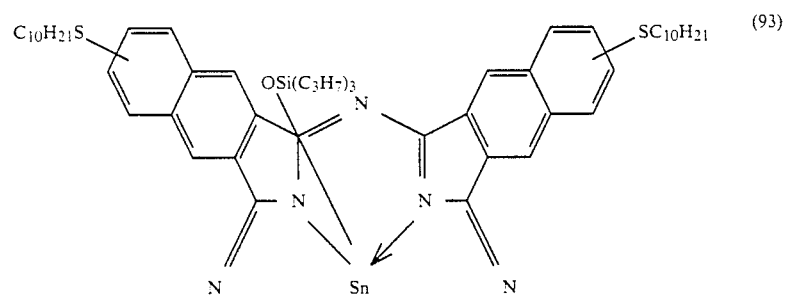
(93)
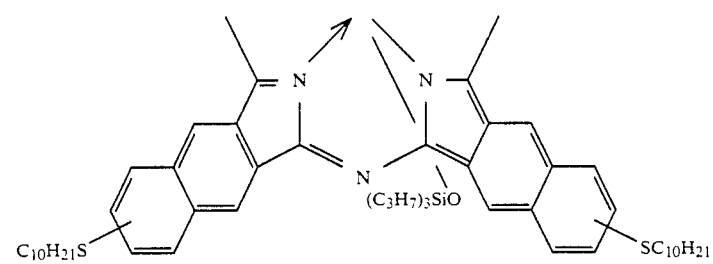
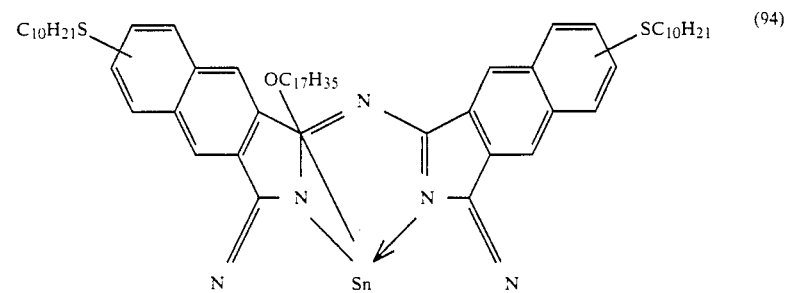
(94)

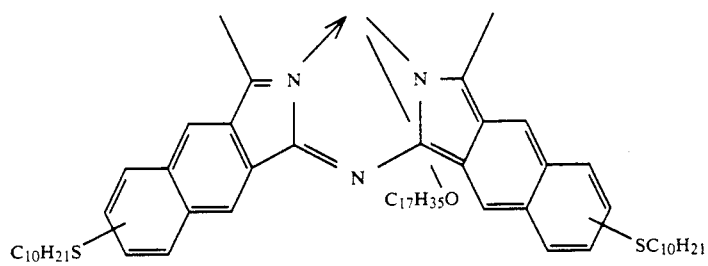
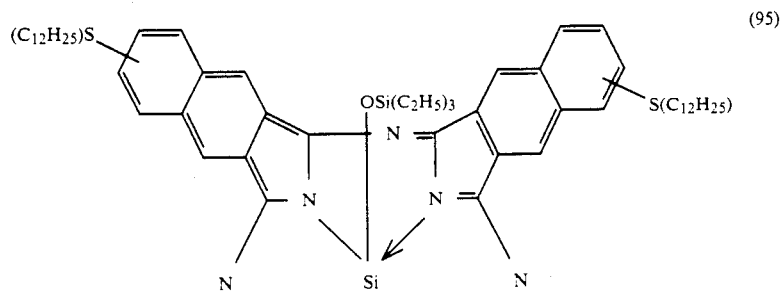
(95)
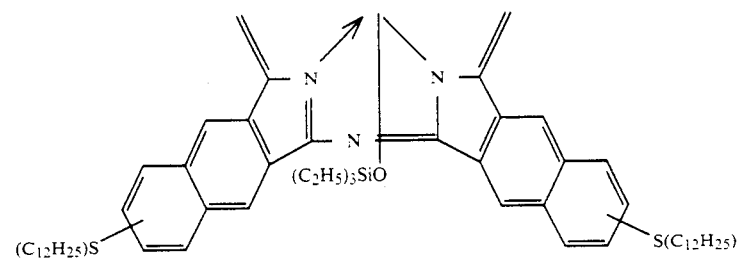
(96)
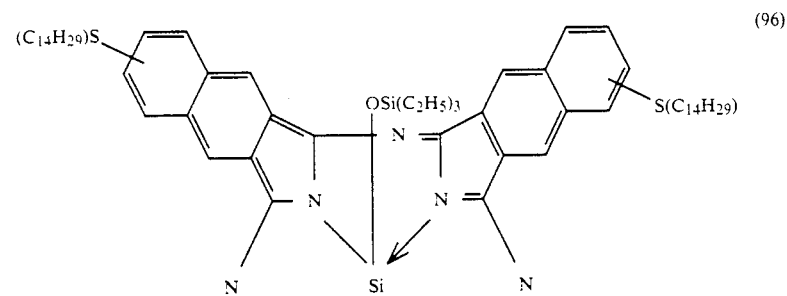
(97)
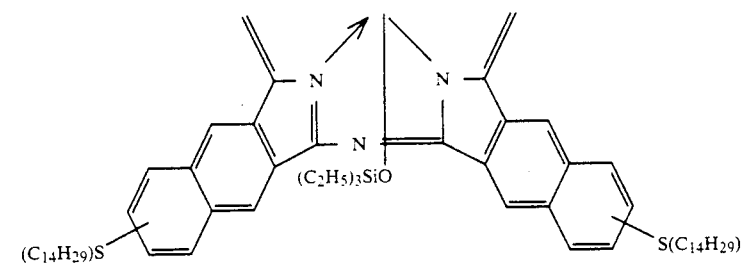
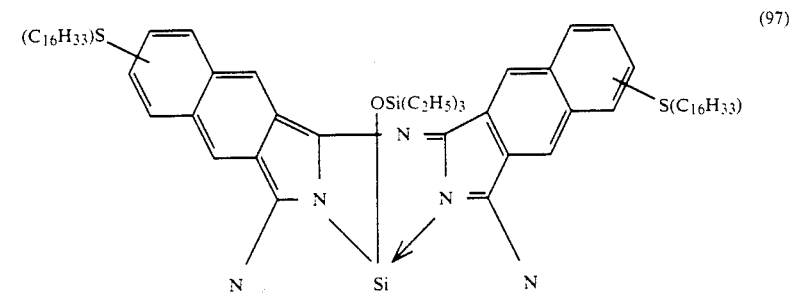

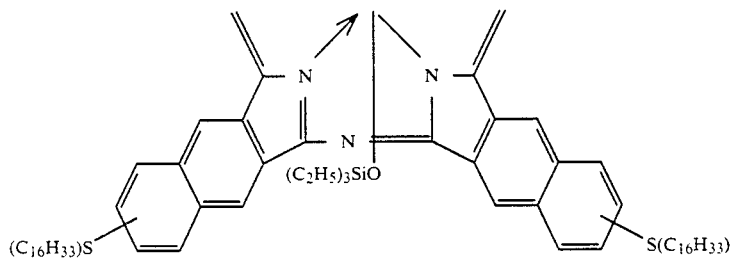
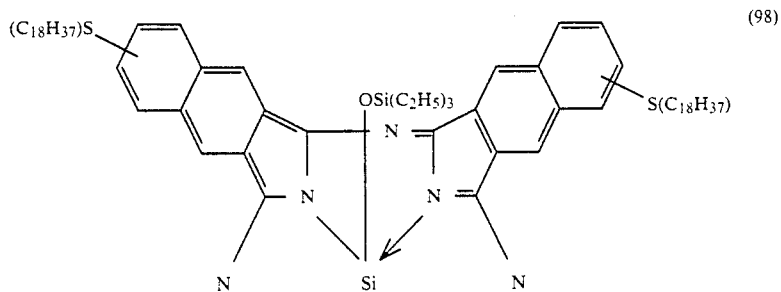
(98)
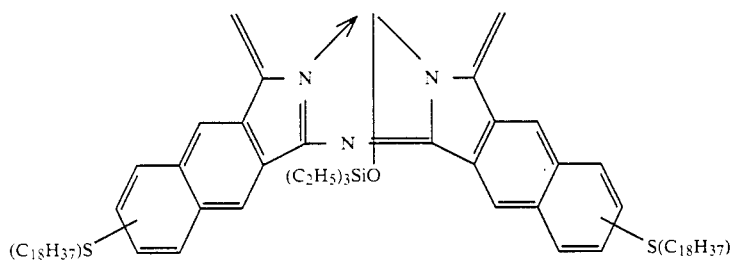
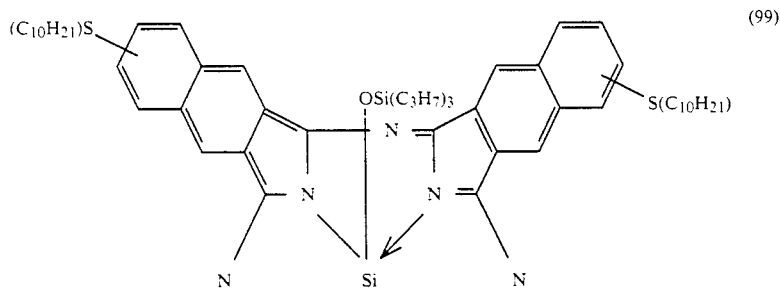
(99)
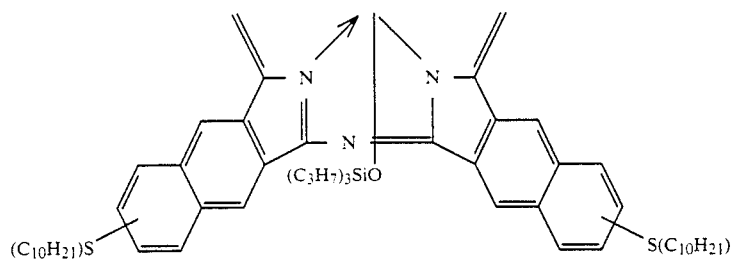
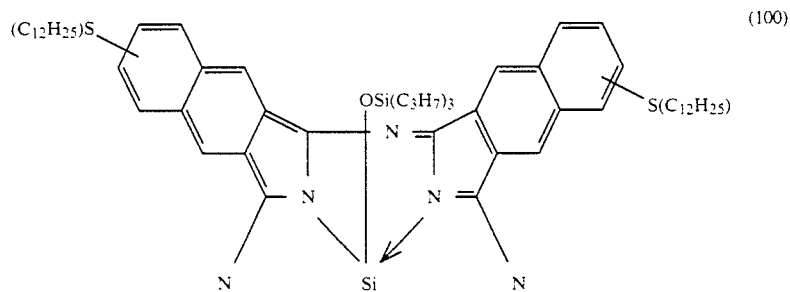
(100)

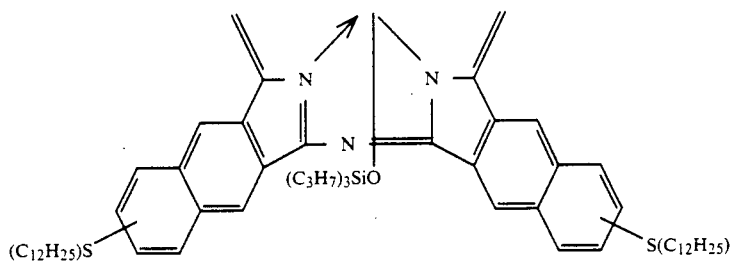
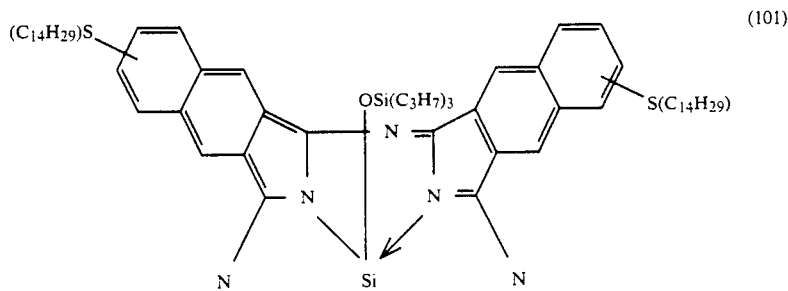
(101)
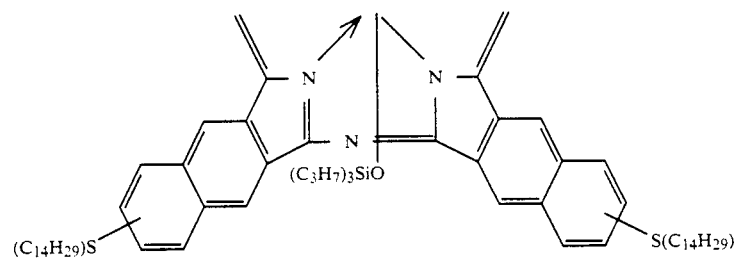
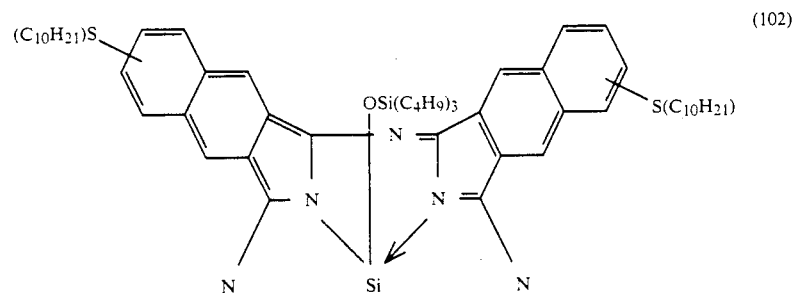
(102)
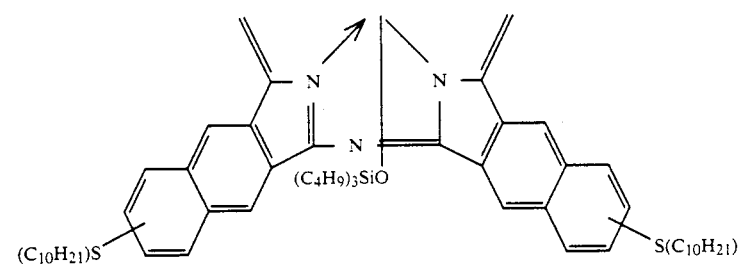
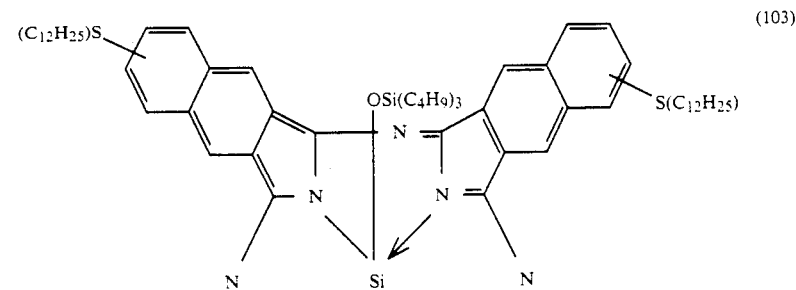
(103)

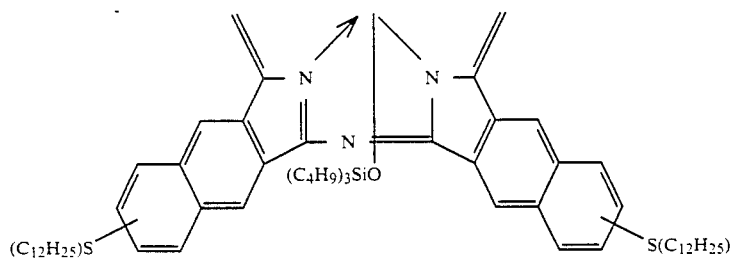
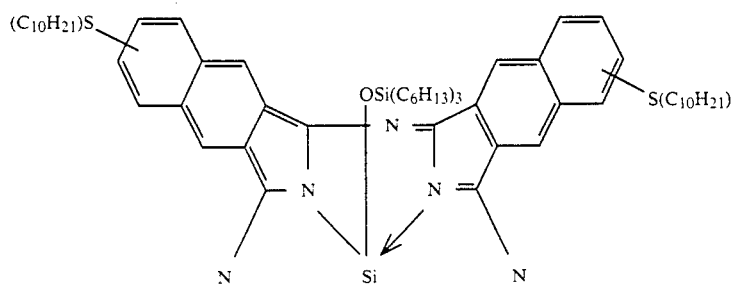
(104)
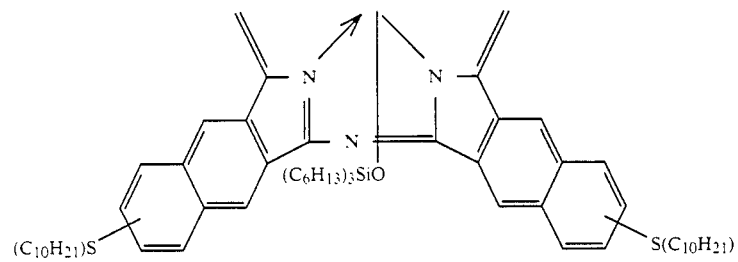
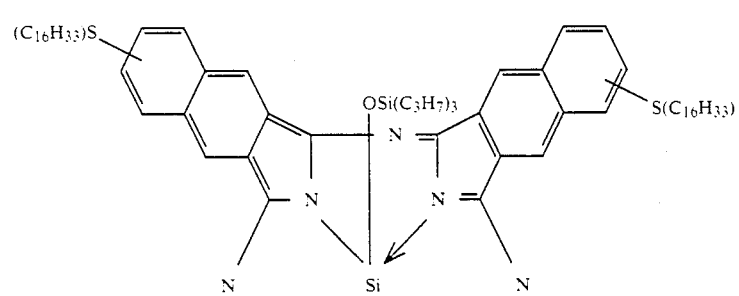
(105)
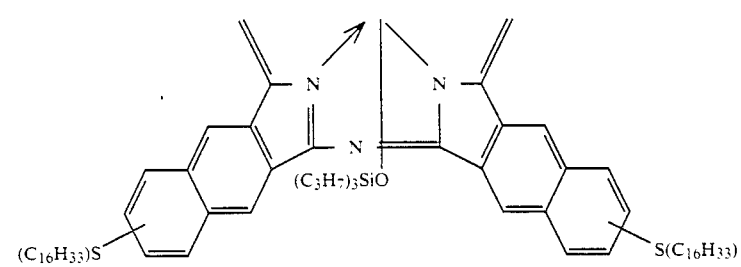
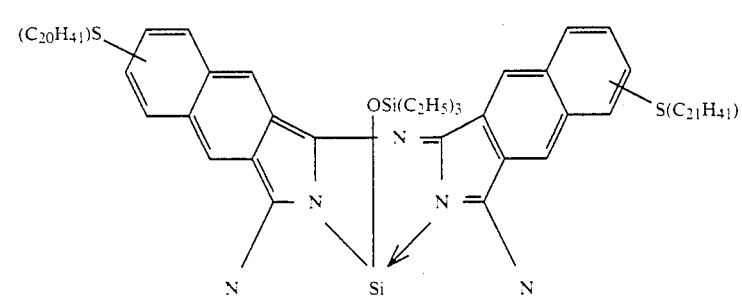
(106)

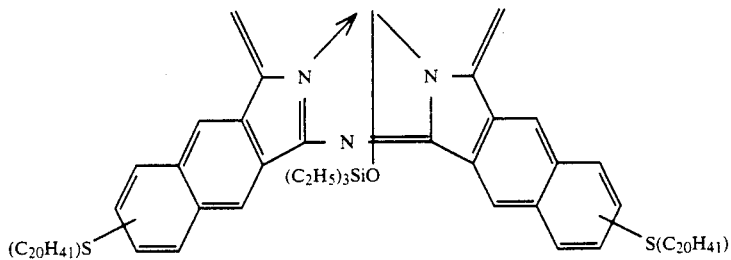
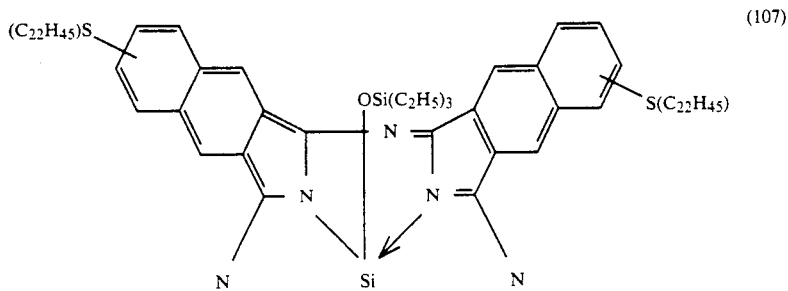
(107)
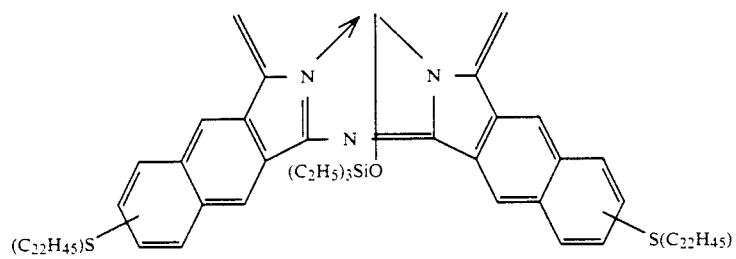
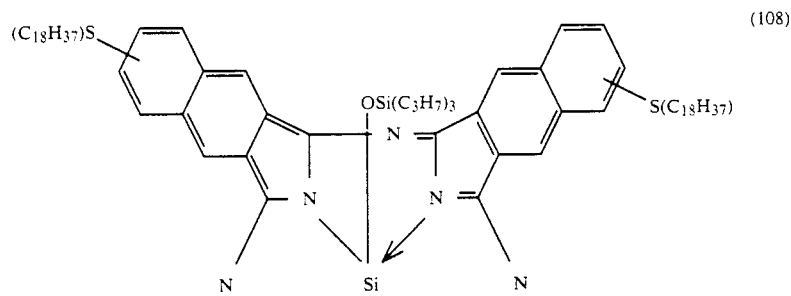
(108)
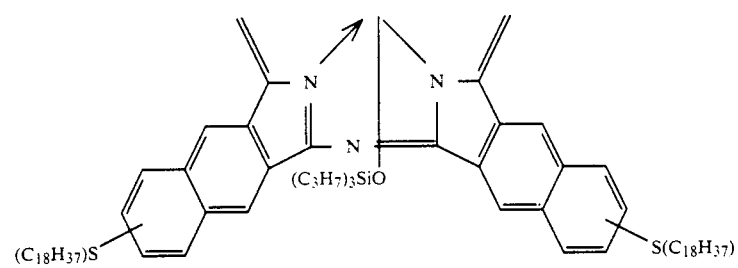
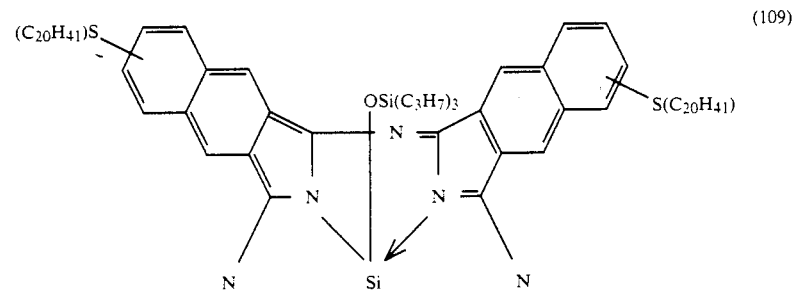
(109)

-continued
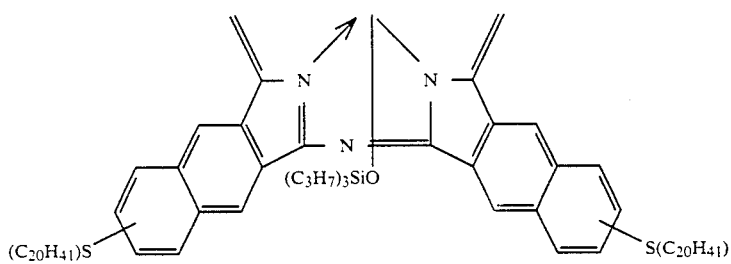
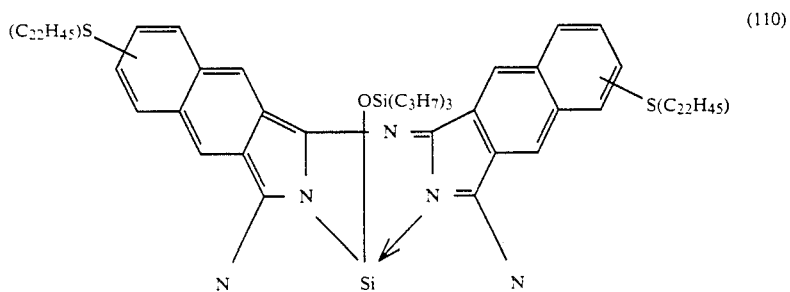
(110)
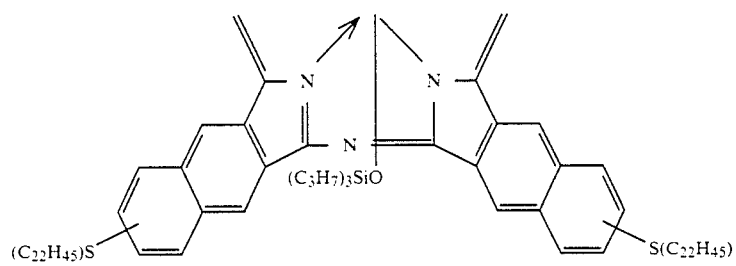
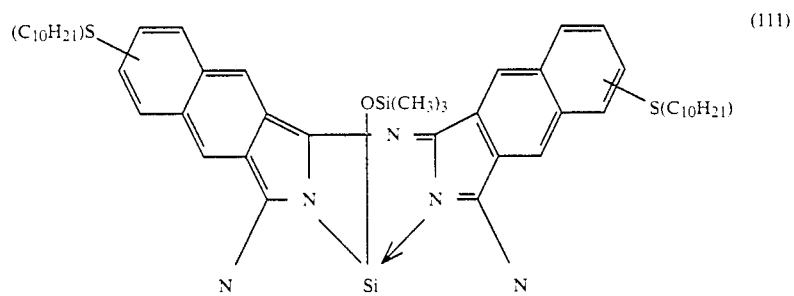
(111)
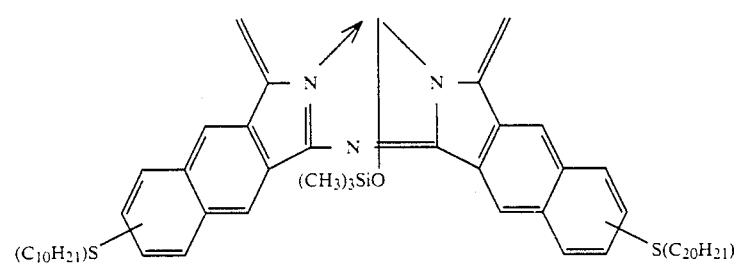
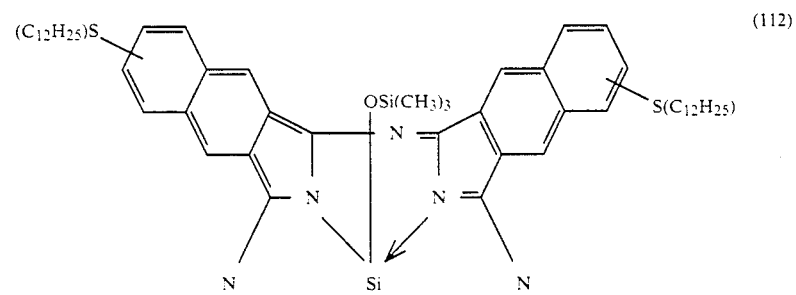
(112)

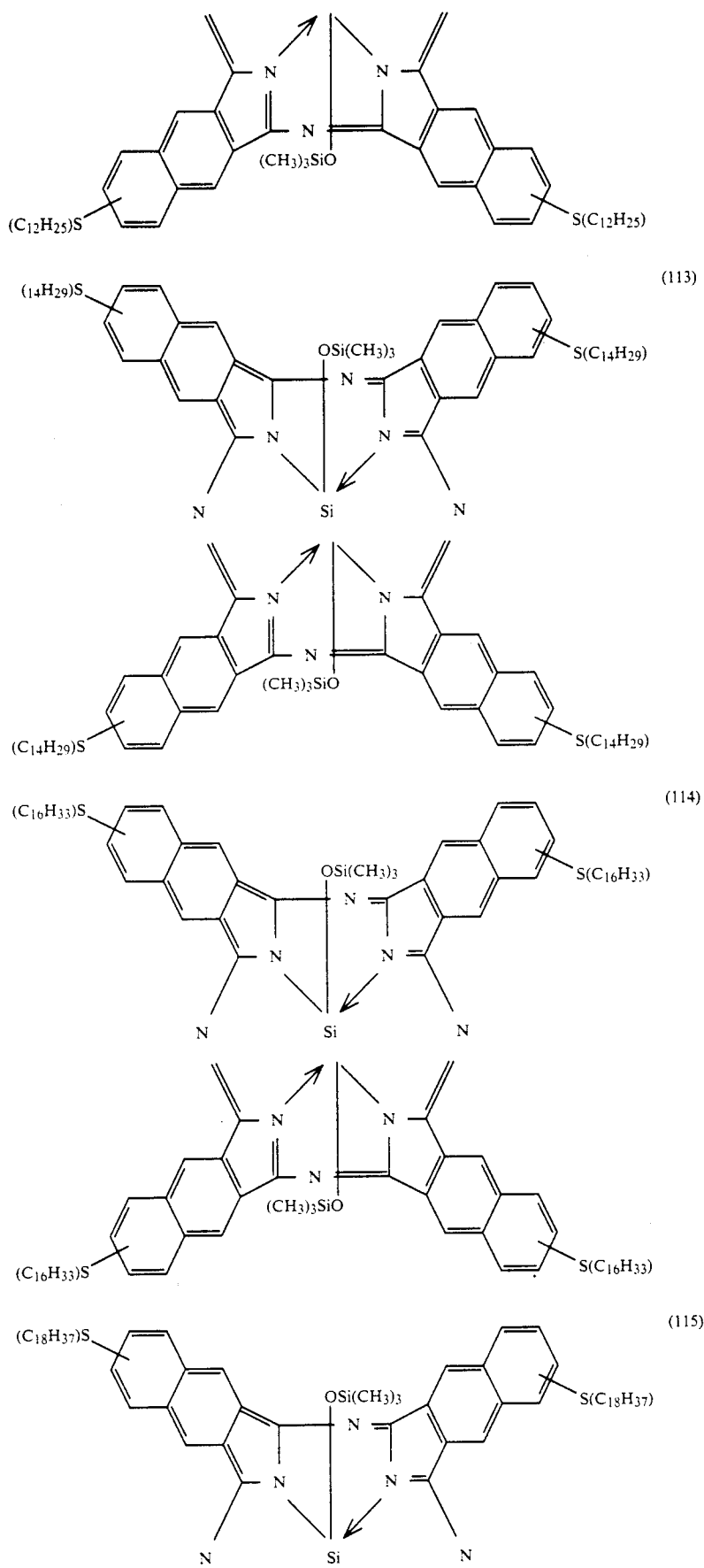

-continued
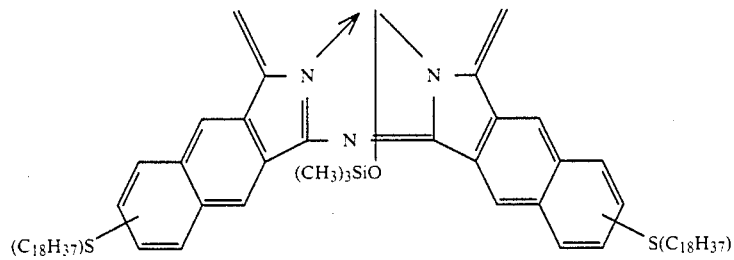
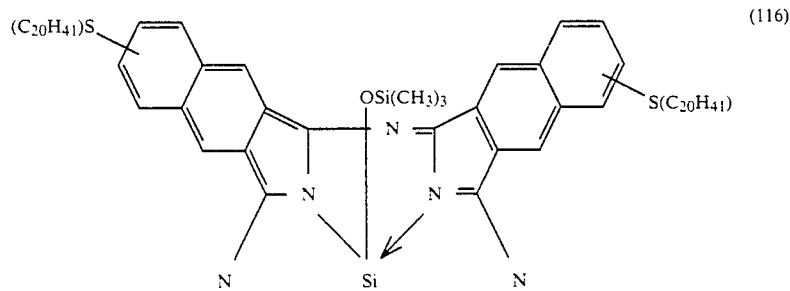
(116)
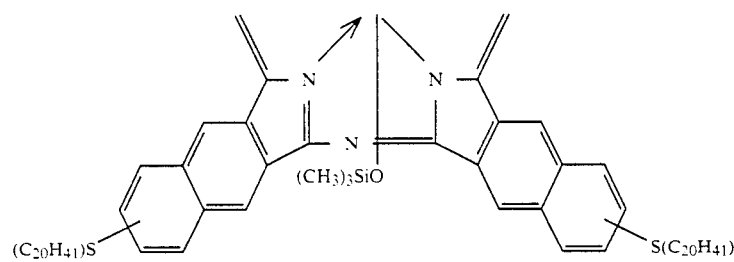
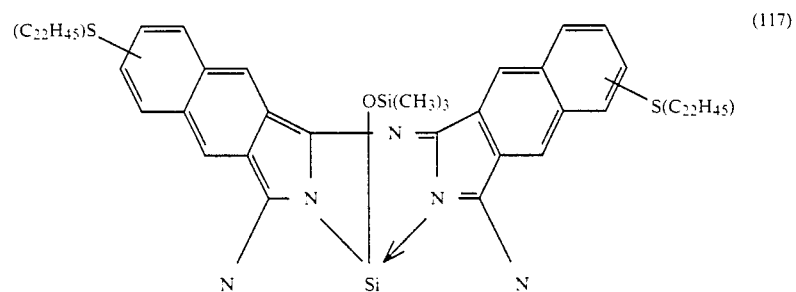
(117)
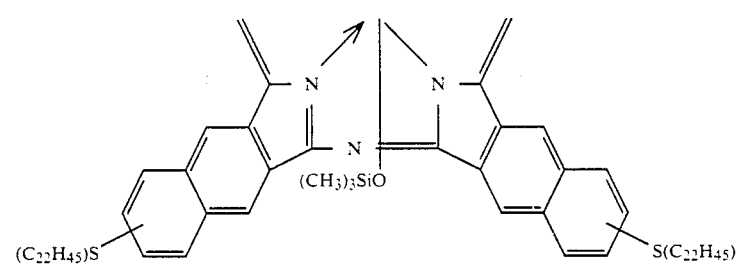
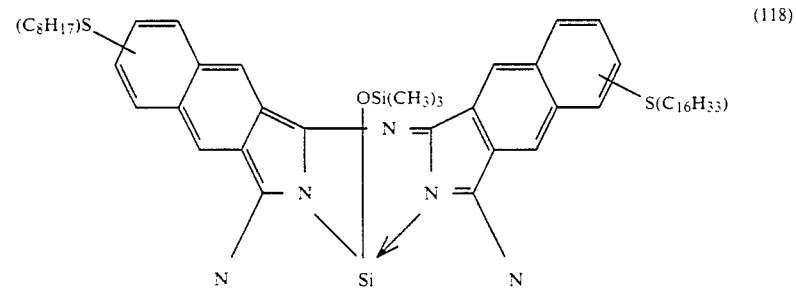
(118)

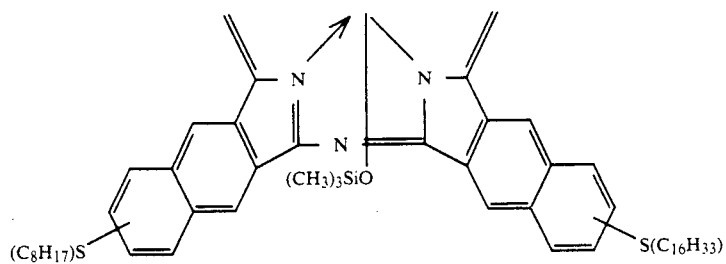
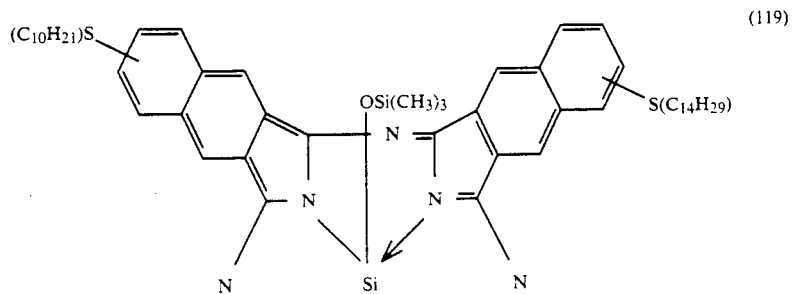
(119)
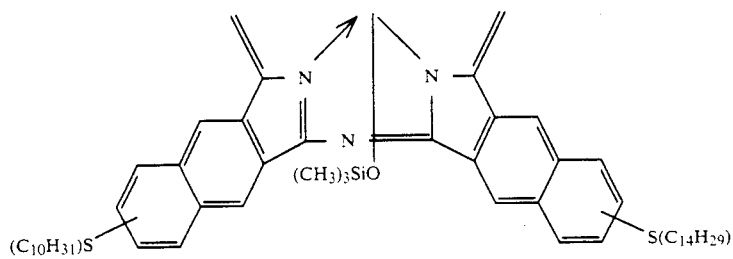
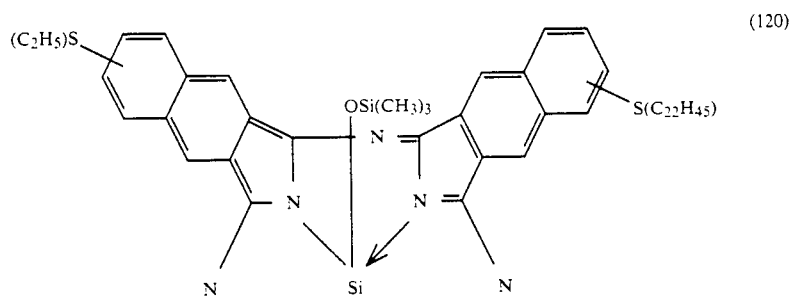
(120)
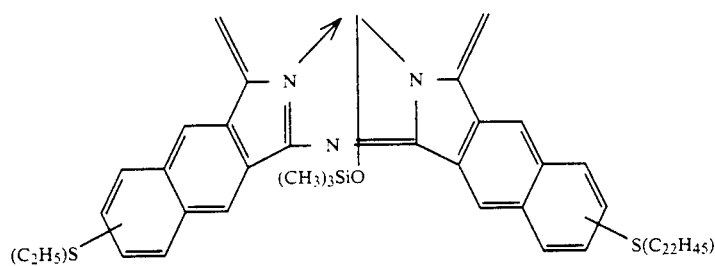
(121)
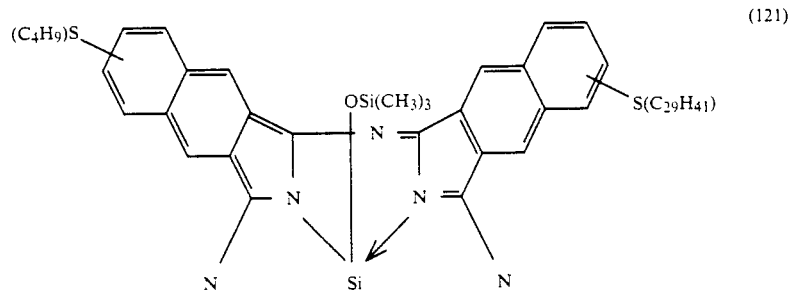

-continued
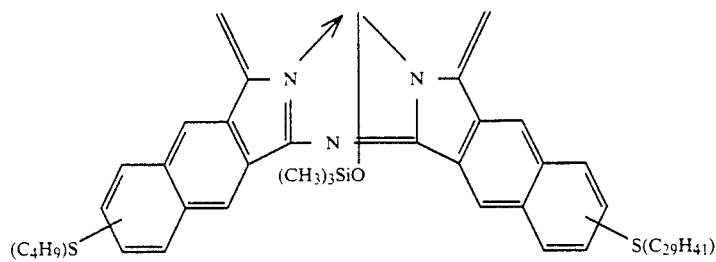
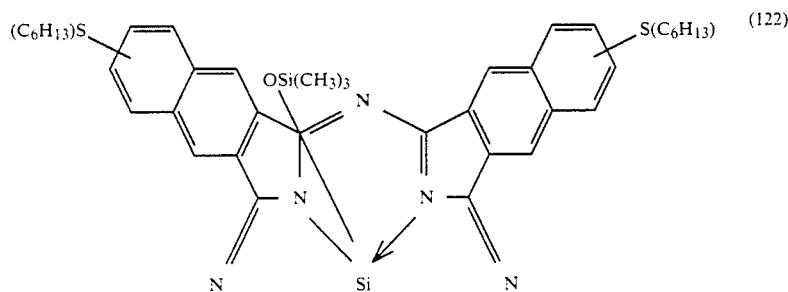
(122)
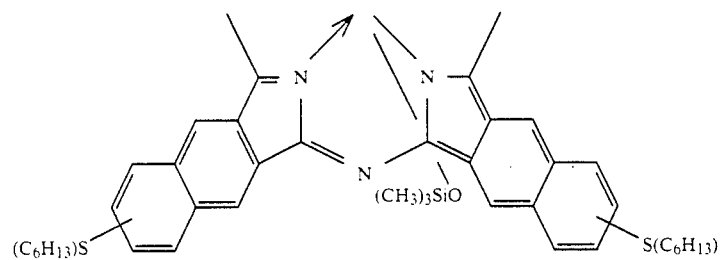
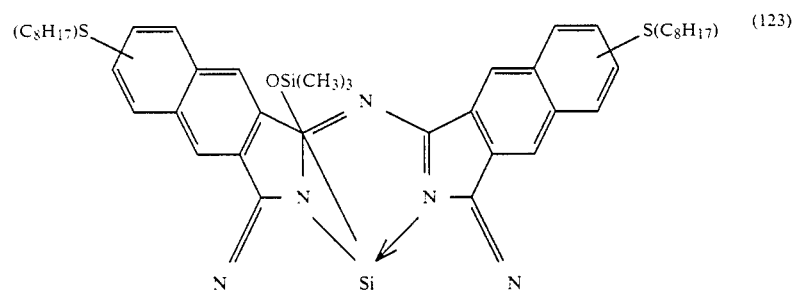
(123)
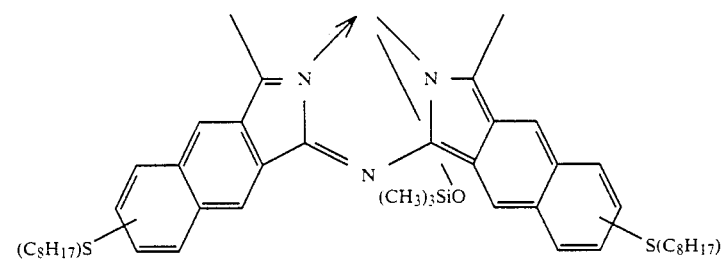
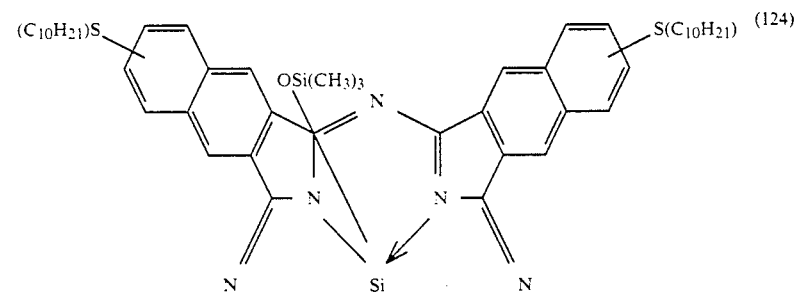
(124)

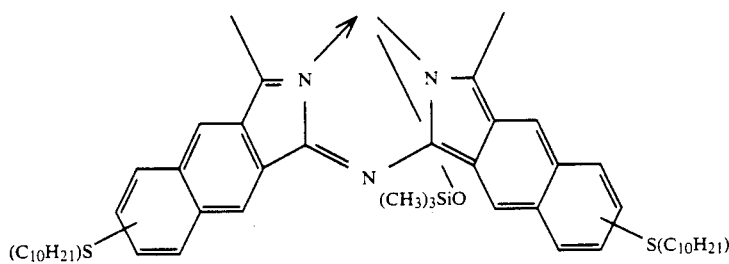
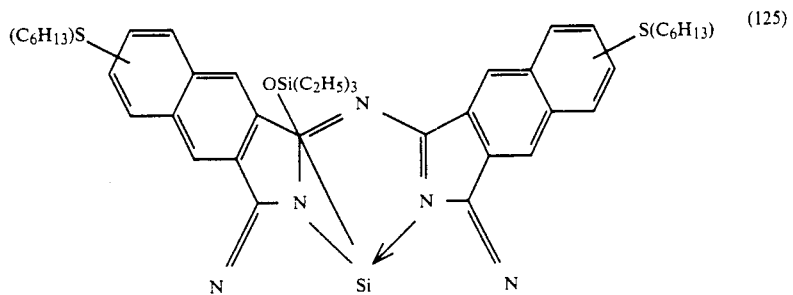
(125)
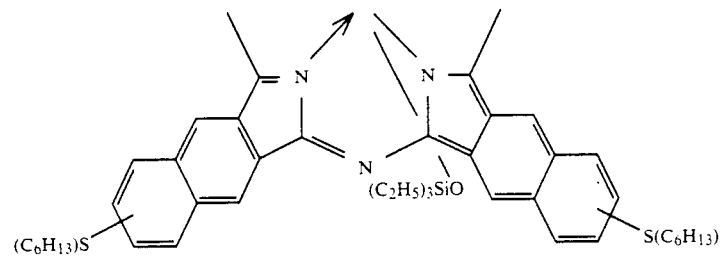
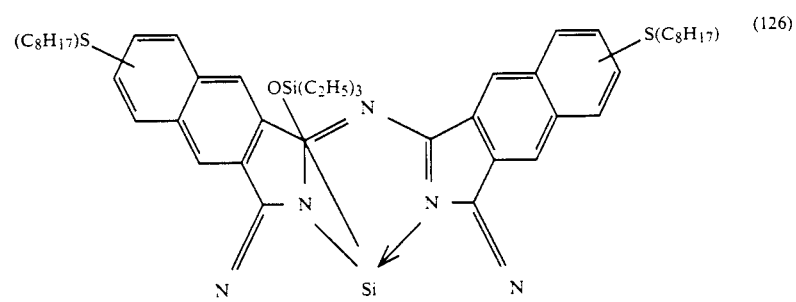
(126)
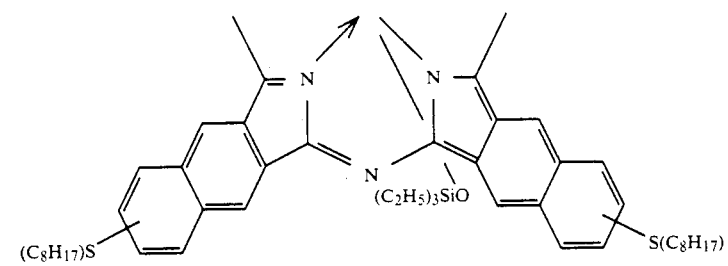
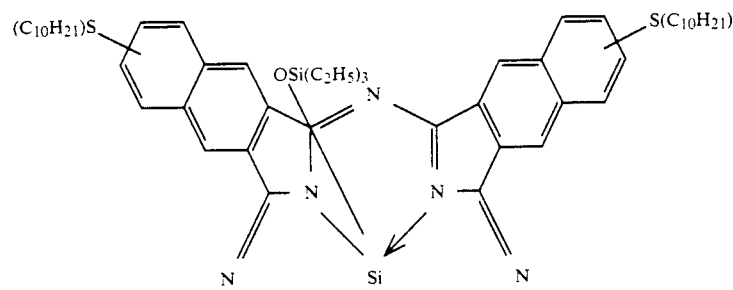
(127)

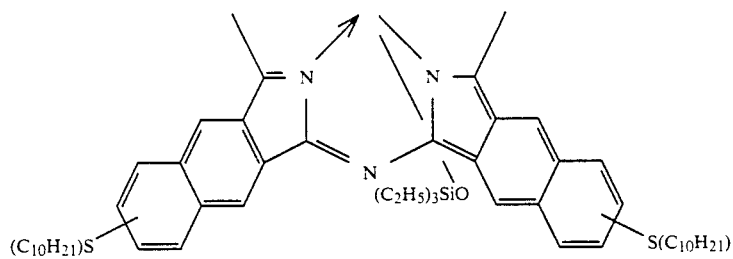
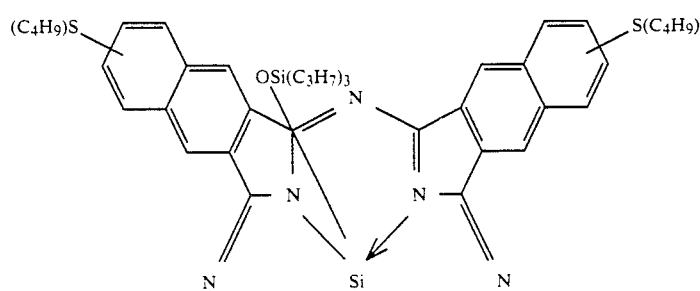
(128)
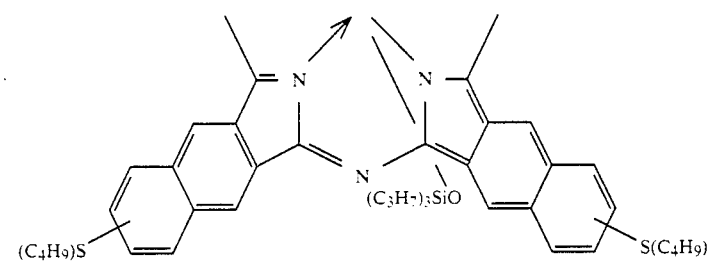
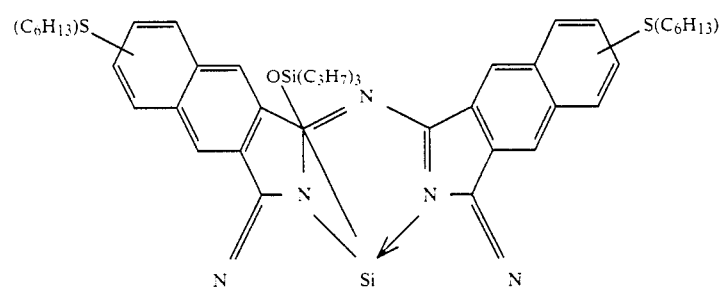
(129)
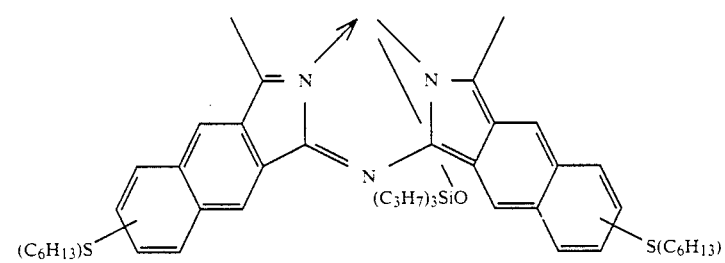
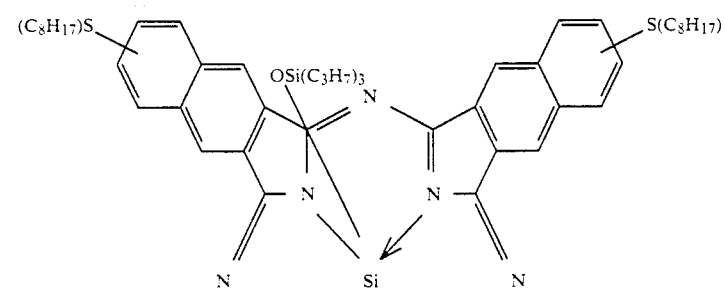
(130)

-continued
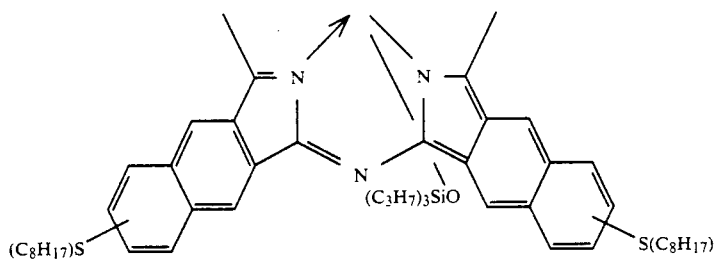
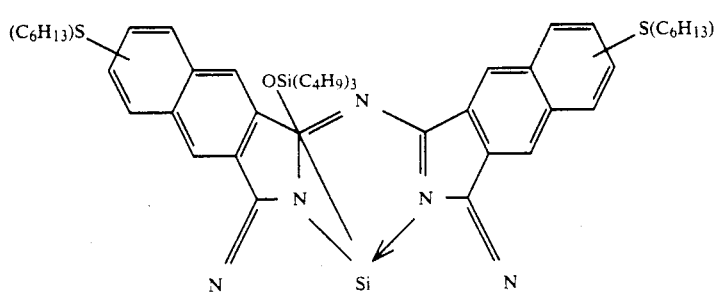
(131)
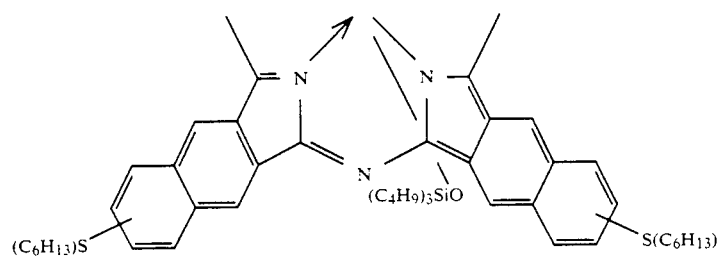
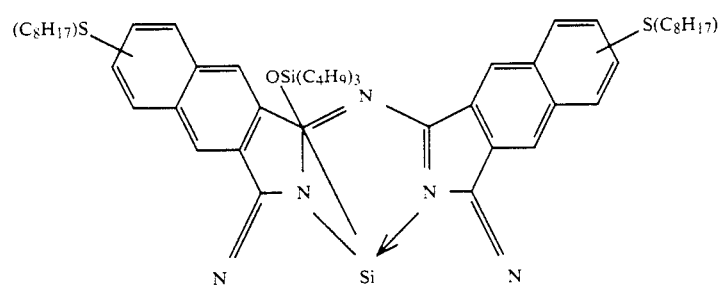
(132)
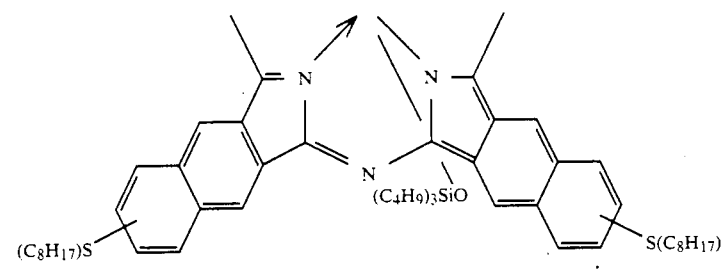
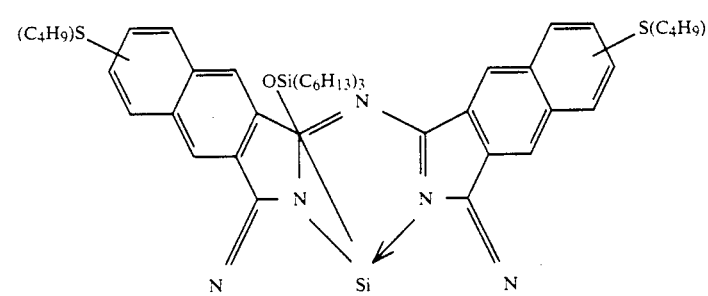
(133)

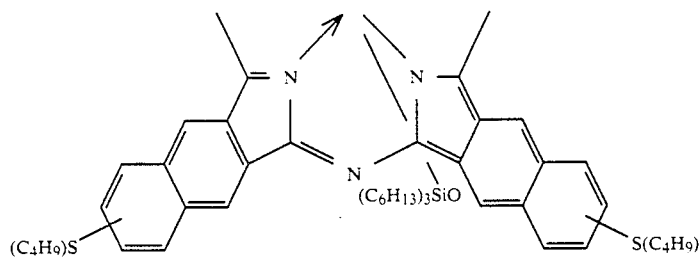
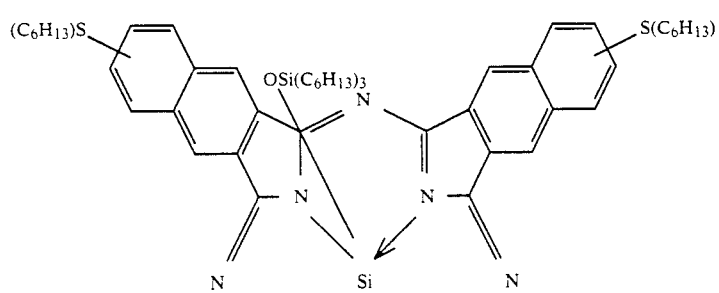
(134)
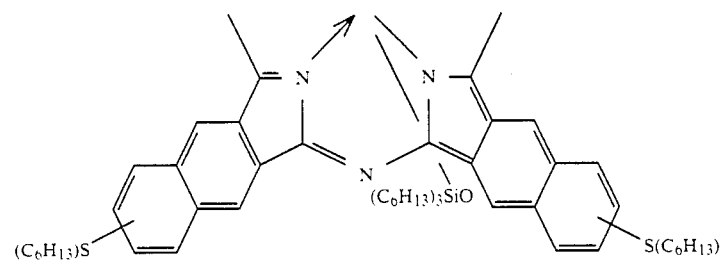
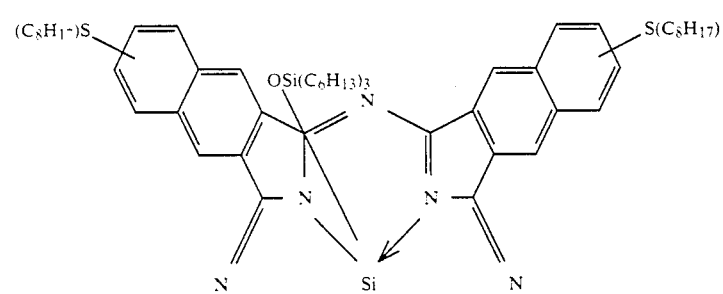
(135)
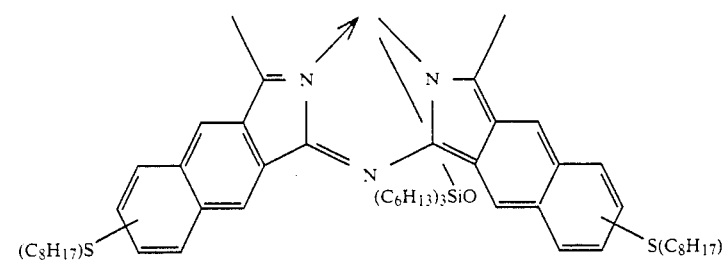
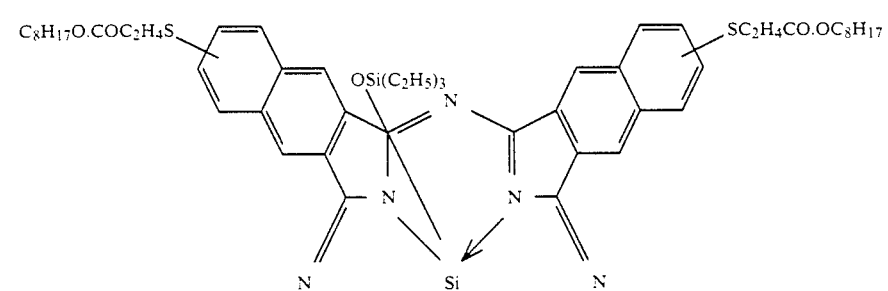
(136)

-continued
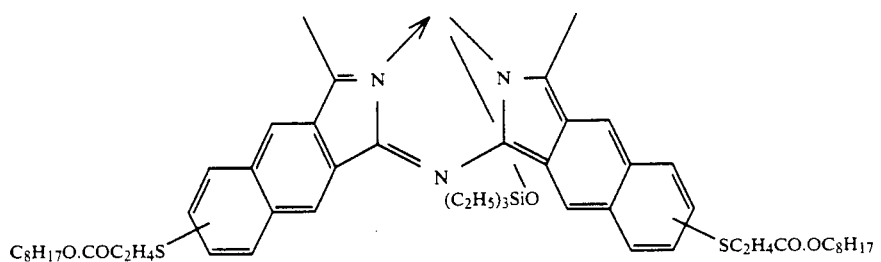
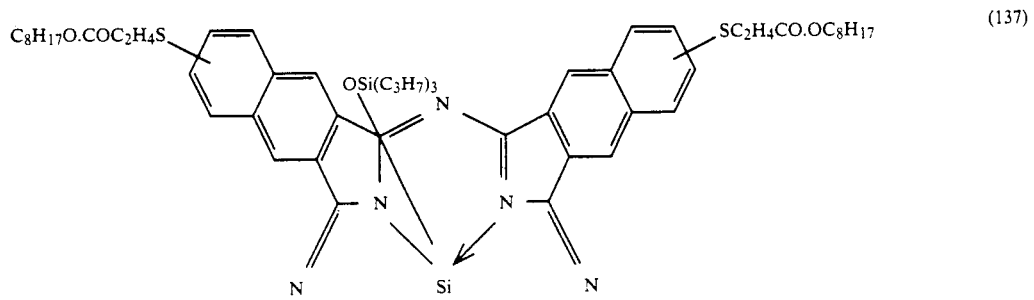
(137)
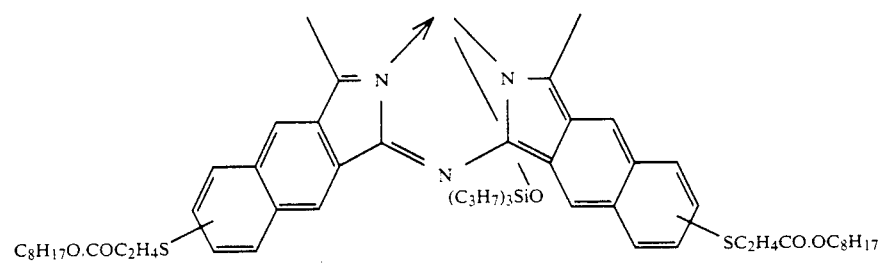
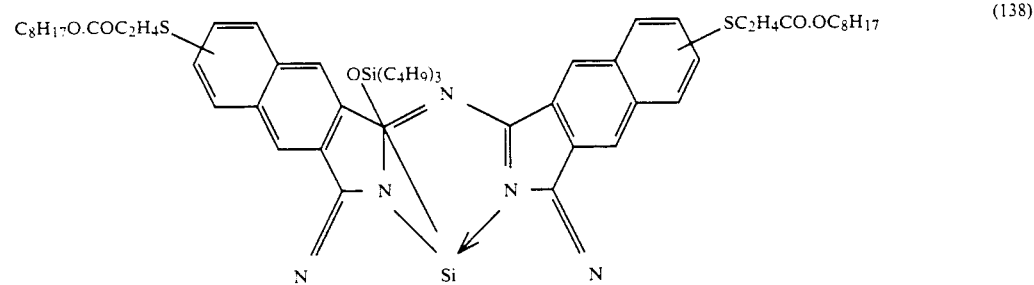
(138)
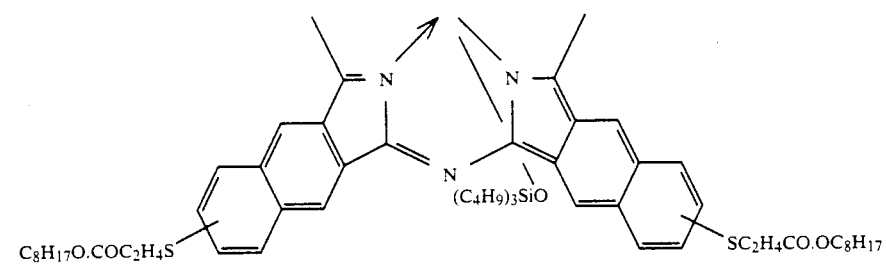
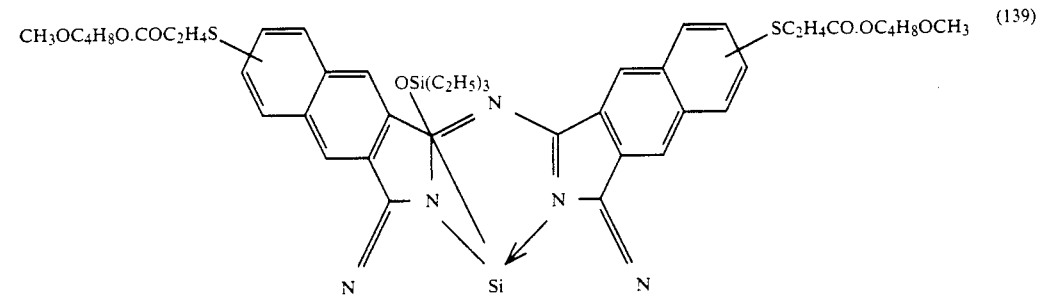
(139)

-continued
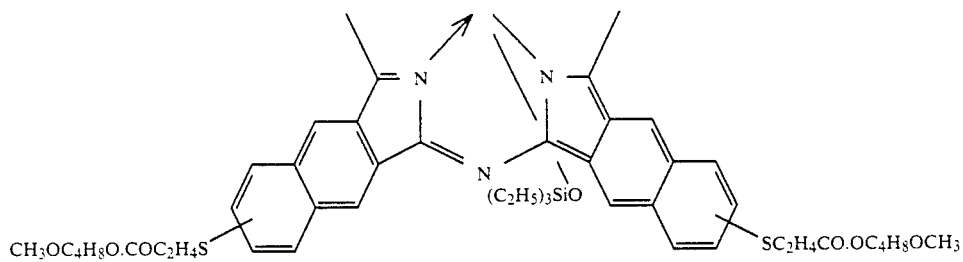
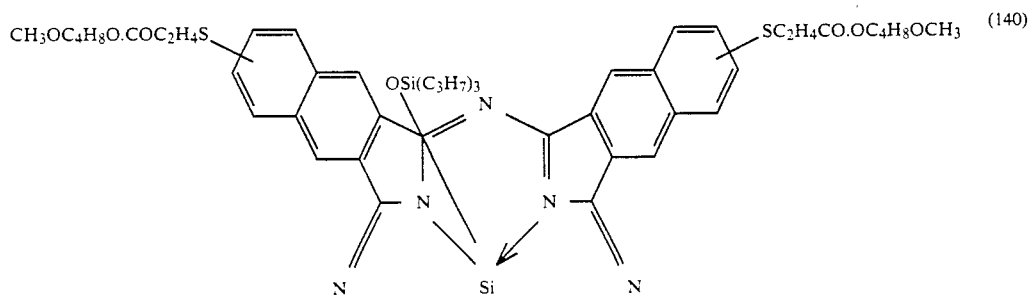
(140)
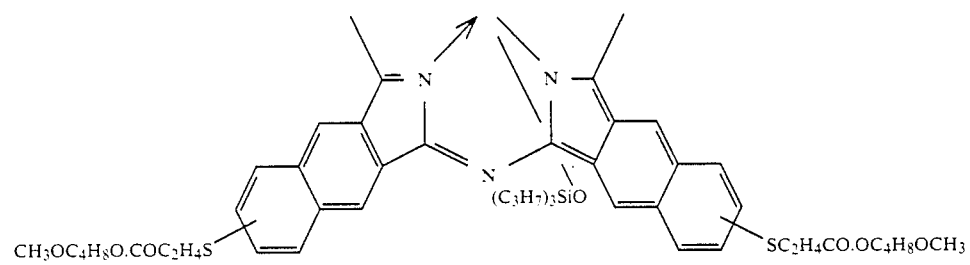
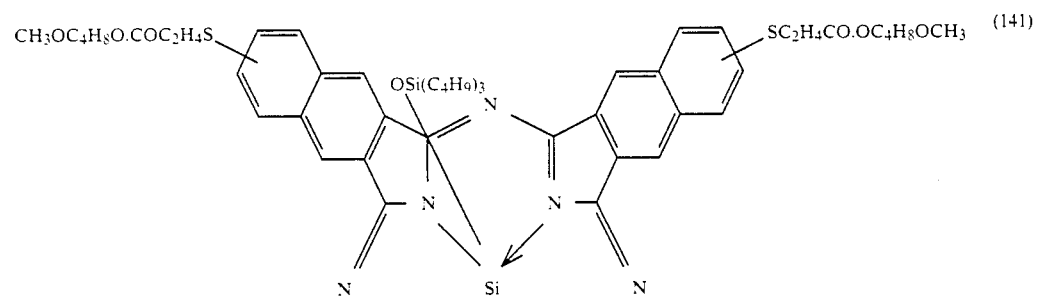
(141)
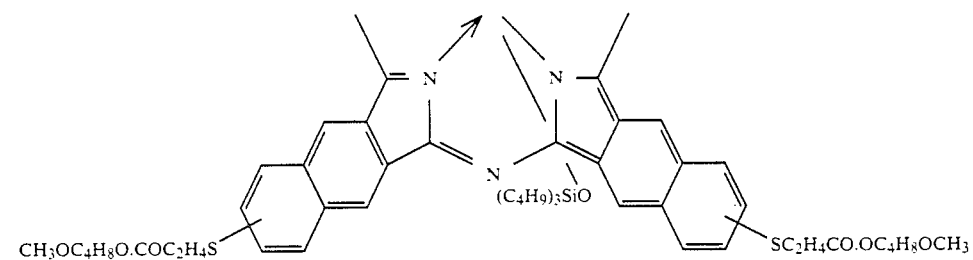
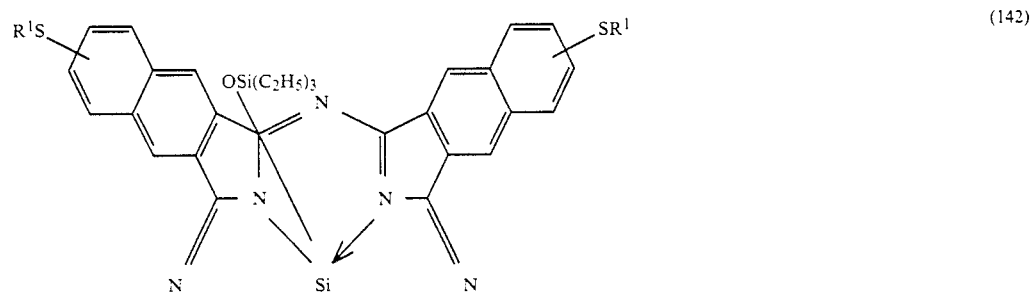
(142)

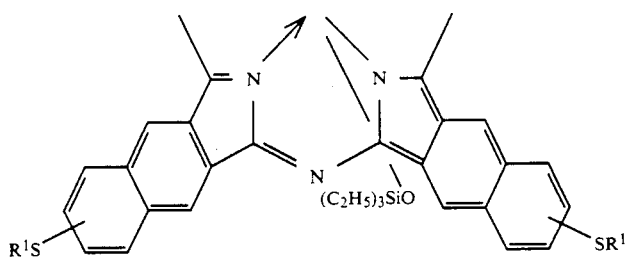
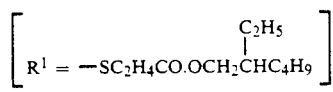
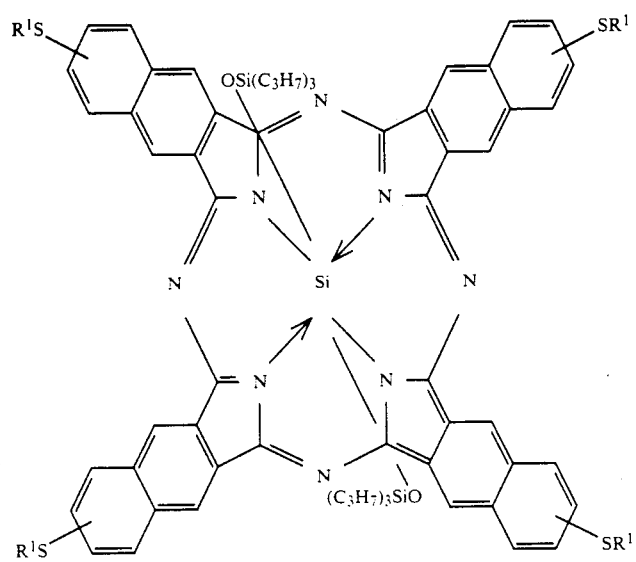
(143)
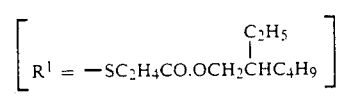
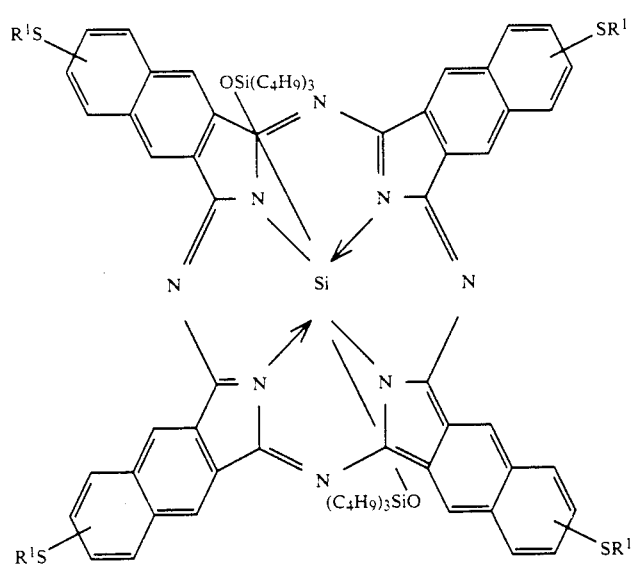
(144)
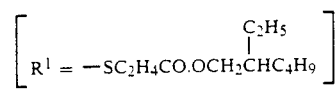

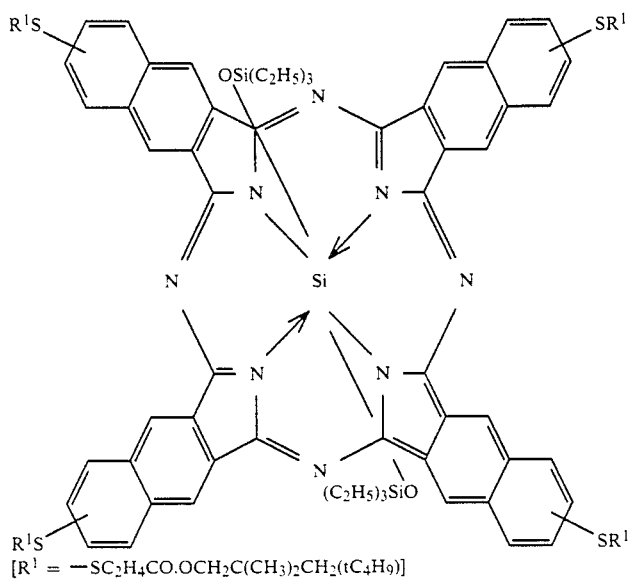
(145)
[R¹ = —SC₂H₄CO.OCH₂C(CH₃)₂CH₂(tC₄H₉)]
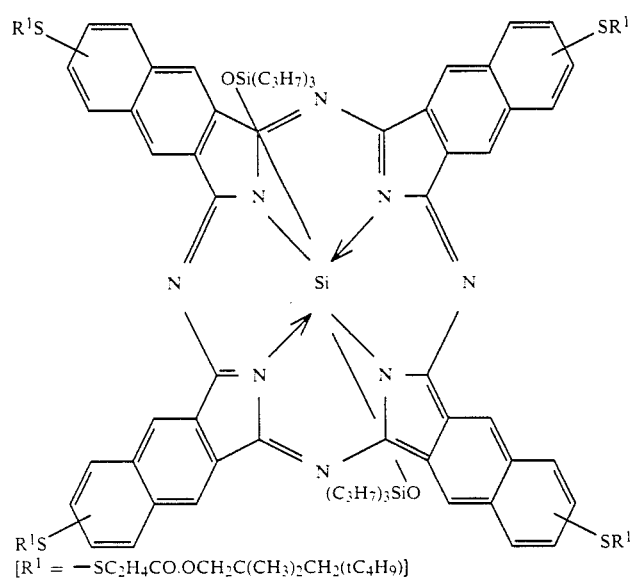
(146)
[R¹ = —SC₂H₄CO.OCH₂C(CH₃)₂CH₂(tC₄H₉)]
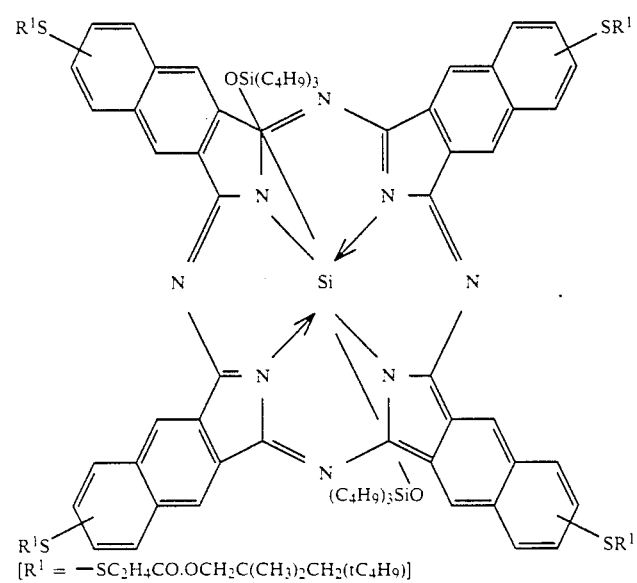
(147)
[R¹ = —SC₂H₄CO.OCH₂C(CH₃)₂CH₂(tC₄H₉)]

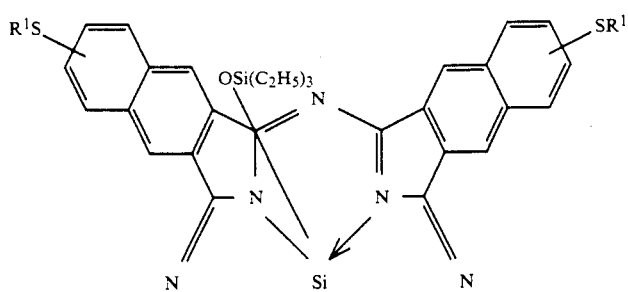
(148)
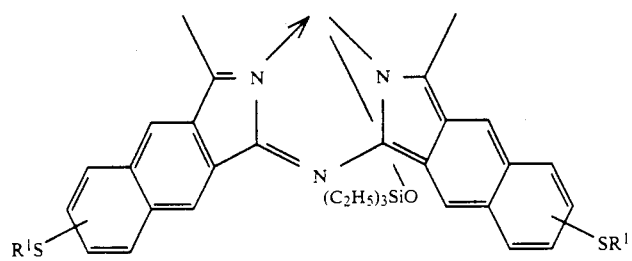
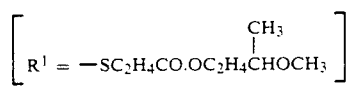
$$R^1 = -SC_2H_4CO.OC_2H_4\overset{\underset{\textstyle |}{CH_3}}{C}HOCH_3$$
(149)
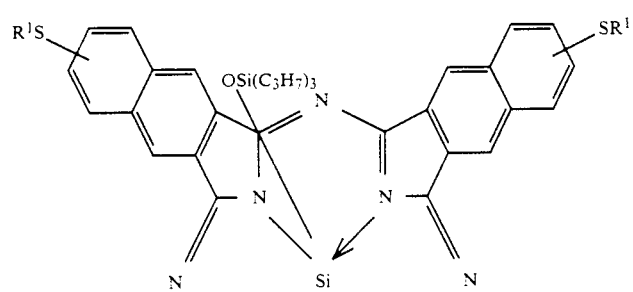
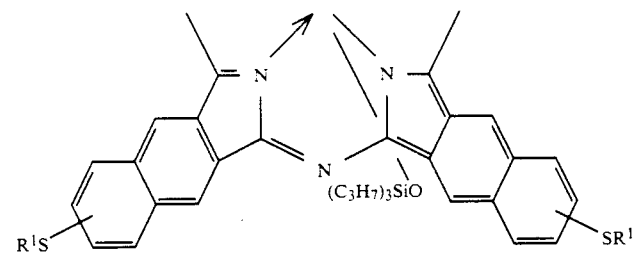
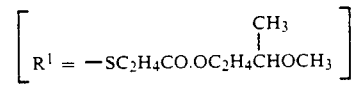
$$R^1 = -SC_2H_4CO.OC_2H_4\overset{\underset{\textstyle |}{CH_3}}{C}HOCH_3$$
(150)
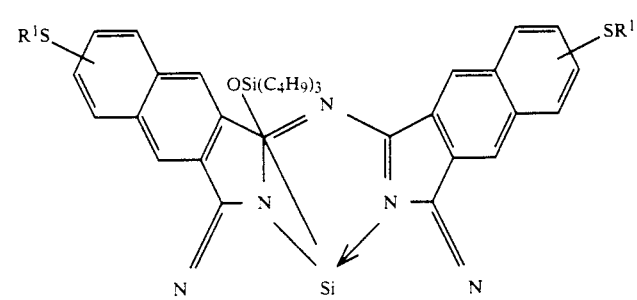

-continued
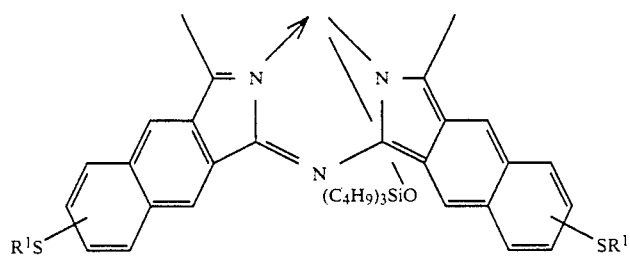
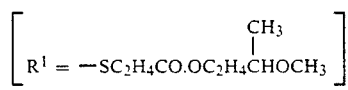
(151)
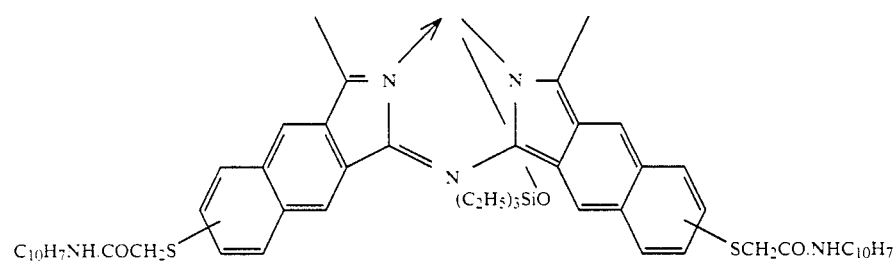
(152)
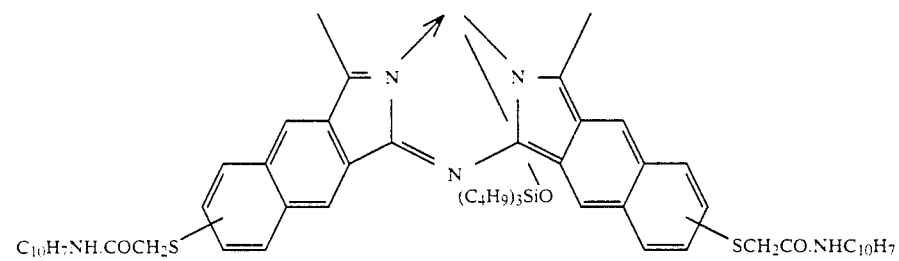

-continued
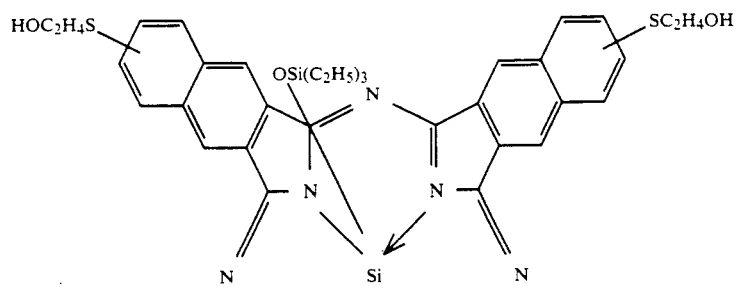
(153)
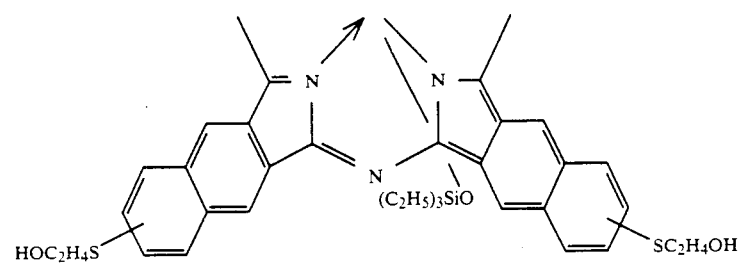
(154)
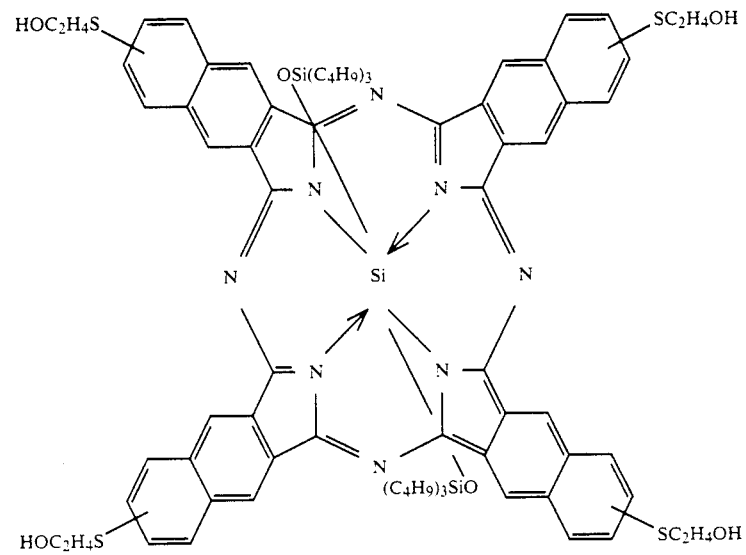
(155)

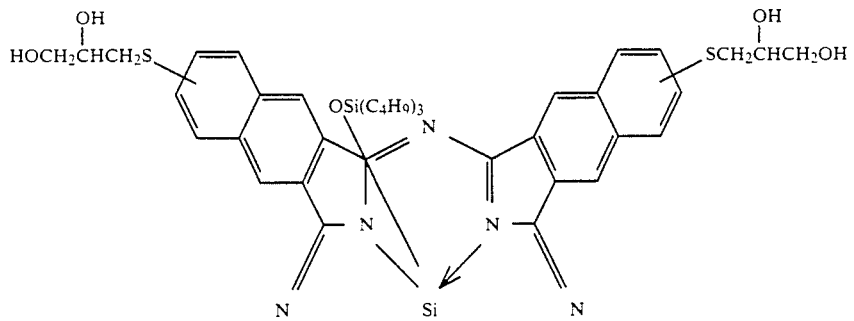
(156)
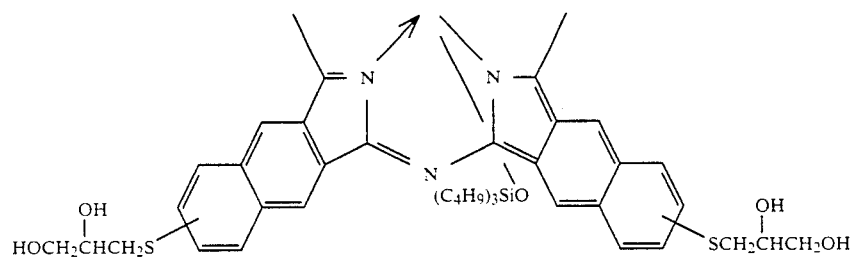
(157)
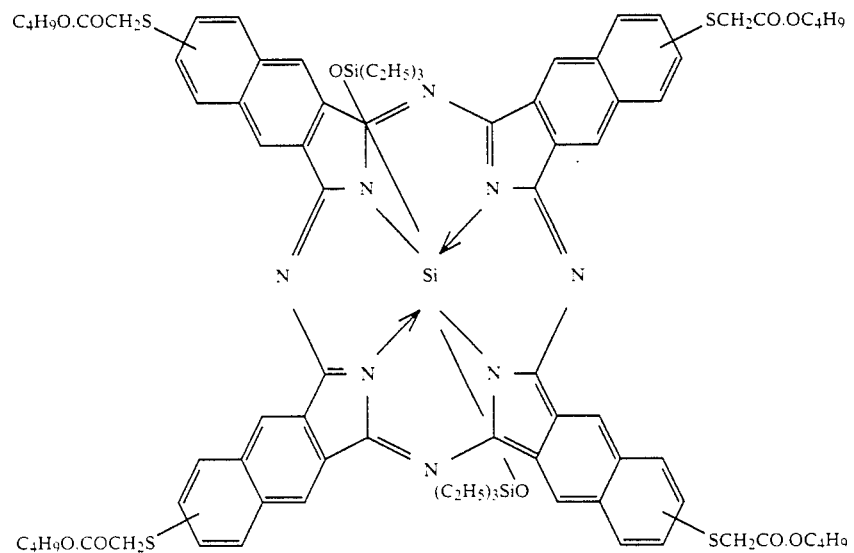
(158)

-continued
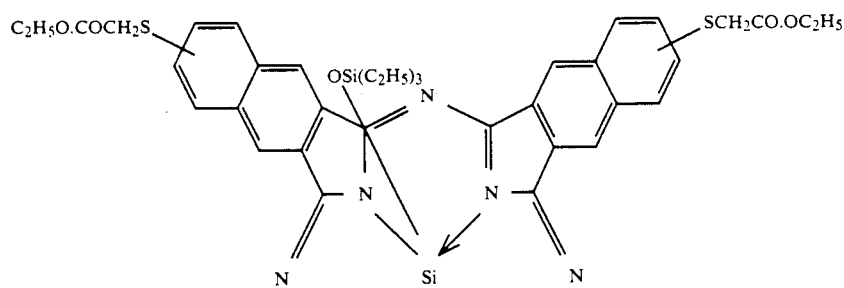 (159)
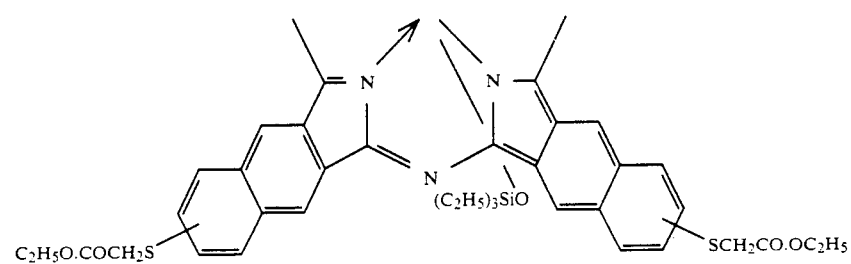
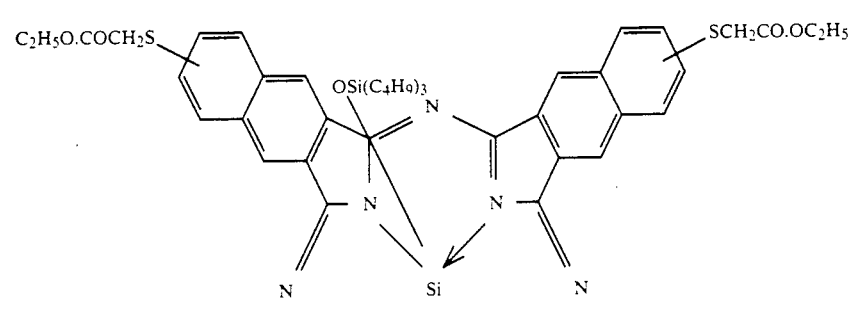 (160)
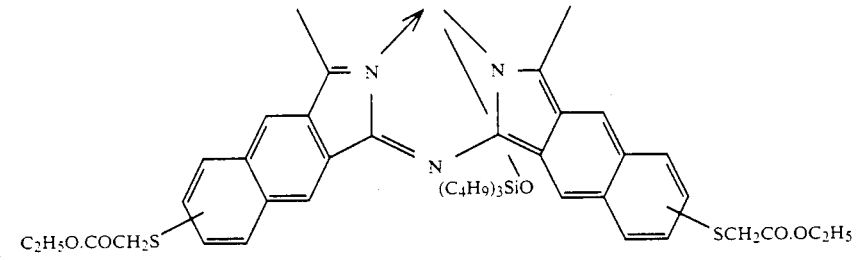
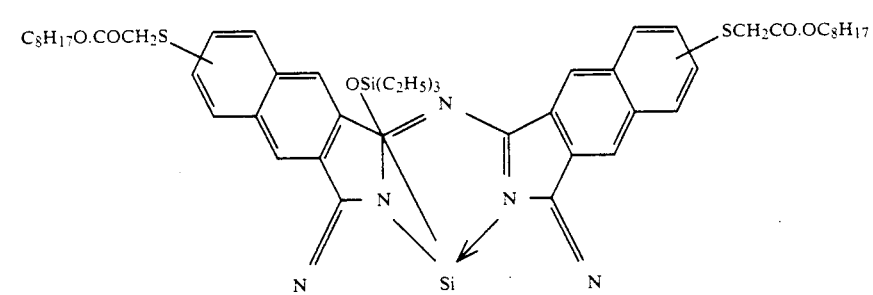 (161)
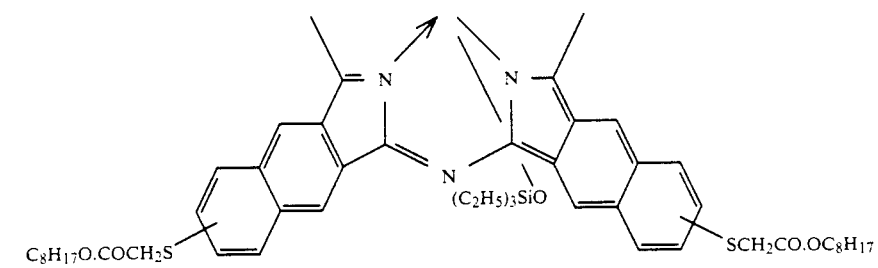

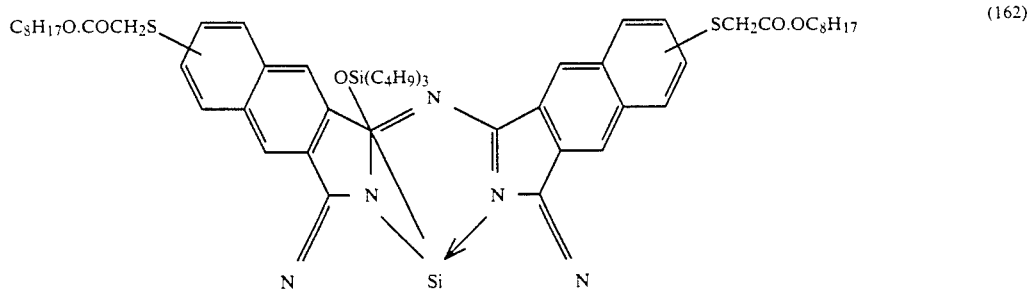
(162)
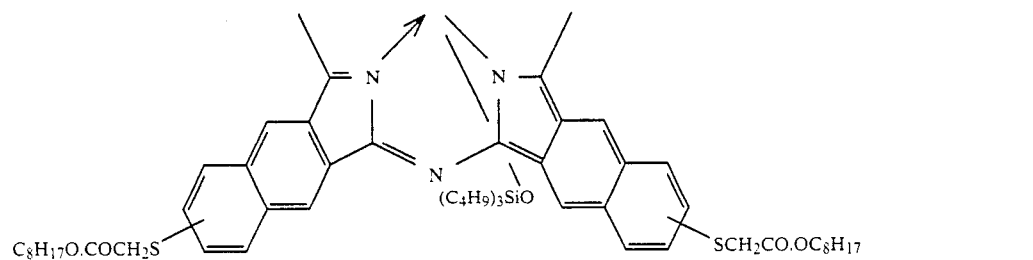
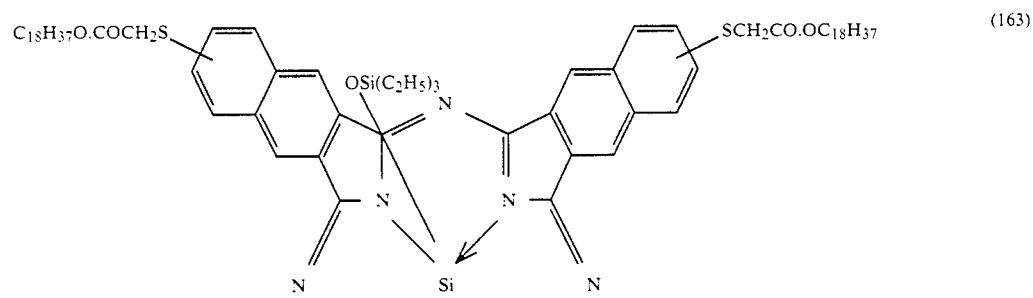
(163)
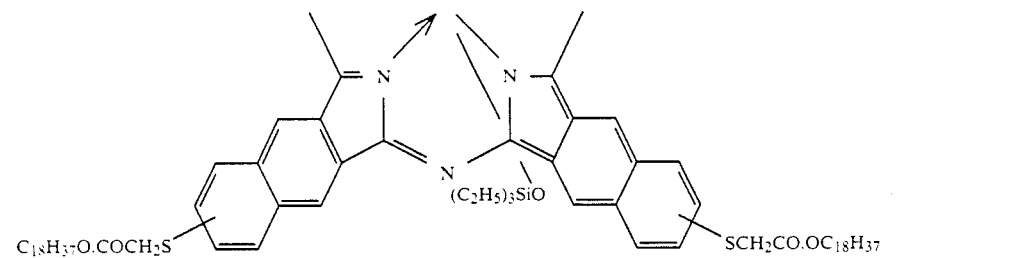
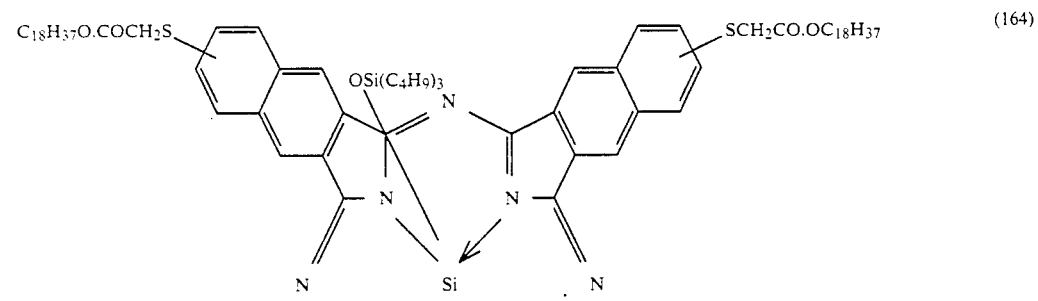
(164)
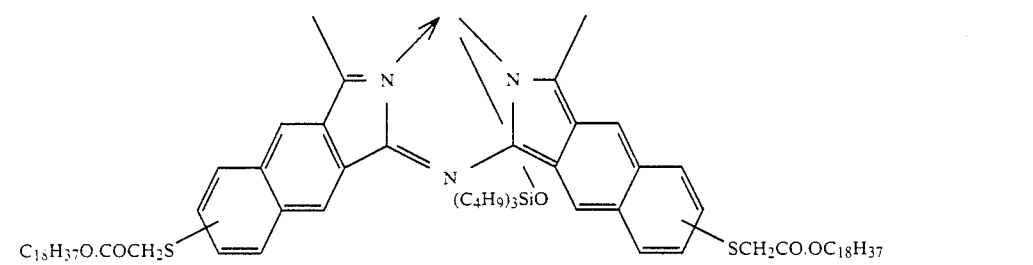

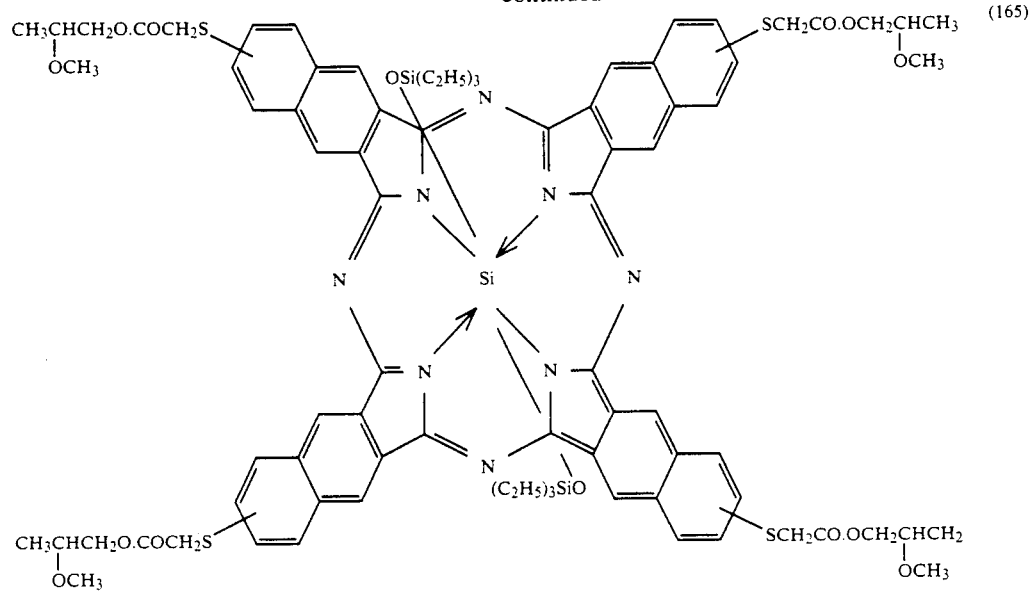
(165)
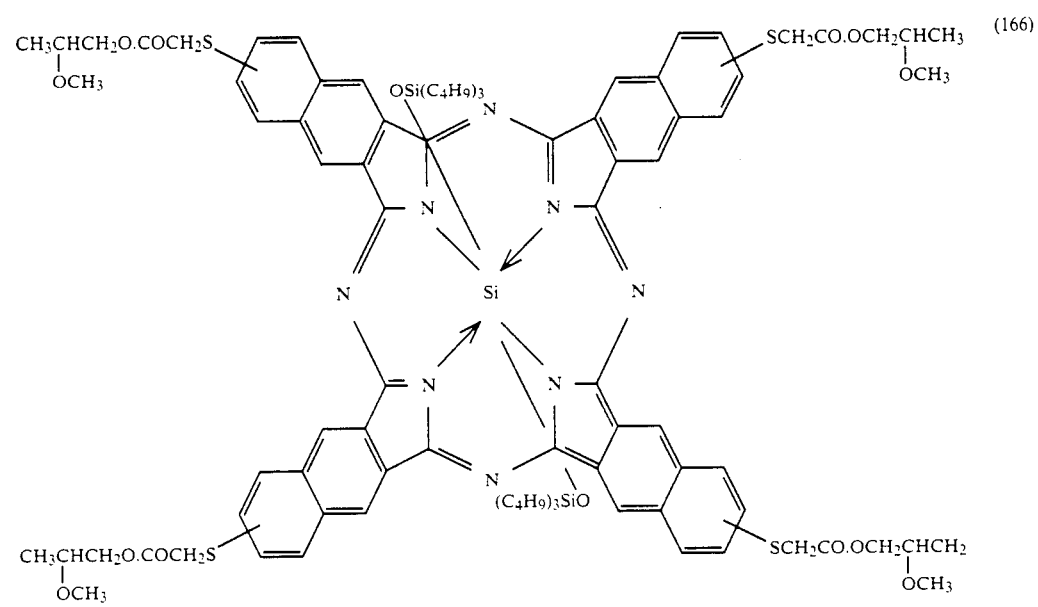
(166)
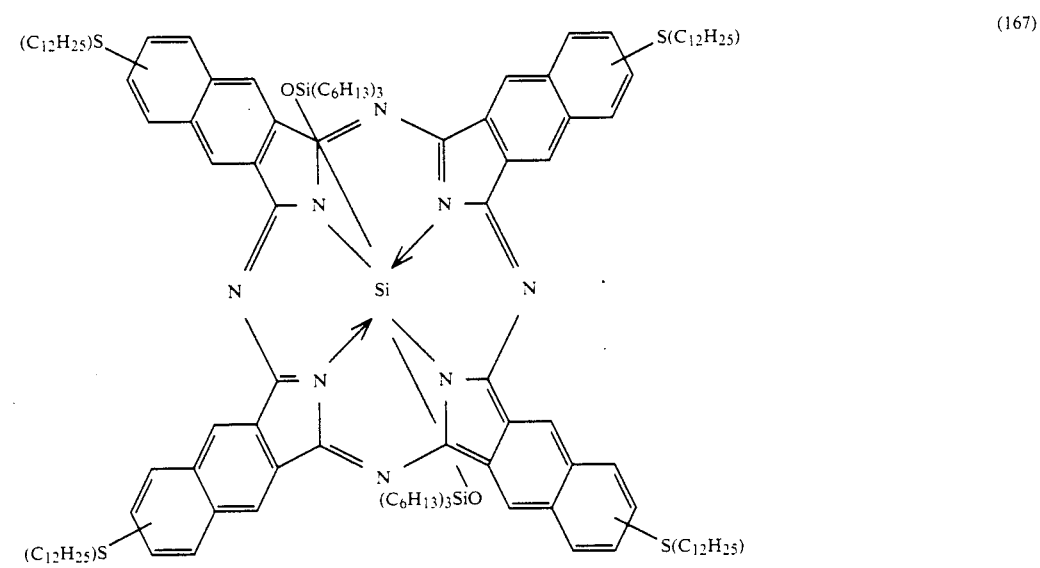
(167)

This invention further provides a process for producing a naphthalocyanine derivative of the formula:

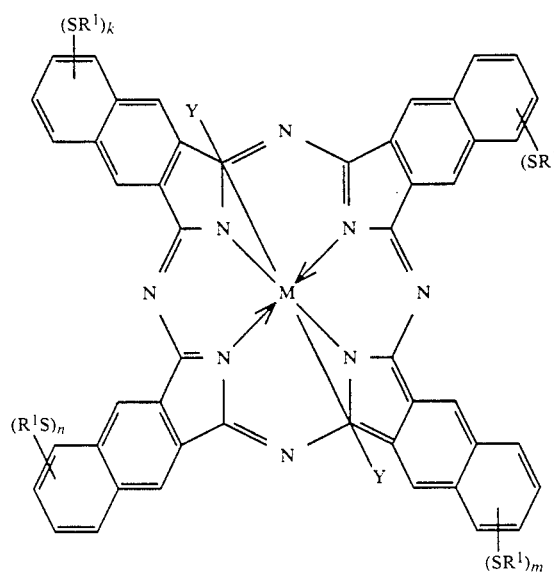
(I)

wherein k, l, m and n, which may be the same or different, are zero or integers of 1 to 4, k+l+m+n being an integer of b 1 or more; $R^1$ is as defined above; two Y's, which may be the same or different, are aryloxyl groups, alkoxyl groups, trialkylsiloxyl groups, tirarylsiloxyl groups, trialkoxysiloxyl groups, triaryloxysiloxyl groups, trityloxyl groups, or acyloxyl group; and M is Si, Ge or Sn, which comprises reacting a naphthalocyanine derivative of the formula:

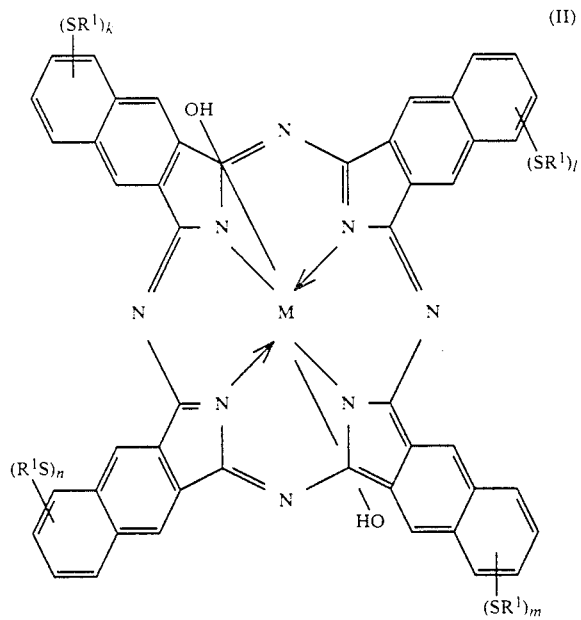
(II)

wherein k, l, m, n, $R^1$ and M are as defined above, with a chlorosilane of the formula:

$(R^2)_3SiCl$ (III), a silanol of the formula:

$(R^3)_3SiOH$ (IV)

(in the formulas (III) and (IV), each of $R^2$ and $R^3$ is an alkyl group, an aryl group, an alkoxyl group, or an aryloxyl group), an alcohol of the formula:

$R^4OH$ (V)

wherein $R^4$ is an alkyl group or an aryl group, or a compound of the formula:

$R^5CO.X$ (VI)

wherein $R^5$ is an alkyl group; and X is a halogen atom, a hydroxyl group or an acyloxyl group.

The naphthalocyanine derivative of the formula (I) can be obtained by reacting a compound of the formula (II) with an excess of a compound of the formula (III), (IV), (V) or (VI) with heating. In this case, the reaction temperature is preferably 80° to 250° C., and the reaction time is preferably 30 minutes to 10 hours. This reaction is preferably carried out without a solvent or by use of a solvent such as benzene, toluene, xylene, trimethylbenzene, chlorobenzene, dichlorobenzene, trichlorobenzene, 1-chloronaphthalene, tetralin, pyridine, β-picoline, quinoline, or the like, if necessary, in the presence of an aliphatic amine such as triethylamine, tripropylamine, tributylamine, tripentylamine, trihexylamine, or the like.

The naphthalocyanine derivative of the formula (I) can be isolated and purified from the reaction mixture, for example, by separating the reaction mixture by chromatography followed by purification by recrystallization.

The naphthalocyanine derivative of the formula (II) can be obtained by hydrolyzing, with heating, a naphthalocyanine derivative of the formula:

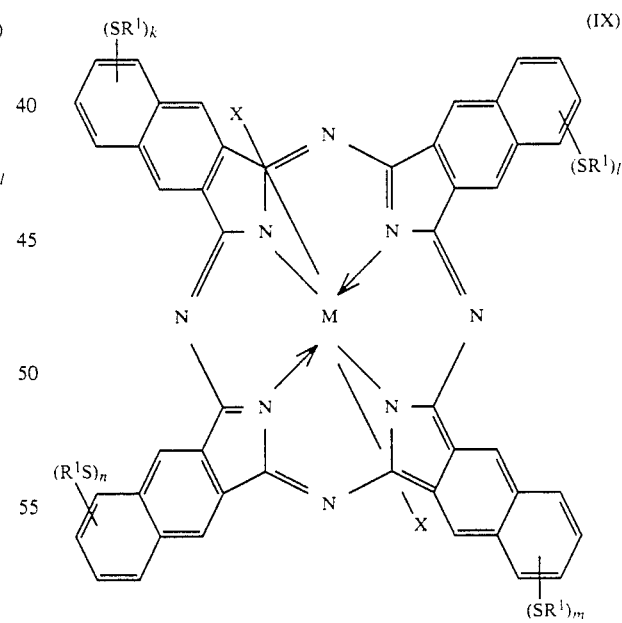
(IX)

wherein k, l, m and n, which may be the same or different, are zero or integers of 1 to 4, k+l+m+n being an integer of 1 or more; $R^1$'s in a number of 4(k+l+m+n), which may be the same or different, are alkyl groups, substituted alkyl groups, or aryl groups; M is Si, Ge or Sn; and two X's, which may be the same or different, are halogen atoms. In this case, the reaction temperature is preferably 50° to 150° C., and the reaction time is preferably 30 minutes to 10 hours. For these conditions, it is preferable to carry out the reaction in a mixed solvent such as pyridine/water, pyridine/aqueous ammonia, methanol/aqueous ammonia, ethanol/aqueous ammonia, propanol/aqueous ammonia, or the like.

The naphthalocyanine derivative of the formula (IX) can be obtained by heating a metal halide of the formula:

$$MX_p \qquad (XII)$$

wherein X is a halogen atom; p is a positive integer indicating the number of X's bound to the metal M; and M is Si, Ge or Sn, together with a 1,3-diiminobenz[f] isoindoline derivative of the formula:

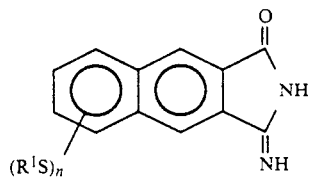

(X)

wherein $R^1$ is the same or different alkyl group, substituted alkyl group or aryl group, and n is the same or different integer of 1 to 4, or a 2,3-dicyanonaphthalene derivative of the formula:

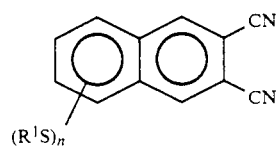

(XI)

wherein $R^1$ is the same or different alkyl group, substituted alkyl group, or aryl group; and n is the same or different integer of 1 to 4, in an amount of 0.1 to 1 mol per mol of the latter, and heating and reacting them. In this case, the reaction temperature is preferably 150° to 300° C., and the reaction time is preferably 30 minutes to 10 hours. This reaction may be carried out without a solvent or by use of a solvent such as urea, tetraline, quinoline, 1-chloronaphthalene, 1-bromonaphthalene, trimethylbenzene, dichlorobenzene, trichlorobenzene, or the like. This reaction is carried out preferably in the presence of an amine. The amine includes triethylamine, tripropylamine, tributylamine, tripentylamine, trihexylamine, etc. The above-mentioned metal halide includes $SiCl_4$, $SiBr_4$, $SiI_4$, $GeCl_4$, $GeBr_4$, $SnCl_2$, $SnI_2$, etc.

The 1,3-diiminobenz[f] isoindoline of the formula (X) can be obtained by refluxing a 2,3-dicyanonaphthalene derivative of the formula (XI) in methanol in the presence of sodium methoxide as a catalyst for 1 to 10 hours while bubbling ammonia gas therethrough.

The 2,3-dicyanonaphthalene derivative of the formula (XI) can be produced mainly by the following two methods.

One of the methods comprises irradiating an o-xylene derivative of the formula:

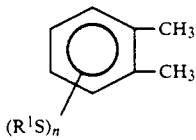

(XIII)

wherein $R^1$ is the same or different alkyl group, substituted alkyl group, or aryl group; and n is an integer of 1 to 4, and N-bromosuccinimide of the formula:

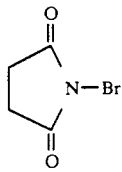

(XIV)

with heating, to obtain a compound of the formula:

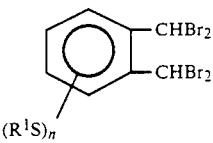

(XV)

wherein $R^1$ is the same or different alkyl group, substituted alkyl group, or aryl group; and n is an integer of 1 to 4, reacting this compound with fumaronitrile of the formula:

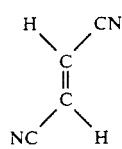

(XVI)

with heating, and thereby synthesizing the 2,3-dicyanonaphthalene of the formula (XI).

In general, the reaction of the o-xylene derivative of the formula (XIII) with N-bromosuccinimide of the formula (XIV) can be carried out by refluxing 0.2 mol of the o-xylene derivative and 0.8 mol of N-bromosuccinimide for 4 to 12 hours under irradiation by a high pressure mercury arc lamp in a solvent which is inert toward the irradiation. The reaction requires addition of a peroxide capable of generating a radical, as a reaction initiator. The peroxide includes benzoyl peroxide, octanoyl peroxide, cyclohexanone peroxide, isobutyryl peroxide, 2,4-dichlorobenzoyl peroxide, methyl ethyl ketone peroxide, etc. The peroxide is used usually in an amount of 500 mg to 2 g per 500 ml of the solvent. The solvent inert to the irradiation is properly selected from halogenated solvents such as chloroform, carbon tetrachloride and the like, or aromatic solvents such as benzene, chlorobenzene and the like.

The next reaction of the compound of the formula (XV) with fumaronitrile of the formula (XVI) can be carried out by heating fumaronitrile of the formula (XVI) together with the compound of the formula (XV) in an amount of 1 to 2 mols per mol of the latter. The reaction temperature is preferably 70° to 100° C., and the reaction time is preferably 5 to 10 hours. As the solvent, polar organic solvents such as N,N-dimethylformamide, N,N-dimethylacetamide, dimethyl sulfoxide, N,N-diethylformamide, N,N-diethylacetamide, and the like are preferred.

In the other method, the 2,3-dicyanonaphthalene derivative can be obtained by subjecting a bromo-2,3-dicyanonaphthalene of the formula:

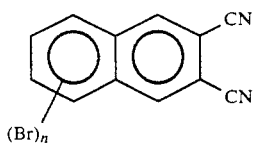

wherein n is an integer of 1 to 4, to substitution reaction with an excess of a copper (I) thiolate of the formula:

CuSR$^1$     (VIII)

wherein R$^1$ is an alkyl group, a substituted alkyl group, or an aryl group. In this case, the reaction temperature is preferably 80° to 250° C., and the reaction time is preferably 1 to 30 hours. As solvents for this invention, there can be used benzene, toluene, xylene, trimethylbenzene, chlorobenzene, dichlorobenzene, trichlorobenzene, 1-chloronaphthalene, tetralin, pyridine, β-picoline, quinoline, etc., alone or as a mixed solvent thereof.

The bromo-2,3-dicyanonaphthalene of the formula (XVII) can be synthesized by the pathway of the following formula (A) according to, for example, the method described in Zhurnal Organicheskoi Khimii, vol. 7, p. 369 (1971):

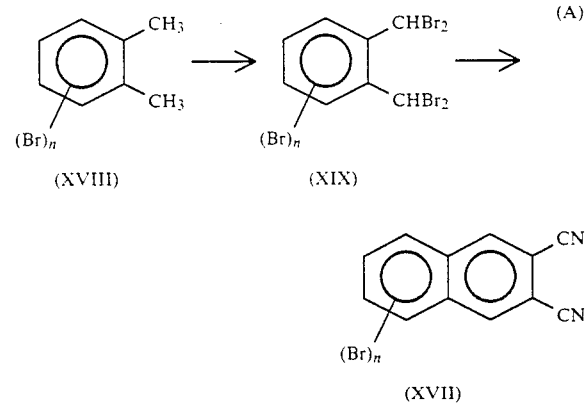

In detail, a bromo-o-xylene (XVIII) and N-bromosuccinimide of the formula (XIV):

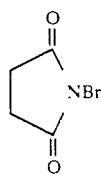

are irradiated with light with heating to obtain bis(dibromomethyl)bromobenzene (XIX), which is then reacted with fumaronitrile of the formula:

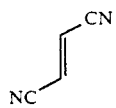

with heating, whereby the bromo-2,3-dicyanonaphthalene of the formula (XVII) is obtained.

In general, the reaction of the bromo-o-xylene of the formula (XVIII) with N-bromosuccinimide of the formula (XIV) can be carried out by refluxing 0.2 mol of the bromo-o-xylene and 0.8 mol of N-bromosuccinimide for 4 to 12 hours under irradiation by a high pressure mercury arc lamp in a solvent which is inert toward the irradiation. The reaction requires addition of a peroxide capable of generating a radical, as a reaction initiator. The peroxide includes benzoyl peroxide, octanoyl peroxide, cyclohexanone peroxide, isobutyryl peroxide, 2,4-dichlorobenzoyl peroxide, methyl ethyl ketone peroxide, etc. The peroxide is used usually in an amount of 500 mg to 2 g per 500 ml of the solvent. The solvent inert to the irradiation is properly selected from halogenated solvents such as chloroform, carbon tetrachloride and the like, or aromatic solvents such as benzene, chlorobenzene and the like.

The next reaction of the compound of the formula (XIX) with fumaronitrile of the formula (XVI) can be carried out by heating fumaronitrile of the formula (XVI) together with the compound of the formula (XIX) in an amount of 1 to 2 mols per mol of the latter. The reaction temperature is preferably 70° to 100° C., and the reaction time is preferably 5 to 10 hours. As the solvent, polar organic solvents such as N,N-dimethylformamide, N,N-dimethylacetamide, dimethyl sulfoxide, N,N-diethylformamide, N,N-diethylacetamide, and the like ar preferred.

This invention further provides a process for producing a naphthalocyanine derivative of the formula

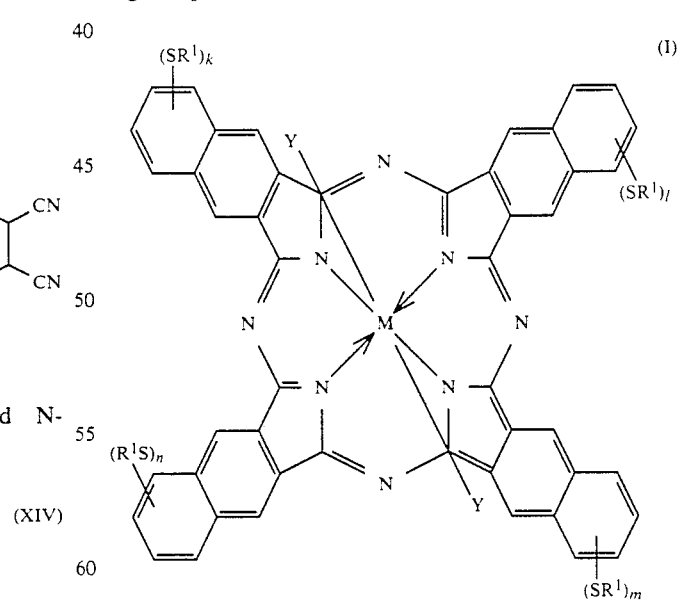

wherein k, l, m and n, which may be the same or different, are zero an integers of 1 to 4, k+l+m+n being an integer of 1 or more; R$^1$ is an alkyl group, a substituted alkyl group, or an aryl group; M is Si, Ge or Sn; and two Y's, which may be the same or different, are aryloxyl groups, alkoxyl groups, trialkylsiloxyl groups, triarylsiloxyl groups, trialkoxysiloxyl groups, triaryloxysiloxyl groups, trityloxyl groups or acyloxyl groups, which comprises reacting a naphthalocyanine derivative of the formula:

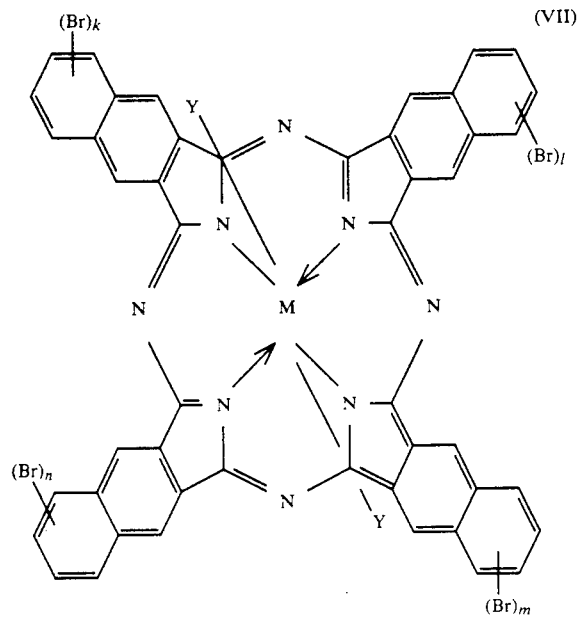

(VII)

wherein k, l, m, n, M and Y are as defined above, with a copper (I) thiolate of the formula:

$$CuSR^1 \quad (VIII)$$

wherein $R^1$ is as defined above.

The naphthalocyanine derivative of the formula (I) can be obtained by subjecting a compound of the formula (VII) to substitution reaction with an excess of a copper (I) thiolate of the formula (VIII) with heating. In this case, the reaction temperature is preferably 80° to 250° C., and the reaction time is preferably 1 to 30 hours. As solvents for this reaction, there can be used benzene, toluene, xylene, trimethylbenzene, chlorobenzene, dichlorobenzene, trichlorobenzene, 1-chloronaphthalene, tetralin, pyridine, β-picoline, quinoline, etc., alone or a mixed solvent thereof.

For producing a naphthalocyanine derivative the formula (I) in which $R^1$'s are different substituents, it is necessary to react the naphthalocyanine derivative of the formula (VII) with several copper (I) thiolates of the formula (VIII) which have substituents corresponding to the different substituents.

The naphthalocyanine derivative of the formula (I) can be isolated and purified from the reaction mixture, for example, by separating the reaction mixture by a column chromatography or a thin layer chromatography, followed by purification by recrystallization.

The naphthalocyanine derivative of the formula (VII) can be obtained by reacting with heating, a naphthalocyanine derivative of the formula (XX):

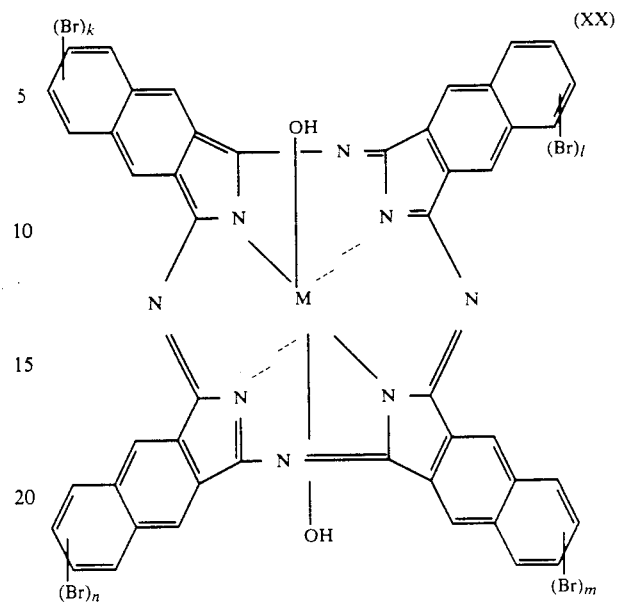

(XX)

wherein k, l, m and n, which may be the same or different, are zero or integers of 1 to 4, k+l+m+n being an integer of 1 or more; and M is Si, Ge or Sn, with an excess of a chlorosilane of the formula:

$$(R^2)_3SiCl \quad (III),$$

a silanol of the formula;

$$(R^3)_3SiOH \quad (IV)$$

(in the formulas (III) and (IV), each of $R^2$ and $R^3$ is an alkyl group, an aryl group, an alkoxyl group, or an aryloxyl group), an alcohol of the formula:

$$R^4OH \quad (V)$$

wherein $R^4$ is an alkyl group or an aryl group, or a compound of the formula:

$$R^5CO.X \quad (VI)$$

wherein $R^5$ is an alkyl group; and X is an halogen atom, a hydroxyl group, or an acyloxyl group. In this case, the reaction temperature is preferably 80° to 250° C., and the reaction time is preferably 30 minutes to 10 hours. This reaction is preferably carried out without a solvent or by use of a solvent such as benzene, toluene, xylene, trimethylbenzene, chlorobenzene, dichlorobenzene, trichlorobenzene, 1-chloronaphthalene, tetralin, pyridine, β-picoline, quinoline, or the like, if necessary, in the presence of an aliphatic amine such as triethylamine, tripropylamine, tributylamine, tripentylamine, trihexylamine, or the like.

The naphthalocyanine derivative of the formula (VII) can be isolated and purified from the reaction mixture by separating the reaction mixture by chromatography, followed by purification by recrystallization.

The naphthalocyanine derivative of the formula (XX) can be obtained by treating a naphthaloyanine derivative of the formula:

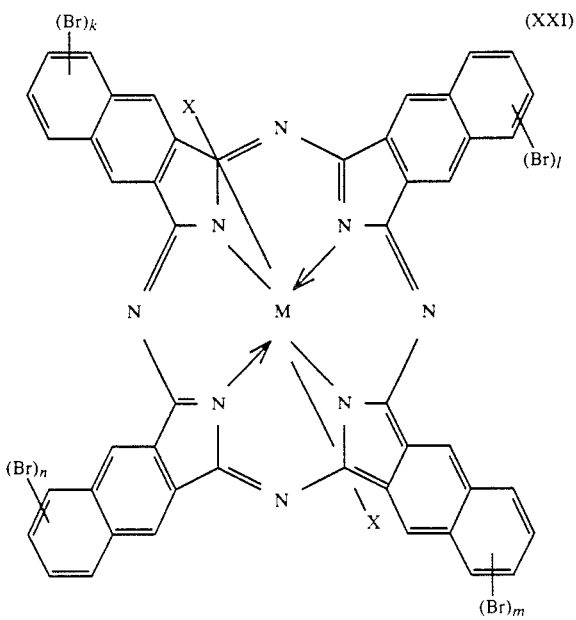

(XXI)

wherein k, l, m and n, which may be the same or different, are zero or integers of 1 to 4, k+l+m+n being an integer of 1 or more; M is Si, Ge or Sn; and two X's, which may be the same or different, are halogen atoms, with concentrated sulfuric acid at room temperature for 1 to 10 hours followed by refluxing in concentrated aqueous ammonia for 30 minutes to 10 hours, or refluxing the same in pyridine/water, pyridine/aqueous ammonia, methanol/aqueous ammonia, ethanol/aqueous ammonia, or propanol/aqueous ammonia for 30 minutes to 10 hours.

The naphthalocyanine derivative of the formula (XXI) can be obtained by heating a metal halide of the formula:

MXp  (XII)

wherein X is a halogen atom; p is a positive integer indicating the number of X's bonded to the metal M; and M is Si, Ge or Sn, together with a bromo-1,3-diiminobenz[f] isoindoline of the formula:

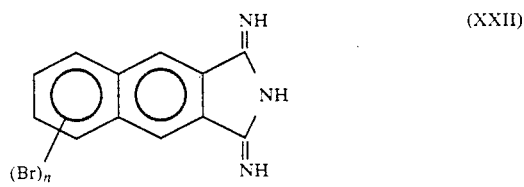

(XXII)

wherein n is an integer of 1 to 4, in an amount of 0.1 to 1 mol per mol of the latter. In this case, the reaction temperature is preferably 150° to 300° C., and the reaction time is preferably 30 minutes to 10 hours. This reaction may be carried out without solvent or by the use of a solvent such as urea, tetralin, quinoline, 1-chloronaphthalene, 1-bromonaphthalene, trimethylbenzene, dichlorobenzene, trichlorobenzene or the like. The reaction is carried out preferably in the presence of an amine. The amine includes triethylamine, tripropylamine, tributylamine, tripentylamine, trihexylamine, etc. The above-mentioned metal halide includes SiCl₄, SiBr₄, SiI₄, GeCl₄, GeBr₄, SnCl₂, SnI₂, etc.

The bromo-1 3-diiminobenz[f] isoindoline of the formula (XXII) can be obtained by refluxing a bromo-2,3-dicyanonaphthalene of the formula:

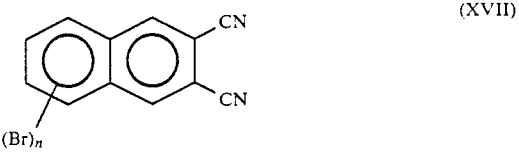

(XVII)

wherein n is an integer of 1 to 4, in methanol in the presence of sodium methoxide as a catalyst for 1 to 10 hours while bubbling ammonia gas therethrough.

In the above-mentioned second and third aspects of the invention, a process for producing a naphthalocyanine in which M is Si or Ge in the formulas (II), (I), (IX), (XII), (VII), (XIX) and (XXI) is preferred.

In the second and third aspects of the invention, a process for producing a naphthalocyanine derivative in which k, l, m and n are all 1 in the formula (II), (I), (IX), (X), (XI), (XIII), (XV), (XVII), (XVIII), (XIX), (VII), (XX), (XXI) or (XXII) is preferred.

In the second and third aspects of the invention, a process for producing a naphthalocyanine derivative in which each of $R^2$ and $R^3$ is an alkyl group in the formulas (III) and (IV) and two Y's are trialkylsiloxyl groups in the formulas (I) and (VII), is preferred.

In the second and third aspects of the invention, a process for producing a naphthalocyanine derivative in which all $R^1$'s are alkyl groups having 1 to 22 carbon atoms in the formulas (II), (I), (IX), (X), (XI), (XIII), (XV) and (VIII), is preferred.

In the second and third aspects of the invention, a process for producing a naphthalocyanine derivative in which all $R^1$'s are substituted alkyl groups in the formulas (II), (I), (IX), (X), (XI), (XIII), (XV) and (VIII), is preferred.

This invention further provides an optical recording medium which comprises a substrate and a recording layer formed on the surface of the substrate, said recording layer being composed mainly of a naphthalocyanine derivative of the formula:

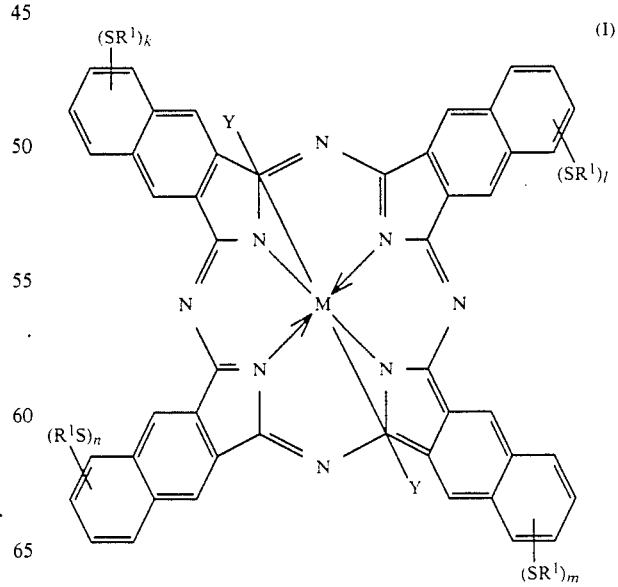

(I)

wherein k, l, m, n, $R^1$, M and Y are as defined above.

The optical recording medium of this invention comprises a substrate and a recording layer composed mainly of the naphthalocyanine derivative of the formula (I) of this invention formed thereon. If necessary, other layers such as primer layer, protective layer, etc. can be formed.

The substrate material used is one which is known to those skilled in the art and it may be either pervious or not pervious to laser beams used. However, when writing and reading are carried out by means of laser beams from the substrate side, the substrate material should be pervious to the laser beams. On the other hand, when writing and reading are carried out from the side reverse to the substrate, i.e., the recording layer side, the substrate material need not to be pervious to the laser beams used. The substrate material includes inorganic materials such as glass, quartz, mica, ceramics, metals in the form of plate or foil; and plates of organic macromolecular materials such as paper, polycarbonates, polyesters, cellulose acetate, nitrocellulose, polyethylenes, polypropylenes, polyvinyl chlorides, vinylidene chloride copolymers, polyamides, polystyrenes, polymethyl methacrylates, methyl methacrylate copolymers, and the like. The substrate material is not limited thereto. For reduction of heat loss at the time of recording and enhancement of the sensitivity, the substrate material is preferably a support made of an organic polymer having a low heat conductivity, and if necessary, guide grooves may be formed in the form of depressions and protuberances on the substrate.

If necessary, a primer layer may be formed on the substrate.

An optical recording medium having a recording layer composed mainly of a naphthalocyanine derivative of the formula (I) in which M is Si or Ge, is preferred.

An optical recording medium having a recording layer composed mainly of a naphthalocyanine derivative of the formula (I) in which k, l, m and n are all 1, is preferred.

An optical recording medium having a recording layer composed mainly of a naphthalocyanine derivative of the formula (I) in which two Y's are trialkylsiloxyl groups, is preferred.

An optical recording medium having a recording layer composed mainly of a naphthalocyanine derivative of the formula (I) in which all $R^1$'s are alkyl groups having 1 to 22 carbon atoms, is preferred.

An optical recording medium having a recording layer composed mainly of a naphthalocyamine derivative of the formula (I) in which all $R^1$'s are substituted alkyl groups.

This invention further provides a process for producing an optical recording medium which comprises forming a recording film or layer on the surface of a substrate by using a solution prepared by dissolving a naphthalocyanine derivative of the formula:

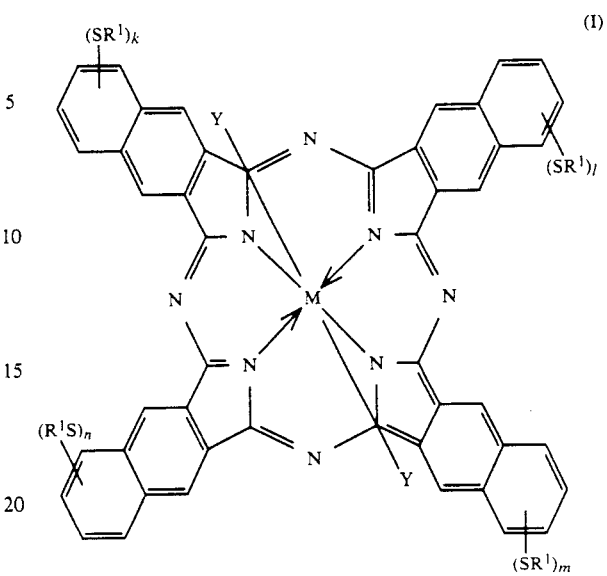

wherein k, l, m, n, Rl, M and Y are as defined above, as a main component in an organic solvent.

The organic solvent is selected from the group consisting of the above-mentioned aromatic solvents, halogenated solvents, ether solvents, ketone solvents, and saturated hydrocarbon solvents which can dissolve the naphthalocyanine derivative of the formula (I). These solvents may be used alone or as a mixed solvent thereof. It is preferable to use a solvent which does not attack the substrate used.

As a method for forming a recording film by use of the solution of a naphthalocyanine derivative of the formula (I) in the organic solvent, there are a coating method, a printing method and an immersing method. Specifically, a dye is dissolved in the above-mentioned solvent, and a recording film is formed by spraying, roller coating, spin coating, or dipping. In forming a recording medium, binders such as polymer binders and the like, stabilizers, etc. can be added if necessary. The binders include polyimide resins, polyamide resins, polystyrene resins, acrylic resins, etc. but are not limited thereto.

The recording layer materials are used alone or in combination of two or more thereof. In the case of a combination of two or more of them, either a laminated structure or a mixture of monolayer structures may be employed. The thickness of the recording layer is preferably in the range of 50 to 10000 Å, particularly preferably 100 to 5000 Å.

When information recorded is optically read out reflected light is often utilized. In this case, the following methods are effective in increasing the contrast. When writing and reading are carried out from the substrate side, a metal layer having a high reflectivity can be formed on the surface of the recording layer which is reverse to the substrate. When writing and reading are carried out from the side reverse to the substrate, i.e., the recording layer side, a metal layer having a high reflectivity can be formed between the substrate and the recording layer. As the metal having a high reflectivity, Al, Cr, Au, Pt, Sn, etc. are used. Films of these metals can be formed by a conventional thin film forming technique such as vacuum deposition, sputtering, plasma deposition or the like, and their thickness is selected in the range of 100 to 10000 Å.

However, said naphthalocyanine per se has a high reflectivity and hence does no require formation of a metal reflective layer.

When the surface smoothness of the substrate itself is a problem, it is recommendable to form a uniform film of an organic polymer on the substrate. As the polymer, commercially available polymers such as polyesters, polyvinyl chlorides and the like can be used.

Further, a protective layer can be formed as an outermost layer to increase the stability and the protectiveness. It is also possible to form a layer for increasing the sensitivity by reduction of the surface reflectivity. Materials used in such a protective layer include polyvinylidene chlorides, polyvinyl chlorides, copolymers of vinylidene chloride and acrylonitrile, polyvinyl acetates, polyimides, polymethyl methacrylates, polystyrenes, polyisoprenes, polybutadienes, polyurethanes, polyvinyl butyrals, fluororubbers, polyesters, epoxy resins, silicone resins, cellulose acetates, etc. These materials can be used alone or as a blend thereof. The presence of silicone oil, antistatic agents, crosslinking agents, etc. in the protective layer is preferable for improving the film characteristics. The protective layer can be composed of two layers placed one upon another. The above-mentioned materials for the protective layer can be coated in the form of a solution in a suitable solvent, or laminated in the form of a thin film. The thickness of the protective layer is adjusted to 0.1 to 10 μm, preferably 0.1 to 2 μm.

A process for producing an optical recording medium using a naphthalocyanine derivative of the formula (I) in which M is Si or Ge, is preferred.

A process for producing an optical recording medium using a naphthalocyanine derivative of the formula (I) in which k, l, m and n are all 1, is preferred.

A process for producing an optical recording medium using a naphthalocyanine derivative of the formula (I) in which two Y's are trialkylsiloxyl groups, is preferred.

A process for producing an optical recording medium using a naphthalocyanine derivative of the formula (I) in which all $R^1$'s are alkyl groups having 1 to 22 carbon atoms, is preferred.

A process for producing an optical recording medium using a naphthalocyanine derivative of the formula (I) in which all $R^1$'s are substituted alkyl groups, is preferred.

This invention is explained below with reference to Examples, which are not by way of limitation but by way of illustration.

SYNTHETIC EXAMPLE 1

Synthesis of 3,4-bis(dibromomethyl)bromobenzene

To a solution of 37 g (0.2 mol) of 4-bromo-o-xylene (75%) (mfd. by Aldrich Chemical Co.) and 142.4 g (0.8 mol) of N-bromosuccinimide in 500 ml of carbon tetrachloride was added 1 g of benzoyl peroxide, and the resulting mixture was irradiated by a 100-W high pressure mercury arc lamp for 8 to 12 hours under reflux in an inner irradiating tube (mfd. by Ushio Inc.). After the mixture was allowed to cool, the white crystals precipitated were removed by filtration and the carbon tetrachloride solution, i.e., the mother liquor was concentrated under reduced pressure. The solid thus obtained was recrystallized from hexane/methylene chloride to obtain 64 g of 3,4-bis-(dibromomethyl) bromobenzene as colorless crystals. Physical properties of 3,4-bis(dibromomethyl)bromobenzene were as follows:

(1) Melting point: 108.5°-110.5° C.
(2) Elementary analysis values

|  | C | H | Br |
|---|---|---|---|
| Calculated (%) | 19.19 | 1.01 | 79.80 |
| Found (%) | 19.12 | 0.88 | 79.84 |

(3) NMR spectrum values: $CDCl_3$:
δ values:
7.81 (1H, br-s),
7.57 (1H, d, J=8.54 Hz),
7.50 (1H, dd, J=8.54, 1.83 Hz),
7.06 (1H, s),
7.02 (1H, s)
(4) IR spectrum (Kbr) is shown in FIG. 1.

SYNTHETIC EXAMPLE 2

Synthesis of 6-bromo-2,3-dicyanonaphthalene

To a solution of 100.2 g (0.2 mol) of 3,4-bis(dibromomethyl)bromobenzene and 27 g (0.346 mol) of fumaronitrile in 800 ml of anhydrous N,N-dimethylformamide was added 200 g (0.67 mol) of sodium iodide with sufficient stirring, and the resulting mixture was stirred under nitrogen at about 75° C. for about 7 hours. After completion of the reaction, the reaction mixture was poured onto about 4 kg of ice. Sodium hydrogensulfite was slowly added until the reddish-brown aqueous solution thus obtained turned light-yellow. Sodium hydrogensulfite was added in a slight excess and stirred for a while. The resulting mixture was allowed to stan overnight at room temperature. The light-yellow solid precipitated was filtered and sufficiently washed with water and then methanol. The light-yelllow solid was recrystallized from acetone/methanol to obtain 33 g of colorless needles. The crystals were confirmed to be 6-bromo-2,3-dicyanonaphthalene from the following analysis results:

(1) Melting point: 254.5°-255.5° C.
(2) Elementary analysis values:

|  | C | H | N | Br |
|---|---|---|---|---|
| Calculated (%) | 56.06 | 1.96 | 10.90 | 31.08 |
| Found (%) | 55.99 | 1.67 | 10.87 | 30.74 |

Figure 2:
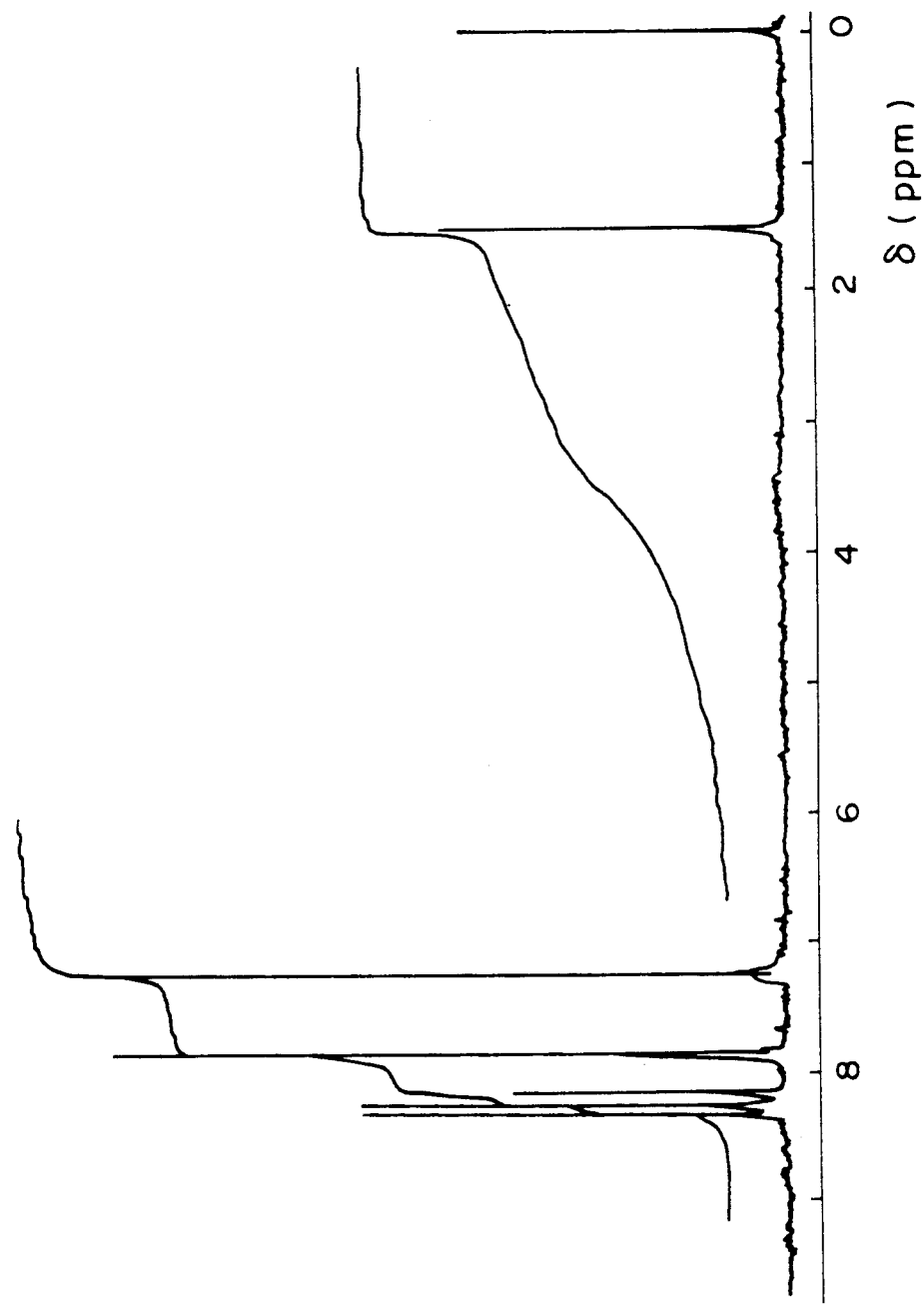
FIG. 2 is an NMR spectrum of 6-bromo-2,3-dicyanonaphthalene.
Figure 3:
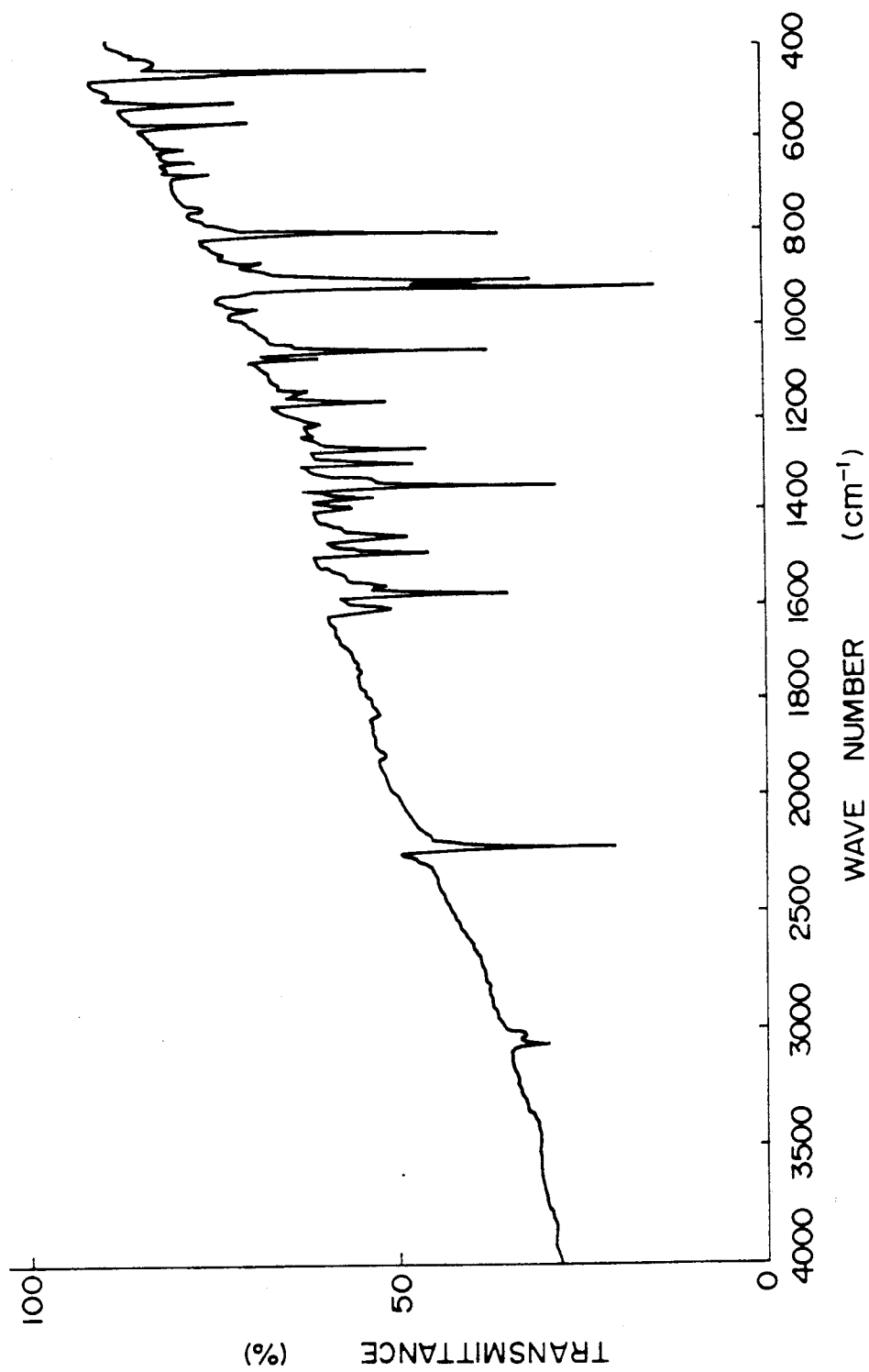
FIG. 3 is an IR spectrum of 6-bromo-2,3-dicyanonaphthalene.

(3) NMR spectrum values: $CDCl_3$ (the NMR spectrum is shown in FIG. 2).
δ values:
8.34 (1H, s),
8.27 (1H, s),
8.17 (1H, br-s),
7.88 (2H, m)
(4) IR spectrum (KBr) is shown in FIG. 3.

SYNTHETIC EXAMPLE 3

Synthesis of 6-bromo-1,3-diiminobenz[f] isoindoline

Figure 4:
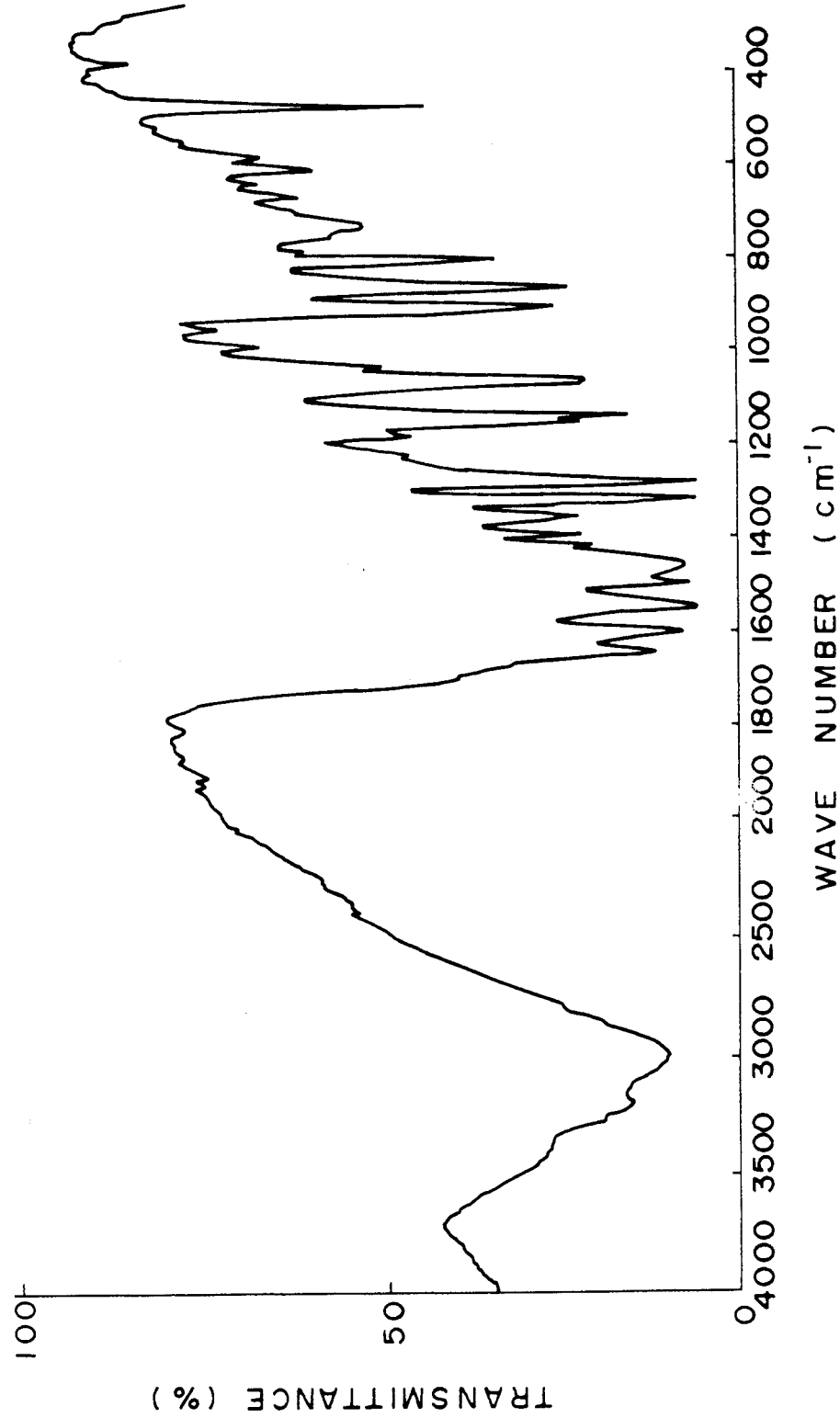
FIG. 4 is an IR spectrum (KBr) of 6-bromo-1,3-diiminobenz[f]isoindoline.

Under nitrogen, 44.1 g (0.172 mol) of 6-bromo-2,3-dicyanonaphthalene was added to a solution of sodium methoxide in methanol prepared by adding 1.92 g (84 m mols) of metallic sodium to 270 ml of absolute methanol, and anhydrous ammonia gas was slowly bubbled into the resulting mixture for about 1 hour. The mixture was refluxed for about 3 hours, while bubbling therethrough anhydrous ammonia gas. After cooling, the yellow solid precipitated was filtered and the residue was sufficiently washed with methanol and dried under reduced pressure to obtain 45 g of 6-bromo-1,3-diiminobenz[f] isoindoline as a yellow solid. IR spectrum of this 6-bromo-1,3-diiminobenz[f] isoindoline is shown in FIG. 4. The 6-bromo-1,3-diiminobenz[f] isoindoline was used in the subsequent reaction without further purification.

SYNTHETIC EXAMPLE 4

Synthesis of dichlorosilicon-tetrabromonaphthalocyanine (the formula (XXI): M is Si; X is a chlorine atom; and k, l, m and n are all 1)

Figure 5:
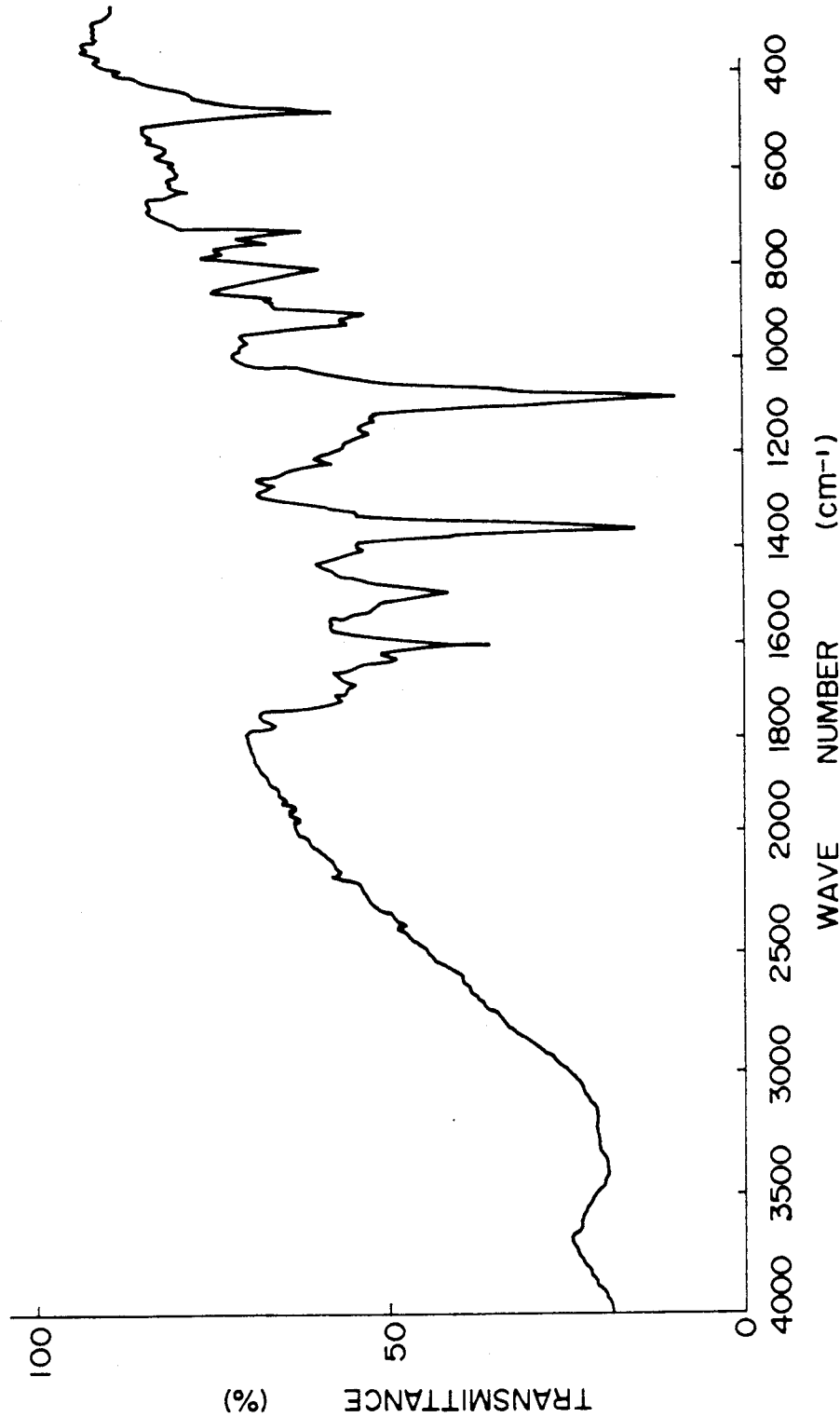
FIG. 5 is an IR spectrum of dichlorosilicontetrabromonaphthalocyanine.
Figure 6:
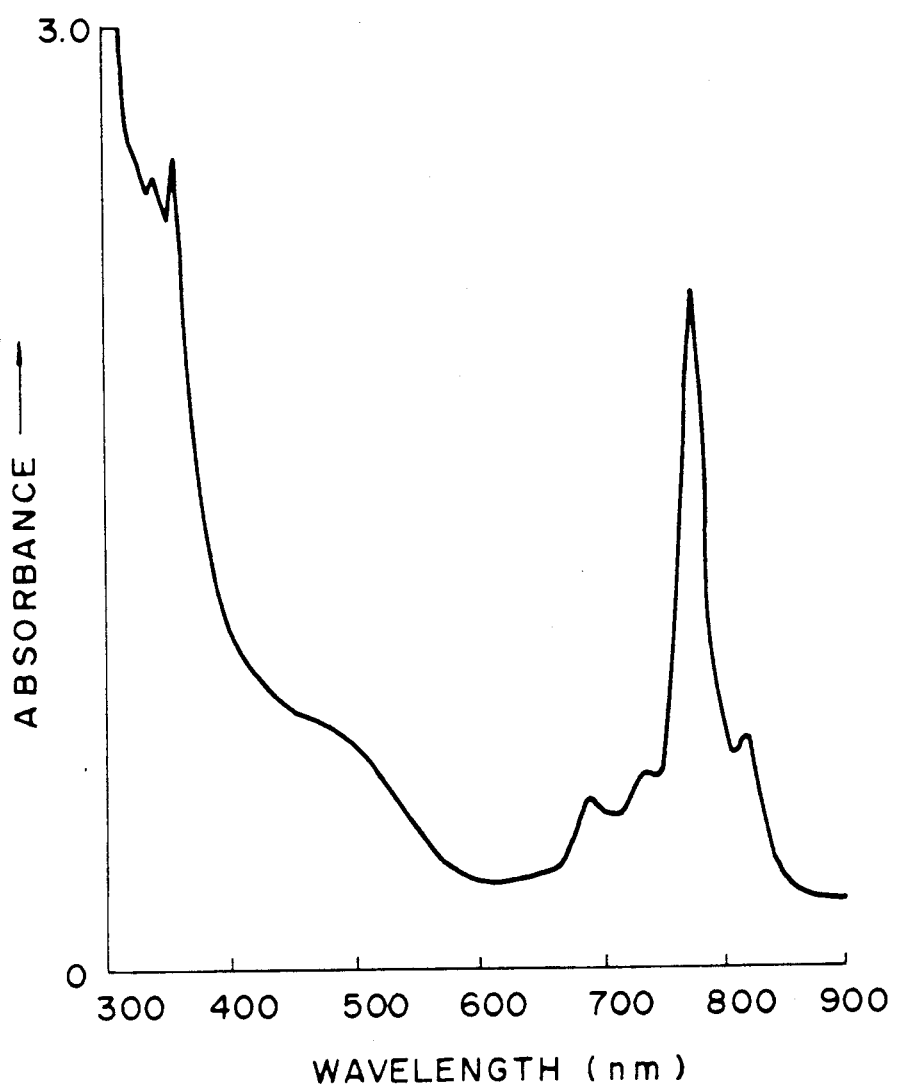
FIG. 6 is an electronic spectrum (tetrahydrofuran solution) of dichlorosilicontetrabromonaphthalocyanine.

Under nitrogen, 54 ml of anhydrous tri-n-butylamine was added to a suspension of 22.5 g (81.8 mmols) of 6-bromo-1,3-diiminobenz[f] isoindoline in 110 ml of anhydrous tetralin, followed by adding thereto 14.4 ml (0.126 mol) of silicon tetrachloride, and the resulting mixture was refluxed for about 3 hours. After cooling, 700 ml of methanol was added and the resulting mixture was allowed to stand overnight. The reddish-brown reaction mixture was filtered, and the residue was sufficiently washed with methanol and then dried under reduced pressure to obtain about 20 g of dichlorosilicon-tetrabromonaphthalocyanine (the formula (XXI): M is Si, X is a chlorine atom, and k, l, m and n are all 1) as a dark-green solid. This dichlorosilicontetrabromonaphthalocyanine was used in the subsequent reaction without further purification. IR spectrum of dichlorosilicon-tetrabromonaphthalocyanine is show in FIG. 5. Its electronic spectrum is shown in FIG. 6.

SYNTHETIC EXAMPLE 5

Synthesis of dihydroxysilicon-tetrabromonaphthalocyanine (the formula (XX): M is Si; and k, l, m and n are all 1)

Figure 7:
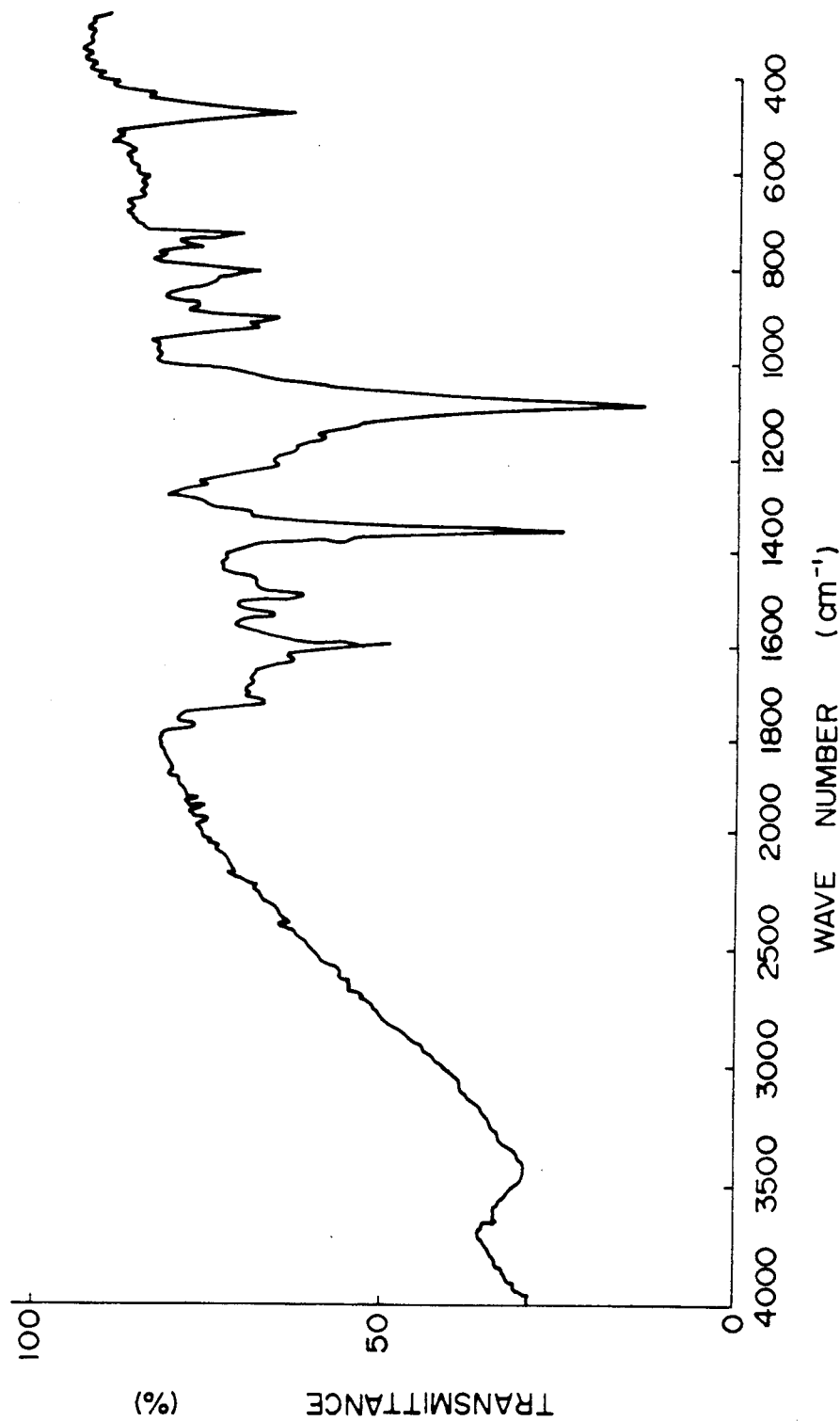
FIG. 7 is an IR spectrum (KBr) of dihydroxysilicontetrabromonaphthalocyanine.
Figure 8:
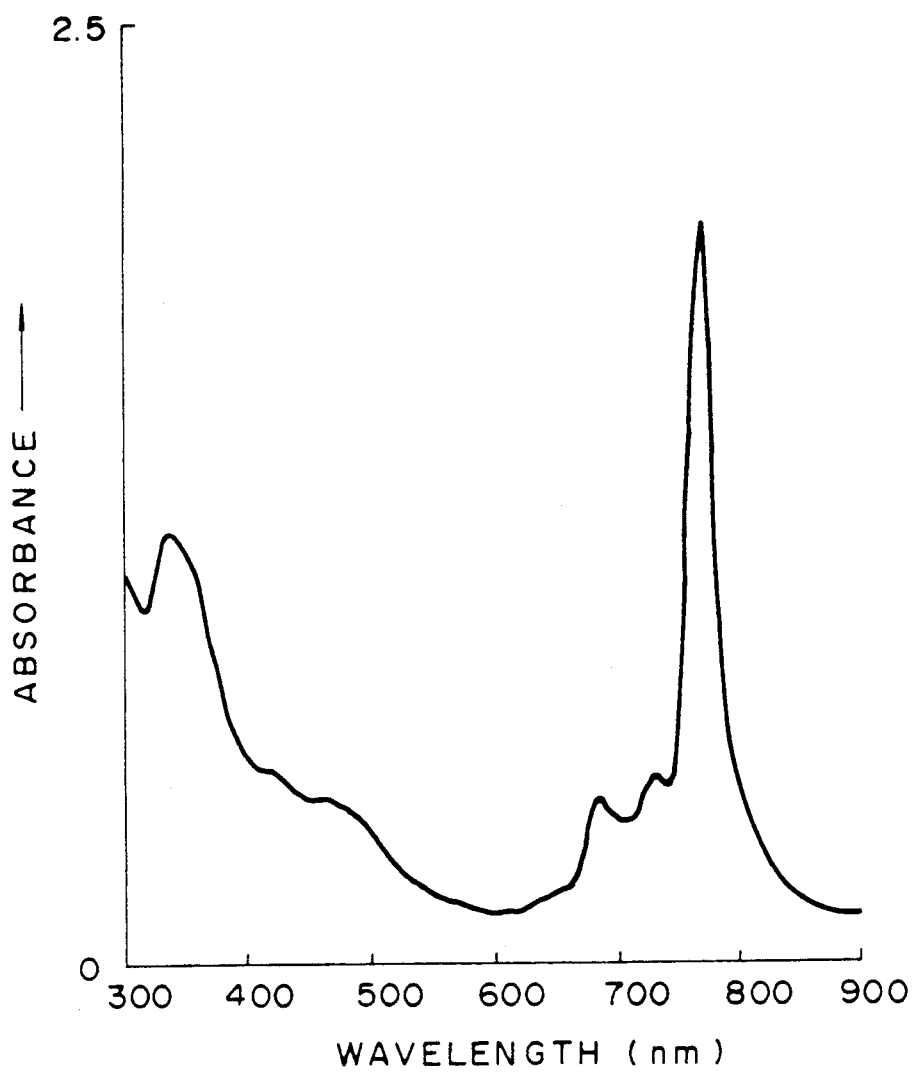
FIG. 8 is an electronic spectrum (tetrahydrofuran solution) of dihydroxysilicon-tetrabromonaphthalocyanine.

To 250 ml of concentrated sulfuric acid was added 9.7 g (8.6 m mols) of dichlorosilicon-tetrabromonaphthalocyanine, followed by stirring for about 2 hours. The reaction mixture was poured onto about 800 g of ice and the resulting mixture was allowed to stand overnight. The precipitate formed was filtered, and after sufficient washing with water and then methanol, the precipitate was refluxed in 180 ml of concentrated aqueous ammonia for about 1 hour. After cooling followed by filtration, the residue was sufficiently washed successively with water, methanol and acetone, and dried under reduced pressure to obtain 8.7 g of dihydroxysilicon-tetrabromonaphthalocyanine (the formula (XX): M is Si and k, l, m and n are all 1) as a dark-green solid. This dihydroxysilicon-tetrabromonaphthalocyanine was used in the subsequent reaction withoug further purification. IR spectrum of dihydroxysilicon-tetrabromonaphthalocyanine is shown in FIG. 7. Its electronic spectrum is shown in FIG. 8.

SYNTHETIC EXAMPLE 6

Synthesis of bis(tri-n-propylsiloxy)silicontetrabromonaphthalocyanine (the formula (VII): M is Si, k, l, m and n are all 1, and Y is a tri-n-propylsiloxyl group)

Under nitrogen, 8 ml (33.6 m mols) of anhydrous tri-n-butylamine was added to a suspension of 2.82 g (2.6 m mols) of dihydroxysilicon-tetrabromonaphthalocyanine in 280 ml of anhydrous 8-picoline, followed by adding thereto 7.2 ml (32.8 m mols) of tri-n-propylchlorosilane, and the resulting mixture was refluxed for about 2 hours. After cooling, the mixture was poured into 600 ml of ethanol/water (1/1), and the resulting mixture was sufficiently stirred and then allowed to stand overnight. The precipitate formed was filtered and then washed with water and then with methanol. With hot chloroform, only a soluble material in the precipitate was extracted, purified by a silica gel column chromatography, and then recrystallized from chloroform to obtain 0.82 g of dark-green crystals. The dark-green crystals were confirmed to be bis(tri-n-propylsiloxy)silicon-tetrabromonaphthalocyanine (the formula (VII): M is Si; k, l, m and n are all 1; and Y is a tri-n-propylsiloxyl group) from the following analysis results:

(1) Melting point: above 300° C.
(2) Elementary analysis values:

|  | C | H | N | Br |
|---|---|---|---|---|
| Calculated (%) | 56.50 | 4.45 | 7.99 | 22.78 |
| Found (%) | 56.28 | 4.39 | 8.04 | 22.45 |

Figure 9:
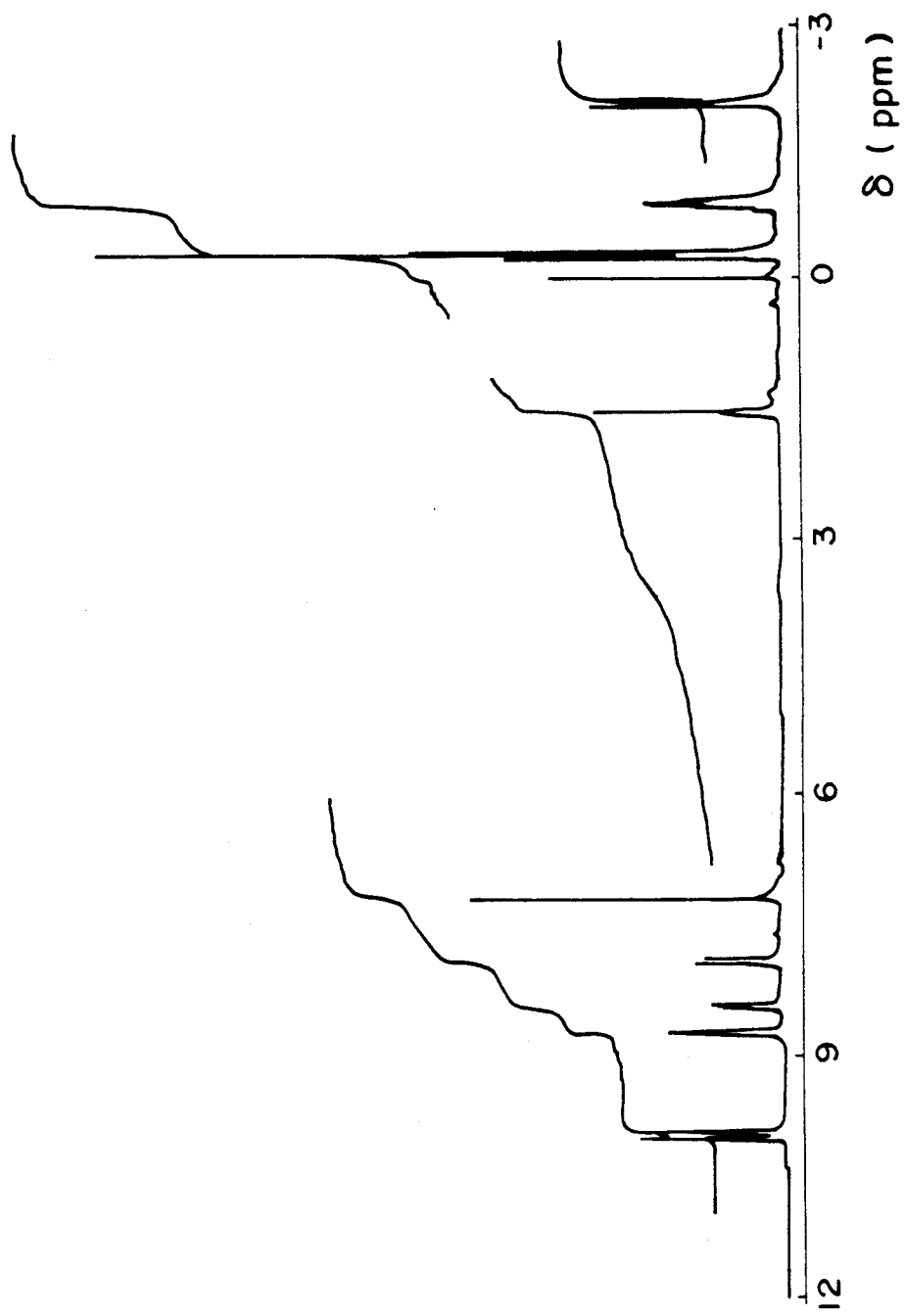
FIG. 9 is an NMR spectrum of bis(tri-n-propylsiloxy)silicon-tetrabromonaphthalocyanine.

(3) NMR spectrum values (the NMR spectrum is shown in FIG. 9): CDCl$_3$:

δ values:
10.08 (4H, br-s),
10.01 (4H, br-s),
8.83 (4H, br-s),
8.54 (4H, dd, J=8.85, 3.05 Hz),
8.00 (4H, d, J=8.85 Hz),
−0.29 (18H, t, J=7.17 Hz),
−0.90 (12H, sextet-like m),
−2.08 (12H, t-like m)

Figure 10:
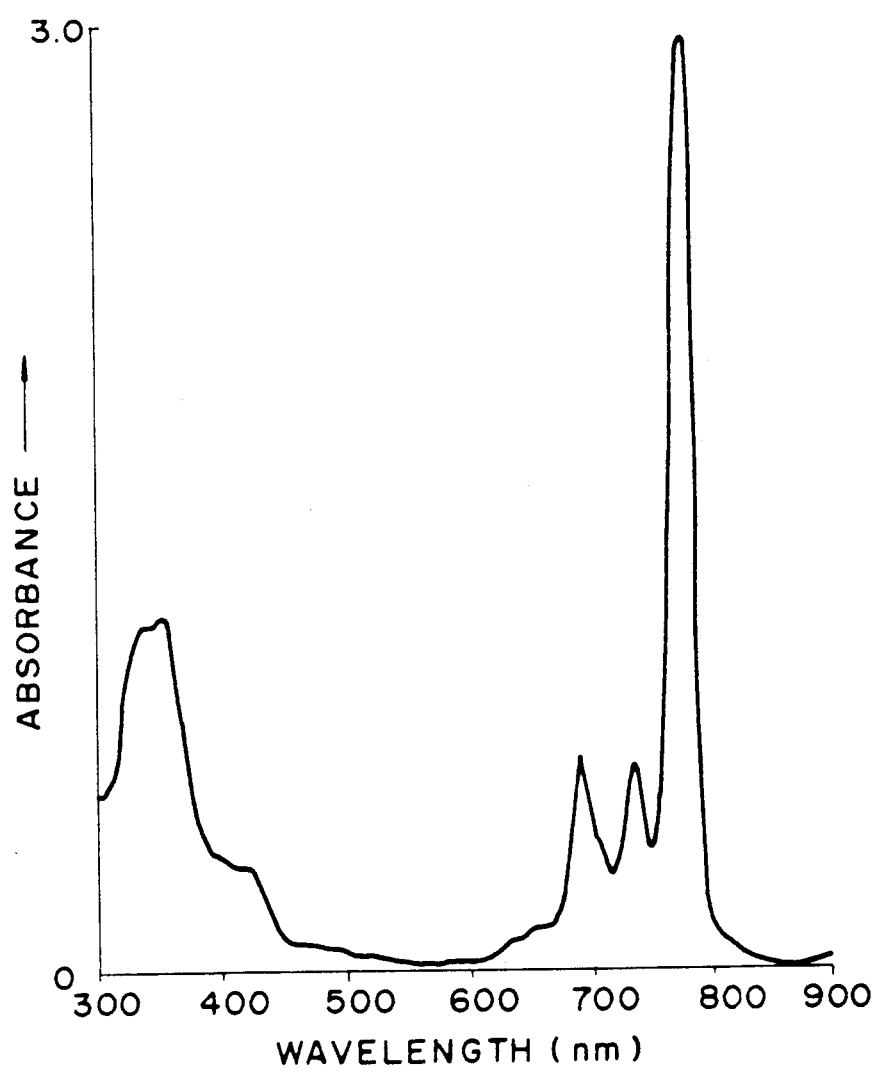
FIG. 10 is an electronic spectrum of bis(tri-n-propylsiloxy)silicon-tetrabromonaphthalocyanine.

(4) Electronic spectrum (CHCl$_3$ solution) is shown in FIG. 10.

Figure 11:
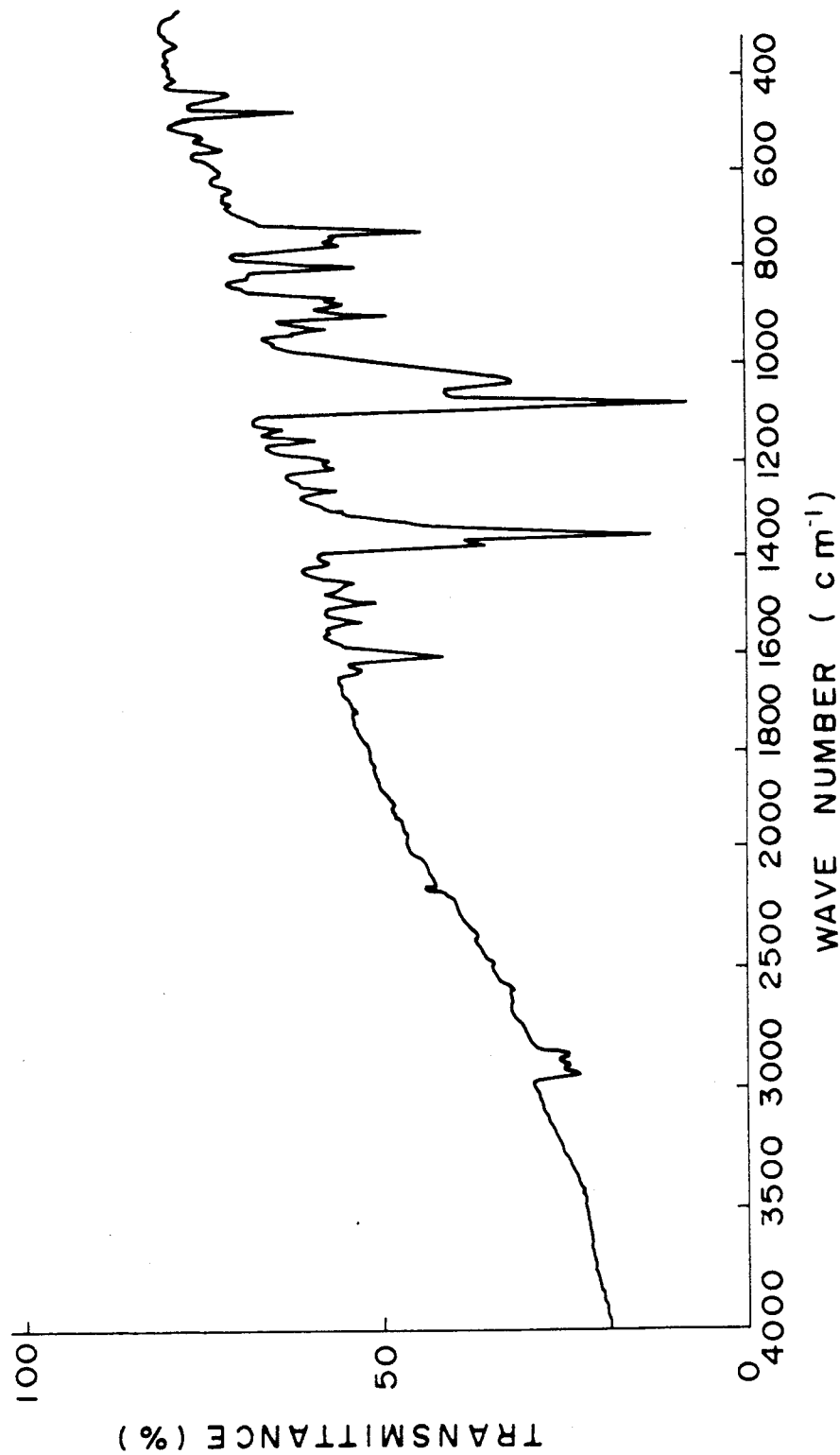
FIG. 11 is an IR spectrum of bis(tri-n-propylsiloxy)silicon-tetrabromonaphthalocyanine.

(5) IR spectrum (KBr) is shown in FIG. 11.

SYNTHETIC EXAMPLE 7

Synthesis of bis(tri-n-butylsiloxy)silicon-tetrabromonaphthalocyanine (the formula (VII): M is Si; k, l, m and n are all 1; and Y is a tri-n-butylsiloxy group)

To a suspension of 2.82 g (2.6 m mols) of dihydroxysilicon-tetrabromonaphthalocyanine in 280 ml of anhydrous β-picoline was added 8 ml (33.6 m mols) of anhydrous tri-n-butylamine, followed by adding thereto 8.8 ml (32.8 m mols) of tri-n-butylchlorosilane, and the resulting mixture was refluxed for about 2 hours. After cooling, the reaction mixture was treated in the same manner as in Synthetic Example 6, and recrystallization from chloroform gave 0.75 g of dark-green crystals. The dark-green crystals were confirmed to be bis(tri-n-butylsiloxy)silicon-tetrabromonaphthaloxyamine (the formula (VII): M is Si; k, l, m and n are all 1; and Y is a tri-n-butylsiloxyl group) from the following analysis results:

(1) Melting point: above 300° C.
(2) Elementary analysis values:

|  | C | H | N | Br |
|---|---|---|---|---|
| Calculated (%) | 58.14 | 5.02 | 7.53 | 21.49 |
| Found (%) | 58.36 | 5.11 | 7.51 | 21.03 |

Figure 12:
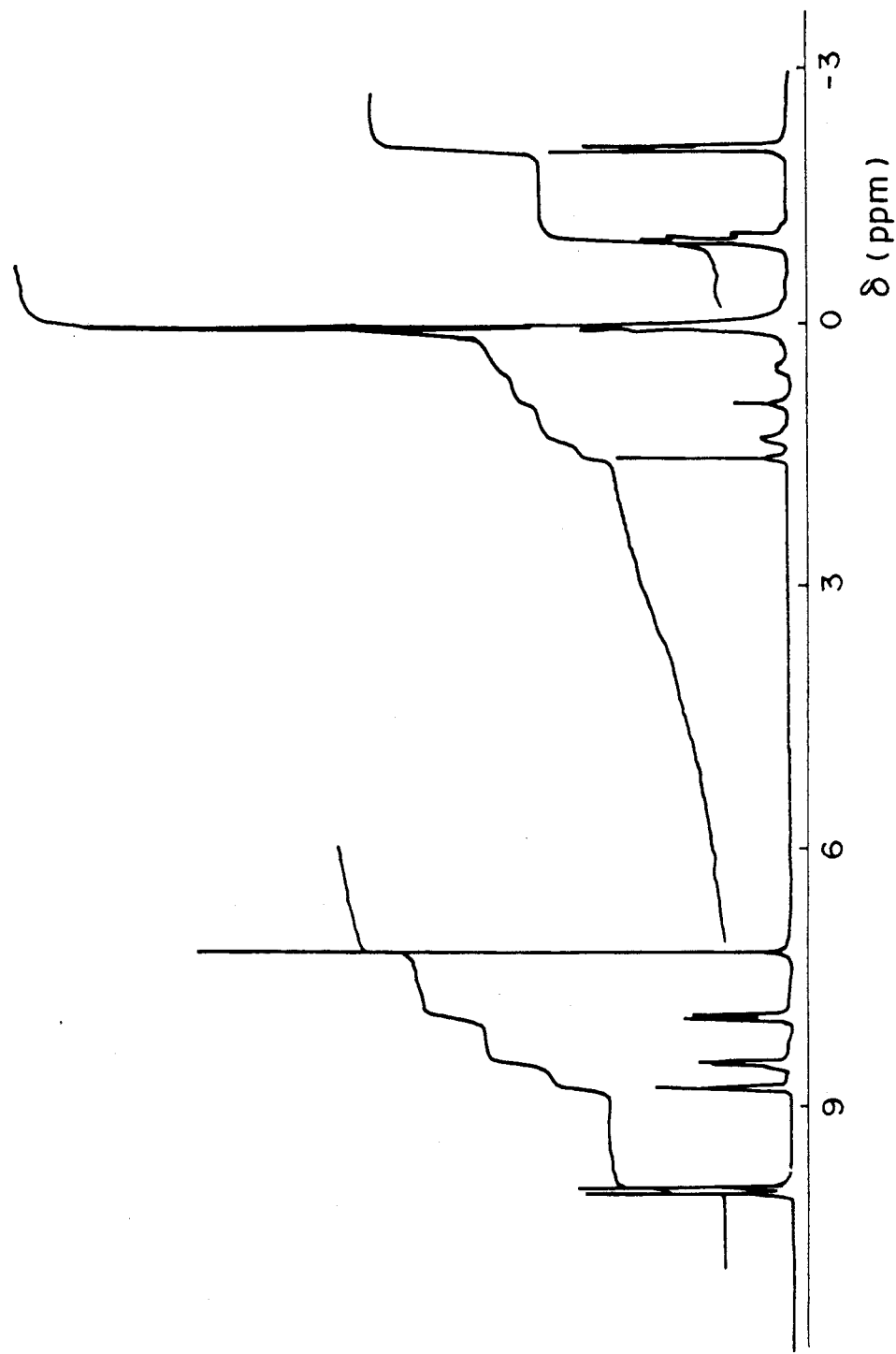
FIG. 12 is an NMR spectrum of bis(tri-n-butylsiloxy)-silicon-tetrabromonaphthalocyanine.

(3) NMR spectrum values (the NMR spectrum is shown in FIG. 12): CDCl$_3$:

δ values:
10.09 (4H, br-s),
10.02 (4H, br-s),
8.85 (4H, br-s),
8.55 (4H, dd, J=8.85, 3.05 Hz),
8.01 (4H, d, J=8.85 Hz),
0.02 (30H, m),
−0.99 (12H, sextet-like m),
−2.07 (12H, t-like m)

Figure 13:
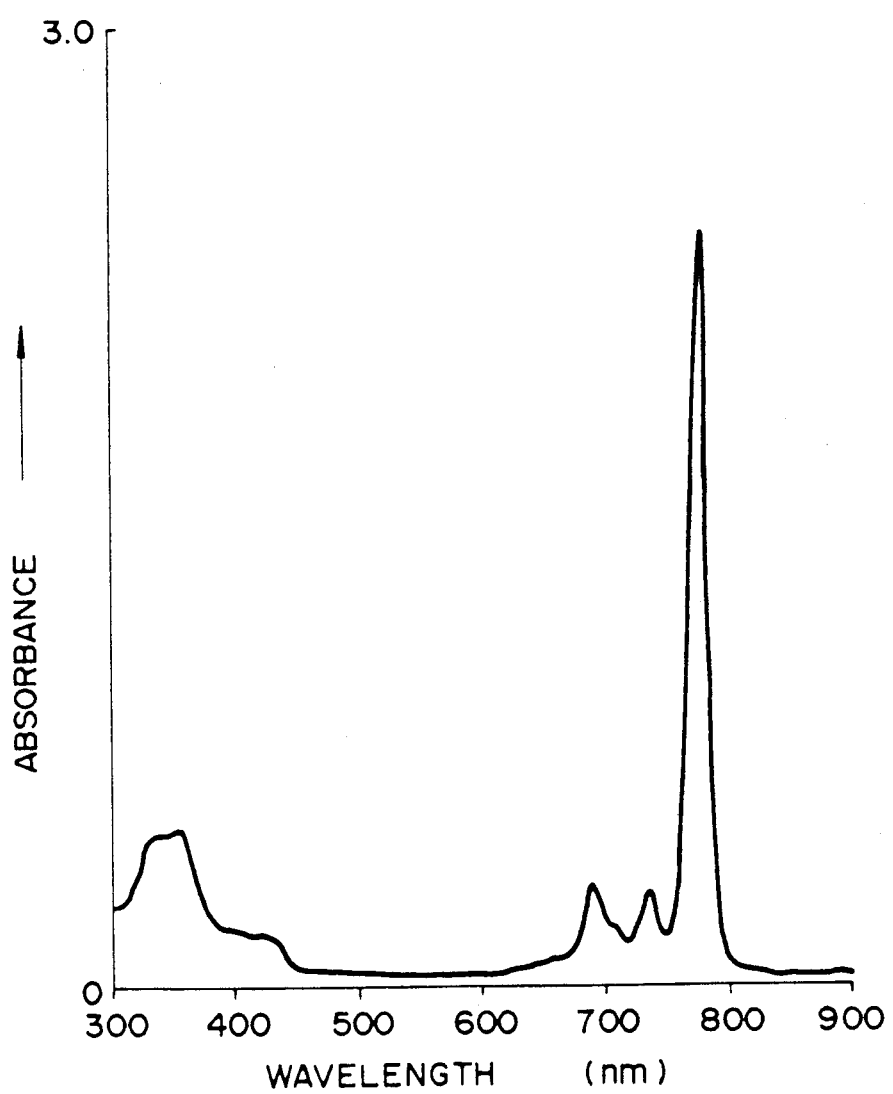
FIG. 13 is an electronic spectrum of bis(tri-n-butylsiloxy)silicon-tetrabromonaphthalocyanine.

(4) Electronic spectrum (CHCl$_3$ solution) is shown in FIG. 13.

Figure 14:
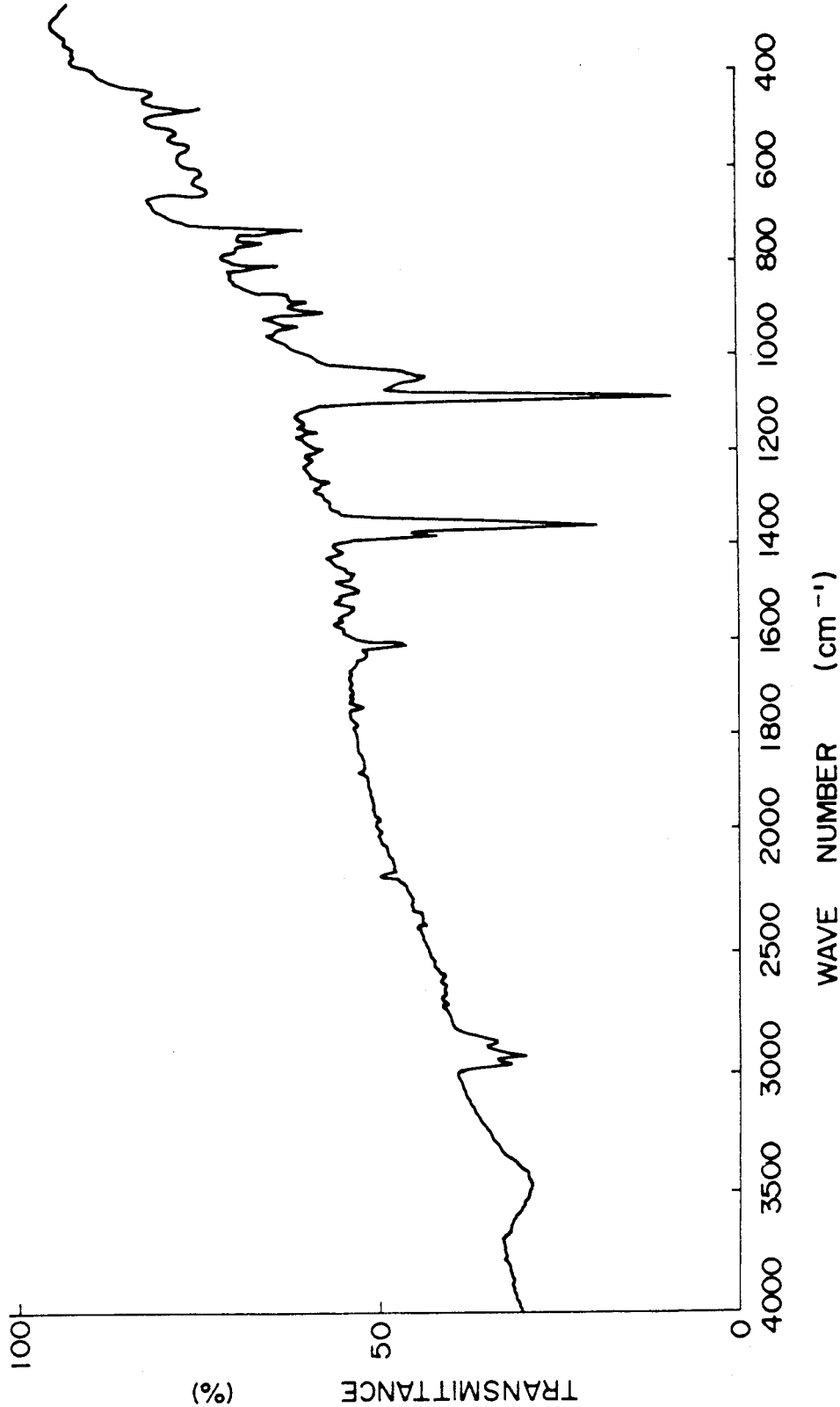
FIG. 14 is an IR spectrum of bis(tri-n-butylsiloxy)-silicontetrabromonaphthalocyanine.

(5) IR spectrum (KBr) is shown in FIG. 14.

SYNTHETIC EXAMPLE 8

Synthesis of bis(tri-n-hexylsiloxy)silicon-tetrabromonaphthalocyanine (the formula (VII): M is Si; k, l, m and n are all 1; and Y is a tri-n-hexylsiloxyl group)

To a suspension of 2.82 g (26 m mols) of dihydroxysilicon-tetrabromonaphthalocyanine in 280 ml of anhydrous β-picoline was added 8 ml (33.6 m mols) of anhydrous tri-n-butylamine, followed by adding thereto 12 ml (32.8 m mols) of tri-n-hexylchlorosilane, and the resulting mixture was refluxed for about 2 hours. After cooling, the reaction mixture was treated in the same manner as in Synthetic Example 6, and recrystallization from hexane/chloroform gave 0.78 g of dark-green crystals. The dark-green crystals were confirmed to be bis(tri-n-hexylsiloxy)silicon-tetrabromonaphthalocyanine (the formula (VII): M is Si; k, l, m and n are all 1; and Y is a tri-n-hexylsiloxyl group) from the following analysis results:

(1) Melting point: 298°–300° C.
(2) Elementary analysis values:

|  | C | H | N | Br |
|---|---|---|---|---|
| Calculated (%) | 60.94 | 5.97 | 6.77 | 19.30 |
| Found (%) | 60.77 | 5.71 | 6.65 | 19.02 |

(3) NMR spectrum values (the NMR spectrum is shown in FIG. 15): CDCl$_3$:

δ values:
10.06 (4H, br-s),
10.00 (4H, br-s), 8.83 (4H, br-s), 8.53 (4H, dd, J=8.85, 2.44 Hz), 7.99 (4H, dd, J=8.85 Hz), 0.63 (12H, sextet, J=7.32 Hz), 0.45 (18H, t, J=7.32 Hz), 0.22 (12H, quintet, J=7.32 Hz), 0.05 (12H, quintet, J=7.32 Hz), −1.02 (12H, quintet-like m), −2.10 (12H, t-like m)

Figure 16:
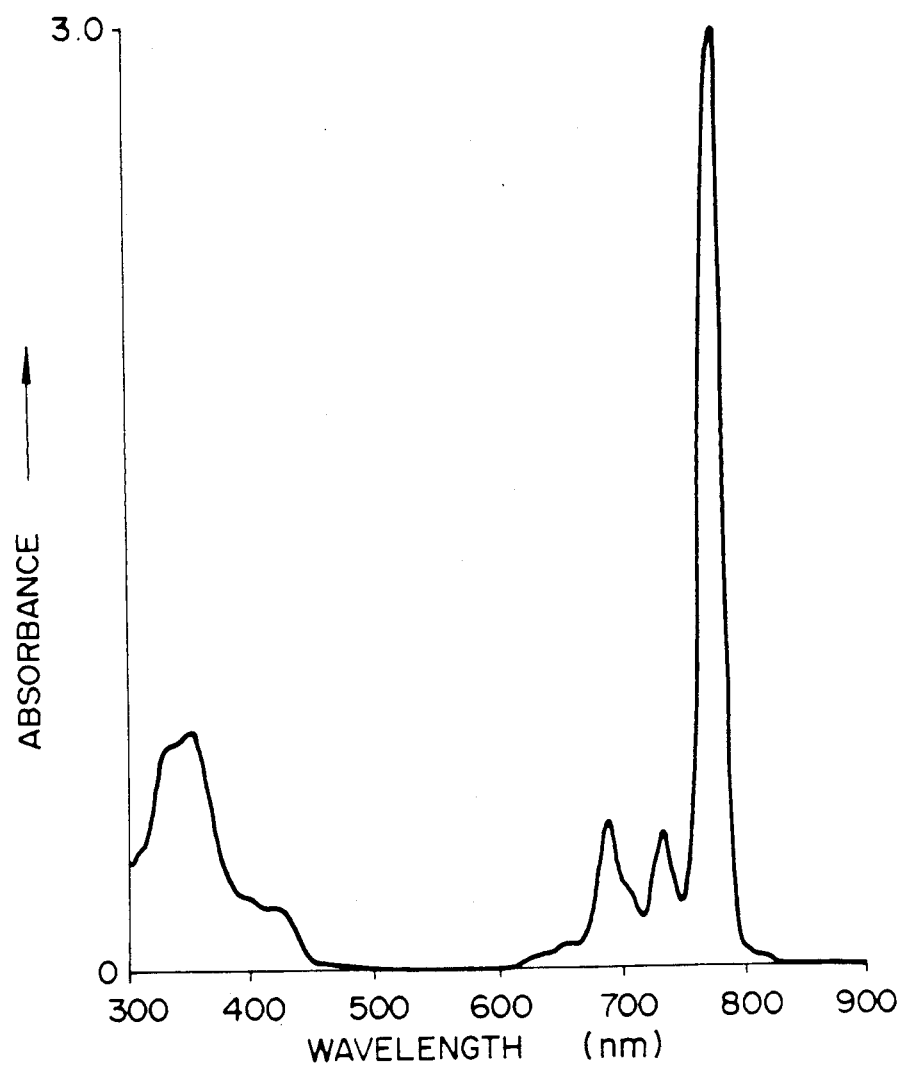
FIG. 16 is an electronic spectrum of bis(tri-n-hexylsiloxy)silicon-tetrabromonaphthalocyanine.

(4) Electronic spectrum (CHCl$_3$ solution) is shown in FIG. 16.

Figure 17:
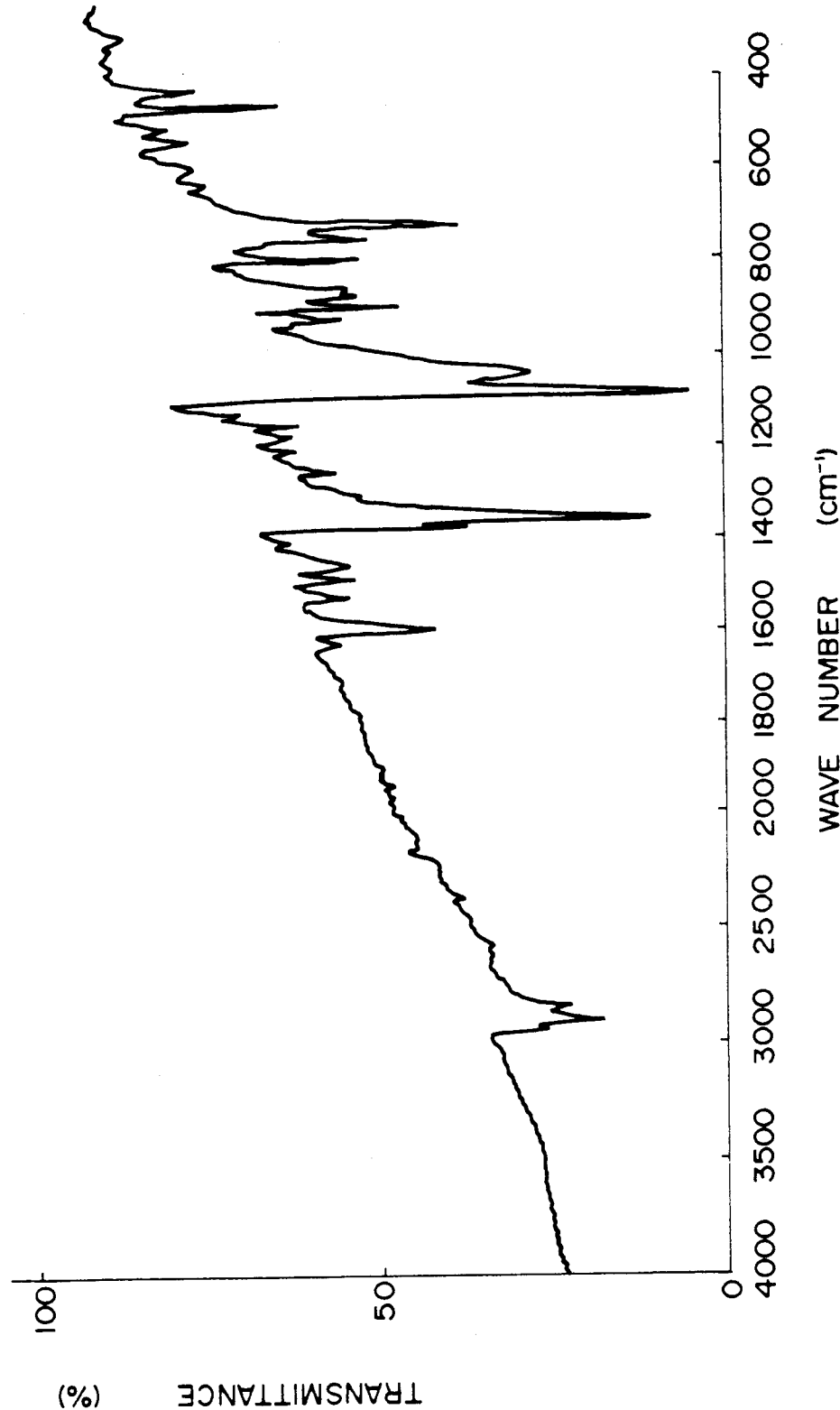
FIG. 17 is an IR spectrum of bis(tri-n-hexylsiloxy)silicon-tetrabromonaphthalocyanine.

(5) IR spectrum (KBr) is shown in FIG. 17.

SYNTHETIC EXAMPLE 9

Synthesis of bis(triethylsiloxy)silicon-tetrabromonaphthalocyanine (the formula (VII): M is Si; k, l, m and n are all 1; and Y is a triethylsiloxyl group)

To a suspension of 2.82 g (2.6 m mols) of dihydroxysilicon-tetrabromonaphthalocyanine in 100 ml of quinoline was added 10 ml (65 m mols) of triethylsilanol, and the resulting mixture was refluxed for about 3 hours. After cooling, the reaction mixture was poured into 500 ml of ethanol/water (1/1), and after sufficient stirring, the resulting mixture was allowed to stand overnight. The precipitate formed was filtered and the residue was sufficiently washed with methanol and then chloroform. The crystals thus obtained was washed with chloroform by the Soxhlet extraction method to obtain 2.1 g of dark-green crystals. The dark-green crystals were confirmed to be bis(triethylsiloxy)silicon-tetrabromonaphthalocyanine (the formula (VII): M is Si; k, l, m and n are all 1; and Y is a triethylsiloxyl group) from the following analysis results:

(1) Melting point: above 300° C.
(2) Elementary analysis values:

|  | C | H | N | Br |
|---|---|---|---|---|
| Calculated (%) | 54.64 | 3.82 | 8.50 | 24.23 |
| Found (%) | 54.18 | 3.62 | 8.81 | 23.94 |

(3) NMR spectrum values: CDCl$_3$:

δ values:
10.07 (4H, br-s),
10.00 (4H, br-s),
8.83 (4H, br-s),
8.54 (4H, dd, J=8.85, 3.05 Hz),
8.01 (4H, d, J=8.85 Hz),
−1.04 (18H, t, J=7.32 Hz),
−2.05 (12H, q, J=7.32 Hz)

Figure 18:
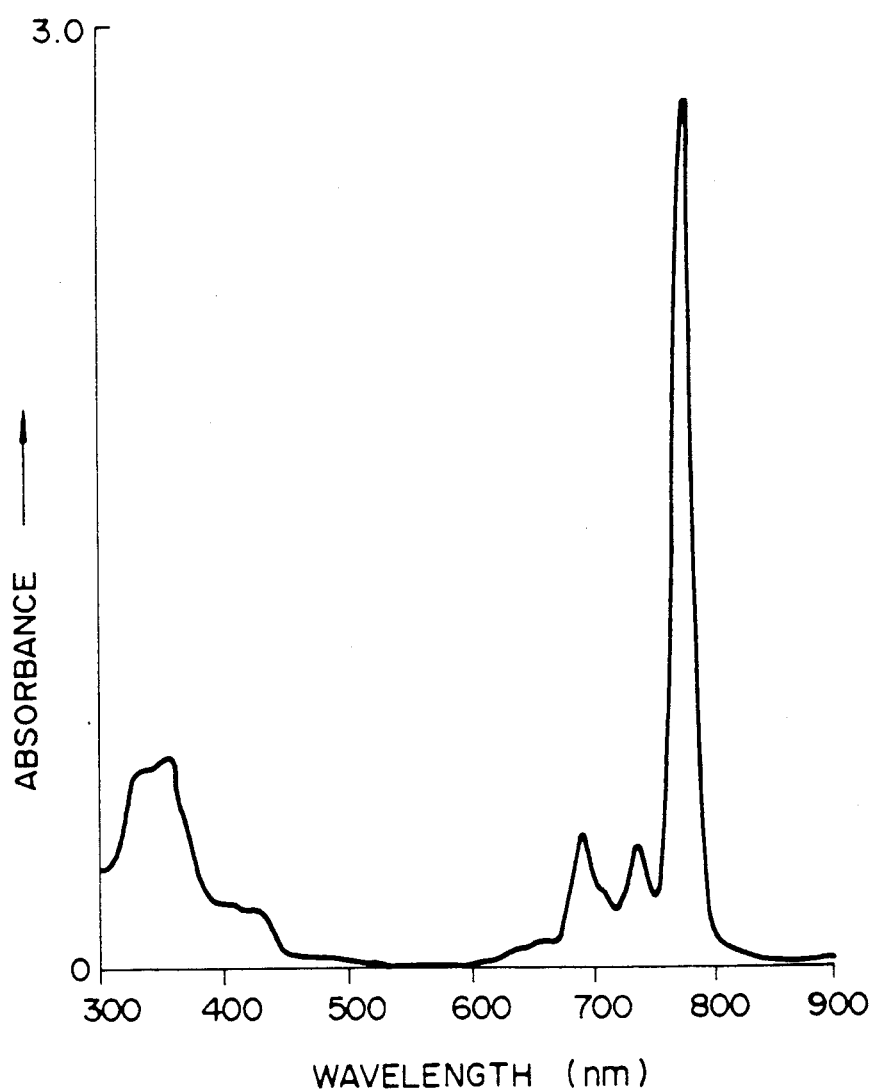
FIG. 18 is an electronic spectrum of bis(triethylsiloxy)silicon-tetrabromonaphthalocyanine.

(4) Electronic spectrum (CHCl$_3$ solution) is shown in FIG. 18.

Figure 19:
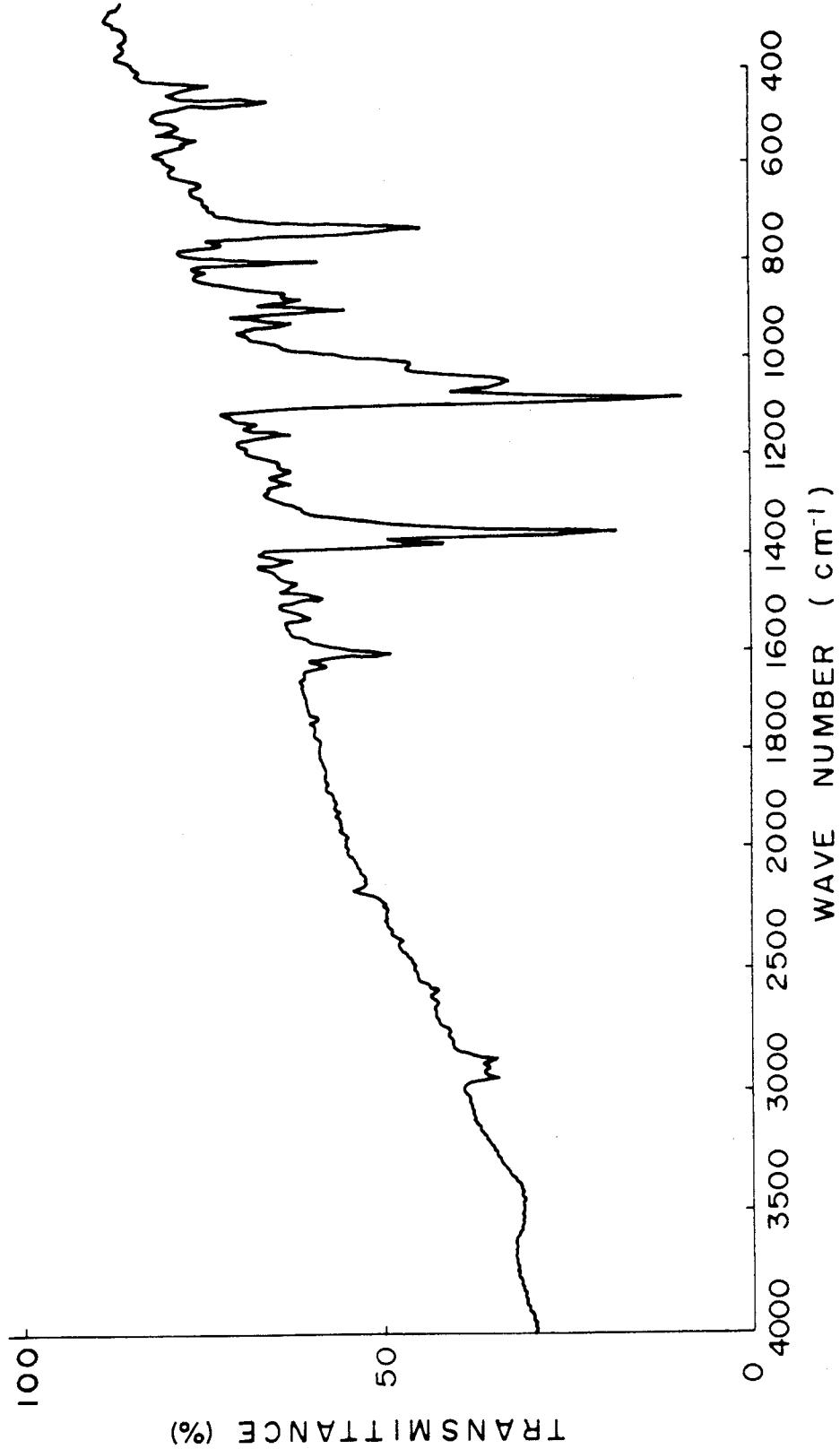
FIG. 19 is an IR spectrum of bis(triethylsiloxy)silicon-tetrabromonaphthalocyanine.

(5) IR spectrum (KBr) is shown in FIG. 19.

EXAMPLE 1

Synthesis of bis(tri-n-propylsiloxy)silicon-tetra (n-dodecylthio)naphthalocyanine (illustrative compound (100))

To a solution of 140 mg (0.1 m mol) of bis (tri-n-propylsiloxy)silicon-tetrabromonaphthalocyanine in a mixture of 10 ml of quinoline and 3.2 ml of pyridine was added 2.33 g (8.8 m mols) of cuprous n-dodecylthiolate synthesized according to the method described in Organic Syntheses, vol. 42, p. 22, and the resulting mixture was refluxed at 160° to 170° C. for 8 hours. After being allowed to cool, the reaction mixture was poured into 200 ml of methanol, and the resulting mixture was sufficiently stirred and then allowed to stand overnight at room temperature. The precipitate formed was filtered and sufficiently washed with methanol, and only a material soluble in benzene was extracted from the precipitate with benzene. The benzene solution was concentrated, followed by separation by an alumina column chromatography and recrystallization from chloroform/ethanol, whereby 138 mg (73%) of yellow-green crystals were obtained. The yellow-green crystals were confirmed to be bis(tri-n-propylsiloxy)silicon-tetra (n-dodecylthio)naphthalocyanine [illustrative compound (100)] from the following analysis results:

(1) Melting point: 145°–149° C.
(2) Elementary analysis values:

|  | C | H | N |
|---|---|---|---|
| Calculated (%) | 72.48 | 8.64 | 5.93 |
| Found (%) | 72.61 | 8.65 | 5.87 |

Figure 20:
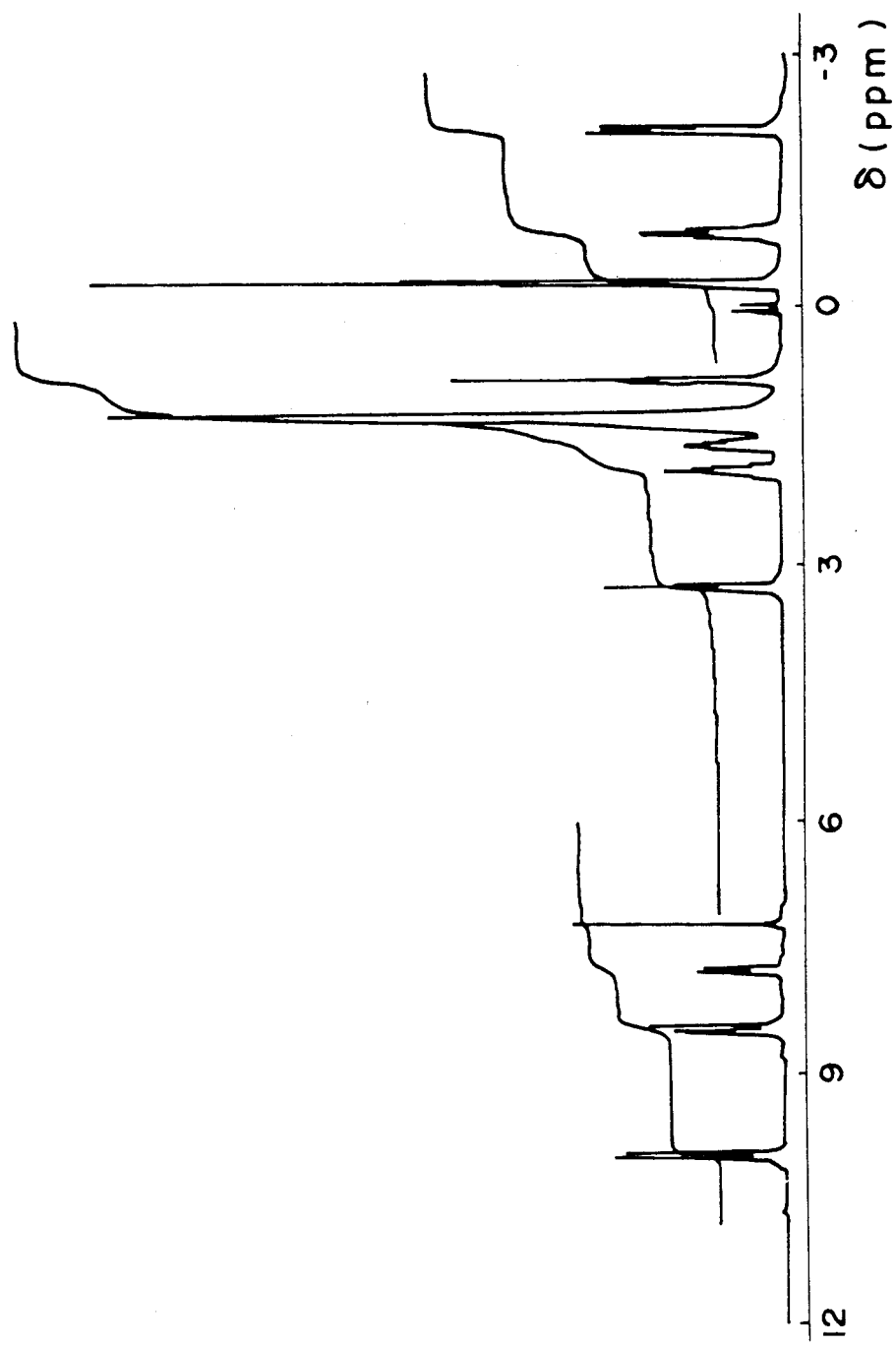
FIG. 20 is an NMR spectrum of bis(tri-n-propylsiloxy)silicon-tetra(n-dodecylthio)naphthalocyanine.

(3) NMR spectrum values (the NMR spectrum is shown in FIG. 20): CDCl$_3$:

δ values:
9.94 (4H, br-s), 9.89 (4H, br-s),
8.45 (4H, d, J=8.85 Hz),
8.37 (4H, br-s),
7.72 (4H, d, J=8.85 Hz),
3.23 (8H, t, J=7.33 Hz),
1.86 (8H, quintet, J=7.33 Hz),
1.56 (8H, m),
1.22 (64H, m),
0.81 (12H, t-like m),
−0.33 (18H, t, J=7.33 Hz),
−0.92 (12H, sextet-like m),
−2.13 (12H, t-like m)

Figure 21:
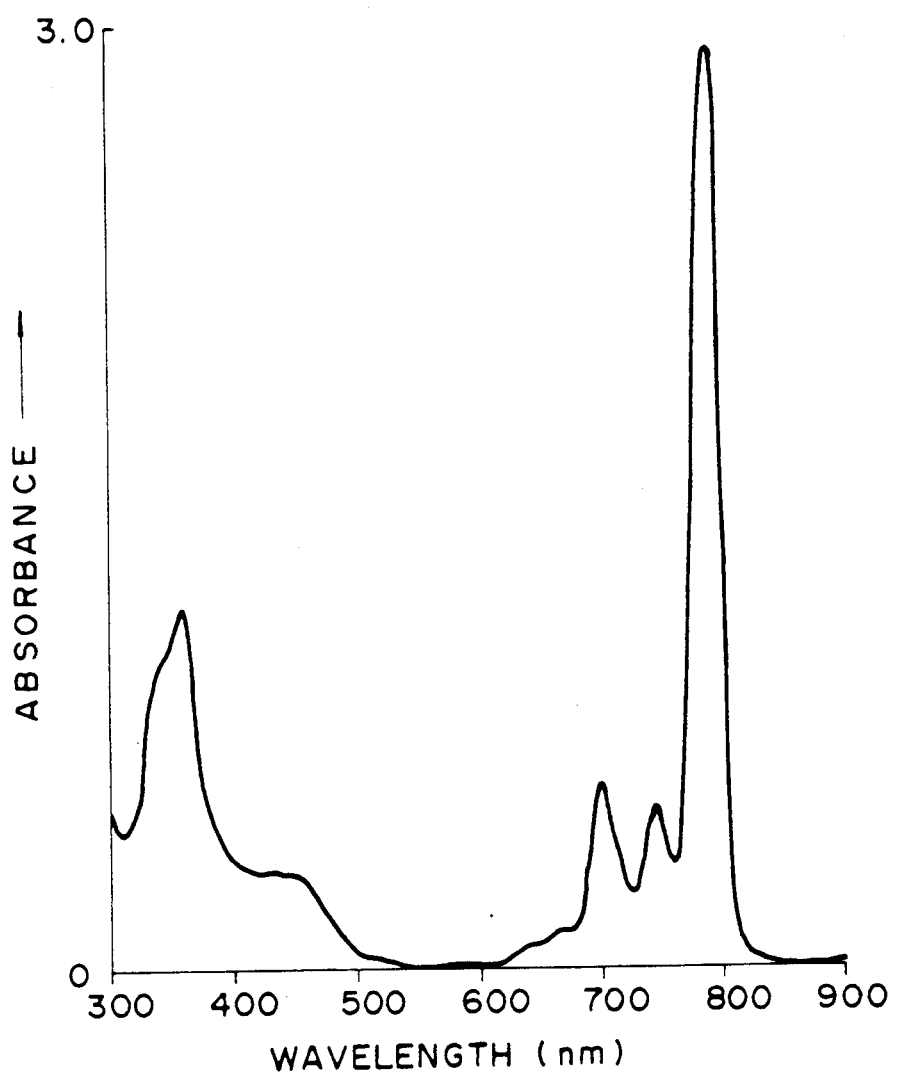
FIG. 21 is an electronic spectrum of bis(tri-n-propylsiloxy)silicon-tetra(n-dodecylthio)naphthalocyanine.

(4) Electronic spectrum (CHCl$_3$ solution) is shown in FIG. 21.

Figure 22:
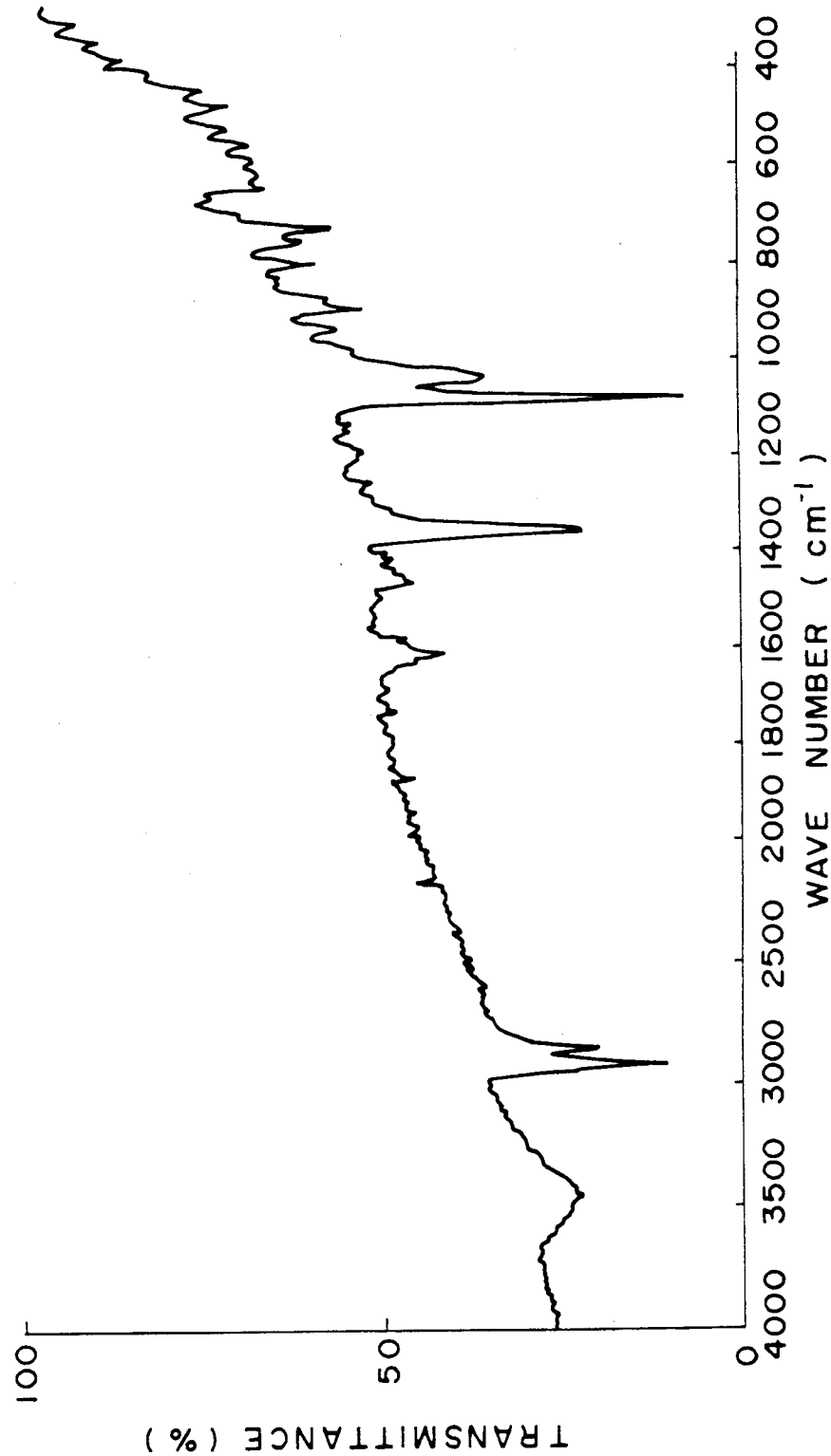
FIG. 22 is an IR spectrum of bis(tri-n-propylsiloxy)-silicon-tetra(n-dodecylthio)naphthalocyanine.

(5) IR spectrum (KBr) is shown in FIG. 22.

EXAMPLE 2

Synthesis of bis(tri-n-propylsiloxy)silicon-tetra (n-tetradecylthio)naphthalocyanine (illustrative compound (101))

To a solution of 140 mg (0.1 m mol) of bis (tri-n-propylsiloxy)silicon-tetrabromonaphthalocyanine in a mixture of 10 ml of quinoline and 3.2 ml of pyridine was added 2.53 g (8.8 m mols) of cuprous n-tetradecylthiolate synthesized according to the method described in Organic Syntheses, vol. 42, p. 22, and the resulting mixture was refluxed at 160° to 170° C. for 8 hours. After cooling, the reaction mixture was treated in the same manner as in Example 1 to obtain 126 mg (63%) of yellow-green crystals. The yellow-green crystals are confirmed to be bis(tri-n-propylsiloxy)silicon-tetra(n-tetradecylthio)naphthalocyanine [illustrative compound (101)] from the following analysis results:

(1) Melting point: 141°–143° C.
(2) Elementary analysis values:

|  | C | H | N |
|---|---|---|---|
| Calculated (%) | 73.21 | 8.97 | 5.60 |
| Found (%) | 73.36 | 8.99 | 5.58 |

Figure 23:
FIG. 23 is an NMR spectrum of bis(tri-n-propylsiloxy)silicon-tetra(n-tetradecylthio)naphthalocyanine.

(3) NMR spectrum values (the NMR spectrum is shown in FIG. 23): CDCl$_3$:
δ values:
10.01 (4H, br-s),
9.96 (4H, br-s),
8.53 (4H, d, J=8.85 Hz),
8.45 (4H, br-s),
7.80 (4H, d, J=8.85 Hz),
3.30 (8H, t, J=7.17 Hz),
1.94 (8H, quintet, J=7.17 Hz),
1.64 (8H, m),
1.27 (80H, m,
0.87 (12H, t-like m),
−0.26 (18H, t, J=7.17 Hz), −0.85 (12H, sextet-like m), −2.06 (12H, t-like m)

Figure 24:
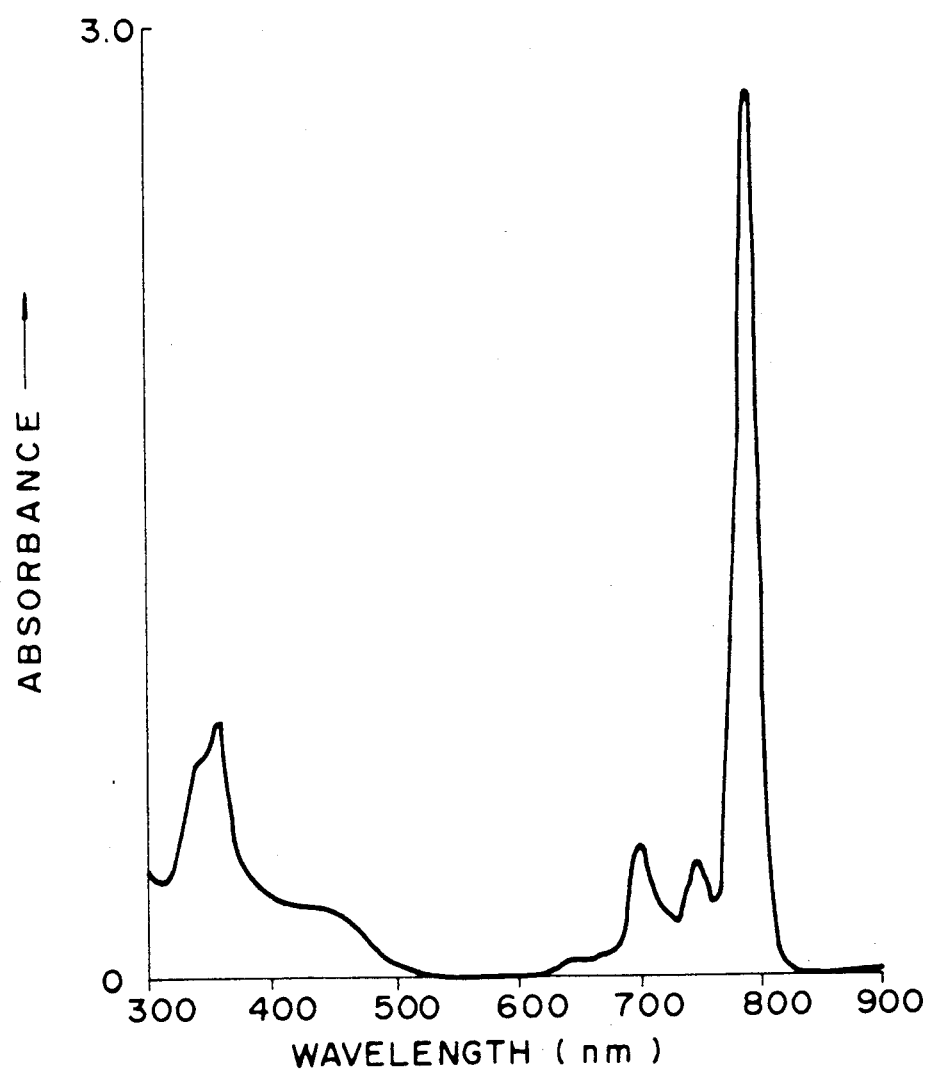
FIG. 24 is an electronic spectrum of bis(tri-n-propylsiloxy)silicon-tetra(n-tetradecylthio)naphthalocyanine.

(4) Electronic spectrum (CHCl$_3$ solution) is shown in FIG. 24.

Figure 25:
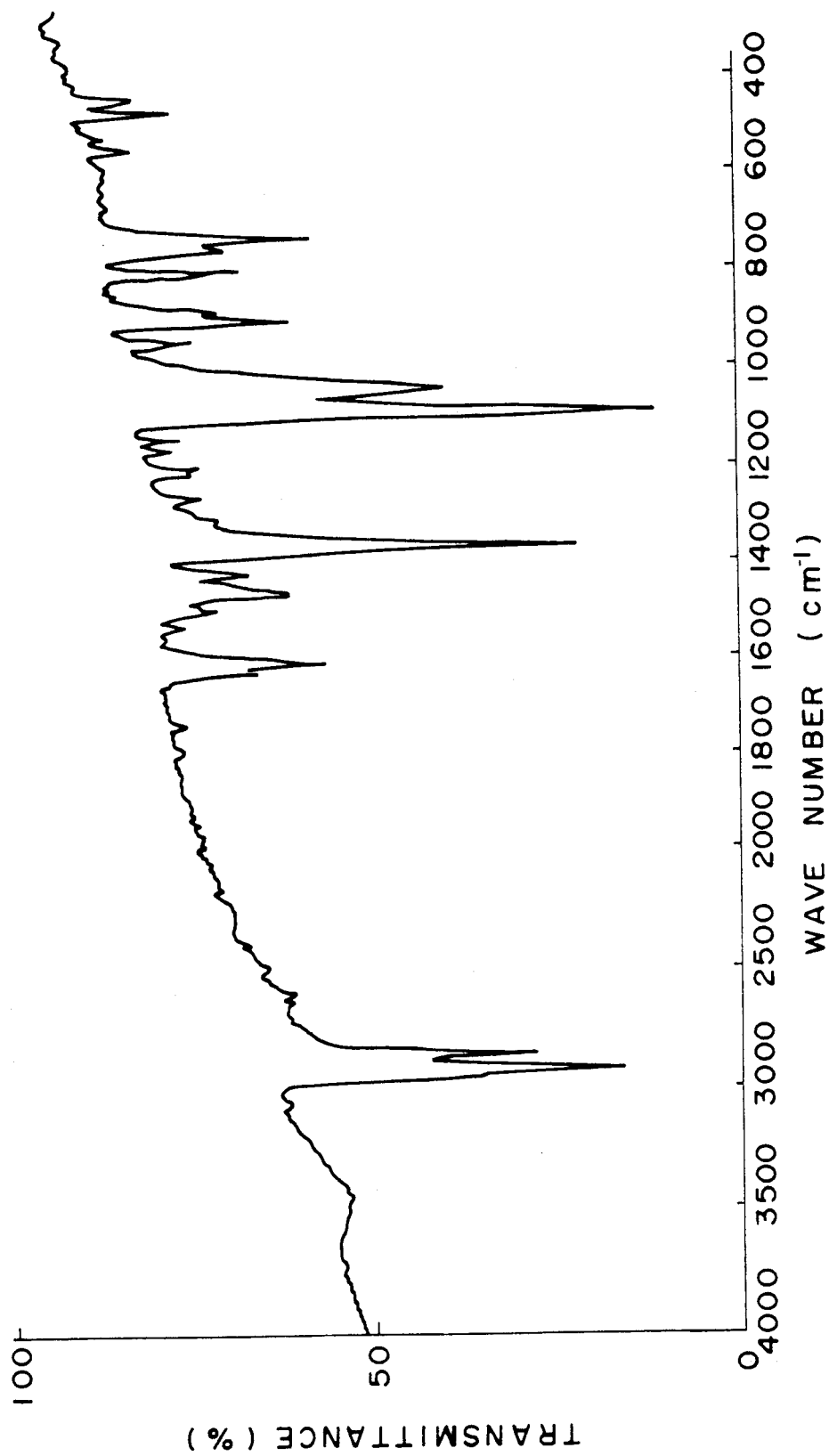
FIG. 25 is an IR spectrum of bis(tri-n-propylsiloxy)-silicon-tetra(n-tetradecylthio)naphthalocyanine.

(5) IR spectrum (KBr) is shown in FIG. 25.

EXAMPLE 3

Synthesis of bis(tri-n-propylsiloxy)silicon-tetra(n-hexadecylthio) naphthalocyanine (illustrative compound (105))

To a solution of 140 mg (0.1 m mol) of bis (tri-n-propylsiloxy)silicon-tetrabromonaphthalocyanine in a mixture of 10 ml of quinoline and 3.2 ml of pyridine was added 2.82 g (8.8 m mols) of cuprous n-hexadecylthiolate synthesized according to the method described in Organic Synthesis, vol. 42, p. 22, and the resulting mixture was refluxed at 160° to 170° C. for 8 hours. After cooling, the reaction mixture was treated in the same manner as in Example 1 to obtain 144 mg (68%) of yellow-green crystals. The yellow-green crystals were confirmed to be bis(tri-n-propylsiloxy)silicon-tetra (n-hexadecylthio)naphthalocyanine [illustrative compound (105)] from the following analysis results:

(1) Melting point: 130.5°–132.5° C.
(2) Elementary analysis values:

|  | C | H | N |
|---|---|---|---|
| Calculated (%) | 73.87 | 9.25 | 5.30 |
| Found (%) | 73.91 | 9.33 | 5.35 |

Figure 26:
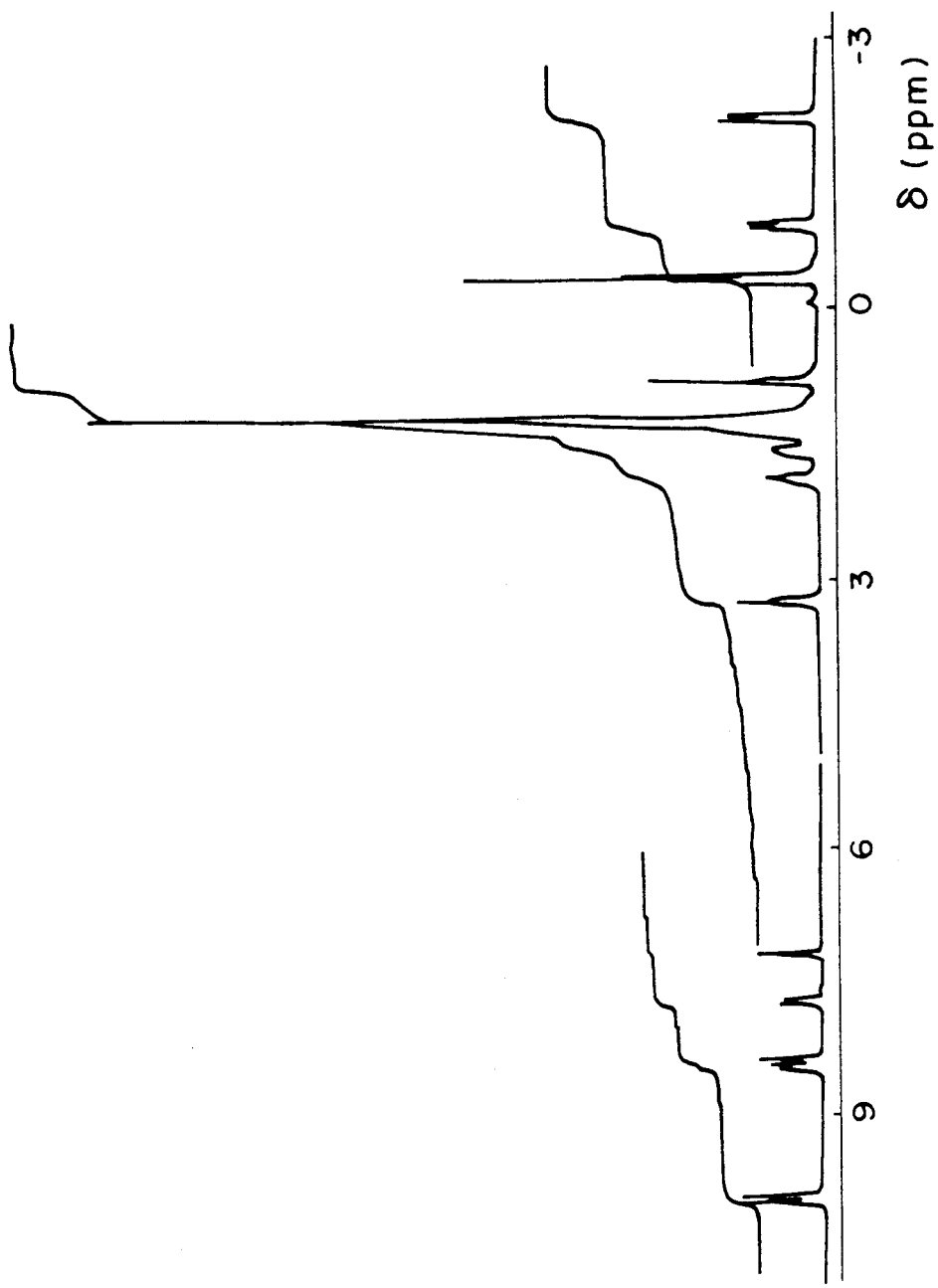
FIG. 26 is an NMR spectrum of bis(tri-n-propylsiloxy)silicon-tetra(n-hexadecylthio)naphthalocyanine.

(3) NMR spectrum values (the NMR spectrum is shown in FIG. 26): CDCl$_3$:
δ values:
10.02 (4H br-s),
9.97 (4H, br-s),
8.52 (4H, d, J=8.85 Hz),
8.45 (4H, br-s),
7.80 (4H, d, J=8.85 Hz),
3.30 (8H, t, J=7.33 Hz),
1.94 (8H, quintet, J=7.33 Hz),
1.64 (8H, m),
1.26 (96H, m),
0.87 (12H, t-like m),
−0.25 (18H, t, J=7.33 Hz),
−0.84 (12H, sextet-like m),
−2.05 (12H, t-like m)

Figure 27:
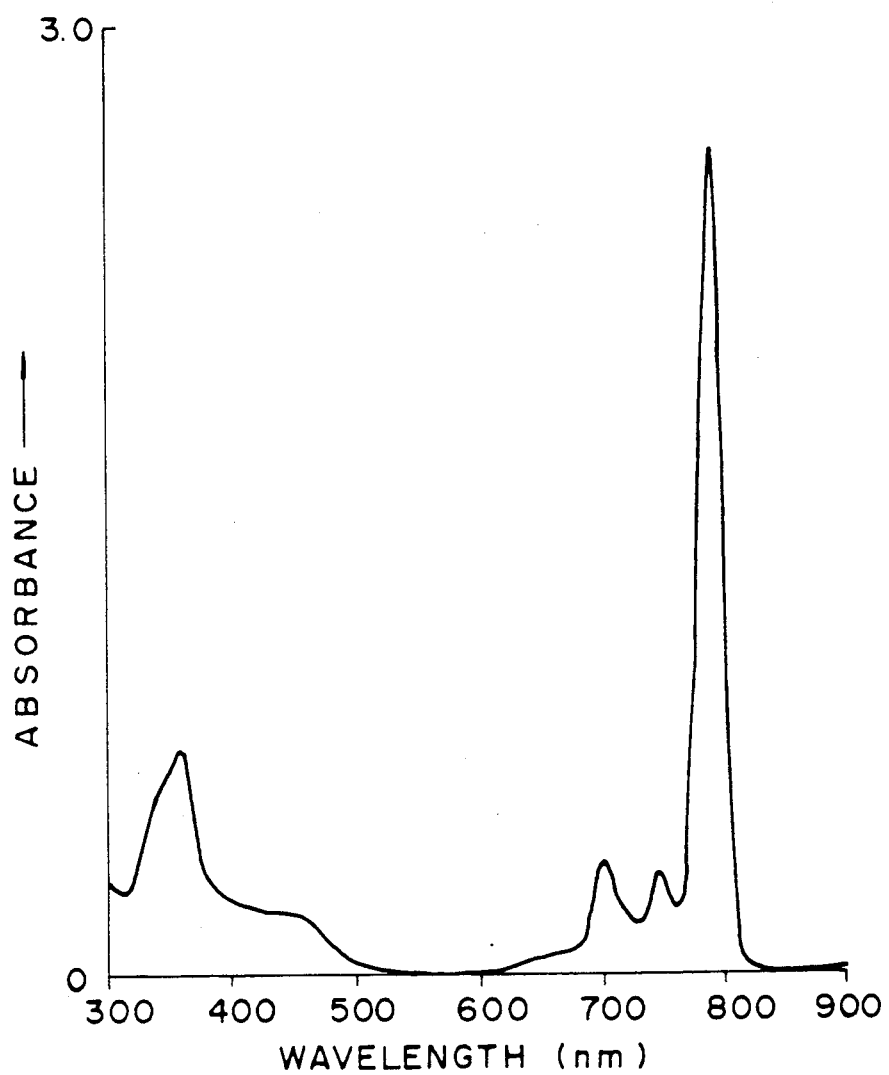
FIG. 27 is an electronic spectrum of bis(tri-n-propylsiloxy)silicon-tetra(n-hexadecylthio)naphthalocyanine.

(4) Electronic spectrum (CHCl$_3$ solution) is shown in FIG. 27.

Figure 28:
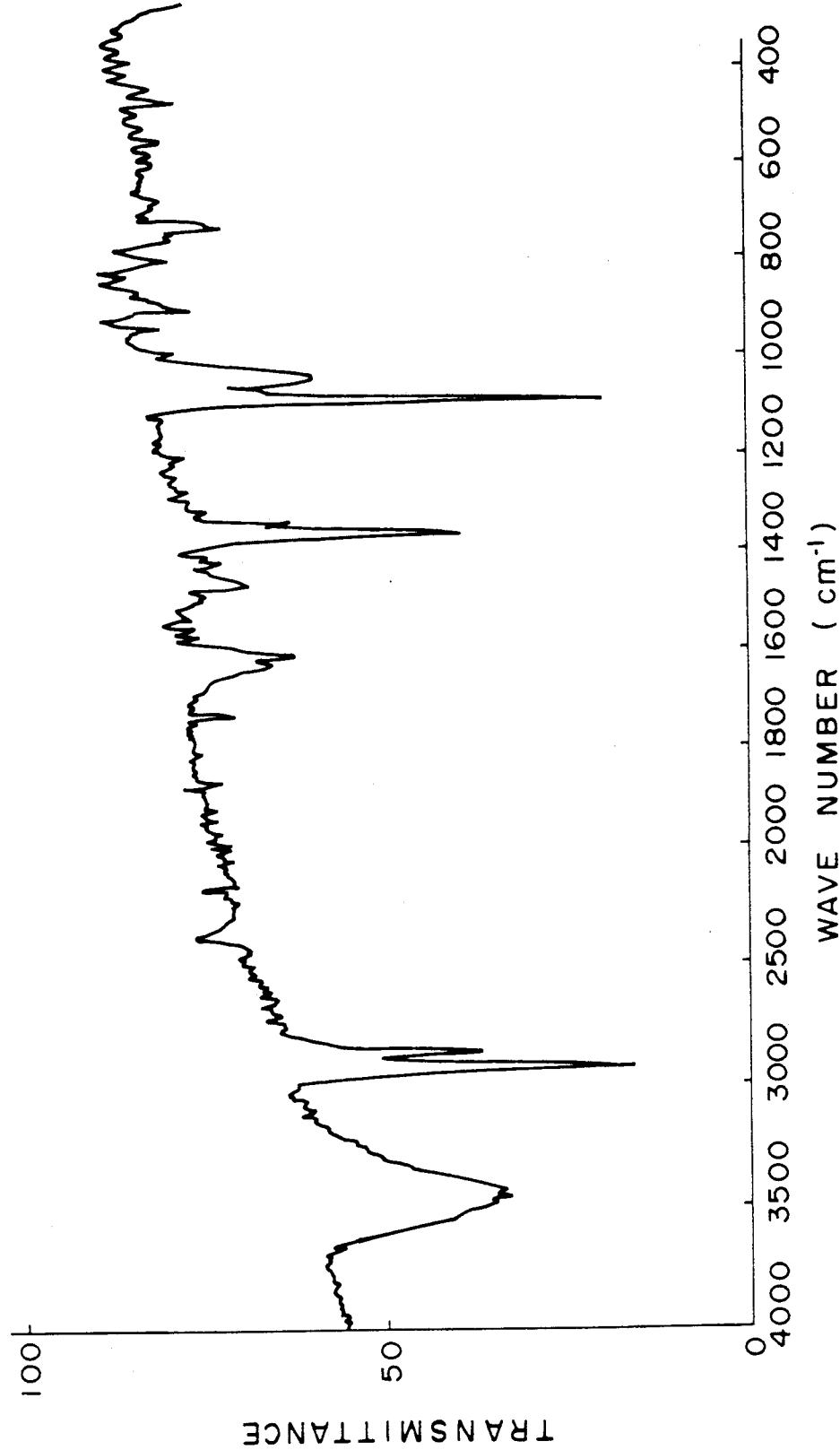
FIG. 28 is an IR spectrum of bis(tri-n-propylsiloxy)-silicon-tetra(n-hexadecylthio)naphthalocyanine.

(5) IR spectrum (KBr) is shown in FIG. 28.

Synthesis of bis(tri-n-propylsiloxy)silicon-tetra (n-decylthio)naphthalocyanine (illustrative compound (99))

To a solution of 140 mg (0.1 m mol) of bis (tri-n-propylsiloxy)silicon-tetrabromonaphthalocyanine in a mixture of 10 ml of quinoline and 3.2 ml of pyridine was added 2.08 g (8.8 m mols) of cuprous n-decylthiolate synthesized according to the method described in Organic Syntheses, vol. 42, p. 22, and the resulting mixture was refluxed at 160° to 170° C. for 8 hours. After cooling, the reaction mixture was treated in the same manner as in Example 1 to obtain 121 mg (68%) of yellow-green crystals. The yellow-green crystals were confirmed to be bis(tri-n-propylsiloxy)silicon-tetra (n-decylthio)naphthalocyanine [illustrative compound (99)] from the following analysis results:

(1) Melting point: 166°–169° C.
(2) Elementary analysis values:

|  | C | H | N |
|---|---|---|---|
| Calculated (%) | 71.65 | 8.28 | 6.31 |
| Found (%) | 71.81 | 8.31 | 6.28 |

Figure 29:
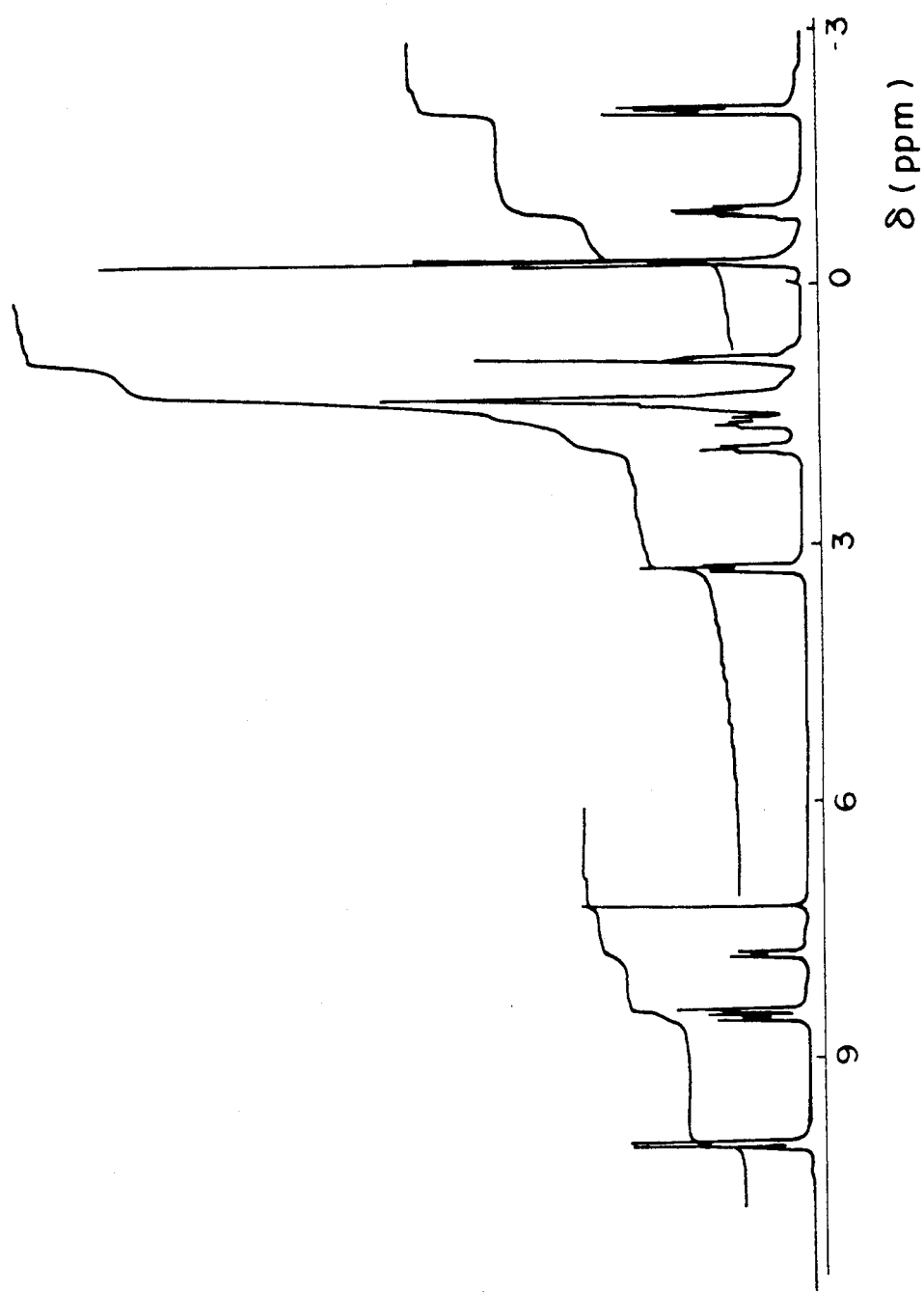
FIG. 29 is an NMR spectrum of bis(tri-n-propylsiloxy)silicon-tetra(n-decylthio)naphthalocyanine.

(3) NMR spectrum values (the NMR spectrum is shown in FIG. 29): CDCl$_3$:
δ values:
10.02 (4H, br-s),
9.97 (4H, br-s),
8.52 (4H, d, J=8.55 Hz), 8.45 (4H, br-s),
7.80 (4H, d, J=8.55 Hz),
3.30 (8H, t, J=7.32 Hz),
1.94 (8H, quintet, J=7.32 Hz),
1.64 (8H, m),
1.32 (48H, m), 0.90 (12H, t-like m), −0.26 (18H, t, J=7.32 Hz), −0.85 (12H, sextet-like m), −2.05 (12H, t-like m)

Figure 30:
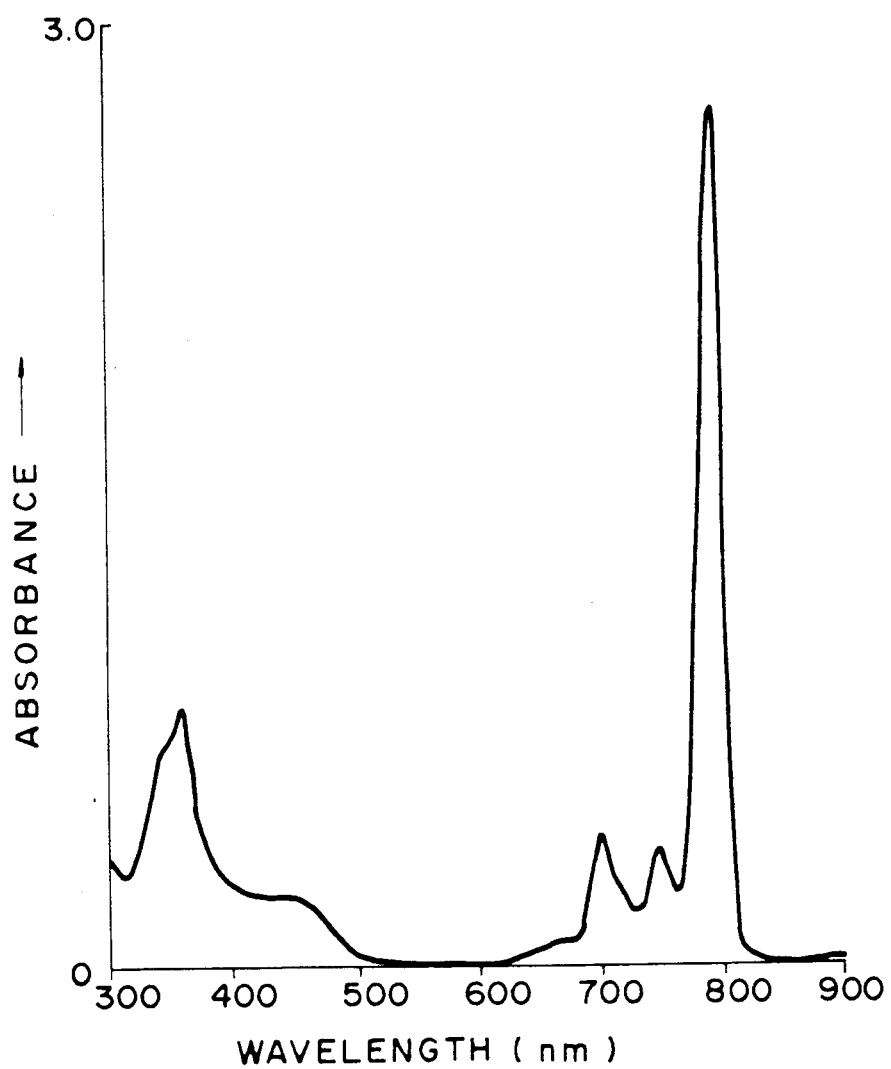
FIG. 30 is an electronic spectrum of bis(tri-n-propylsiloxy)silicon-tetra(n-decylthio)naphthalocyanine.

(4) Electronic spectrum (CHCl$_3$ solution) is shown in FIG. 30.

Figure 31:
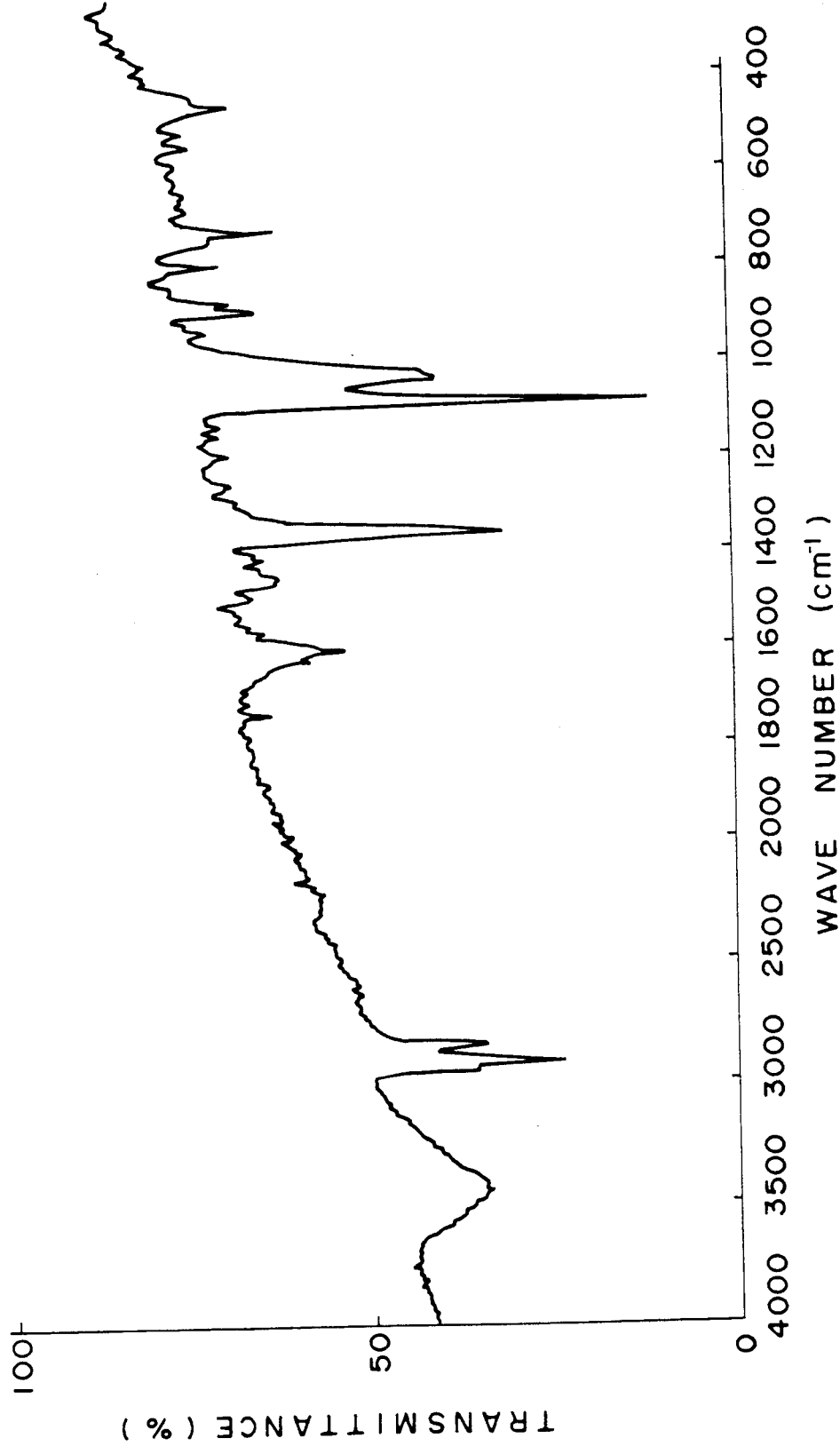
FIG. 31 is an IR spectrum of bis(tri-n-propylsiloxy)-silicon-tetra(n-decylthio)naphthalocyanine.

(5) IR spectrum (KBr) is shown in FIG. 31.

EXAMPLE 5

Synthesis of bis(tri-n-butylsiloxy)silicon-tetra(n-dodecylthio) naphthalocyanine (illustrative compound (103))

To a solution of 142 mg (0.1 m mol) of bis (tri-n-butylsiloxy)silicon-tetrabromonaphthalocyanine in a mixture of 10 ml of quinoline and 3.2 ml of pyridine was added 2.33 g (8.8 m mols) of cuprous n-dodecylthiolate synthesized according to the method described in Organic Syntheses, vol. 42, p. 22, and the resulting mixture was refluxed at 160° to 170° C. for 8 hours. After cooling, the reaction mixture was treated in the same manner as in Example 1 to obtain 114 mg (58%) of yellow-green crystals. The yelllow-green crystals were confirmed to be bis(tri-n-butylsiloxy)silicon-tetra (n-dodecylthio)-naphthalocyanine [illustrative compound (103)] from the following analysis results:

(1) Melting point: 103°–106° C.
(2) Elementary analysis values:

|  | C | H | N |
|---|---|---|---|
| Calculated (%) | 73.04 | 8.89 | 5.68 |
| Found (%) | 73.21 | 8.82 | 5.71 |

Figure 32:
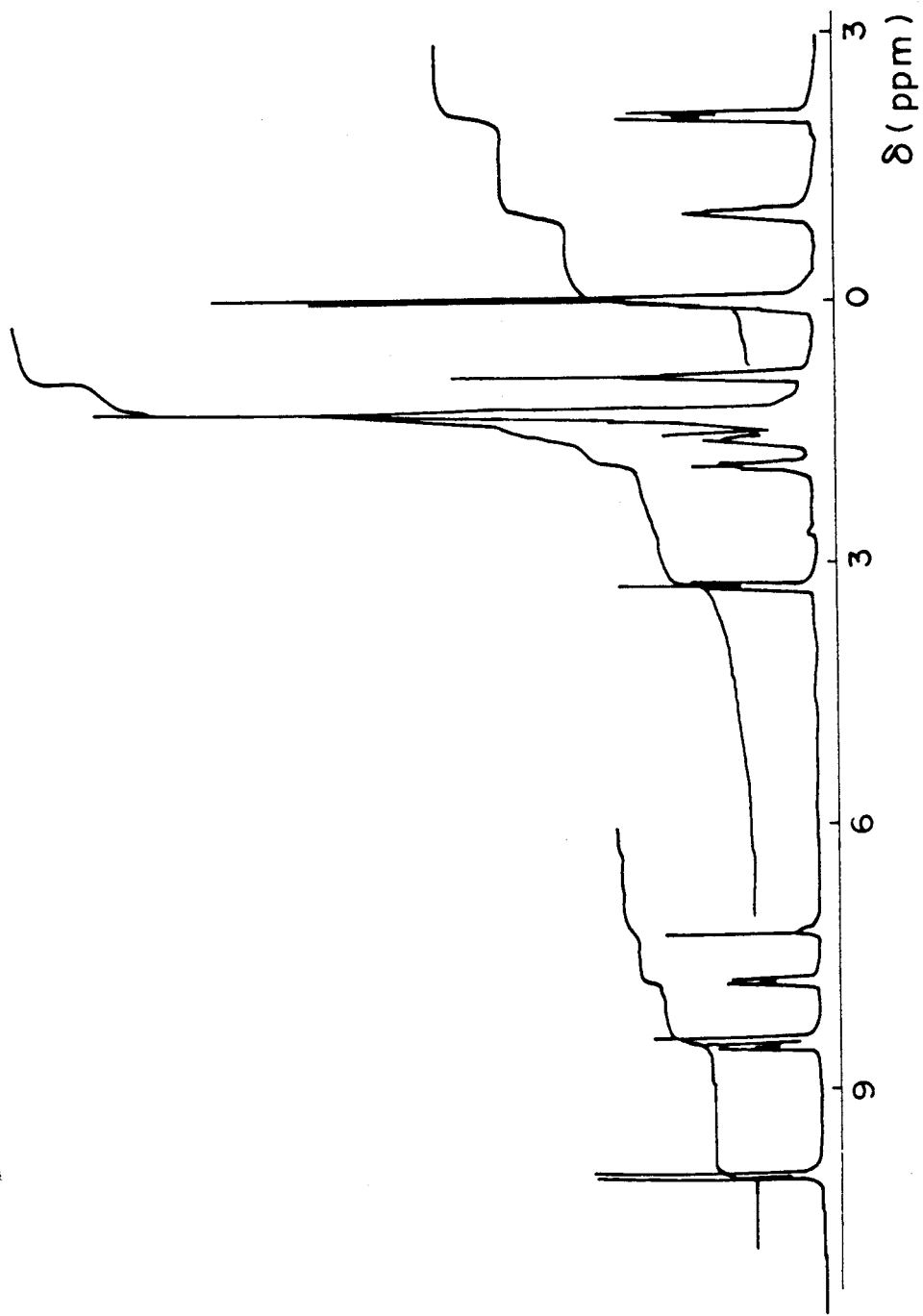
FIG. 32 is an NMR spectrum of bis(tri-n-butylsiloxy)-silicon-tetra(n-dodecylthio)naphthalocyanine.
Figure 33:
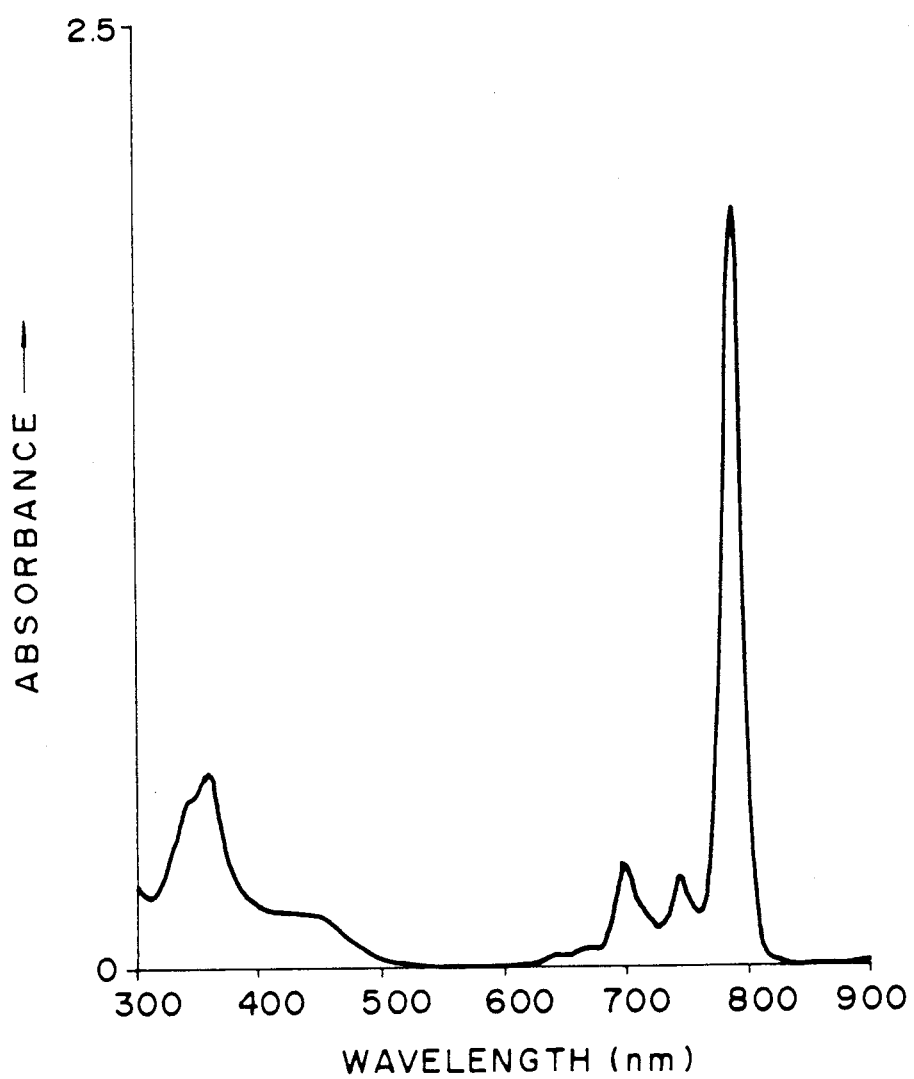
FIG. 33 is an electronic spectrum of bis(tri-n-butylsiloxy)silicon-tetra(n-dodecylthio)naphthalocyanine.

(3) NMR spectrum values (the NMR spectrum is shown in FIG. 32): CDCl$_3$:
δ values:
10.00 (4H, br-s),
9.95 (4H, br-s),
8.53 (4H, d, J=8.85 Hz),
8.45 (4H, br-s),
7.80 (4H, d, J=8.85 Hz),
3.31 (8H, t, J=7.33 Hz),
1.93 (8H, quintet, J=7.33 Hz),
1.64 (8H, m),
1.30 (64H, m),
0.88 (12H, t-like m),
0.02 (30H, m),
−0.96 (12H, sextet-like m),
−2.06 (12H, t-like m), (4) Electronic spectrum (CHCl$_3$ solution) is shown inFIG. 33.

Figure 34:
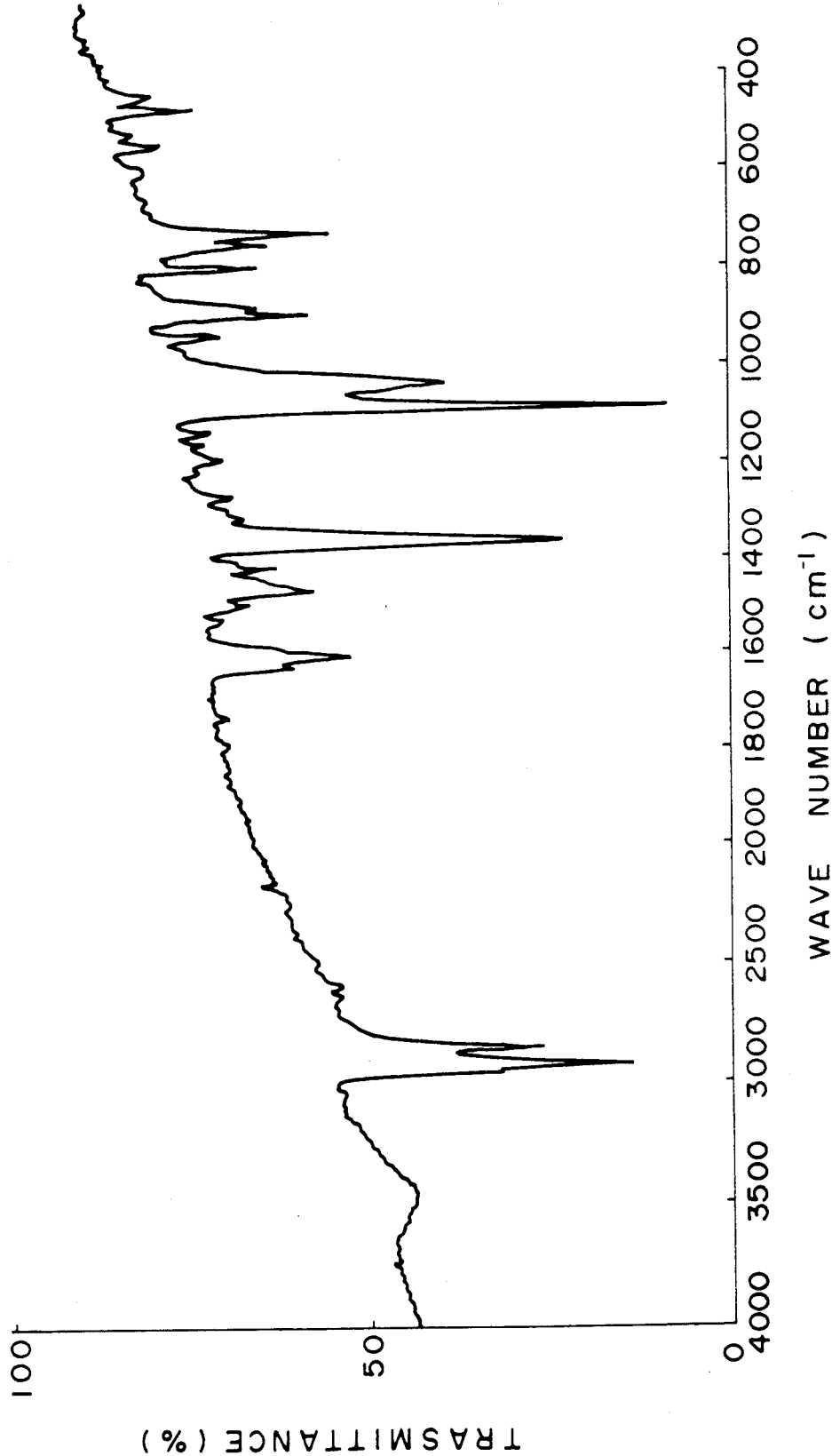
FIG. 34 is an IR spectrum of bis(tri-n-butylsiloxy)silicon-tetra(n-dodecylthio)naphthalocyanine.
Figure 35:
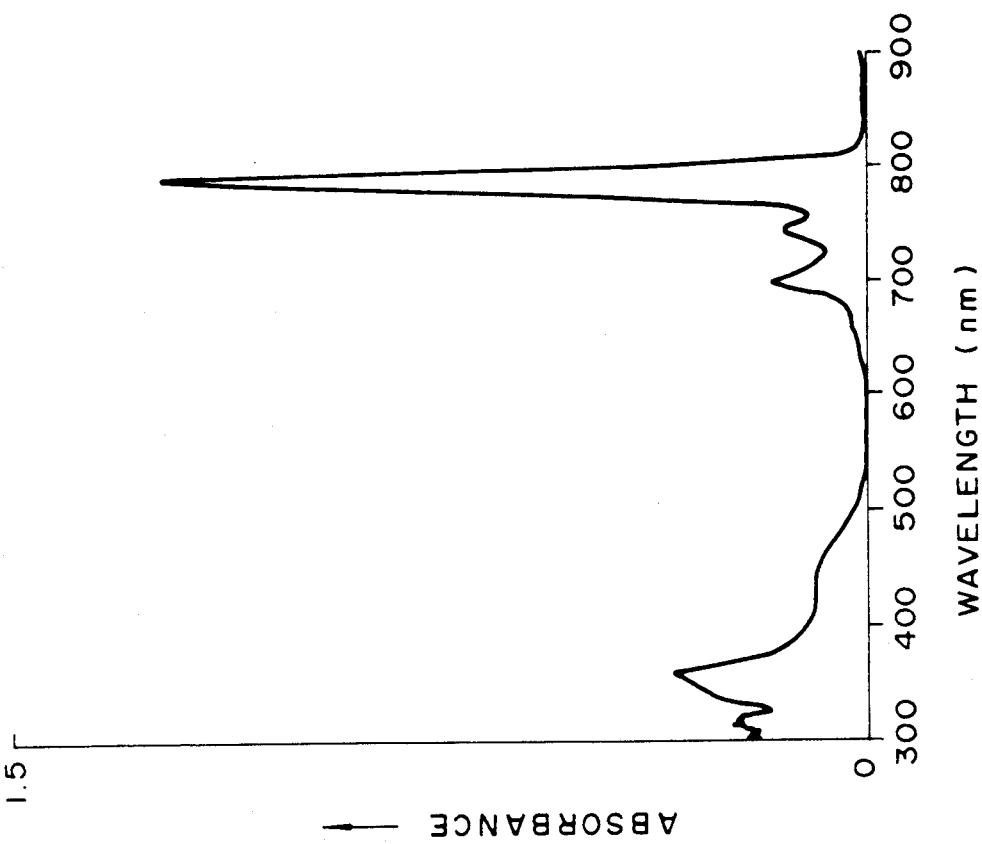
FIG. 35 is an electronic spectrum of bis(tri-n-propylsiloxy)silocon-tetra(n-dodecylthio)naphthalocyanine in tetrahydrofuran.
Figure 36:
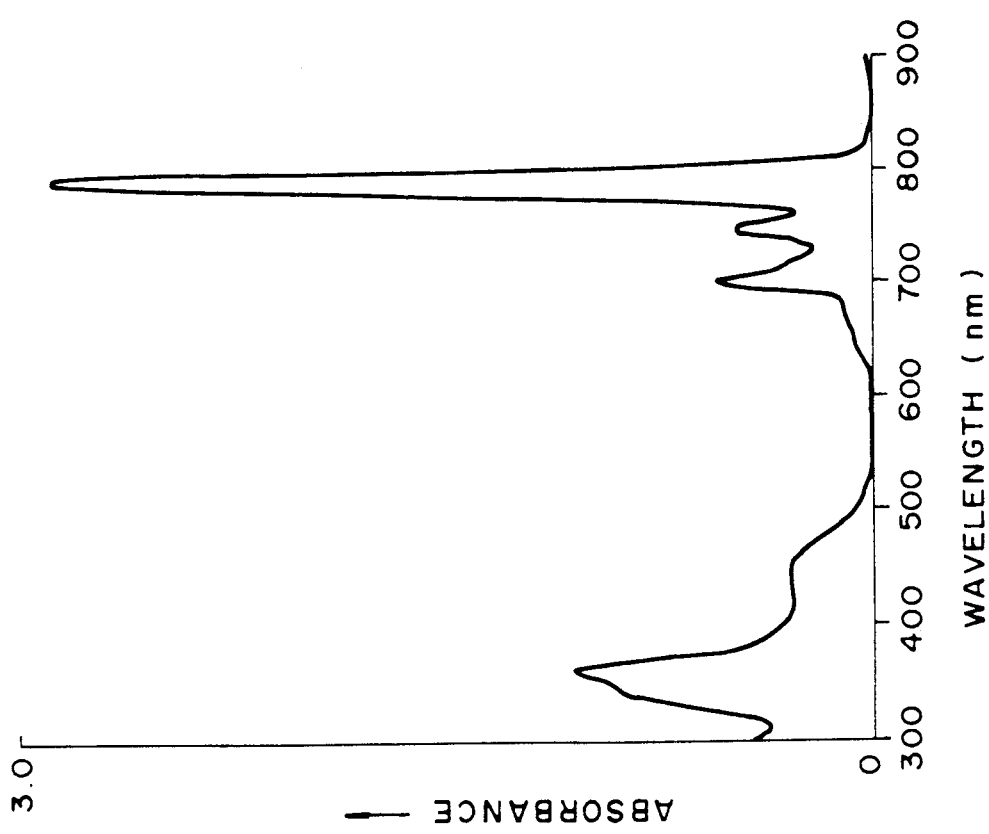
FIG. 36 is an electronic spectrum of bis(tri-n-propylsiloxy)silicon-tetra(n-dodecylthio)naphthalocyanine in acetone.
Figure 37:
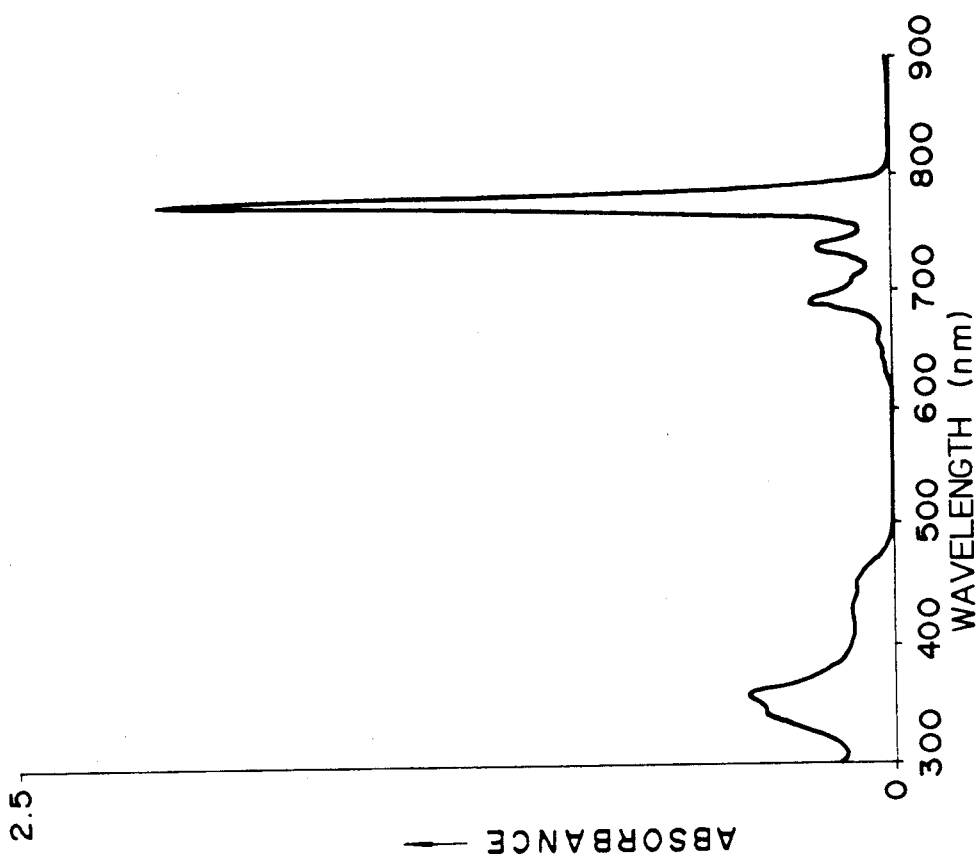
FIG. 37 is an electronic spectrum of bis(tri-n-propylsiloxy)silicon-tetra(n-dodecylthio)naphthalocyanine in toluene.
Figure 38:
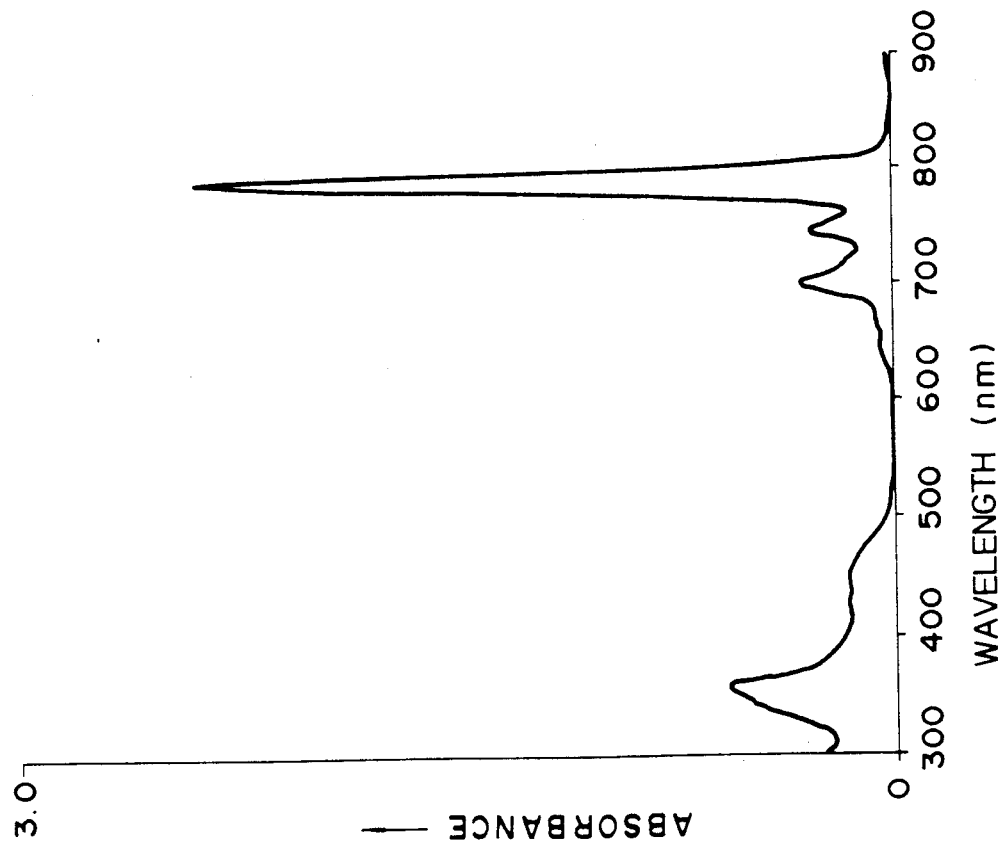
FIG. 38 is an electronic spectrum of bis(tri-n-propylsiloxy)silicon-tetra(n-dodecylthio)naphthalocyanine in hexane.

(5) IR spectrum (KBr) is shown in FIG. 34.

TEST EXAMPLE 1

Bis(tri-n-propylsiloxy)silicon-tetra(ndodecylthio)naphthalocyanine [illustrative compound (100)] was dissolved in various solvents and its electronic spectra were measured. The electronic spectra in chloroform, tetrahydrofuran, acetone, toluene and hexane are shown in FIG. 21, FIG. 35, FIG. 36, FIG. 37 and FIG. 38, respectively. The absorption waveform did not vary at all, depending on either the kind of solvent or the concentration of solution.

TEST EXAMPLE 2

Figure 40:
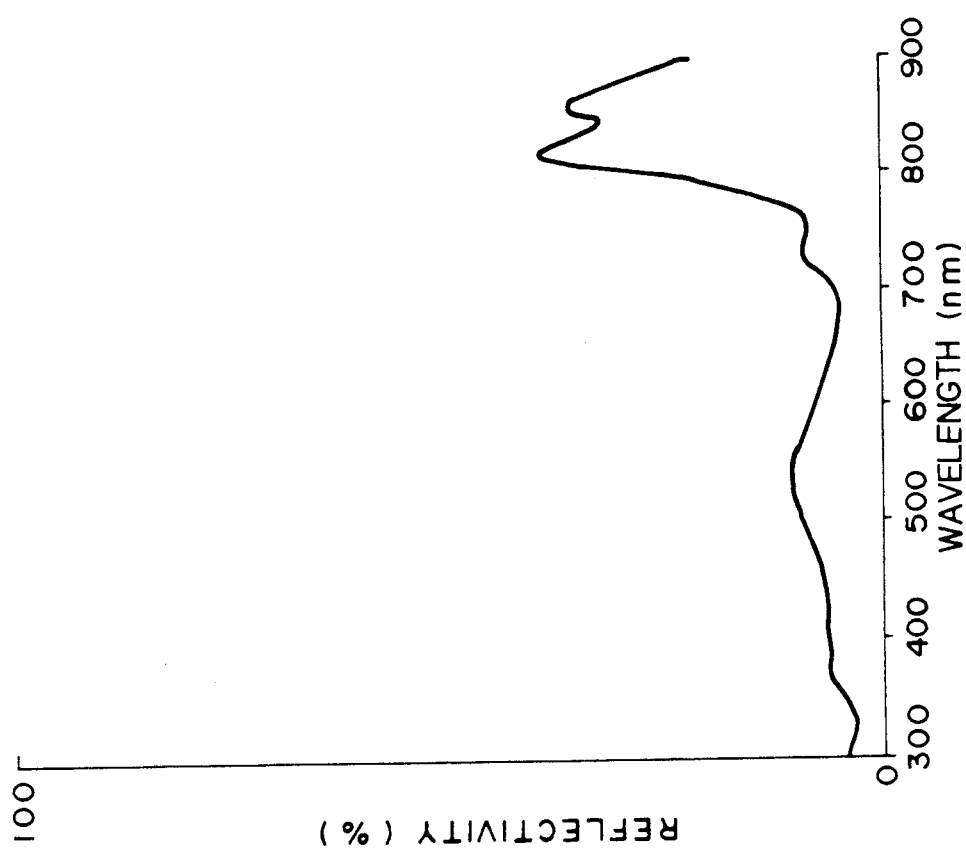
FIG. 40 is a 5° regular-reflection spectrum of a spin-coated film of bis(tri-n-propylsiloxy)silicon-tetra(n-dodecylthio)naphthalocyanine.
Figure 39:
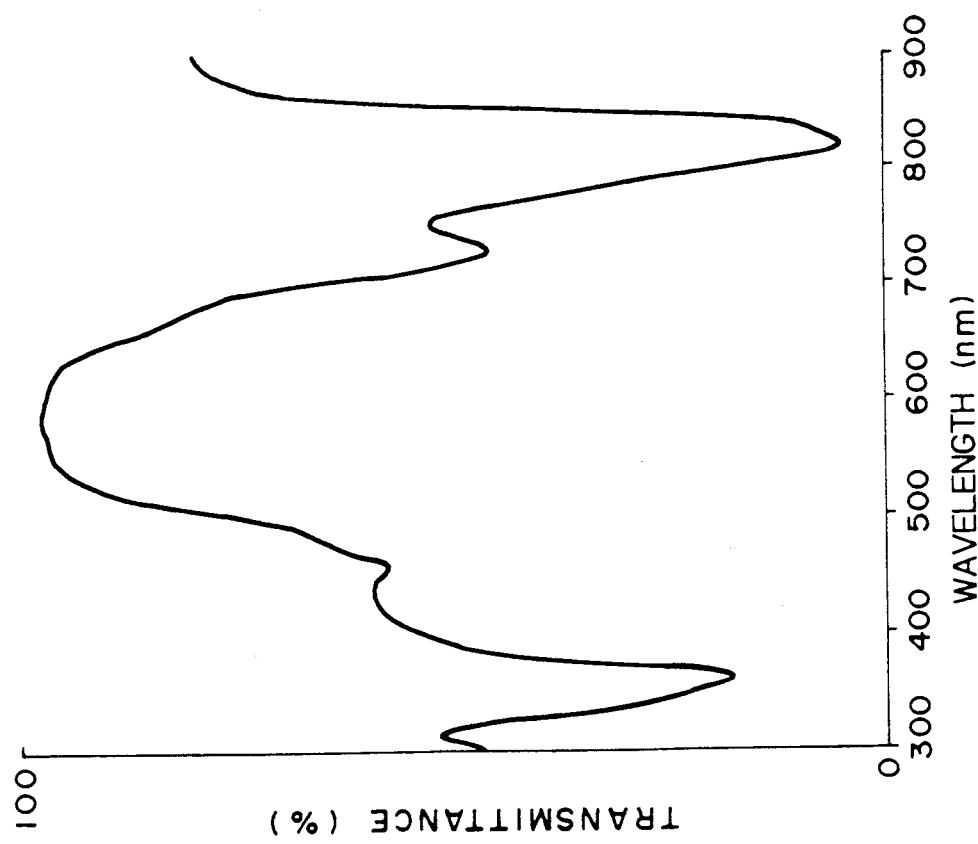
FIG. 39 is a transmission spectrum of a spin-coated film of bis(tri-n-propylsiloxy)silicon-tetra(n-dodecylthio)naphthalocyanine.

A solution composed of 2 parts by weight of bis(tri-n-propylsiloxy)silicon-tetra(n-dodecylthio)naphthalocyanine [illustrative compound (100)] and 98 parts by weight of 1,1,2-trichloroethane was coated on a glass plate by a spin coating method and dried at about 80° C. for about 15 minutes to form an organic film. Transmission spectrum and 5° regular-reflection spectrum of the organic film of the illustrative compound are shown in FIG. 39 and FIG. 40, respectively. The organic film was found to have a high light-absorbing ability and a high reflectivity (∼39%) in the diode laser region (780 to 830 nm).

COMPARATIVE EXAMPLE 1

Figure 41A:
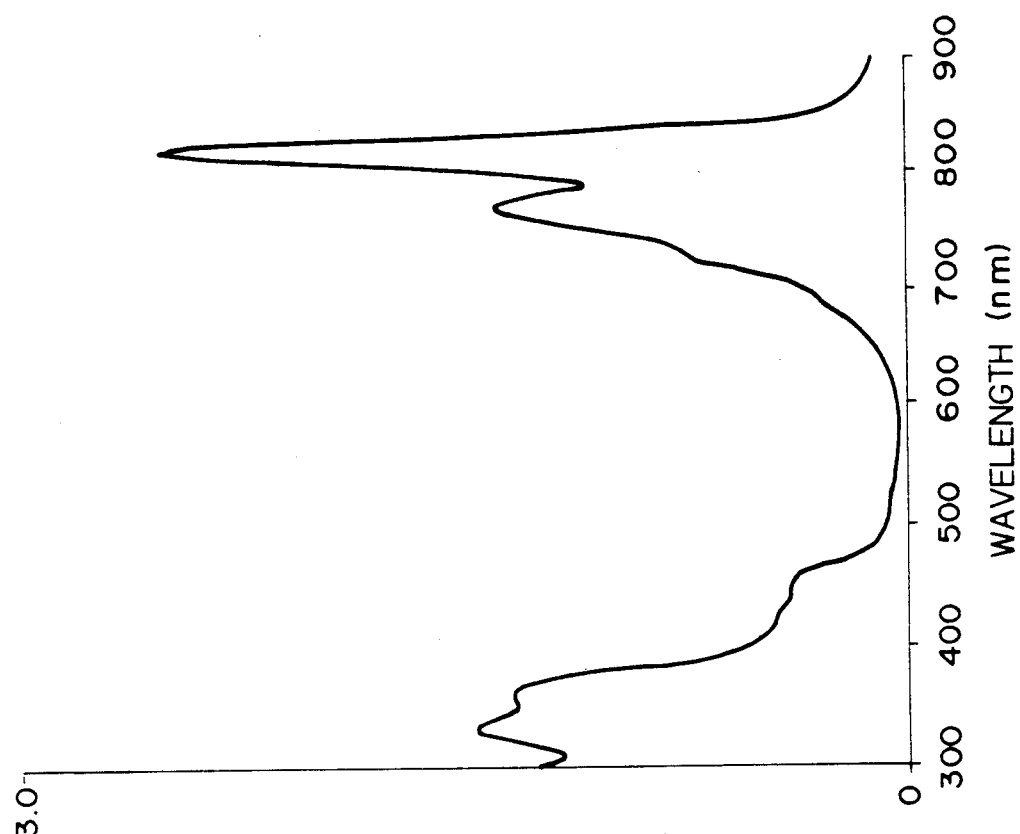
FIG. 41 shows electronic spectra of vanadyltetra(t-butyl)naphthalocyanine in a chloroform solution; (a) $2.37 \times 10^{-6}$M, (b) $1.89 \times 10^{-5}$M.
Figure 41B:
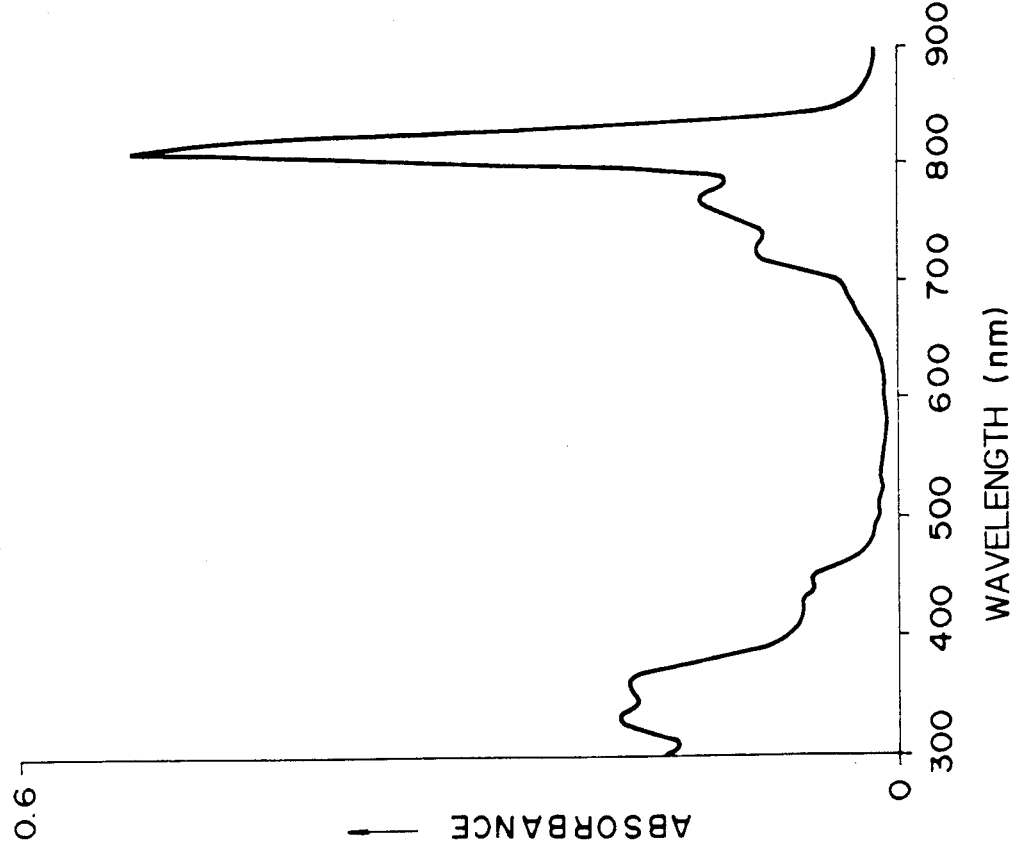
Figure 42:
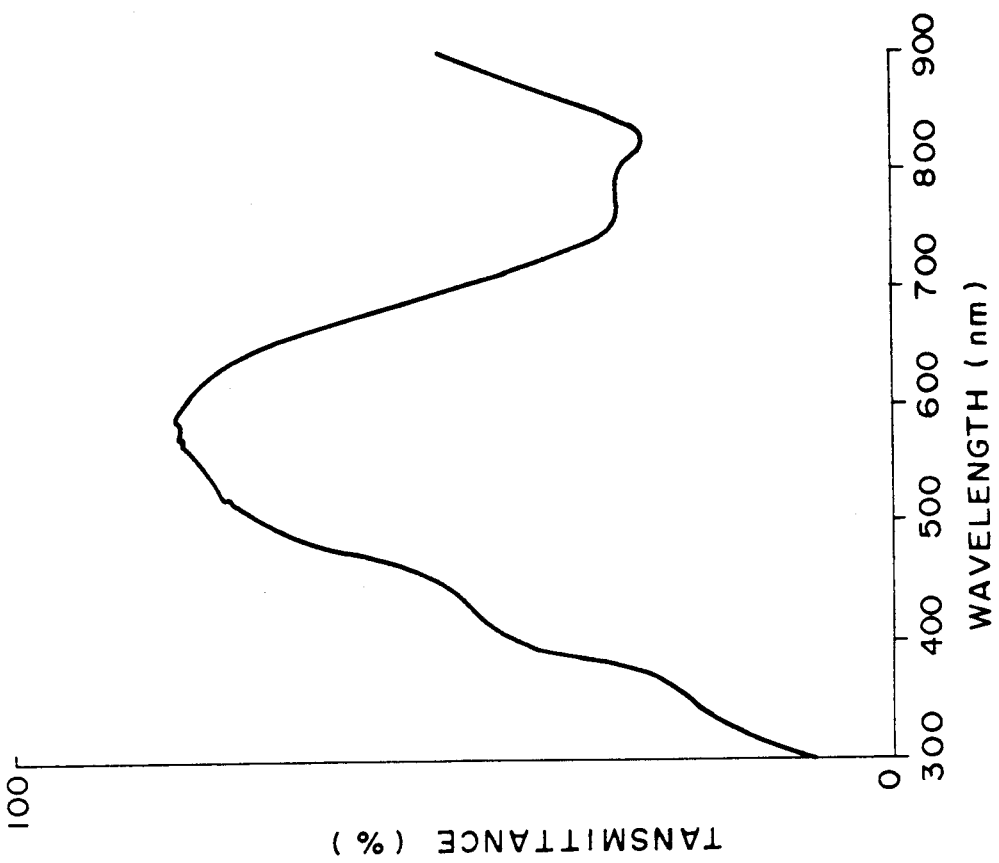
FIG. 42 is an electronic spectrum of vanadyl-tetra(t-butyl)naphthalocyanine in a benzene solution $(9.5 \times 10^{-6}$M).

Vanadyl-tetra(t-butyl)-naphthalocyanine synthesized according to the method described in Zhurnal Obshchei Khimii, vol. 42, p. 696 (1972) was dissolved in each of chloroform and benzene and its electronic spectra were measured. The electronic spectra in chloroform and benzene are shown in FIG. 41 and FIG. 42, respectively. As shown in FIGS. 41 and 42, in the case of the compound synthesized, the absorption waveform varied depending on the kind of solvent and the conventration of solution. The higher the concentration, the weaker the absorption near 800 nm and the stronger the absorption at 720 to 730 nm.

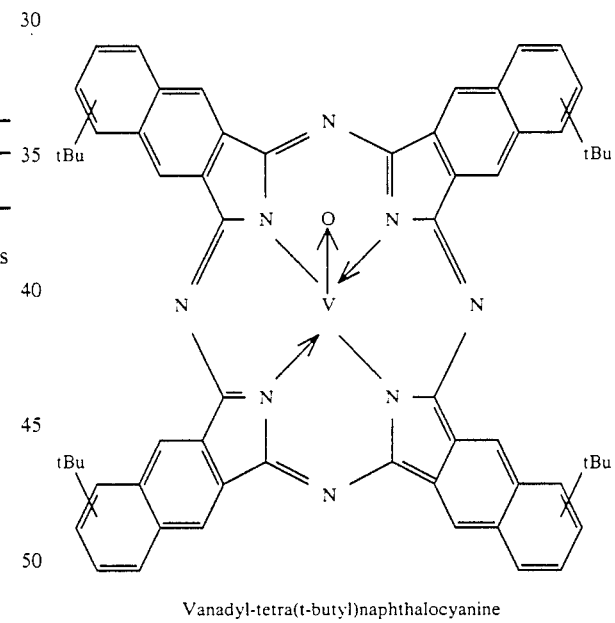

Vanadyl-tetra(t-butyl)naphthalocyanine

COMPARATIVE EXAMPLE 2

Figure 43:
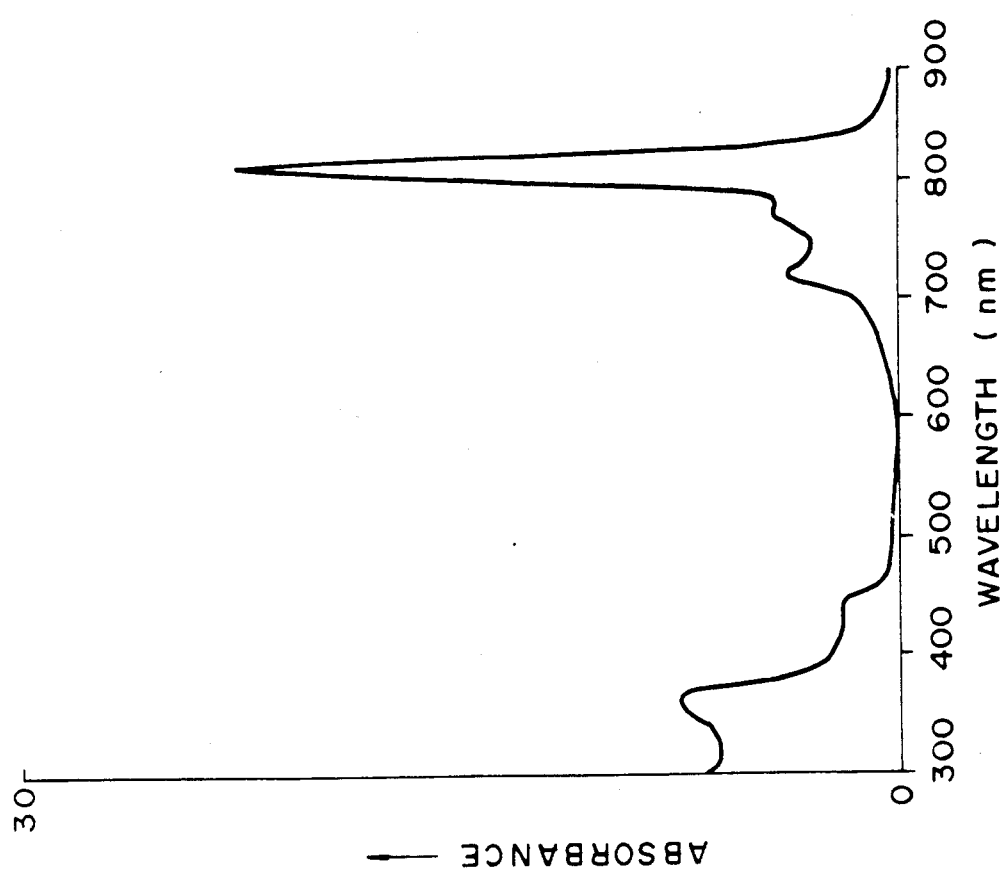
FIG. 43 is a transmission spectrum of a spin-coated film of vanadyl-tetra(t-butyl)naphthalocyanine.
Figure 44:
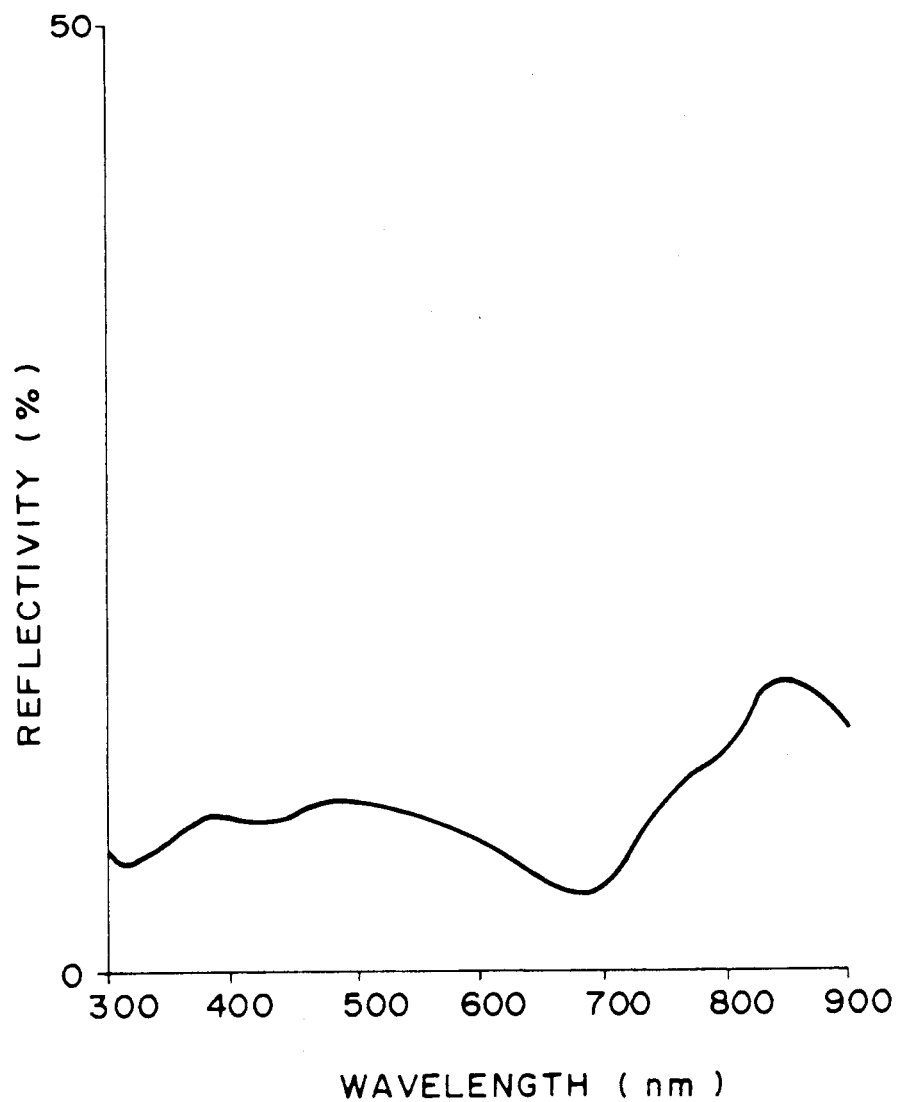
FIG. 44 is a 5° regular-reflection spectrum of a spin-coated film of vanadyl-tetra(t-butyl)naphthalocyanine.

An organic film of the same vanadyl-tetra(t-butyl) naphthalocyanine as used in Comparative Example 1 was formed on a glass plate in the same manner as in Test Example 2, and transmission spectrum (FIG. 43) and 5° regular-reflection spectrum (FIG. 44) of the organic film were measured. The organic film did not have very high light-absorbing ability and reflectivity (20% or less) in the diode laser region (780 to 830 nm).

TEST EXAMPLE 3

Figure 45:
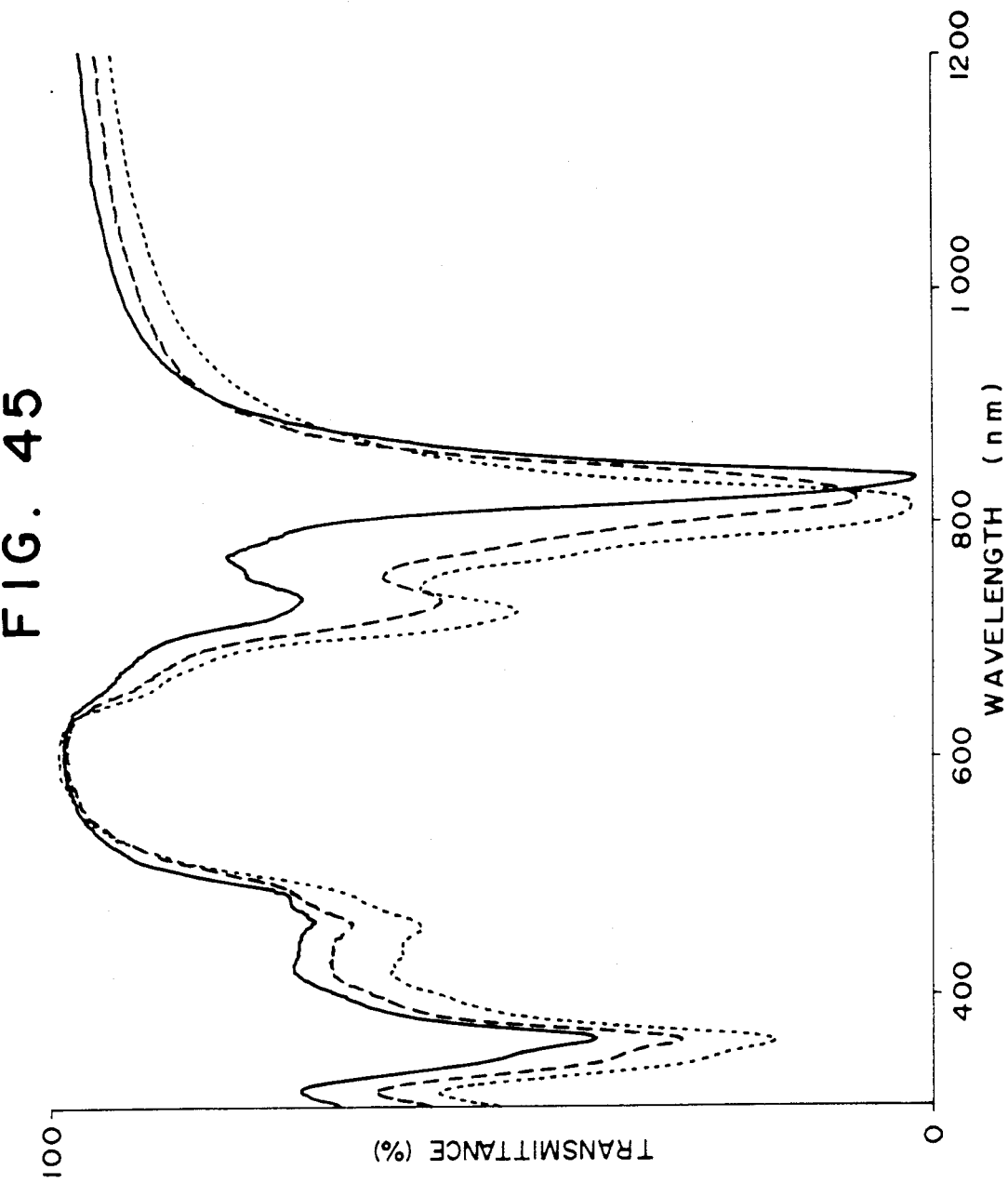
FIG. 45 shows transmission spectra of spin-coated films of bis(triethylsiloxy)silicon-tetra(n-decylthio)-naphthalocyanine [illustrative compound (127)](......), bis(tri-n-propylsiloxy)silicon-tetra(n-decylthio)naphthalocyanine [illustrative compound (99)](---), and bis(-tri-n-butylsiloxy)silicon-tetra(n-decylthio)naphthalocyanine [illustrative compound (102)](—).
Figure 46:
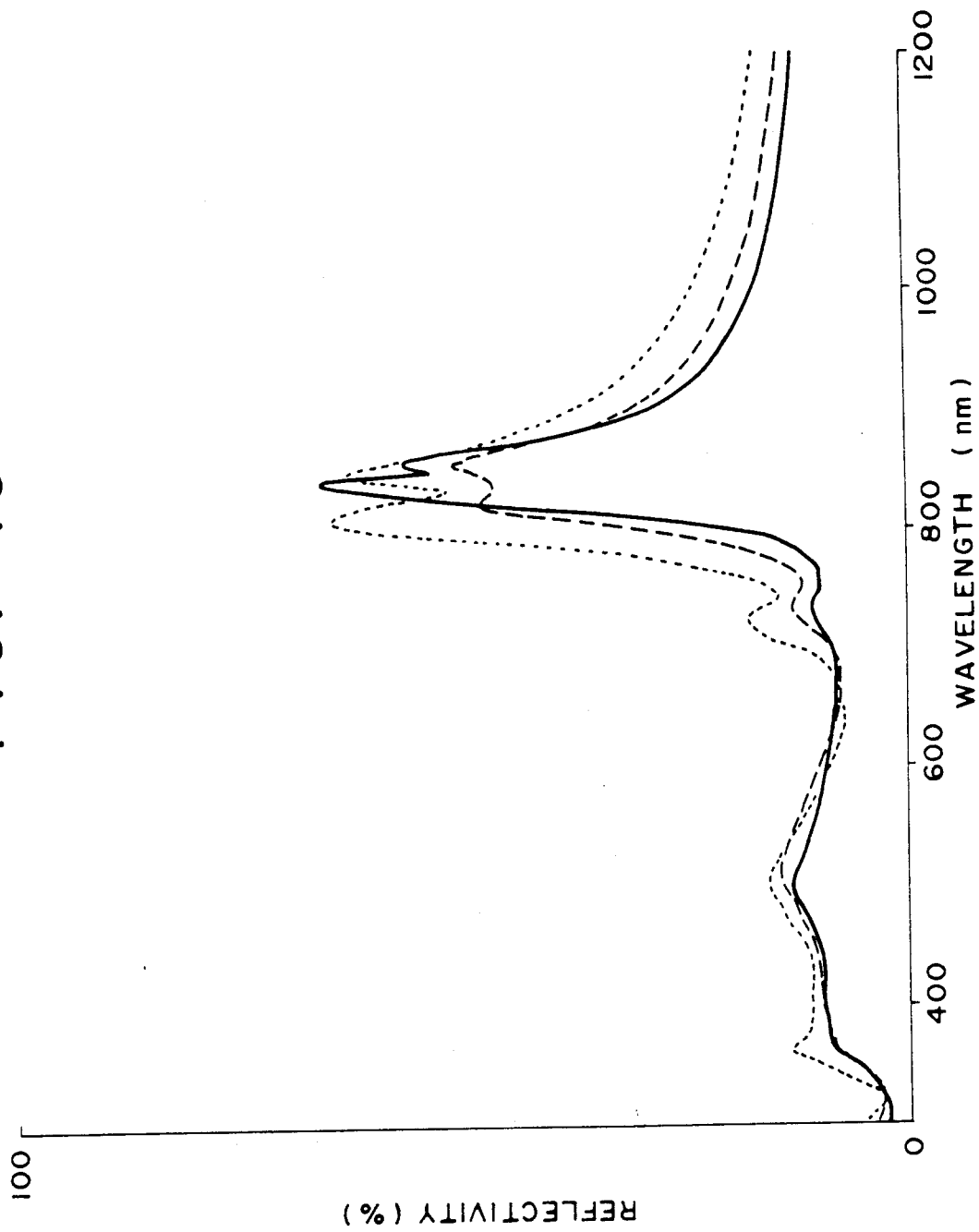
FIG. 46 shows 5° regular-reflection spectra of spin-coated films of bis(triethylsiloxy)silicon-tetra(n-decylthio)naphthalocyanine [illustrative compound (127)](......), bis(tri-n-propylsiloxy)silicon-tetra(n-decylthio)naphthalocyanine [illustrative compound (99)](---), and bis(tri-n-butylsiloxy)silicon-tetra(n-decylthio)naphthalocyanine [illustrative compound (102)](—).

A solution composed of 1 part by weight of each of the naphthalocyanine derivatives (127), (99) and (102) exemplified and 99 parts by weight of tetrahydrofuran was coated on a glass plate by a spin coating method and dried at about 80° C. for about 15 minutes to form an organic film. Transmission spectra and 5° regular-reflection spectra of the thus formed organic films of the naphthalocyanine derivatives are summarized in FIG. 45 and FIG. 46, respectively. The organic films were found to have a high light-absorbing ability and a high reflectivity (>40%) in the diode laser region (780 to 830 nm).

TEST EXAMPLE 4

The solubility of bis(tri-n-propylsiloxy)silicon-tetra (n-decylthio)naphthalocyanine [illustrative compound (99)] was measured in the following manner. In a 2-ml sample tube were placed 100 mg of bis (tri-n-propylsiloxy)silicon-tetra(n-decylthio)naphthalocyanine and 0.5 ml of a solvent, and the sample tube was tightly stoppered, followed by ultrasonic agitation at 40° C. for 15 minutes. Subsequently, the sample tube was allowed to stand overnight at room temperature, and its contents were filtered. The residue on filter paper was collected and then dried under reduced pressure, after which the solubility was calculated from the remainder after substraction of the amount of the residue from the initial amount of said compound.

$$\text{Solubility} = \frac{0.1 - \text{Amount of the residue on filter paper}}{0.5} \times 100$$

| Solvent | Solubility (%) |
|---|---|
| Benzene | >20 |
| Toluene | >20 |
| Xylene | >20 |
| Tetrahydrofuran | >20 |
| 1,1,2-Trichloroethane | 6.6 |
| Chloroform | >20 |

EXAMPLE 6

Synthesis of bis(triethylsiloxy)silicon-tetra (n-decylthio)naphthalocyanine (illustrative compound (127))

To a solution of 132 mg (0.1 m mol) of bis(triethylsiloxy)silicon-tetrabromonaphthalocyanine in a mixture of 10 ml of quinoline and 3.2 ml of pyridine was added 2.08 g (8.8 m mols) of cuprous n-decylthiolate synthesized according to the method described in Organic Syntheses, vol. 42, p. 22, and the resulting mixture was refluxed at 160° to 170° C. for 8 hours. After cooling, the reaction mixture was treated in the same manner as in Example 1 to obtain 126 mg (75%) of yellow-green crystals. The yellow-green crystals were confirmed to be bis(triethylsiloxy)silicon-tetra(n-decylthio)naphthalocyanine [illustrative compound (127)] from the following analysis results:

(1) Melting point: 278°–280° C.
(2) Elementary analysis values:

|  | C | H | N |
|---|---|---|---|
| Calculated (%) | 70.95 | 7.98 | 6.62 |
| Found (%) | 70.68 | 7.82 | 6.75 |

Figure 47:
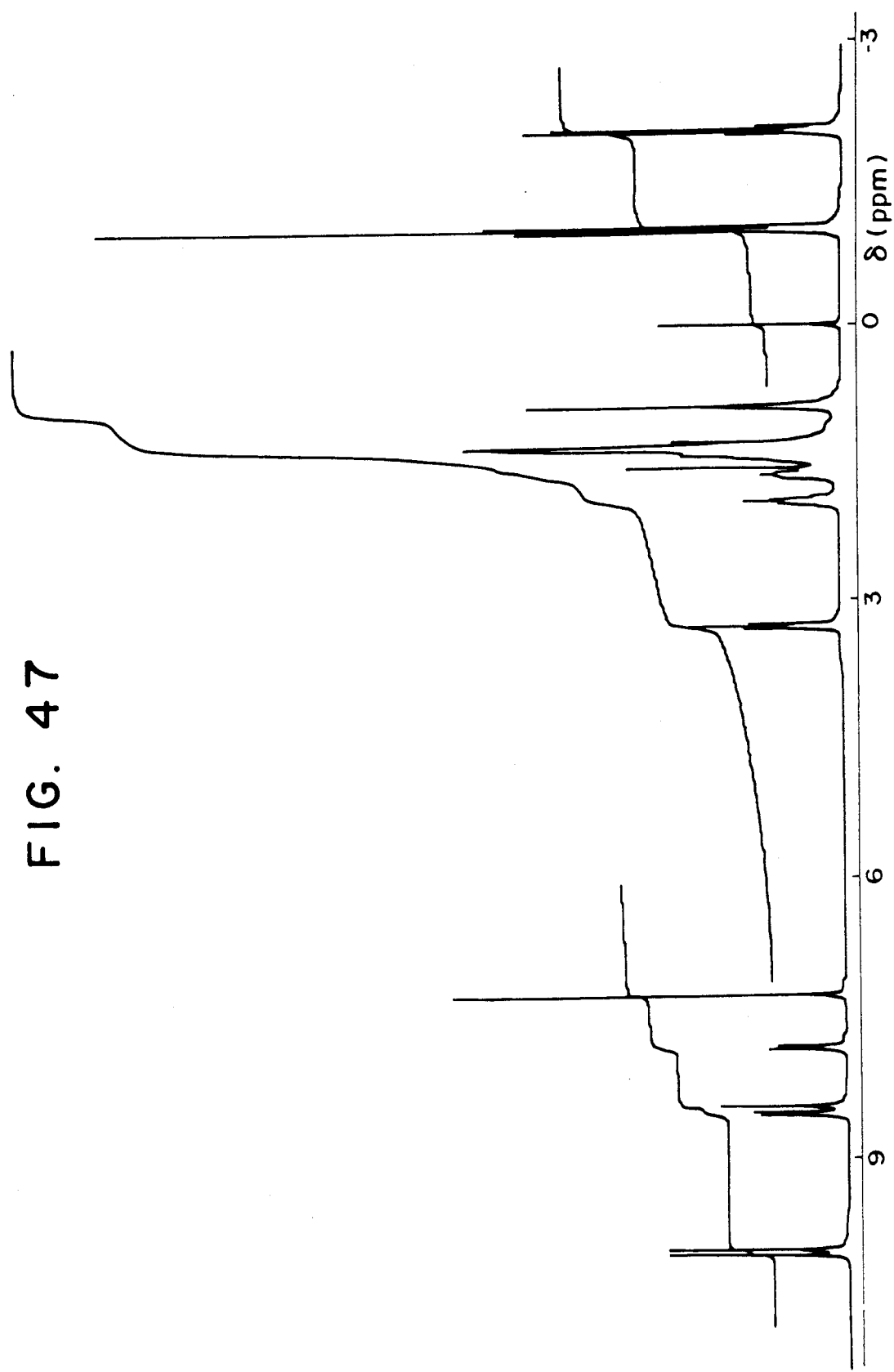
FIG. 47 is an NMR spectrum of bis(triethylsiloxy)silicon-tetra (n-decylthio)naphthalocyanine.

(3) NMR spectrum values (the NMR spectrum is shown in FIG. 47): CDCl$_3$:

δ values:
10.02 (4H, br-s),
9.97 (4H, br-s),
8.53 (4H, d, J=8.85 Hz),
8.45 (4H, br-s),
7.81 (4H, dd, J=8.85, 1.83 Hz),
3.29 (8H, t, J=7.33 Hz),
1.93 (8H, quintet, J=7.33 Hz),
1.64 (8H, m),
1.33 (48H, m),
0.90 (12H, t-like m),
−1.01 (18H, t, J=7.94 Hz),
−2.07 (12H, q, J=7.94 Hz)

Figure 48:
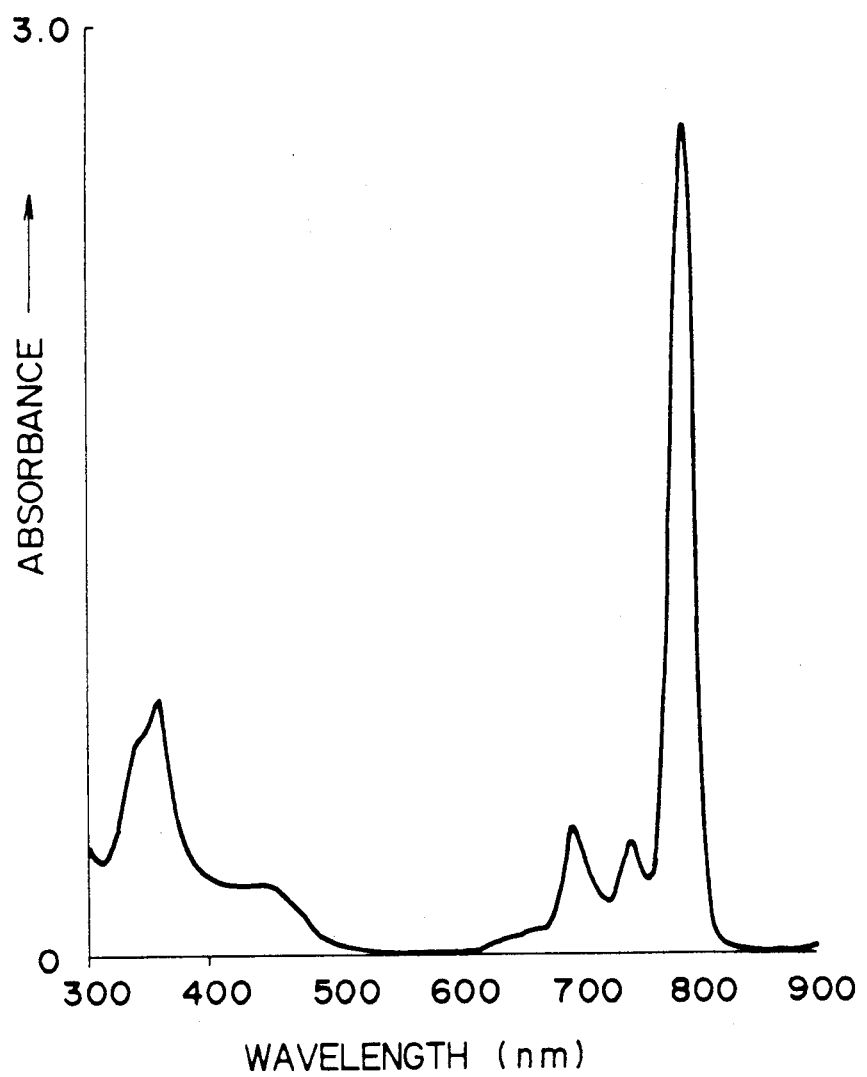
FIG. 48 is an electronic spectrum of bis(triethylsiloxy)silicon-tetra (n-decylthio)naphthalocyanine.
Figure 49:
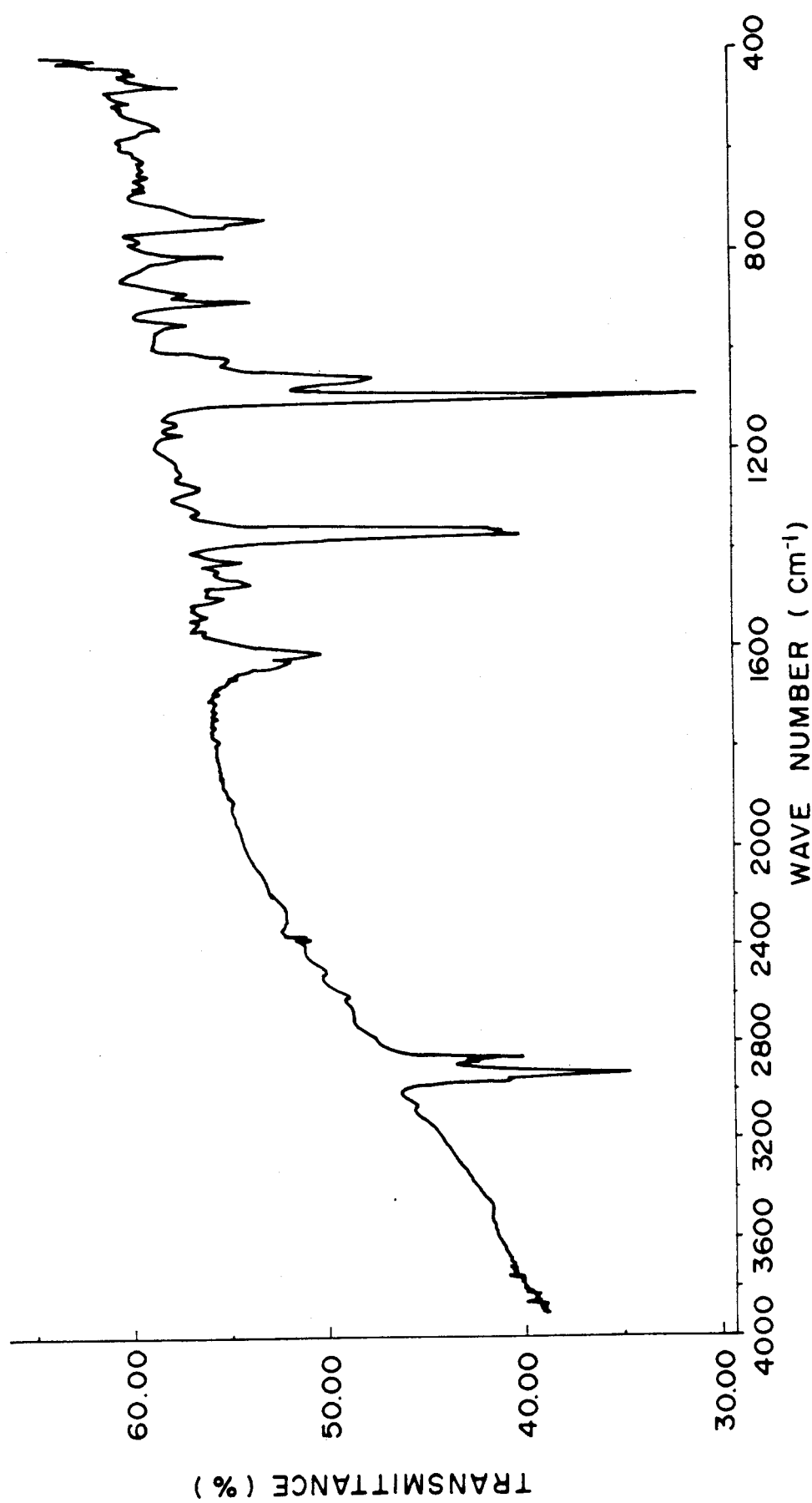
FIG. 49 is an IR spectrum of bis(triethylsiloxy)silicon-tetra(n-decylthio) naphthalocyanine.

(4) Electronic spectrum (CHCl$_3$ solution) is shown in FIG. 48.
(5) IR spectrum (KBr) is shown in FIG. 49.

EXAMPLE 7

Synthesis of bis(triethylsiloxy)silicon-tetra (n-dodecylthio)naphthalocyanine (illustrative compound (95))

To a solution of 132 mg (0.1 m mol) of bis (triethylsiloxy)silicon-tetrabromonaphthalocyanine in a mixture of 10 ml of quinoline and 3.2 ml of pyridine was added 2.33 g (8.8 m mols) of cuprous n-dodecylthiolate synthesized according to the method described in Organic Syntheses, vol. 42, p. 22, and the resulting mixture was refluxed at 160° to 170° C. for 8 hours. After cooling, the reaction mixture was treated in the same manner as in Example 1 to obtain 93 mg (52%) of yellow-green crystals. The yellow-green crystals were confirmed to be bis(triethylsiloxy)silicon-tetra(n-dodecylthio)naphthalocyanine [illustrative compound (95)] from the following analysis results:

(1) Melting point: 261°–263° C.
(2) Elementary analysis values:

|  | C | H | N |
|---|---|---|---|
| Calculated (%) | 71.86 | 8.38 | 6.21 |
| Found (%) | 71.92 | 8.13 | 6.09 |

Figure 50:
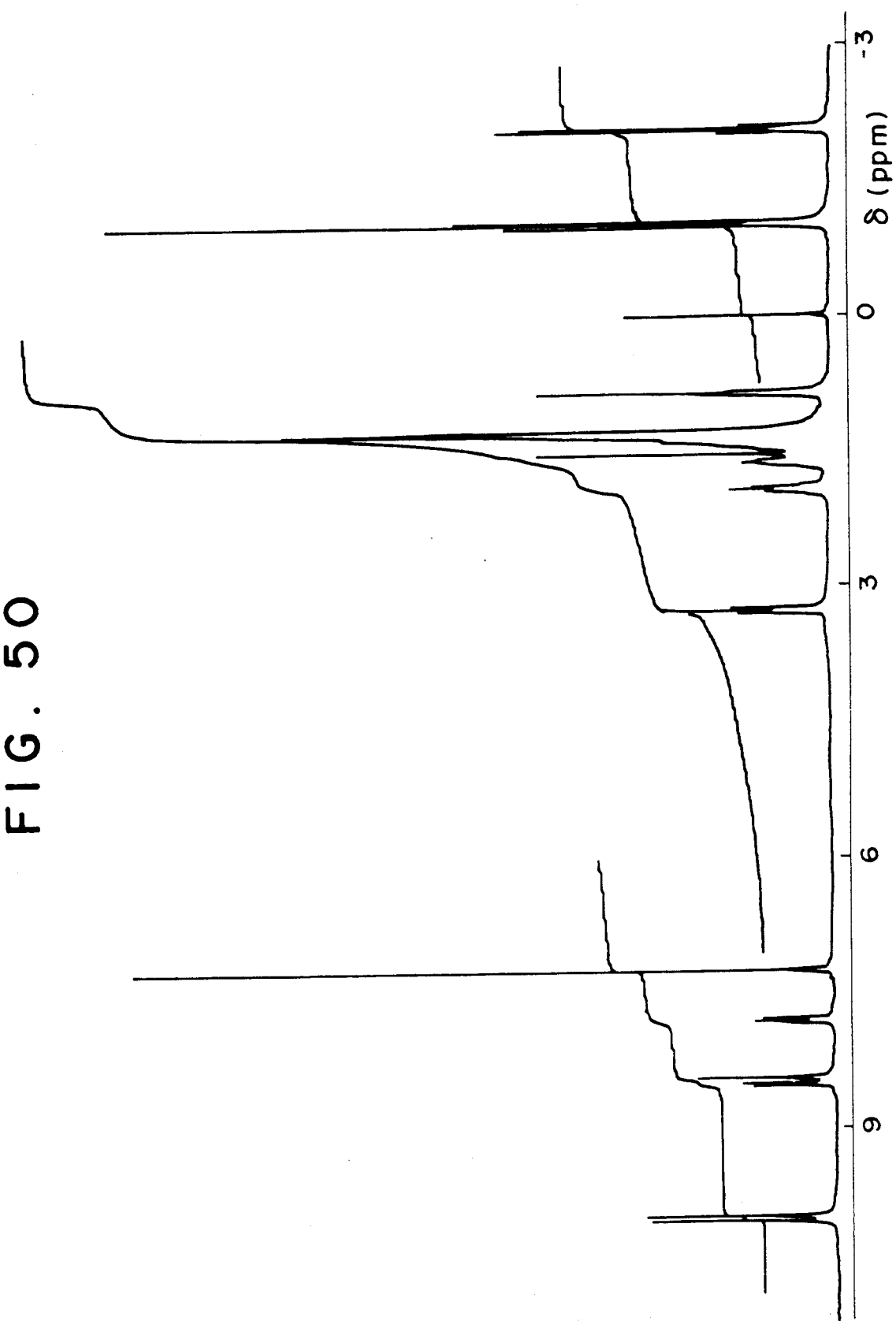
FIG. 50 is an NMR spectrum of bis(triethylsiloxy)silicon-tetra (n-dodecylthio)naphthalocyanine.

(3) NMR spectrum values (the NMR spectrum is shown in FIG. 50): CDCl$_3$:

δ values:
10.02 (4H, br-s),
9.97 (4H, br-s),
8.53 (4H, d, J=8.85 Hz),
8.45 (4H, br-s), 7.81 (4H, dd, J=8.85, 1.83 Hz), 3.29 (8H, t, J=7.33 Hz), 1.93 (8H, quintet, J=7.33 Hz), 1.64 (8H, m), 1.30 (64H, m), 0.88 (12H, t-like m), −1.02 (18H, t, J=7.94 Hz), −2.07 (12H, q, J=7.94 Hz)

Figure 51:
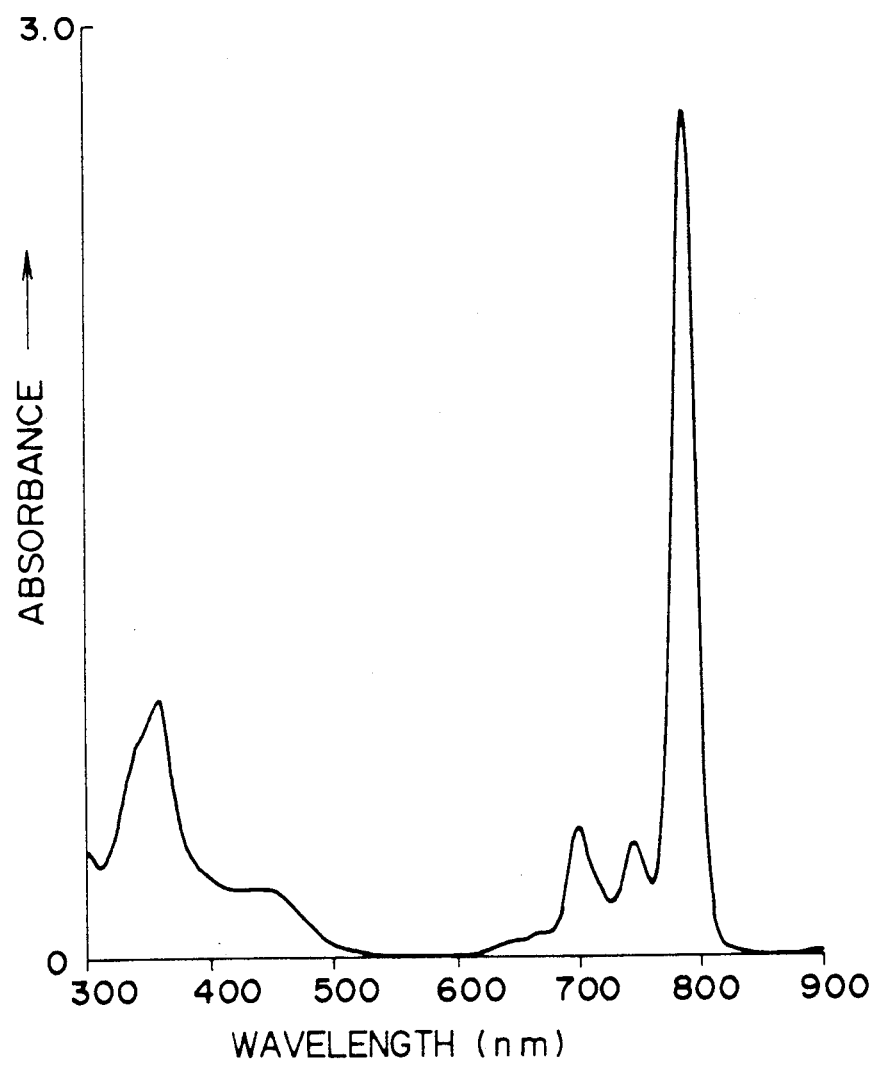
FIG. 51 is an electronic spectrum of bis(triethylsiloxy)silicon-tetra (n-dodecylthio)naphthalocyanine.
Figure 52:
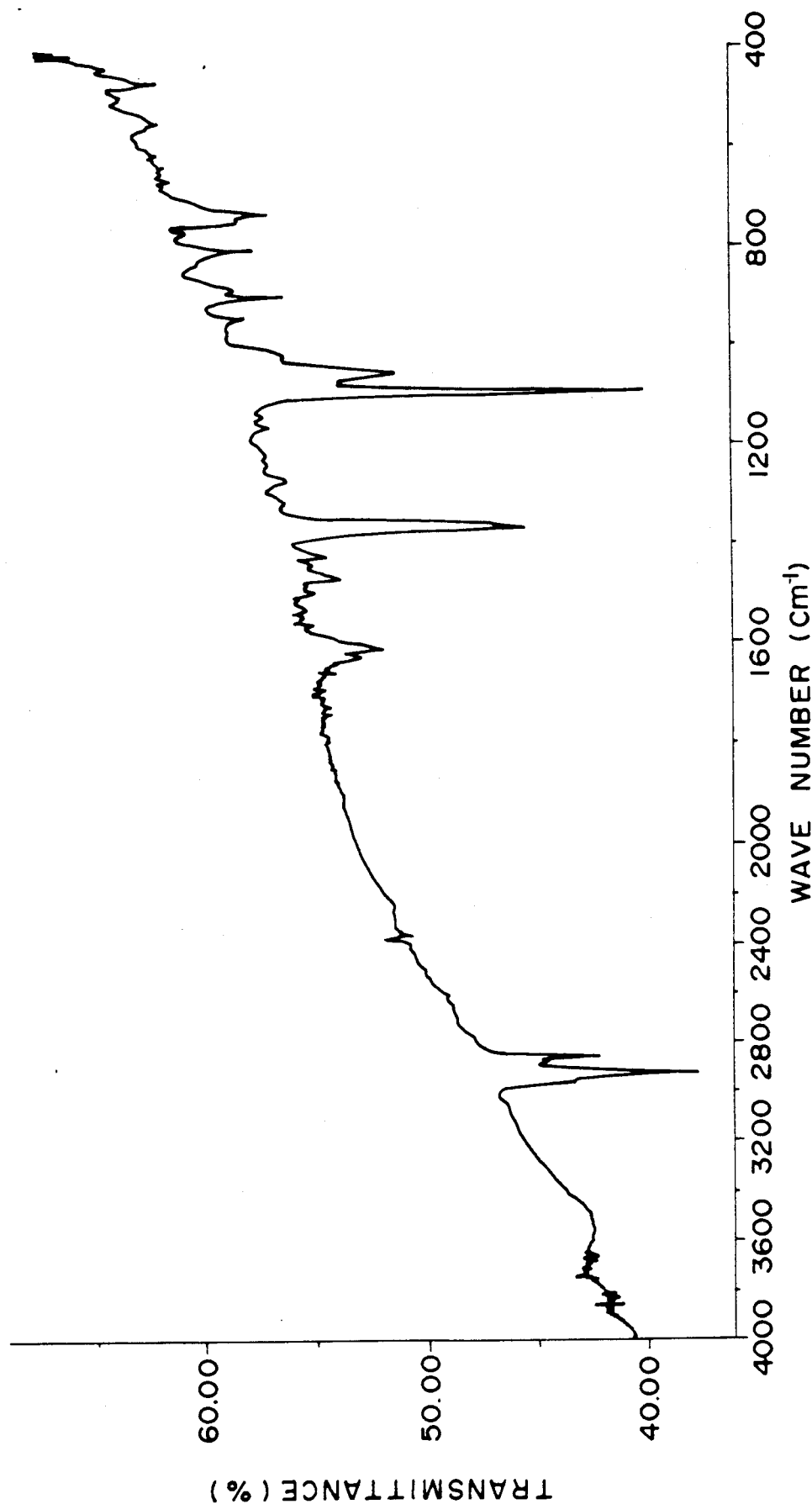
FIG. 52 is an IR spectrum of bis(triethylsiloxy)silicon-tetra (n-dodecylthio)naphthalocyanine.

(4) Electronic spectrum (CHCl solution) is shown in FIG. 51.
(5) IR spectrum (KBr) is shown in FIG. 52.

EXAMPLE 8

Synthesis of bis(tri-n-butylsiloxy)silicon-tetra (n-decylthio)naphthalocyanine (illustrative compound (102))

To a solution of 142 mg (0.1 m mol) of bis(tri-n-butylsiloxy)silicon-tetrabromonaphthalocyanine in a mixture of 10 ml of quinoline and 3.2 ml of pyridine was added 2.08 g (8.8 m mols) of cuprous n-decylthiolate synthesized according to the method described in Organic Syntheses, vol. 42, p. 22, and the resulting mixture was refluxed at 160° to 170° C. for 8 hours. After cooling, the reaction mixture was treated in the same manner as in Example 1 to obtain 112 mg (63%) of yellow-green crystals. The yellowgreen crystals were confirmed to be bis(tri-n-butylsiloxy)silicon-tetra(n-decylthio)naphthalocyanine illustrative compound (102)] from the following analysis results:

(1) Melting point: 122°–123° C.
(2) Elementary analysis values:

|  | C | H | N |
|---|---|---|---|
| Calculated (%) | 72.28 | 8.56 | 6.02 |
| Found (%) | 72.07 | 8.32 | 6.28 |

Figure 53:
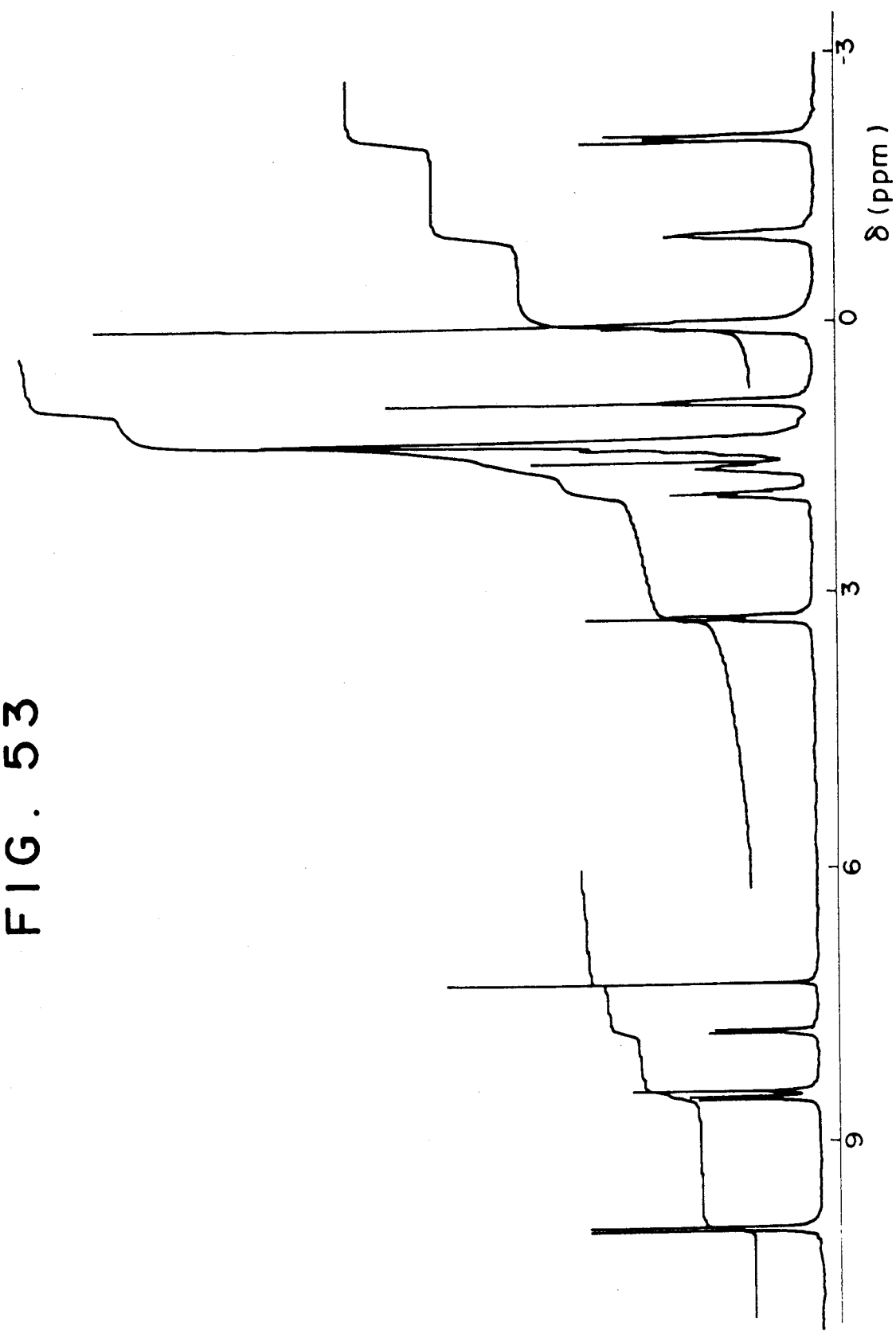
FIG. 53 is an NMR spectrum of bis(tri-n-butylsiloxy)-silicon-tetra (n-decylthio)naphthalocyanine.

(3) NMR spectrum values (the NMR spectrum is shown in FIG. 53): CDCl$_3$:
δ values:
10.00 (4H, br-s),
9.95 (4H, br-s),
8.53 (4H, d, J=8.55 Hz),
8.45 (4H, br-s),
7.80 (4H, dd, J=8.55, 1.53 Hz),
3.31 (8H, t, J=7.33 Hz),
1.93 (8H, quintet, J=7.33 Hz),
1.64 (8H, m),
1.33 (48H. m),
0.90 (12H, t-like m),
0.02 (30H, m),
−0.96 (12H, sextet-like m),
−2.06 (12H, t-like m)

Figure 54:
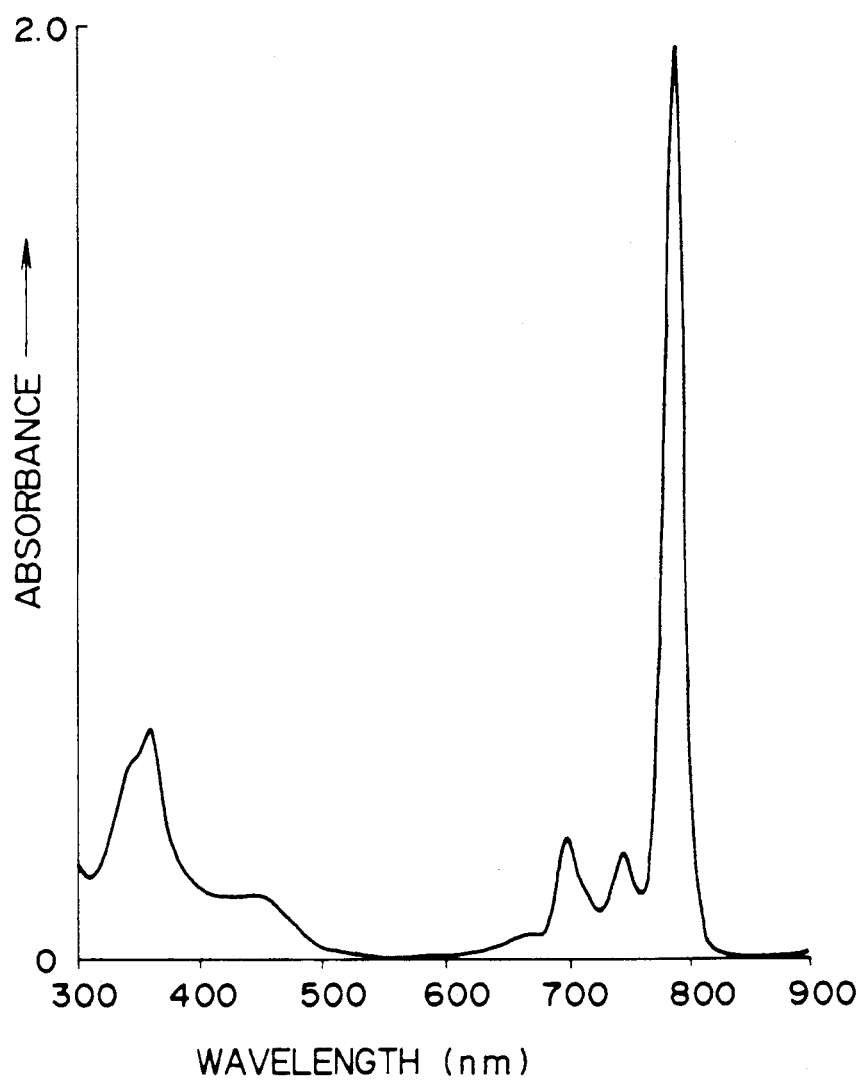
FIG. 54 is an electronic spectrum of bis(tri-n-butylsiloxy)silicon-tetra (n-decylthio)naphthalocyanine.
Figure 55:
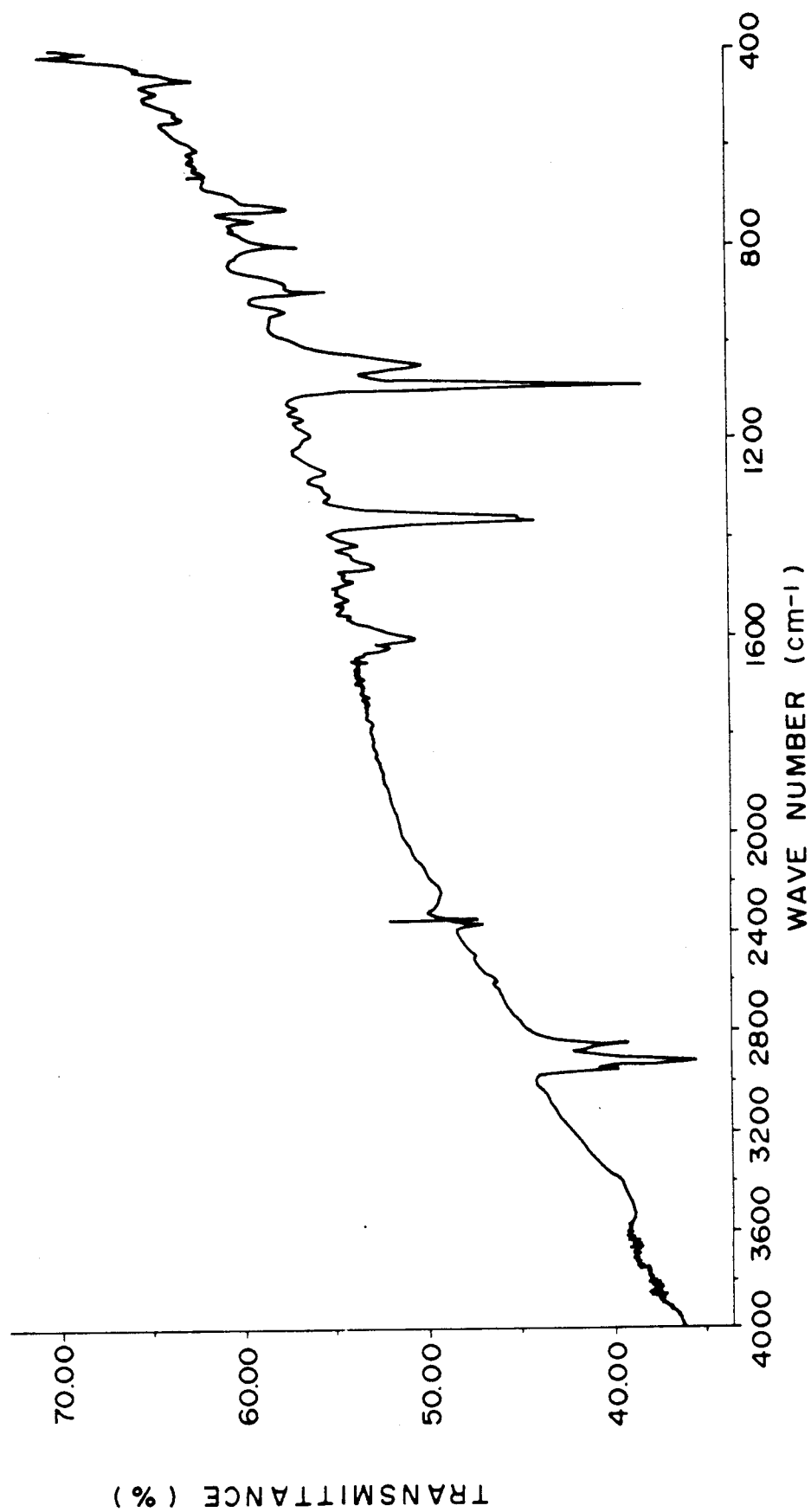
FIG. 55 is an IR spectrum of bis(tri-n-butylsiloxy)silicon-tetra (n-decylthio)naphthalocyanine.

(4) Electronic spectrum (CHCl$_3$ solution) is shown in FIG. 54.
(5) IR spectrum (KBr) is shown in FIG. 55.

EXAMPLE 9

Synthesis of bis(tri-n-hexylsiloxy)silicon-tetra (n-dodecylthio)naphthalocyanine (illustrative compound (167))

To a solution of 166 mg (0.1 m mol) of bis(tri-n-hexylsiloxy)silicon-tetrabromonaphthalocyanine in a mixture of 10 ml of quinoline and 3.2 ml of pyridine was added 2.33 g (8.8 m mols) of cuprous n-dodecylthiolate synthesized according to the method described in Organic Syntheses, vol. 42, p. 22, and the resulting mixture was refluxed at 160° to 170° C. for 8 hours. After cooling, the reaction mixture was treated in the same manner as in Example 1 to obtain 89 mg (42%) of a green oil. The green oil was confirmed to be bis(tri-n-hexylsiloxy)silicon-tetra(n-dodecylthio)naphthalocyanine [illustrative compound (167)] from the following analysis results:

|  | C | H | N |
|---|---|---|---|
| Calculated (%) | 74.03 | 9.32 | 5.23 |
| Found (%) | 73.91 | 9.18 | 5.46 |

Figure 56:
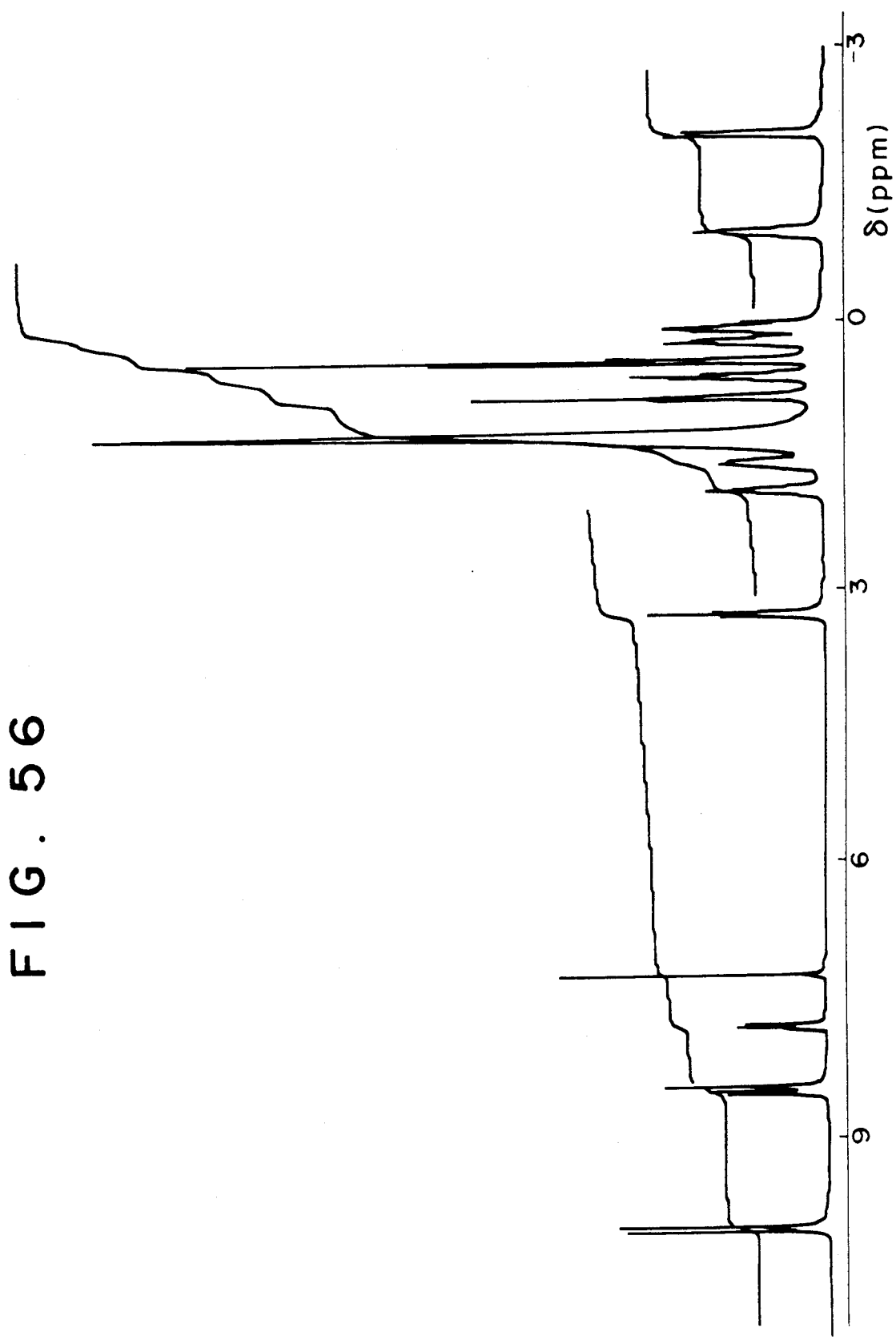
FIG. 56 is an NMR spectrum of bis(tri-n-hexylsiloxy)silicon-tetra (n-dodecylthio)naphthalocyanine.

(2) NMR spectrum values (the NMR spectrum is shown in FIG. 56): CDCl$_3$:
δ values:
10.00 (4H, br-s),
9.95 (4H, br-s),
8.52 (4H, d, J=8.85 Hz),
8.46 (4H, br-s), 7.81 (4H, dd, J=8.85, 1.52 Hz), 3.29 (8H, t, J=7.32 Hz), 1.92 (8H, quintet, J=7.32 Hz), 1.63 (8H, m), 1.30 (64H, m), 0.88 (12H, t-like m), 0.63 (12H, sextet, J=7.32 Hz), 0.18H, t, J=7.32 Hz), 0.23 (12H, quintet, J=7.32 Hz), 0.07 (12H, quintet, J=7.32 Hz), −0.99 (12H, quintet-like m), −2.07 (12H, t-like m)

Figure 57:
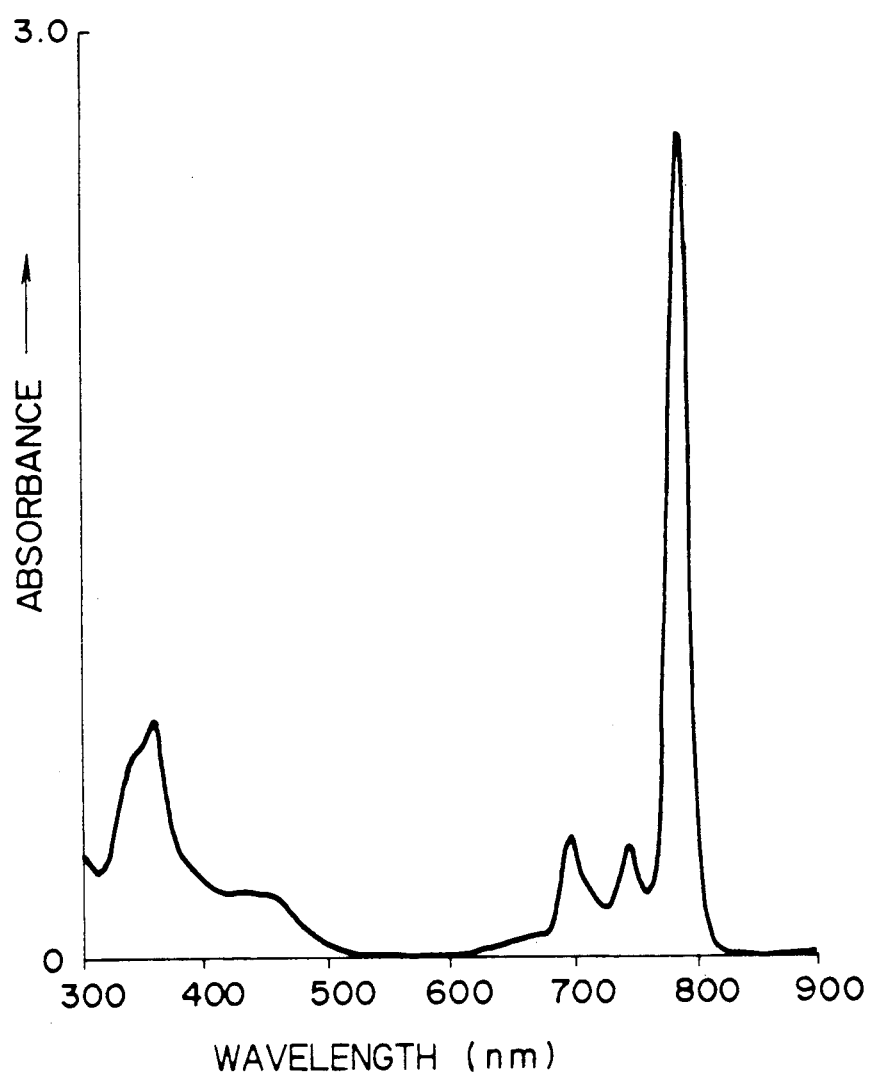
FIG. 57 is an electronic spectrum of bis(tri-n-hexylsiloxy)silicon-tetra (n-dodecylthio)naphthalocyanine.
Figure 58:
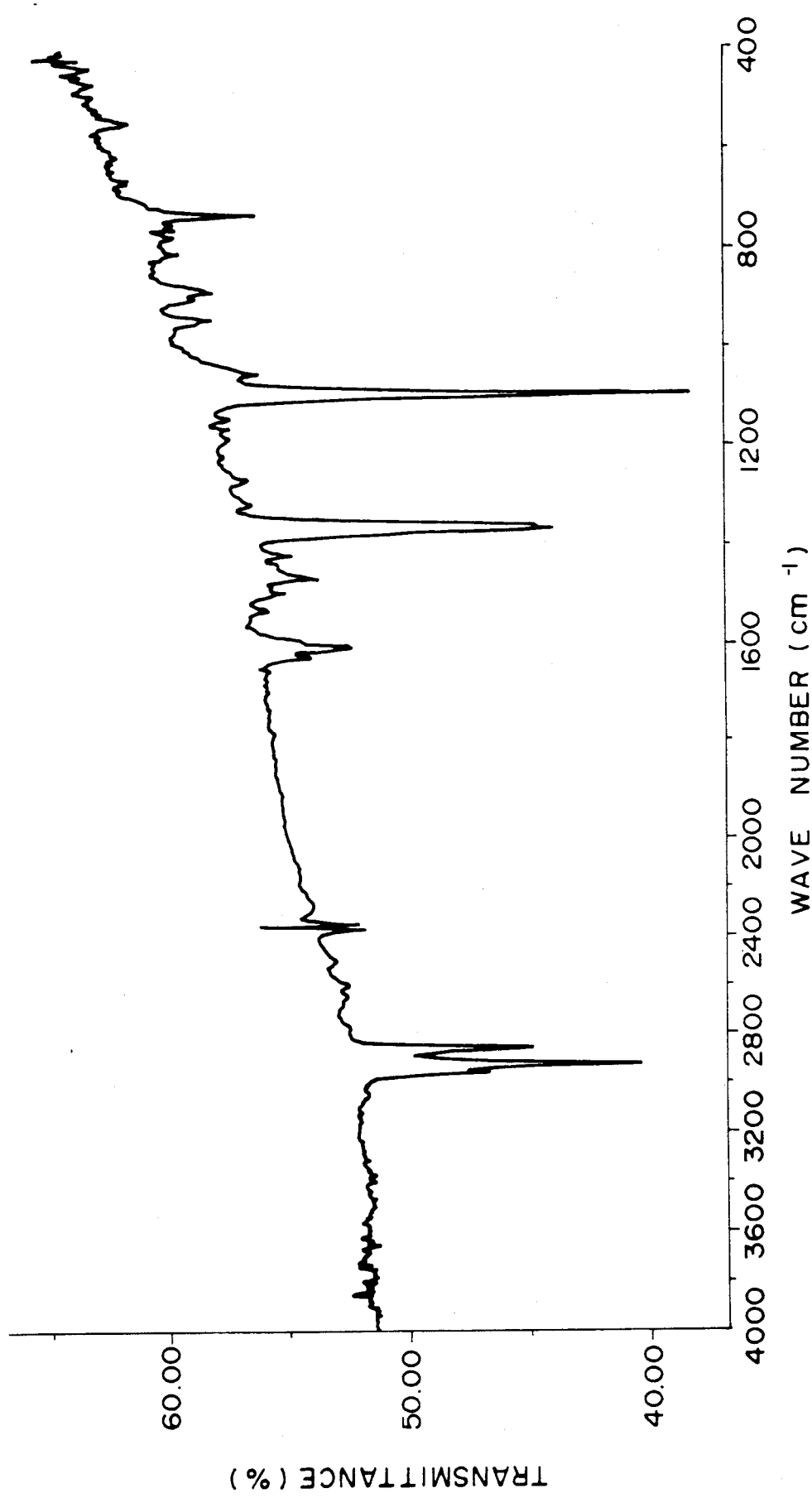
FIG. 58 is an IR spectrum of bis-(tri-n-hexylsiloxy)-silicon-tetra (n-dodecylthio)naphthalocyanine.

(3) Electronic spectrum (CHCl$_3$ solution) is shown in FIG. 57.
(4) IR spectrum (KBr) is shown in FIG. 58.

Synthesis of bis(tri-n-propylsiloxy)silicon-tetrakis-[(2(2'-ethylhexyloxycarbonyl)ethylthio]naphthalocyanine illustrative compound (143)]

To a solution of 140 mg (0.1 m mol) of bis (tri-n-propylsiloxy)silicon-tetrabromonaphthalocyanine in a mixture of 10 ml of quinoline and 3.2 ml of (2'-ethylhexyloxycarbonyl)ethylthiolate synthesized according to the method described in Organic Syntheses, vol. 42, p. 22, and the resulting mixture was refluxed at 160° to 170° C. for 8 hours. After cooling, the reaction mixture was treated in the same manner as in Example 1 to obtain 46 mg (24%) of yellow-green crystals. The yellow-green crystals were confirmed to be bis(tri-n-propylsiloxy)silicon-tetrakis-[2-(2'-ethylhexyloxycarbonyl)ethylthio]naphthalocyanine illustrative compound (143)] from the following analysis results:

(1) Melting point: 125°–127° C.
(2) Elementary analysis values:

|  | C | H | N |
|---|---|---|---|
| Calculated (%) | 67.65 | 7.54 | 5.74 |
| Found (%) | 67.89 | 7.42 | 5.65 |

Figure 59:
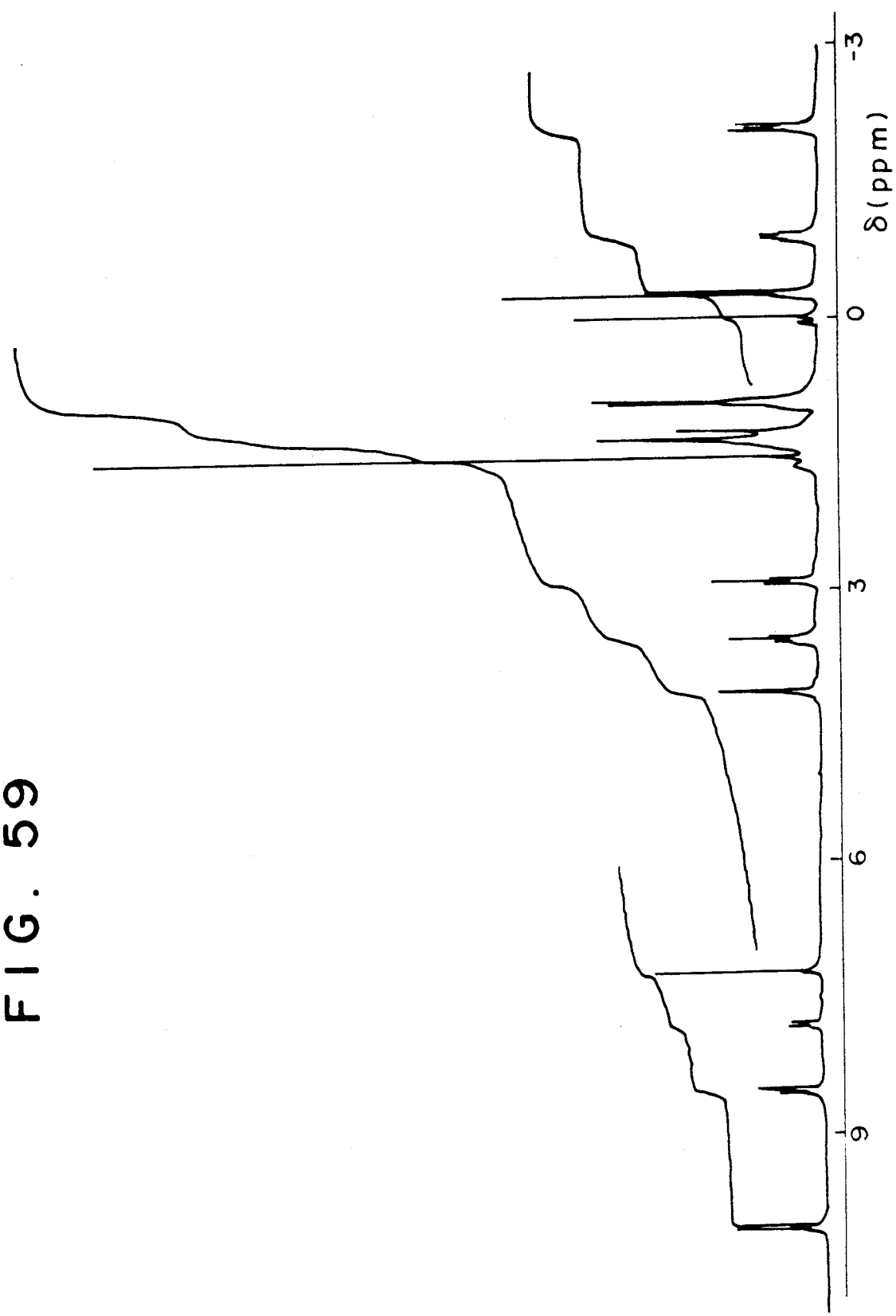
FIG. 59 is an NMR spectrum of bis(tri-n-propylsiloxy)silicon-tetrakis [2-(2'-ethylhexyloxycarbonyl)ethylthio]naphthalocyanine.

(3) NMR spectrum values (the NMR spectrum is shown in FIG. 59): CDCl$_3$:
δ values:
10.04 (4H, br-s),
10.00 (4H, br-s),
8.57 (4H, d, J=8.85 Hz),
8.53 (4H, br-s),
7.84 (4H, d, J=8.85 Hz),
4.14 (8H, d, J=5.80 Hz),
3.56 (8H, t, J=7.33 Hz),
2.93 (8H, t, J=7.33 Hz),
0.7–1.8 (36H, m),
0.94 (24H, m),
−0.27 (18H, t, J=7.33 Hz),
−0.87 (12H, sextet-like m),
−2.08 (12H, t-like m)

Figure 60:
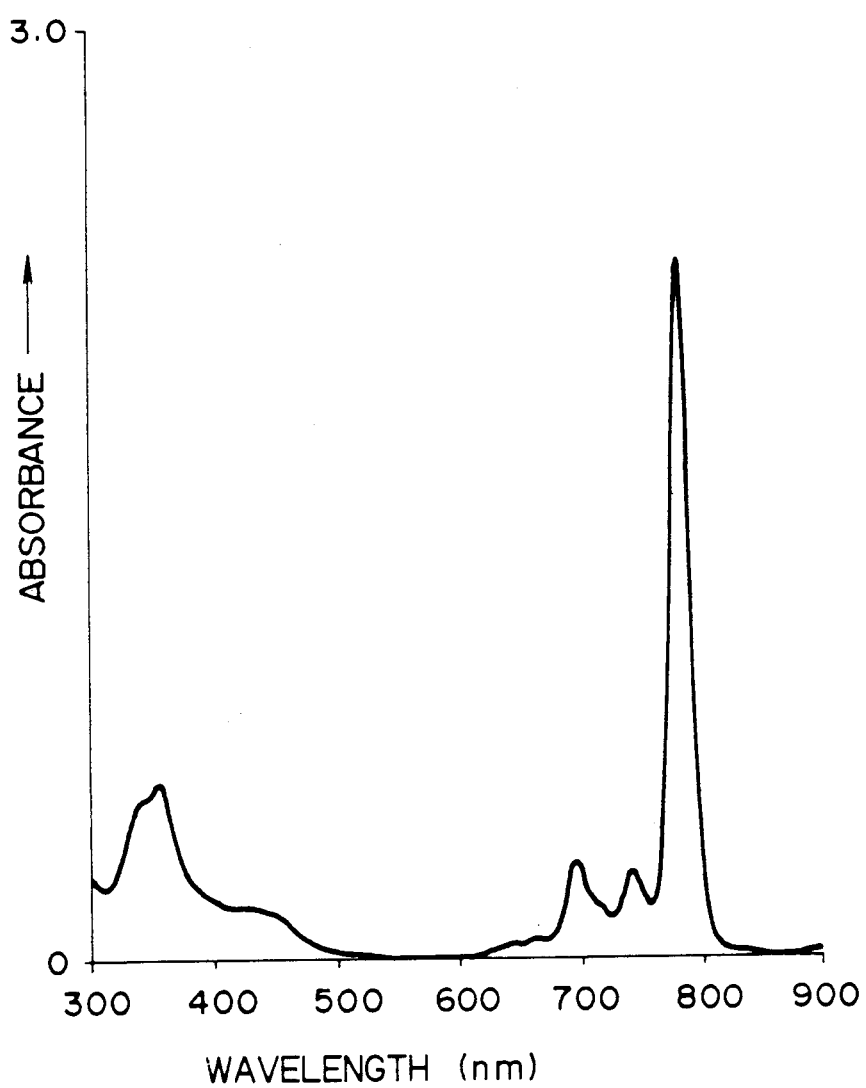
FIG. 60 is an electronic spectrum of bis(tri-n-propylsiloxy) silicon-tetrakis[2-(2'-ethylhexyloxycarbonyl)ethylthio]naphthalocyanine.
Figure 61:
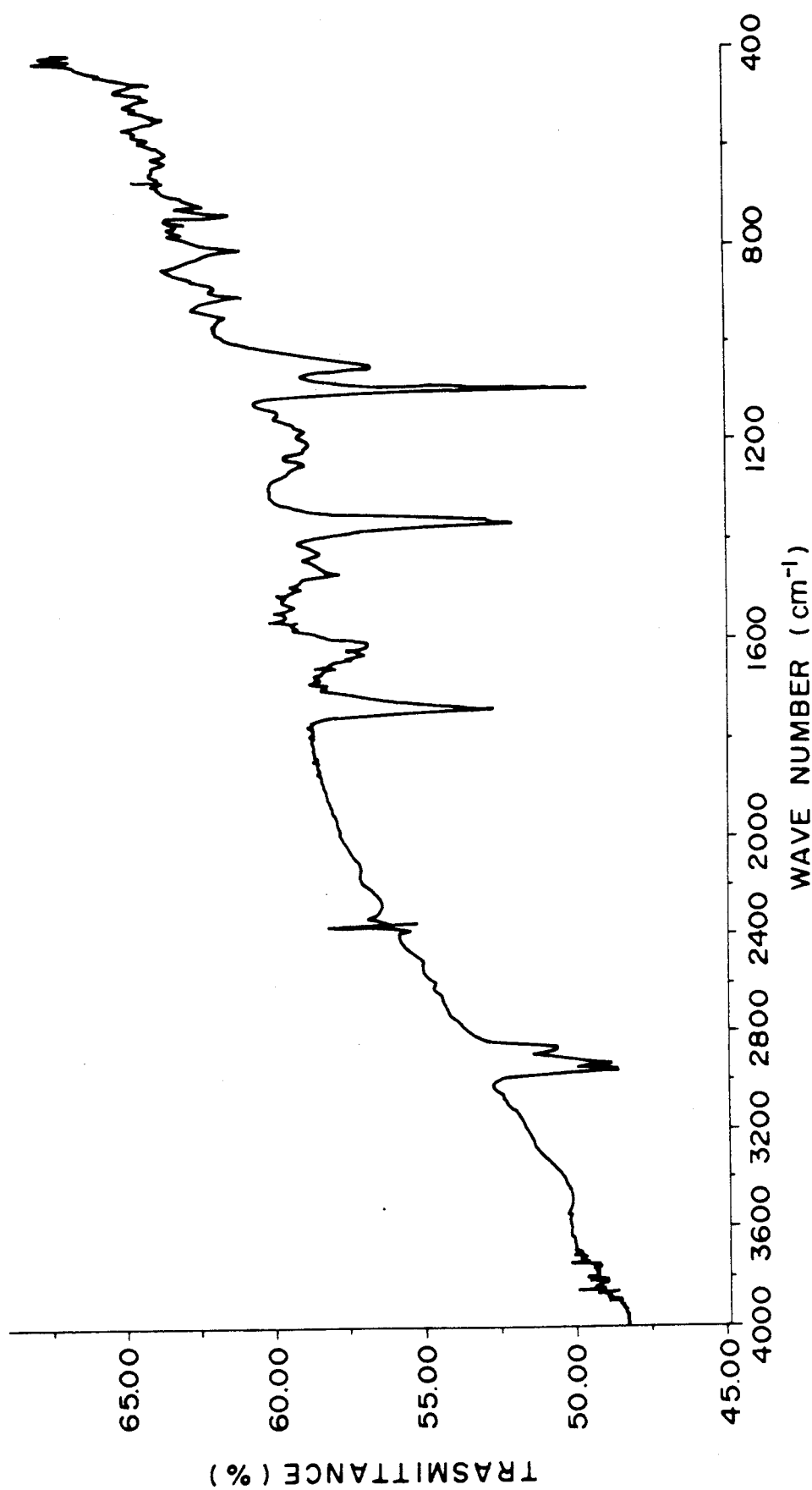
FIG. 61 is an IR spectrum of bis(tri-n-propylsiloxy)-silicon-tetrakis[2-(2'-ethylhexyloxycarbonyl)ethylthio)-naphthalocyanine.

(4) Electronic spectrum (CHCl$_3$ solution) is shown in FIG. 60.
(5) IR spectrum (KBr) is shown in FIG. 61.

EXAMPLE 11

Synthesis of bis(tri-n-propylsiloxy)silicon-tetrakis-[2-(2',2',4',4'-tetramethylpentyloxycarbonyl)ethylthio]naphthalocyanine [illustrative compound (146)]

To a solution of 140 mg (0.1 m mol) of bis (tri-n-propylsiloxy)silicon-tetrabromonaphthalocyanine in a mixture of 10 ml of quinoline and 3.2 ml of pyridine was added 2.59 g (8.8 m mols) of cuprous 2-(2', 2',4',4'-tetramethylpentyloxycarbonyl)ethylthiolate synthesized according to the method described in Organic Syntheses, vol. 42, p. 22, and the resulting mixture was refluxed at 160° to 170° C. for 8 hours. After cooling, the reaction mixture was treated in the same manner as in Example 1 to obtain 52 mg (26%) of yellow-green crystals. The yellow-green crystals were confirmed to be bis (tri-n-propylsiloxy)silicon-tetrakis-[2-(2',2',4', 4'-tetramethylpenthyloxycarbonyl)ethylthio]naphthalocyanine [illustrative compound (146)] from the following analysis results:
(1) Melting point. 131°–133° C.
(2) Elementary analysis values:

|  | C | H | N |
|---|---|---|---|
| Calculated (%) | 68.15 | 7.73 | 5.58 |
| Found (%) | 68.13 | 7.65 | 5.37 |

Figure 62:
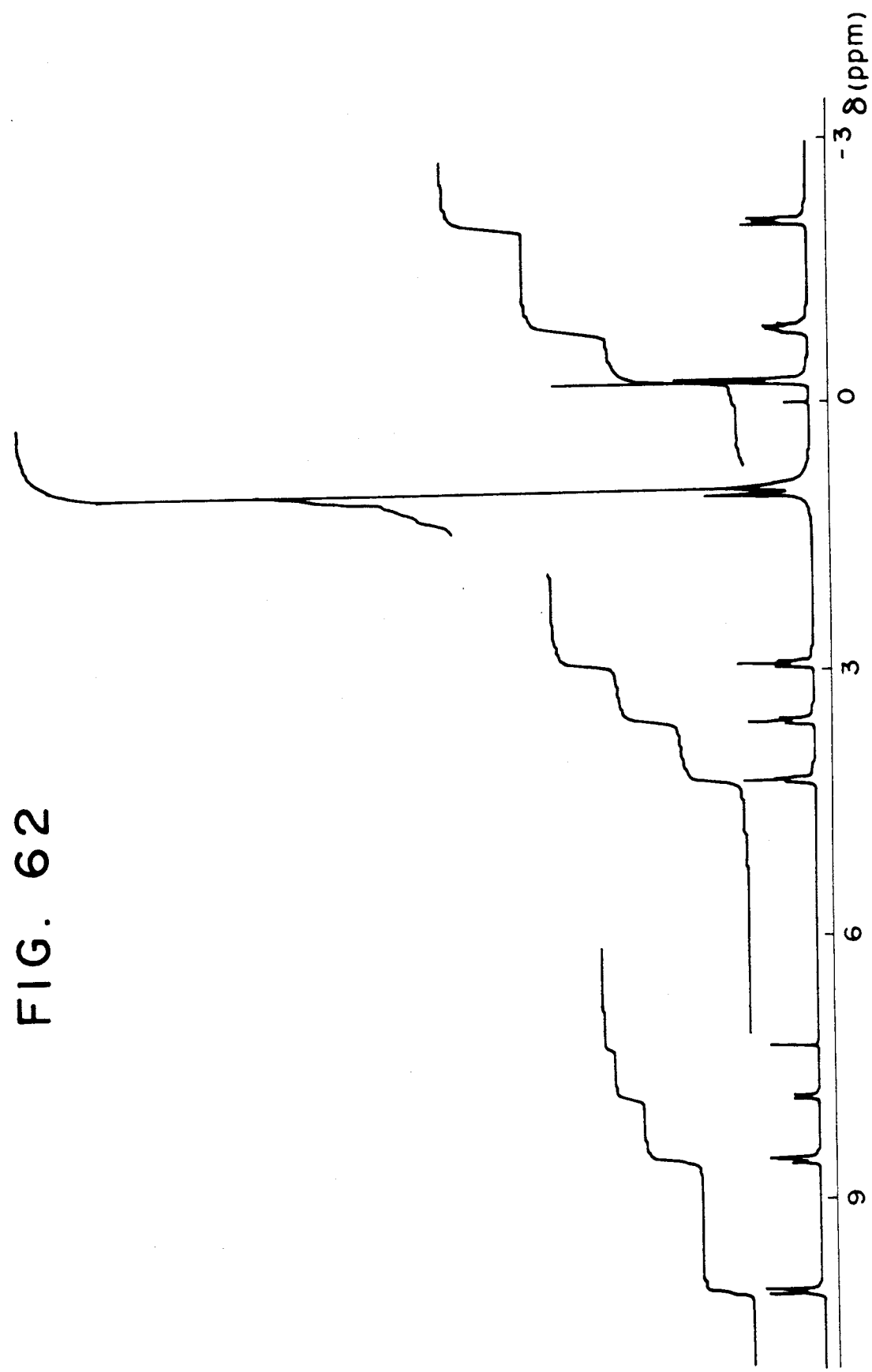
FIG. 62 is an NMR spectrum of bis(tri-n-propylsiloxy)silicon-tetrakis[2-(2',2',4',4'-tetramethylpentyloxycarbonyl) ethylthio]naphthalocyanine.
Figure 63:
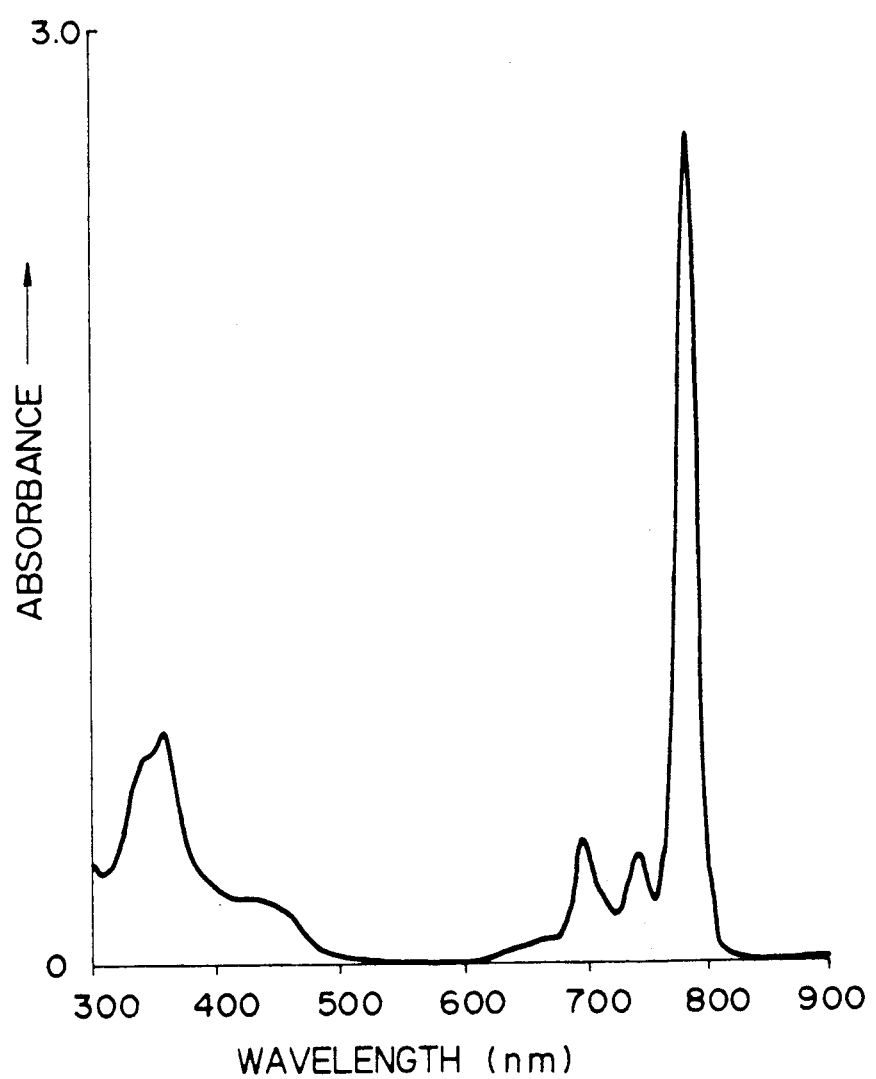
FIG. 63 is an electronic spectrum of bis(tri-n-propylsiloxy)silicon-tetrakis[2-(2',2',4',4'-tertramethylpentyloxycarbonyl)ethylthio]naphthalocyanine.
Figure 64:
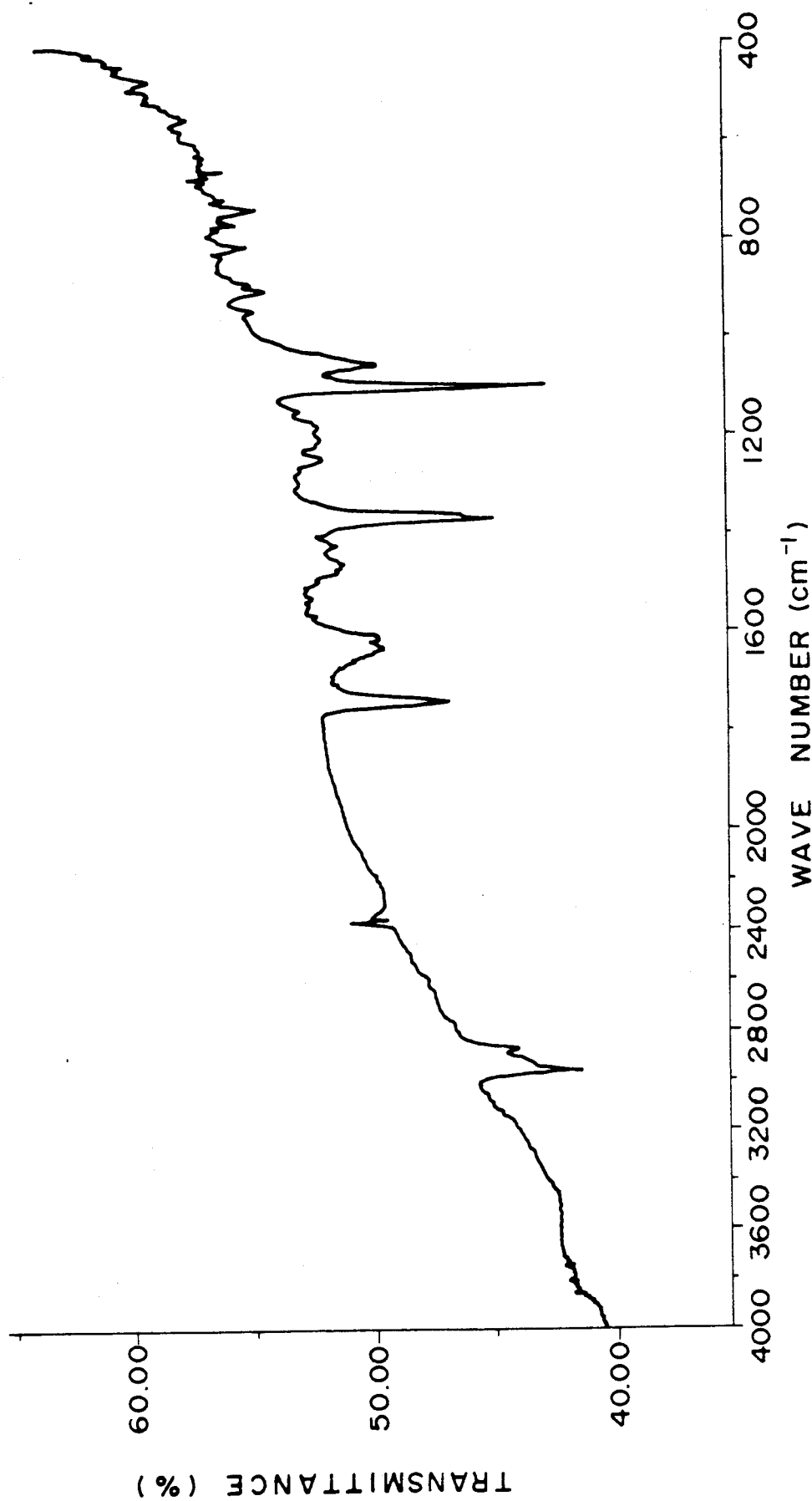
FIG. 64 is an IR spectrum of bis(tri-n-propylsiloxy)-silicon-tetrakis[2-(2',2',4',4'-tetramethylpentyloxycarbonyl) ethylthio]naphthalocyanine.

(3) NMR spectrum values (the NMR spectrum is shown in FIG. 62): CDCl$_3$:
δ values:
10.05 (4H, br-s),
10.01 (4H, br-s),
8.57 (4H, d, J=8.55 Hz),
8.54 (4H, br-s),
7.84 (4H, d, J=8.55 Hz),
4.24 (8H, t, J=6.56 Hz),
3.57 (8H, t, J=7.33 Hz),
2.93 (8H, t, J=7.33 Hz),
1.01 (8H, d, J=5.5 Hz),
0.94 (60H, br-s),
−0.26 (18H, t, J=7.33 Hz),
−0.85 (12H, sextet-like m),
−2.06 (12H, t-like m)
(4) Electronic spectrum (CHCl$_3$ solution) is shown in FIG. 63.
(5) IR spectrum (KBr) is shown in FIG. 64.

EXAMPLE 12

A solution composed of 1 part by weight of the exemplified naphthalocyanine derivative (1) and 99 parts by weight of chloroform was coated on a polymethyl methacrylate 2P substrate having a thickness of 1.2 mm and a diameter of 130 mm by a spin coating method and dried at about 80° C. for about 15 minutes to form a recording layer. The thickness of the recording layer was about 1000 Å. The optical recording medium thus produced was placed, the recording layer upward, on a turn table, and subjected to recording of pulse signals of 2 MHz within a radius of 40 to 60 mm from the center by use of an optical head equipped with a diode layer (830 nm) and an output on the substrate surface of 6 mW, while rotating the turn table at a rate of 900 r.p.m. and controlling laser beams so as to focus the same on the recording layer through the polymethyl methacrylate resin plate from below the optical recording medium, namely, from the substrate side. Next, the output on the substrate surface of the diode laser was adjusted to 0.7 mW and the recorded signals were read out by means of the same apparatus while carrying out the same operations as described above. In this case, the C/N ratio was 56 dB and very excellent writing and reading of signals could be conducted.

EXAMPLE 13

A solution of the exemplified naphthalocyanine derivative (15) in chloroform was coated on a polymethyl methacrylate 2P substrate having a thickness of 1.2 mm and a diameter of 130 mm by a spin coating method in the same manner as in Example 12 to form a recording medium. The thickness of the recording medium was about 1500 Å. When the optical recording medium thus formed was subjected to recording and reading out in the same manner as in Example 12, the C/N ratio was 58 dB and very excellent writing and reading of signals could be conducted.

EXAMPLE 14

The exemplified naphthalocyanine derivative (30) was coated on a polymethyl methacrylate 2P substrate having a thickness of 1.2 mm and a diameter of 130 mm, in the form of a solution in chloroform in the same manner as in Example 12 by a spin coating method to form a recording layer. The thickness of the recording layer was about 1200 Å. When the optical recording medium thus obtained was subjected to recording and reading out of signals in the same manner as in Example 12, the C/N ratio was 59 dB and very excellent writing and reading of signals could be conducted.

EXAMPLE 15

The exemplified naphthalocyanine derivative (40) was coated on a polymethyl methacrylate 2P substrate having a thickness of 1.2 mm and a diameter of 130 mm, in the form of a solution in chloroform in the same manner as in Example 12 by a spin coating method to form a recording layer. The thickness of the recording layer was about 1300 Å. When the optical recording medium thus obtained was subjected to recording and reading out of signals in the same manner as in Example 12, the C/N ratio was 60 dB and very excellent writing and reading of signals could be conducted.

EXAMPLE 16

The exemplified naphthalocyanine derivative (53) was coated on a polymethyl methacrylate 2P substrate having a thickness of 1.2 mm and a diameter of 130 mm, in the form of a solution in chloroform in the same manner as in Example 12 by a spin coating method to form a recording layer. The thickness of the recording layer was about 1100 Å. When the optical recording medium thus obtained was subjected to recording and reading out of signals in the same manner as in Example 12, the C/N ratio was 57 dB and very excellent writing and reading of signals could be conducted.

EXAMPLE 17

The exemplified naphthalocyanine derivative (79) was coated on a polymethyl methacrylate 2P substrate having a thickness of 1.2 mm and a diameter of 130 mm, in the form of a solution in chloroform in to form a recording layer. The thickness of the recording layer was about 1500 Å. When the optical recording medium thus obtained was subjected to recording and reading out of signals in the same manner as in Example 12, the C/N ratio was 59 dB and very excellent writing and reading of signals could be conducted.

EXAMPLE 18

The exemplified naphthalocyanine derivative (87) was coated on a polymethyl methacrylate 2P substrate having a thickness of 1.2 mm and a diameter of 130 mm, in the form of a solution in chloroform in the same manner as in Example 12 by a spin coating method to form a recording layer. The thickness of the recording layer was about 1200 Å. When the optical recording medium thus obtained was subjected to recording and reading out of signals in the same manner as in Example 12, the C/N ratio was 55 dB and very excellent writing and reading of signals could be conducted.

EXAMPLE 19

The exemplified naphthalocyanine derivative (94) was coated on a polymethyl methacrylate 2P substrate having a thickness of 1.2 mm and a diameter of 130 mm, in the form of a solution in chloroform in the same manner as in Example 12 by a spin coating method to form a recording layer. The thickness of the recording layer was about 1300 Å. When the optical recording medium thus obtained was subjected to recording and reading out of signals in the same manner as in Example 12, the C/N ratio was 58 dB and very excellent writing and reading of signals could be conducted.

EXAMPLE 20

The exemplified naphthalocyanine derivative (95) was coated on a polymethyl methacrylate 2P substrate having a thickness of 1.2 mm and a diameter of 130 mm, in the form of a solution in xylene in the same manner as in Example 12 by a spin coating method to form a recording layer. The thickness of the recording layer was about 600 Å. When the optical recording medium thus obtained was subjected to recording and reading out of signals in the same manner as in Example 12, the C/N ratio was 53 dB and ver excellent writing and reading of signals could be conducted.

EXAMPLE 21

The exemplified naphthalocyanine derivative (96) was coated on a polymethyl methacrylate 2P substrate having a thickness of 1.2 mm and a diameter of 130 mm, in the form of a solution in xylene in the same manner as in Example 12 by a spin coating method to form a recording layer. The thickness of the recording layer was about 700 Å. When the optical recording medium thus obtained was subjected to recording and reading out of signals in the same manner as in Example 12, the C/N ratio was 51 dB and very excellent writing and reading of signals could be conducted.

EXAMPLE 22

The exemplified naphthalocyanine derivative (97) was coated on a polymethyl methacrylate 2P substrate having a thickness of 1.2 mm and a diameter of 130 mm, in the form of a solution in xylene in the same manner as in Example 12 by a spin coating method to form a recording layer. The thickness of the recording layer was about 600 Å. When the optical recording medium thus obtained was subjected to recording and reading out of signals in the same manner as in Example 12, the C/N ratio was 52 dB and very excellent writing and reading of signals could be conducted.

EXAMPLE 23

The exemplified naphthalocyanine derivative (98) was coated on a polymethyl methacrylate 2P substrate having a thickness of 1.2 mm and a diameter of 130 mm, in the form of a solution in xylene in the same manner as in Example 12 by a spin coating method to form a recording layer. The thickness of the recording layer was about 600 Å. The thickness of the recording medium thus obtained was subjected to recording and reading out of signals in the same manner as in Example 12, the C/N ratio was 53 dB and very excellent writing and reading of signals could be conducted.

EXAMPLE 24

The exemplified naphthalocyanine derivative (99) was coated on a polymethyl methacrylate 2P substrate having a thickness of 1.2 mm and a diameter of 130 mm, in the form of a solution in xylene in the same manner as in Example 12 by a spin coating method to form a recording layer. The thickness of the recording layer was about 700 Å. When the optical recording medium thus obtained was subjected to recording and reading out of signals in the same manner as in Example 12, the C/N ratio was 54 dB and very excellent writing and reading of signals could be conducted.

EXAMPLE 25

The exemplified naphthalocyanine derivative (100) was coated on a polymethyl methacrylate 2P substrate having a thickness of 1.2 mm and a diameter of 130 mm, in the form of a solution in toluene in the same manner as in Example 12 by a spin coating method to form a recording layer. The thickness of the recording layer was about 700 Å. When the optical recording medium thus obtained was subjected to recording and reading out of signals in the same manner as in Example 12, the C/N ratio was 50 dB and very excellent writing and reading of signals could be conducted.

EXAMPLE 26

The exemplified naphthalocyanine derivative (101) was coated on a polymethyl methacrylate 2P substrate having a thickness of 1.2 mm and a diameter of 130 mm, in the form of a solution in toluene in the same manner as in Example 12 by a spin coating method to form a recording layer. The thickness of the recording layer was about 600 Å. When the optical recording medium thus obtained was subjected to recording and reading out of signals in the same manner as in Example 12, the C/N ratio was 51 dB and very excellent writing and reading of signals could be conducted.

EXAMPLE 27

The exemplified naphthalocyanine derivative (102) was coated on a polymethyl methacrylate 2P substrate having a thickness of 1.2 mm and a diameter of 130 mm, in the form of a solution in tetrahydrofuran in the same manner as in Example 12 by a spin coating method to form a recording layer. The thickness of the recording layer was about 700 Å. When the optical recording medium thus obtained was subjected to recording and reading out of signals in the same manner as in Example 12, the C/N ratio was 52 dB and very excellent writing and reading of signals could be conducted.

EXAMPLE 28

The exemplified naphthalocyanine derivative (103) was coated on a polymethyl methacrylate 2P substrate having a thickness of 1.2 mm and a diameter of 130 mm, in the form of a solution in tetrahydrofuran in the same manner as in Example 12 by a spin coating method to form a recording layer. The thickness of the recording layer was about 600 Å. When the optical recording medium thus obtained was subjected to recording and reading out of signals in the same manner as in Example 12, the C/N ratio was 51 dB and very excellent writing and reading of signals could be conducted.

EXAMPLE 29

The exemplified naphthalocyanine derivative (105) was coated on a polymethyl methacrylate 2P substrate having a thickness of 1.2 mm and a diameter of 130 mm, in the form of a solution in 1,1,2-trichloroethane in the same manner as in Example 12 by a spin coating method to form a recording layer. The thickness of the recording layer was about 1100 Å. When the optical recording medium thus obtained was subjected to recording and reading out of signals in the same manner as in Example 12, the C/N ratio was 53 dB and very excellent writing and reading of signals could be conducted.

EXAMPLE 30

The exemplified naphthalocyanine derivative (113) was coated on a polymethyl methacrylate 2P substrate having a thickness of 1.2 mm and a diameter of 130 mm, in the form of a solution in xylene in the same manner as in Example 12 by a spin coating method to form a recording layer. The thickness of the recording layer was about 700 Å. When the optical recording medium thus obtained was subjected to recording and reading out of signals in the same manner as in Example 12, the C/N ratio was 50 dB and very excellent writing and reading of signals could be conducted.

EXAMPLE 31

The exemplified naphthalocyanine derivative (114) was coated on a polymethyl methacrylate 2P substrate having a thickness of 1.2 mm and a diameter of 130 mm, in the form of a solution in xylene in the same manner as in Example 12 by a spin coating method to form a recording layer. The thickness of the recording layer was about 600 Å. When the optical recording medium thus obtained was subjected to recording and reading out of signals in the same manner as in Example 12, the C/N ratio was 51 dB and very excellent writing and reading of signals could be conducted.

EXAMPLE 32

The exemplified naphthalocyanine derivative (120) was coated on a polymethyl methacrylate 2P substrate having a thickness of 1.2 mm and a diameter of 130 mm, in the form of a solution in xylene in the same manner as in Example 12 by a spin coating method to form a recording layer. The thickness of the recording layer was about 600 °A. When the optical recording medium thus obtained was subjected to recording and reading out of signals in the same manner as in Example 12, the C/N ratio was 51 dB and very excellent writing and reading of signals could be conducted.

EXAMPLE 33

The exemplified naphthalocyanine derivative (127) was coated on a polymethyl methacrylate 2P substrate having a thickness of 1.2 mm and a diameter of 130 mm, in the form of a solution in 1,1,2-trichloroethane in the same manner as in Example 12 by a spin coating method to form a recording layer. The thickness of the recording layer was about 1100 Å. When the optical recording medium thus obtained was subjected to recording and reading out of signals in the same manner as in Example 12, the C/N ratio was 54 dB and very excellent writing and reading of signals could be conducted.

EXAMPLE 34

The exemplified naphthalocyanine derivative (130) was coated on a polymethyl methacrylate 2P substrate having a thickness of 1.2 mm and a diameter of 130 mm, in the form of a solution in xylene in the same manner as in Example 12 by a spin coating method to form a recording layer. The thickness of the recording layer was about 700 Å. When the optical recording medium thus obtained was subjected to recording and reading out of signals in the same manner as in Example 12, the C/N ratio was 52 dB and very excellent writing and reading of signals could be conducted.

EXAMPLE 35

The exemplified naphthalocyanine derivative (131) was coated on a polymethyl methacrylate 2P substrate having a thickness of 1.2 mm and a diameter of 130 mm, in the form of a solution in toluene in the same manner as in Example 12 by a spin coating method to form a recording layer. The thickness of the recording layer was about 600 Å. When the optical recording medium thus obtained was subjected to recording and reading out of signals in the same manner as in Example 12, the C/N ratio was 51 dB and very excellent writing and reading of signals could be conducted.

EXAMPLE 36

The exemplified naphthalocyanine derivative (132) was coated on a polymethyl methacrylate 2P substrate having a thickness of 1.2 mm and a diameter of 130 mm, in the form of a solution in xylene in the same manner as in Example 12 by a spin coating method to form a recording layer. The thickness of the recording layer was about 600 Å. When the optical recording medium thus obtained was subjected to recording and reading out of signals in the same manner as in Example 12, the C/N ratio was 53 dB and very excellent writing and reading of signals could be conducted.

EXAMPLE 37

The exemplified naphthalocyanine derivative (133) was coated on a polymethyl methacrylate 2P substrate having a thickness of 1.2 mm and a diameter of 130 mm, in the form of a solution in xylene in the same manner as in Example 12 by a spin coating method to form a recording layer. The thickness of the recording layer was about 700 Å. When the optical recording medium thus obtained was subjected to recording and reading out of signals in the same manner as in Example 12, the C/N ratio was 52 dB and very excellent writing and reading of signals could be conducted.

EXAMPLE 38

The exemplified naphthalocyanine derivative (134) was coated on a polymethyl methacrylate 2P substrate having a thickness of 1.2 mm and a diameter of 130 mm, in the form of a solution in toluene in the same manner as in Example 12 by a spin coating method to form a recording layer. The thickness of the recording layer was about 700 Å. When the optical recording medium thus obtained was subjected to recording and reading out of signals in the same manner as in Example 12, the C/N ratio was 52 dB and very excellent writing and reading of signals could be conducted.

EXAMPLE 39

The exemplified naphthalocyanine derivative (136) was coated on a polymethyl methacrylate 2P substrate having a thickness of 1.2 mm and a diameter of 130 mm, in the form of a solution in tetrahydrofuran in the same manner as in Example 12 by a spin coating method to form a recording layer. The thickness of the recording layer was about 800 Å. When the optical recording medium thus obtained was subjected to recording and reading out of signals in the same manner as in Example 12, the C/N ratio was 53 dB and very excellent writing and reading of signals could be conducted.

EXAMPLE 40

The exemplified naphthalocyanine derivative (139) was coated on a polymethyl methacrylate 2P substrate having a thickness of 1.2 mm and a diameter of 130 mm, in the form of a solution in xylene in the same manner as in Example 12 by a spin coating method to form a recording layer. The thickness of the recording layer was about 700 Å. When the optical recording medium thus obtained was subjected to recording and reading out of signals in the same manner as in Example 12, the C/N ratio was 51 dB and very excellent writing and reading of signals could be conducted.

EXAMPLE 41

The exemplified naphthalocyanine derivative (140) was coated on a polymethyl methacrylate 2P substrate having a thickness of 1.2 mm and a diameter of 130 mm, in the form of a solution in toluene in the same manner as in Example 12 by a spin coating method to form a recording layer. The thickness of the recording layer was about 600 Å. When the optical recording medium thus obtained was subjected to recording and reading out of signals in the same manner as in Example 12, the C/N ratio was 52 dB and very excellent writing and reading of signals could be conducted.

EXAMPLE 42

The exemplified naphthalocyanine derivative (141) was coated on a polymethyl methacrylate 2P substrate having a thickness of 1.2 mm and a diameter of 130 mm, in the form of a solution in tetrahydrofuran in the same manner as in Example 12 by a spin coating method to form a recording layer. The thickness of the recording layer was about 700 Å. When the optical recording medium thus obtained was subjected to recording and reading out of signals in the same manner as in Example 12, the C/N ratio was 54 dB and very excellent writing and reading of signals could be conducted.

EXAMPLE 43

The exemplified naphthalocyanine derivative (142) was coated on a polymethyl methacrylate 2P substrate having a thickness of 1.2 mm and a diameter of 130 mm, in the form of a solution in toluene in the same manner as in Example 12 by a spin coating method to form a recording layer. The thickness of the recording layer was about 600 Å. When the optical recording medium thus obtained was subjected to recording and reading out of signals in the same manner as in Example 12, the C/N ratio was 52 dB and very excellent writing and reading of signals could be conducted.

EXAMPLE 44

The exemplified naphthalocyanine derivative (145) was coated on a polymethyl methacrylate 2P substrate having a thickness of 1.2 mm and a diameter of 130 mm, in the form of a solution in xylene in the same manner as in Example 12 by a spin coating method to form a recording layer. The thickness of the recording layer was about 800 Å. When the optical recording medium thus obtained was subjected to recording and reading out of signals in the same manner as in Example 12, the C/N ratio was 51 dB and very excellent writing and reading of signals could be conducted.

EXAMPLE 45

The exemplified naphthalocyanine derivative (148) was coated on a polymethyl methacrylate 2P substrate having a thickness of 1.2 mm and a diameter of 130 mm, in the form of a solution in tetrahydrofuran in the same manner as in Example 12 by a spin coating method to form a recording layer. The thickness of the recording layer was about 600 Å. When the optical recording medium thus obtained was subjected to recording and reading out of signals in the same manner as in Example 12, the C/N ratio was 50 dB and very excellent writing and reading of signals could be conducted.

EXAMPLE 46

The exemplified naphthalocyanine derivative (149) was coated on a polymethyl methacrylate 2P substrate having a thickness of 1.2 mm and a diameter of 130 mm, in the form of a solution in toluene in the same manner as in Example 12 by a spin coating method to form a recording layer. The thickness of the recording layer was about 600 Å. When the optical recording medium thus obtained was subjected to recording and reading out of signals in the same manner as in Example 12, the C/N ratio was 52 dB and very excellent writing and reading of signals could be conducted.

EXAMPLE 47

The exemplified naphthalocyanine derivative (151) was coated on a polymethyl methacrylate 2P substrate having a thickness of 1.2 mm and a diameter of 130 mm, in the form of a solution in 1,1,2-trichloroethane in the same manner as in Example 12 by a spin coating method to form a recording layer. The thickness of the recording layer was about 1000 Å. When the optical recording medium thus obtained was subjected to recording and reading out of signals in the same manner as in Example 12, the C/N ratio was 53 dB and very excellent writing and reading of signals could be conducted.

EXAMPLE 48

The exemplified naphthalocyanine derivative (154) was coated on a polymethyl methacrylate 2P substrate having a thickness of 1.2 mm and a diameter of 130 mm, in the form of a solution in butanol in the same manner as in Example 12 by a spin coating method to form a recording layer. The thickness of the recording layer was about 800 Å. When the optical recording medium thus obtained was subjected to recording and reading out of signals in the same manner as in Example 12, the C/N ratio was 52 dB and very excellent writing and reading of signals could be conducted.

EXAMPLE 49

The exemplified naphthalocyanine derivative (156) was coated on a polymethyl methacrylate 2P substrate having a thickness of 1.2 mm and a diameter of 130 mm, in the form of a solution in butanol in the same manner as in Example 12 by a spin coating method to form a recording layer. The thickness of the recording layer was about 700 Å. When the optical recording medium thus obtained was subjected to recording and reading out of signals in the same manner as in Example 12, the C/N ratio was 51 dB and very excellent writing and reading of signals could be conducted.

EXAMPLE 50

The exemplified naphthalocyanine derivative (158) was coated on a polymethyl methacrylate 2P substrate having a thickness of 1.2 mm and a diameter of 130 mm in the form of a solution in xylene in the same manner as in Example 12 by a spin coating method to form a recording layer. The thickness of the recording layer was about 700 Å. When the optical recording medium thus obtained was subjected to recording and reading out of signals in the same manner as in Example 12, the C/N ratio was 53 dB and very excellent writing and reading of signals could be conducted.

EXAMPLE 51

The exemplified naphthalocyanine derivative (160) was coated on a polymethyl methacrylate 2P substrate having a thickness of 1.2 mm and a diameter of 130 mm, in the form of a solution in 1,1,2-trichloroethane in the same manner as in Example 12 by a spin coating method to form a recording layer. The thickness of the recording layer was about 800 Å. When the optical recording medium thus obtained was subjected to recording and reading out of signals in the same manner as in Example 12, the C/N ratio was 50 dB and very excellent writing and reading of signals could be conducted.

EXAMPLE 52

The exemplified naphthalocyanine derivative (162) was coated on a polymethyl methacrylate 2P substrate having a thickness of 1.2 mm and a diameter of 130 mm, in the form of a solution in toluene in the same manner as in Example 12 by a spin coating method to form a recording layer. The thickness of the recording layer was about 600 Å. When the optical recording medium thus obtained was subjected to recording and reading out of signals in the same manner as in Example 12, the C/N ratio was 51 dB and very excellent writing and reading of signals could be conducted.

EXAMPLE 53

The exemplified naphthalocyanine derivative (164) was coated on a polymethyl methacrylate 2P substrate having a thickness of 1.2 mm and a diameter of 130 mm, in the form of a solution in toluene in the same manner as in Example 12 by a spin coating method to form a recording layer. The thickness of the recording layer was about 700 Å. When the optical recording medium thus obtained was subjected to recording and reading out of signals in the same manner as in Example 12, the C/N ratio was 52 dB and very excellent writing and reading of signals could be conducted.

EXAMPLE 54

The exemplified naphthalocyanine derivative (165) was coated on a polymethyl methacrylate 2P substrate having a thickness of 1.2 mm and a diameter of 130 mm, in the form of a solution in xylene in the same manner as in Example 12 by a spin coating method to form a recording layer. The thickness of the recording layer was about 600 Å. When the optical recording medium thus obtained was subjected to recording and reading out of signals in the same manner as in Example 12, the C/N ratio was 50 dB and very excellent writing and reading of signals could be conducted.

EXAMPLE 55

The exemplified naphthalocyanine derivative (166) was coated on a polymethyl methacrylate 2P substrate having a thickness of 1.2 mm and a diameter of 130 mm, in the form of a solution in toluene in the same manner as in Example 12 by a spin coating method to form a recording layer. The thickness of the recording layer was about 700 Å. When the optical recording medium thus obtained was subjected to recording and reading out of signals in the same manner as in Example 12, the C/N ratio was 53 dB and very excellent writing and reading of signals could be conducted.

COMPARATIVE EXAMPLE 3

OVNc(t-$C_4H_9$)$_4$ was coated on a polymethyl methacrylate 2P substrate having a thickness of 1.2 mm and a diameter of 130 mm, in the form of a solution in chloroform in the same manner as in Example 12 by a spin coating method to form a recording layer. The thickness of the recording layer was about 1000 Å. When the recording medium thus obtained was subjected to recording and reading out in the same manner as in Example 12, the C/N ratio was 49 dB and no excellent writing and reading could be conducted.

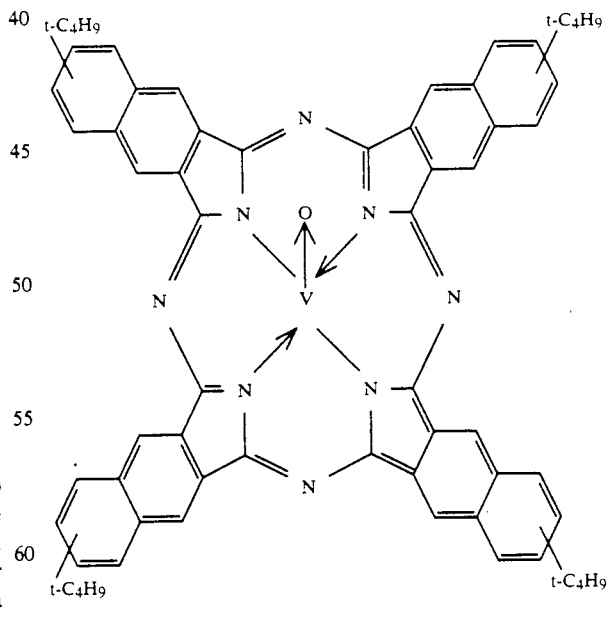

OVNc(t-$C_4H_9$)$_4$

EXAMPLE 56

The previously exemplified naphthalocyanine derivative (95) was dissolved in xylene to prepare a 1% solution, which was then coated on a glass substrate of 1.2 mm in thickness by a spin coating method to form a recording layer of 700 Å in thickness. When the recording medium thus formed was irradiated with diode laser beams having a wavelength of 830 nm from the glass substrate side and the recording characteristics were evaluated, recording was possible at a beam diameter of 1.6 μm at a linear velocity of 6.5 m/sec, at 6.4 mW. On the other hand, when the recording medium was repeatedly irradiated with reading light of 0.5 mW in order to evaluate the stability against reading out light, even $10^6$ repetitions of the irradiation did not cause a change of the reflectivity.

COMPARATIVE EXAMPLE 4

Cyanine dye NK-2905 (mfd. by Nihon Kanko Shikiso Kenkyusho) was dissolved in dichloroethane and the resulting solution was coated on a glass substrate by a spin coating method to form a recording layer of 500 Å in thickness. When the recording medium thus obtained was irradiated with laser beams in the same manner as in Example 56, recording was possible at 4.8 mW. But when its stability against reading out light was evaluated, the reflectivity began to be lowered at a number of repetitions of the irradiation of about $4 \times 10^4$ times and was lowered to 70% of the initial reflectivity after $10^6$ repetitions.

EXAMPLE 57

The exemplified naphthalocyanine derivative (131) was dissolved in xylene and the resulting solution was coated on a glass substrate by a spin coating method to form a recording layer of 700 Å in thickness. The recording medium thus obtained was irradiated with diode laser beams having a wavelength of 830 nm from the glass substrate side and the recording characteristics were evaluated to find that recording was possible at a beam diameter of 1.6 μm at a linear velocity of 6.5 m/sec, at 6.9 mW. On the other hand, when the recording medium was repeatedly irradiated with reading light of 0.5 mW in order to evaluate the stability against reading out light, even $10^6$ repetitions of the irradiation did not cause a change of the reflectivity.

EXAMPLE 58

The exemplified naphthalocyanine derivative (133) was dissolved in xylene and the resulting solution was coated on a glass substrate by a spin coating method to form a recording layer of 900 Å in thickness. The recording medium thus obtained was irradiated with laser beams in the same manner as in Example 57 to find that recording was possible at 6.6 mW. When the stability against reading out light was evaluated in the same manner as in Example 57, even $10^6$ repetitions of the irradiation did not cause a change of the reflectivity.

EXAMPLE 59

The exemplified naphthalocyanine derivative (133) and polystyrene were dissolved in toluene in the ratio of 1:1 and the resulting solution was coated on a glass substrate by a spin coating method to form a recording layer of 1500 Å in thickness. The recording medium thus formed was irradiated with laser beams in the same manner as in Example 57 to find that recording was possible at 9.6 mW. When the stability against reading out light was evaluated in the same manner as in Example 57, even $10^6$ repetitions of the irradiation did not cause a change of the reflectivity.

The exemplified naphthalocyanine derivative (138) was dissolved in toluene and the resulting solution was coated on a glass substrate of 1.2 mm in thickness by a spin coating method to form a recording layer of 700 Å in thickness. When the recording medium thus obtained was irradiated with diode laser beams having a wavelength of 830 nm from the glass substrate side and the recording characteristics were evaluated, recording was possible at a beam diameter of 1.6 μm at a linear velocity of 7.5 m/sec, at 4.6 mW. On the other hand, when the recording medium was repeatedly irradiated with reading light of 0.5 mW in order to evaluate the stability against reading out light, even $10^6$ repetitions of the irradiation did not cause a change of the reflectivity.

COMPARATIVE EXAMPLE 5

Cyanine dye NK-2873 (mfd. by Nihon Kanko Shikiso Kenkyusho) was dissolved in dichloroethane and the resulting solution was coated on a glass substrate by a spin coating method to form a recording layer of 500 Å in thickness. When the recording medium thus obtained was irradiated with laser beams in the same manner as in Example 57 recording was possible at 5.2 mW. But when its stability against reading out light was evaluated, the reflectivity began to be lowered at a number of repetitions of the irradiation of about $5 \times 10^4$ times and was lowered to 70% of the initial reflectivity after $10^6$ repetitions.

EXAMPLE 61

The exemplified naphthalocyanine derivative (141) was dissolved in dichloroethane and the resulting solution was coated on a glass substrate by a spin coating method to form a recording layer of 500 Å in thickness. The recording medium thus obtained was irradiated with laser beams in the same manner as in Example 57 to find that recording was possible at 4.4 mW. When its stability against reading out light was evaluated, even $10^6$ repetitions of the irradiation did not cause a change of the reflectivity.

EXAMPLE 62

The exemplified naphthalocyanine derivative (144) was dissolved in toluene and the resulting solution was coated on a glass substrate by a spin coating method to form a recording layer of 500 Å in thickness. The recording medium thus obtained was irradiated with laser beams in the same manner as in Example 57 to find that recording was possible at 4.9 mW. When its stability against reading out light was evaluated, even $10^6$ repetitions of the irradiation did not cause a change of the reflectivity.

EXAMPLE 63

The exemplified naphthalocyanine derivative (147) was dissolved in toluene and the resulting solution was coated on a glass substrate by a spin coating method to form a recording layer of 400 Å in thickness. The recording medium thus obtained was irradiated with laser beams in the same manner as in Example 57 to find that recording was possible at 4.2 mW. When its stability against reading out light was evaluated, even $10^6$ repetitions of the irradiation did not cause a change of the reflectivity.

EXAMPLE 64

A solution of the exemplified naphthalocyanine derivative (150) in toluene was coated on a polycarbonate substrate of 1.2 mm in thickness having a Ti chelate surface-protecting layer of 10 nm in thickness by a spin coating method using a spinner, to form a recording layer of 600 Å in thickness. The recording characteristics were evaluated at a linear velocity of 5 m/sec in the same manner as in Example 57 to find that recording was possible at 7.4 mW. When the stability against reading out light was evaluated at the same time, even $10^6$ repetitions of the irradiation did not cause a change of the reflectivity.

EXAMPLE 65

A mixture of the exemplified naphthalocyanine derivative (152) and polystyrene in the ratio of 2:1 was dissolved in methyl ethyl ketone and the resulting solution was formed into a recording layer of 600 Å in thickness on a glass substrate. Evaluation was conducted in the same manner as in Example 57 to obtain the results: the recording sensitivity 4.8 mW, deterioration by reproduction $10^6$ repetitions or more.

EXAMPLE 66

The exemplified naphthalocyanine derivative (154) was dissolved in butanol to prepare a 0.8 wt % solution, which was then coated on a glass substrate of 1.2 mm in thickness by a spin coating method to form a recording layer of 400 Å in thickness. When the recording medium thus obtained was irradiated with diode laser beams having a wavelength of 830 nm from the glass substrate side and its recording characteristics were evaluated, recording was possible at a $1/e^2$ beam diameter of 1.6 μm at a linear velocity of 7.6 m/sec, at 7.8 mW. On the other hand, when the recording medium was repeatedly irradiated with reading light of 0.5 mW in order to evaluate its stability against reading out light, even $10^6$ repetitions of the irradiation did not cause a change of the reflectivity.

EXAMPLE 67

The exemplified naphthalocyanine derivative (156) was dissolved in butanol to prepare a 1.0 wt % solution, which was then coated on a glass substrate of 1.2 mm in thickness by a spin coating method to form a recording layer of 600 Å in thickness. When the recording medium thus obtained was irradiated with diode laser beams having a wavelength of 830 nm from the glass substrate side and its recording characteristics were evaluated, recording was possible at a $1/e^2$ beam diameter of 1.6 μm at a linear velocity of 7.6 m/sec, at 8.6 mW. On the other hand, when the recording medium was repeatedly irradiated with reading light of 0.5 mW in order to evaluate its stability against reading out light, even $10^6$ repetitions of the irradiation did not cause a change of the reflectivity.

EXAMPLE 68

A mixture of the exemplified naphthalocyanine derivative (158) and polystyrene in the ratio of 2:1 was dissolved in 1,1,2-trichloroethane and the resulting solution was coated on a glass substrate of 1.2 mm in thickness by a spin coating method to form a recording layer of 800 Å in thickness. When the recording medium thus obtained was irradiated with diode laser beams having a wavelength of 830 nm from the substrate side and its recording characteristics were evaluated, recording was possible at a linear velocity of 8 m/sec, at 6 mW. The recording medium was repeatedly irradiated with reading light of 0.5 mW, but even $10^6$ repetitions of the irradiation did not cause a change of the reflectivity.

This invention provides a novel naphthalocyanine derivative, and this compound is useful, for example, as optical recording media, photo conducting material, liquid crystal display material, and the like.

What is claimed is:

1. A naphthalocyanine derivative represented by the formula:

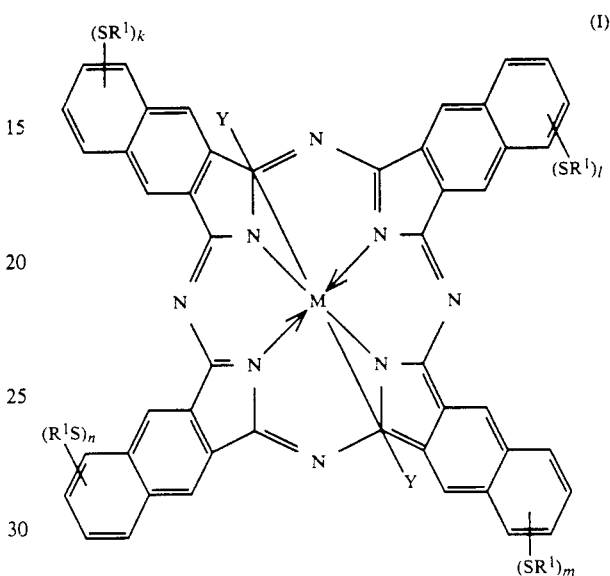

wherein k, l, m and n, which may be the same or different, are zero or integers of 1 to 4, k+l+m+n being an integer of 1 or more; $R^1$'s in a number of 4(k+l+m+n), which may be the same or different, are alkyl groups, substituted alkyl groups, or aryl groups; M is Si, Ge or Sn; and two Y's, which may be the same or different, are aryloxyl groups, alkoxyl groups, trialkylsiloxyl groups, triarylsiloxyl groups, trialkoxysiloxyl groups, triaryloxysiloxyl groups, trityloxyl groups, or acyloxyl groups.

2. A naphthalocyanine derivative according to claim 1, wherein M is Si or Ge in the formula (I).

3. A naphthalocyanine derivative according to claim 1, wherein k, l, m and n are all 1 in the formula (I).

4. A naphthalocyanine derivative according to claim 1, wherein two Y's are trialkylsiloxyl groups in the formula (I).

5. A naphthalocyanine derivative according to claim 1, wherein all $R^1$'s are alkyl groups having 1 to 22 carbon atoms in the formula (I).

6. A naphthalocyanine derivative according to claim 1, wherein all $R^1$'s are substituted alkyl groups in the formula (I).

7. A naphthalocyanine derivative according to claim 1, wherein the aryloxyl groups are selected from the group consisting of phenoxyl group, tolyloxyl group and anisyloxyl group; the alkoxyl groups are selected from the group consisting of amyloxyl group, hexyloxyl group, octyloxyl group, decyloxyl group, dodecyloxyl group, tetradecyloxyl group, hexadecyloxyl group, octadecyloxyl group, eicosyloxyl group and docosyloxyl group; the trialkylsiloxyl groups are selected from the group consisting of trimethylsiloxyl group, triethylsiloxyl group, tripropylsiloxyl group and tributylsiloxyl group; the triarylsiloxyl groups are selected from the group consisting of triphenylsiloxyl group, trianisyl-siloxyl group and tritolylsiloxyl group; the trialkoxysiloxyl groups are selected from the group consisting of trimethoxysiloxyl group, triethoxysiloxyl group, tripropoxysiloxyl group and tributoxysiloxyl group; the triaryloxysiloxyl groups are selected from the group consisting of triphenoxysiloxyl group, trianisiloxysiloxyl group and tritolyloxysiloxyl group; and the acyloxyl groups are selected from the group consisting of acetyoxyl group, propionyloxyl group, butyryloxyl group, valeryloxyl group, pivaloyloxyl group, hexanoyloxyl group and octanoyloxyl group.

8. A naphthalocyanine derivative according to claim 5, wherein the aryloxyl groups are selected from the group consisting of phenoxyl group, tolyloxyl group and anisyloxyl group; the alkoxyl groups are selected from the group consisting of amyloxyl group, hexyloxyl group, octyloxyl group, decyloxyl group, dodecyloxyl group, tetradecyloxyl group, hexadecyloxyl group, octadecyloxyl group, eicosyloxyl group and docosyloxyl group; the trialkylsiloxyl groups are selected from the group consisting of trimethylsiloxyl group, triethylsiloxyl group, tripropylsiloxyl group and tributylsiloxyl group; the triarylsiloxyl groups are selected from the group consisting of triphenylsiloxyl group, trianisyl-siloxyl group and tritolylsiloxyl group; the trialkoxysiloxyl groups are selected from the group consisting of trimethoxysiloxyl group, triethoxysiloxyl group, tripropoxysiloxyl group and tributoxysiloxyl group; the triaryloxysiloxyl groups are selected from the group consisting of triphenoxysiloxyl group, trianisiloxysiloxyl group and tritolyloxysiloxyl group; and the acyloxyl groups are selected from the group consisting of acetyoxyl group, propionyloxyl group, butyryloxyl group, valeryloxyl group, pivaloyloxyl group, hexanoyloxyl group and octanoyloxyl group.

9. A naphthalocyanine derivative according to claim 1, wherein Y in the formula (I) is a trialkoxysiloxyl group, a triaryloxysiloxyl group, a trityloxyl group or an acyloxyl group.

10. A naphthalocyanine derivative according to claim 1, wherein Y in the formula (I) is a trialkoxysiloxyl group.

11. A naphthalocyanine derivative according to claim 1, wherein Y in the formula (I) is a trialkoxysiloxyl group, a triaryloxysiloxyl group, a trityloxyl group or an acyloxyl group; and $R^1$ is an alkyl group.

12. A naphthalocyanine derivative according to claim 1, wherein Y in the formula (I) is a trialkoxysiloxyl group; and $R^1$ is an alkyl group.

13. An optical recording medium comprising a substrate and a recording layer formed on a surface of the substrate, said recording layer comprising mainly a naphthalocyanine derivative represented by the formula:

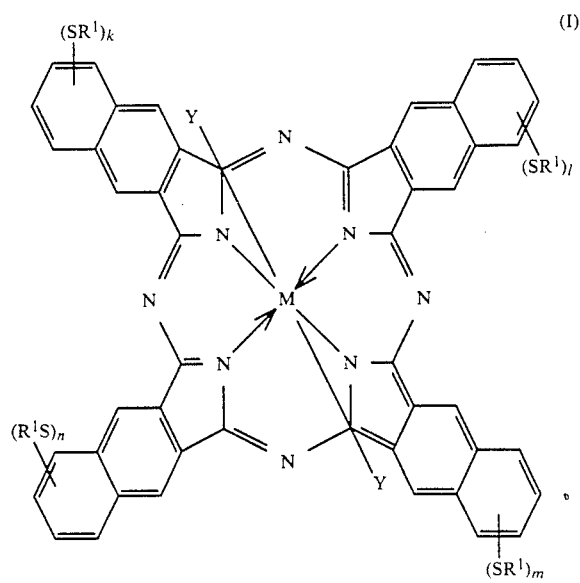

wherein k, l, m and n, which may be the same or different, are zero or integers of 1 to 4, $k+l+m+n$ being an integer of 1 or more; $R^1$'s in a number of 4 $(k+l+m+n)$, which may be the same or different, are alkyl groups, substituted alkyl groups, or aryl groups; M is Si, Ge or Sn; and two Y's, which may be the same or different, are aryloxyl groups, alkoxyl groups, trialkylsiloxyl groups, triarylsiloxyl groups, trialkoxysiloxyl groups, triaryloxysiloxyl groups, trityloxyl groups, or acyloxyl groups.

14. An optical recording medium according to claim 13, wherein the recording layer comprises mainly a naphthalocyanine derivative of the formula (I) in which M is Si or Ge.

15. An optical recording medium according to claim 13, wherein the recording layer is composed mainly of a naphthalocyanine derivative of the formula (I) in which k, l, m and n are all 1.

16. An optical recording medium according to claim 13, wherein the recording layer is composed mainly of a naphthalocyanine derivative of the formula (I) in which two Y's are trialkylsiloxyl groups.

17. An optical recording medium according to claim 13, wherein the recording layer is composed mainly of a naphthalocyanine derivative of the formula (I) in which all $R^1$'s are alkyl groups having 1 to 22 alkyl groups.

18. An optical recording medium according to claim 13, wherein the recording layer is composed mainly of a naphthalocyanine derivative of the formula (I) in which all $R^1$'s are substituted alkyl groups.

19. An optical recording medium according to claim 13, wherein the aryloxyl groups are selected from the group consisting of phenoxyl group, tolyloxyl group and anisyloxyl group; the alkoxyl groups are selected from the group consisting of amyloxyl group, hexyloxyl group, octyloxyl group, decyloxyl group, dodecyloxyl group, tetradecyloxyl group, hexadecyloxyl group, octadecyloxyl group, eicosyloxyl group and docosyloxyl group; the trialkylsiloxyl groups are selected from the group consisting of trimethylsiloxyl group, triethylsiloxyl group, tripropylsiloxyl group and tributylsiloxyl group; the triarylsiloxyl groups are selected from the group consisting of triphenylsiloxyl group, trianisylsiloxyl group and tritolylsiloxyl group; the trialkoxysiloxyl groups are selected from the group consisting of trimethoxysiloxyl group, triethoxysiloxyl group, tripropoxysiloxyl group and tributoxysiloxyl group; the triaryloxysiloxyl groups are selected from the group consisting of triphenoxysiloxyl group, trianisiloxysiloxyl group and tritolyloxysiloxyl group; and the acyloxyl groups are selected from the group consisting of acetyoxyl group, propionyloxyl group, butyryloxyl group, valeryloxyl group, pivaloyloxyl group, hexanoyloxyl group and octanoyloxyl group.

20. An optical recording medium according to claim 17, wherein the aryloxyl groups are selected from the group consisting of phenoxyl group, tolyloxyl group and anisyloxyl group; the alkoxyl groups are selected from the group consisting of amyloxyl group, hexyloxyl group, octyloxyl group, decyloxyl group, dodecyloxyl group, tetradecyloxyl group, hexadecyloxyl group, octadecyloxyl group, eicosyloxyl group and docosyloxyl group; the trialkylsiloxyl groups are selected from the group consisting of trimethylsiloxyl group, triethylsiloxyl group, tripropylsiloxyl group and tributylsiloxyl group; the triarylsiloxyl groups are selected from the group consisting of triphenylsiloxyl group, trianisylsiloxyl group and tritolylsiloxyl group; the trialkoxysiloxyl groups are selected from the group consisting of trimethoxysiloxyl group, triethoxysiloxyl group, tripropoxysiloxyl group and tributoxysiloxyl group; the triaryloxysiloxyl groups are selected from the group consisting of triphenoxysiloxyl group, trianisiloxysiloxyl group and tritolyloxysiloxyl group; and the acyloxyl groups are selected from the group consisting of acetyoxyl group, propionyloxyl group, butyryloxyl group, valeryloxyl group, pivaloyloxyl group, hexanoyloxyl group and octanoyloxyl group.

* * * * *